(12) United States Patent
Kamo et al.

(10) Patent No.: US 10,992,056 B2
(45) Date of Patent: Apr. 27, 2021

(54) SLOT ANTENNA DEVICE

(71) Applicants: Nidec Corporation, Kyoto (JP); WGR Co., Ltd., Kyoto (JP)

(72) Inventors: Hiroyuki Kamo, Kyoto (JP); Hideki Kirino, Kyoto (JP)

(73) Assignees: NIDEC CORPORATION, Kyoto (JP); WGR CO., LTD., Kyoto (JP)

(*) Notice: Subject to any disclaimer, the term of this patent is extended or adjusted under 35 U.S.C. 154(b) by 4 days.

(21) Appl. No.: 16/599,264

(22) Filed: Oct. 11, 2019

(65) Prior Publication Data

US 2020/0044360 A1   Feb. 6, 2020

Related U.S. Application Data

(63) Continuation of application No. PCT/JP2018/015116, filed on Apr. 10, 2018.

(30) Foreign Application Priority Data

Apr. 14, 2017 (JP) .............................. JP2017-080191

(51) Int. Cl.
*H01Q 13/10* (2006.01)
*H01Q 21/06* (2006.01)
(Continued)

(52) U.S. Cl.
CPC ............. *H01Q 21/064* (2013.01); *G01S 7/03* (2013.01); *G01S 13/878* (2013.01); *H01P 3/02* (2013.01);
(Continued)

(58) Field of Classification Search
CPC .. H01Q 21/064; H01Q 1/3233; H01Q 1/3266; H01Q 13/10; H01Q 13/22;
(Continued)

(56) References Cited

U.S. PATENT DOCUMENTS 6,191,704 B1   2/2001 Takenaga et al.
6,339,395 B1   1/2002 Hazumi et al.
(Continued)

FOREIGN PATENT DOCUMENTS

CN   106537682 A   3/2017
EP   1 331 688 A1   7/2003
(Continued)

OTHER PUBLICATIONS

Zarifi, D. et al.; "A High Gain Ridge Gap Waveguide Fed Slot Antenna Array for 60 GHz Applications"; https://ieeexplore.ieee.org/stamp/stamp.jsp?tp=&amumber=7481703; Apr. 2016; 4 pages.
(Continued)

*Primary Examiner* — Dieu Hien T Duong
(74) *Attorney, Agent, or Firm* — Keating & Bennett

(57) ABSTRACT

A slot antenna device includes a first electrical conductor including first and second electrically conductive surfaces, a second electrical conductor including a third electrically conductive surface that opposes the second electrically conductive surface, a waveguide body on the second electrically conductive surface, and an artificial magnetic conductor extending on both sides of the waveguide body. The first electrical conductor includes a slot. The waveguide body includes a waveguide surface that opposes the third electrically conductive surface. The third electrically conductive surface, the waveguide surface, and the artificial magnetic conductor define a waveguide. The waveguide body includes a first ridge and a second ridge. As viewed from a direction perpendicular or substantially perpendicular to the waveguide surface, the slot is located between the one end of the first ridge and the one end of the second ridge.

25 Claims, 50 Drawing Sheets

(51) Int. Cl.
| | |
|---|---|
| *G01S 7/03* | (2006.01) |
| *G01S 13/87* | (2006.01) |
| *H01P 3/02* | (2006.01) |
| *H01P 3/123* | (2006.01) |
| *H01Q 1/32* | (2006.01) |
| *H01Q 13/22* | (2006.01) |
| *H01Q 21/00* | (2006.01) |

(52) U.S. Cl.
CPC ........... *H01P 3/123* (2013.01); *H01Q 1/3233* (2013.01); *H01Q 1/3266* (2013.01); *H01Q 13/10* (2013.01); *H01Q 13/22* (2013.01); *H01Q 21/005* (2013.01)

(58) Field of Classification Search
CPC ....... H01Q 21/005; G01S 7/03; G01S 13/878; H01P 3/02; H01P 3/123
See application file for complete search history.

(56) References Cited

U.S. PATENT DOCUMENTS

| | | |
|---|---|---|
| 6,403,942 B1 | 6/2002 | Stam |
| 6,611,610 B1 | 8/2003 | Stam et al. |
| 6,628,299 B2 | 9/2003 | Kitayama |
| 6,661,367 B2 | 12/2003 | Sugiyama et al. |
| 6,703,967 B1 | 3/2004 | Kuroda et al. |
| 6,903,677 B2 | 6/2005 | Takashima et al. |
| 6,943,726 B2 | 9/2005 | Schneider |
| 6,970,139 B1 | 11/2005 | Chew et al. |
| 7,161,561 B2 | 1/2007 | Kitayama |
| 7,355,524 B2 | 4/2008 | Schofield |
| 7,358,889 B2 | 4/2008 | Abe et al. |
| 7,417,580 B2 | 8/2008 | Abe et al. |
| 7,420,159 B2 | 9/2008 | Heslin et al. |
| 7,425,983 B2 | 9/2008 | Izumi et al. |
| 7,570,198 B2 | 8/2009 | Tokoro |
| 7,978,122 B2 | 7/2011 | Schmidlin |
| 8,068,134 B2 | 11/2011 | Yoshizawa |
| 8,446,312 B2 | 5/2013 | Kanamoto et al. |
| 8,543,277 B2 | 9/2013 | Higgins-Luthman |
| 8,593,521 B2 | 11/2013 | Schofield et al. |
| 8,604,968 B2 | 12/2013 | Alland et al. |
| 8,610,620 B2 | 12/2013 | Katoh |
| 8,614,640 B2 | 12/2013 | Lynam |
| 8,636,393 B2 | 1/2014 | Schofield |
| 8,730,096 B2 | 5/2014 | Kanamoto et al. |
| 8,730,099 B2 | 5/2014 | Kanamoto et al. |
| 8,779,995 B2 | 7/2014 | Kirino et al. |
| 8,803,638 B2 | 8/2014 | Kildal |
| 8,861,842 B2 | 10/2014 | Jung et al. |
| 9,286,524 B1 | 3/2016 | Mei et al. |
| 9,786,995 B2 | 10/2017 | Kirino et al. |
| 10,027,032 B2 | 7/2018 | Kirino et al. |
| 10,042,045 B2 | 8/2018 | Kirino et al. |
| 10,090,600 B2 | 10/2018 | Kirino et al. |
| 10,158,158 B2 | 12/2018 | Kirino et al. |
| 2011/0187614 A1 | 8/2011 | Kirino et al. |
| 2012/0092224 A1 | 4/2012 | Sauleau et al. |
| 2013/0033404 A1 | 2/2013 | Abe |
| 2015/0264230 A1 | 9/2015 | Takeda |
| 2015/0288063 A1 | 10/2015 | Johnson et al. |
| 2016/0140424 A1 | 5/2016 | Wang et al. |
| 2016/0264065 A1 | 9/2016 | Takeda |
| 2017/0057421 A1 | 3/2017 | Takehara |
| 2017/0057422 A1 | 3/2017 | Takehara |
| 2017/0064165 A1 | 3/2017 | Onishi |
| 2017/0077576 A1 | 3/2017 | Kirino |
| 2017/0077610 A1 | 3/2017 | Bongard et al. |
| 2017/0084971 A1 | 3/2017 | Kildal et al. |
| 2017/0317427 A1 | 11/2017 | Kirino et al. |
| 2018/0040963 A1 | 2/2018 | Kirino et al. |
| 2018/0113187 A1 | 4/2018 | Vassilev et al. |
| 2018/0301817 A1 | 10/2018 | Ichinose et al. |
| 2018/0351261 A1 | 12/2018 | Kamo et al. |
| 2018/0375219 A1 | 12/2018 | Kirino et al. |
| 2019/0006743 A1 | 1/2019 | Kirino et al. |
| 2019/0067780 A1 | 2/2019 | Kirino et al. |
| 2019/0074569 A1 | 3/2019 | Kamo et al. |
| 2019/0123411 A1 | 4/2019 | Carlred et al. |
| 2019/0139914 A1 | 5/2019 | Kirino et al. |
| 2019/0140344 A1 | 5/2019 | Kirino et al. |

FOREIGN PATENT DOCUMENTS

| | | |
|---|---|---|
| JP | 2001-267838 A | 9/2001 |
| JP | 2004-257848 A | 9/2004 |
| JP | 2007-259047 A | 10/2007 |
| JP | 2010-021828 A | 1/2010 |
| JP | 2012-004700 A | 1/2012 |
| JP | 2012-523149 A | 9/2012 |
| JP | 2013-032979 A | 2/2013 |
| WO | 01/67540 A1 | 9/2001 |
| WO | 2008/081807 A1 | 7/2008 |
| WO | 2010/050122 A1 | 5/2010 |
| WO | 2015/172948 A2 | 11/2015 |
| WO | 2016/163932 A1 | 10/2016 |
| WO | 2018/105513 A1 | 6/2018 |
| WO | 2018/207796 A1 | 11/2018 |
| WO | 2018/207838 A1 | 11/2018 |

OTHER PUBLICATIONS

Kirino et al., "A 76 GHz Multi-Layered Phased Array Antenna Using a Non-Metal Contact Metamaterial Waveguide", IEEE Transactions on Antennas and Propagation, vol. 60, No. 2, Feb. 2012, pp. 840-853.
Zaman et al., "Ku Band Linear Slot-Array in Ridge Gapwaveguide Technolgy", 7th European Conference on Antennas and Propagation (EUCAP 2013)—Convened Sessions, 2013, pp. 2968-2971.
Kildal et al., "Local Metamaterial-Based Waveguides in Gaps Between Parallel Metal Plates", IEEE Antennas and Wireless Propagation Letters, vol. 8, 2009, pp. 84-87.
Pucci et al., "Design of a Dual-Mode Horn Element for Microstrip Gap Waveguide Fed Array", 7th European Conference on Antennas and Propagation (EUCAP 2013)—Convened Sessions, 2013, pp. 2976-2979.
Kildal, "Metasurfing Since 1987—A Personal Story Involving Soft and Hard Surfaces, EBG Surfaces, Cloaking, Gap Waveguides and Mass Production", 2014 IEEE Antennas and Propagation Society International Symposium, 2014, pp. 529-530.
Sehm et al., "A High-Gain 58-GHz Box-Horn Array Antenna with Suppressed Grating Lobes", IEEE Transactions on Antennas and Propagation, vol. 47, No. 7, Jul. 1999, pp. 1125-1130.
Zaman et al., "Slot Antenna in Ridge Gap Waveguide Technology", 6th European Conference on Antennas and Propagation, Mar. 2012, pp. 3243 & 3244.
Zarifi et al., "Design and Fabrication of a High-Gain 60-GHz Corrugated Slot Antenna Array With Ridge Gap Waveguide Distribution Layer", IEEE Transactions on Antennas and Propagation, vol. 64, No. 7, Jul. 2016, pp. 2905-2913.
Mustafa, "Hybrid Analog-Digital Beam-Steered Slot Antenna Array for mm-Wave Applications in Gap Waveguide Technology", Department of Electronics and Telecommunications Master of Science in Telecommunications Engineering Master's Thesis, Oct. 2015, 67 pages.
Kirino et al., "Simplified Wavelength Calculations for Fast and Slow Wave Metamaterial Ridged Waveguides and their Application to Array Antenna Design", Proceedings of the International Symposium on Antennas & Propagation, Oct. 25, 2013, 4 pages.
Ahmadi et al., "Direct Coupled Resonator Filters Realized by Gap Waveguide Technology", IEEE Transactions on Microwave Theory and Techniques, vol. 63, No. 10, Oct. 2015, pp. 3445-3452.

US 10,992,056 B2

SLOT ANTENNA DEVICE

CROSS REFERENCE TO RELATED APPLICATIONS

This is a continuation of PCT Application No. PCT/JP2018/015116, filed on Apr. 10, 2018, and priority under 35 U.S.C. §119(a) and 35 U.S.C. §365(b) is claimed from Japanese Application No. 2017-080191, filed Apr. 14, 2017; the entire contents of which are incorporated herein by reference.

FIELD OF THE INVENTION

The present disclosure relates to a slot antenna device.

BACKGROUND

An antenna device in which one or more radiating elements (which may hereinafter be also referred to as "antenna elements") are arrayed on a line or a plane finds its use in various applications, e.g., radar and communication systems. In order to radiate electromagnetic waves from an antenna device, it is necessary to supply electromagnetic waves (e.g., radio-frequency signal waves) to each antenna element, from a circuit which generates electromagnetic waves ("feed"). Such feeding of electromagnetic waves is performed via a waveguide. A waveguide is also used to send electromagnetic waves that are received at the antenna elements to a reception circuit.

Conventionally, feed to an array antenna has often been achieved by using a microstrip line(s). However, in the case where the frequency of an electromagnetic wave to be transmitted or received by an array antenna is a high frequency above 30 gigahertz (GHz), as in the millimeter band, a microstrip line will incur a large dielectric loss, thus detracting from the efficiency of the antenna. Therefore, in such a radio frequency region, an alternative waveguide to replace a microstrip line is needed.

As alternative waveguide structures to the microstrip line, the specification of U.S. Pat. No. 8,779,995, the specification of U.S. Pat. No. 8,803,638, the specification of European Patent Application Publication No. 1331688 and Kirino et al., "A 76 GHz Multi-Layered Phased Array Antenna Using a Non-Metal Contact Metamaterial Waveguide", IEEE Transaction on Antennas and Propagation, Vol. 60, No. 2, February 2012, pp 840-853 and Kildal et al., "Local Metamaterial-Based Waveguides in Gaps Between Parallel Metal Plates", IEEE Antennas and Wireless Propagation Letters, Vol. 8, 2009, pp 84-87, disclose structures which guide electromagnetic waves by utilizing an artificial magnetic conductor (AMC) extending on both sides of a ridge-type waveguide. the specification of U.S. Pat. No. 8,779,995 and Kirino et al., "A 76 GHz Multi-Layered Phased Array Antenna Using a Non-Metal Contact Metamaterial Waveguide", IEEE Transaction on Antennas and Propagation, Vol. 60, No. 2, February 2012, pp 840-853 disclose slot array antennas utilizing such a waveguide structure.

SUMMARY

Example embodiments of the present disclosure provide antenna devices each of which is based on principles different from conventional antenna devices.

A slot antenna device according to one example embodiment of the present disclosure is a slot antenna device, including a first electrical conductor including a first electrically conductive surface on a front side and a second electrically conductive surface on a rear side, and including at least one slot extending from the first electrically conductive surface through to the second electrically conductive surface, a second electrical conductor on the rear side of the first electrical conductor, the second electrical conductor including a third electrically conductive surface on the front side, the third electrically conductive surface opposing the second electrically conductive surface, a ridge-shaped waveguide body on the second electrically conductive surface of the first electrical conductor, the waveguide body including an electrically-conductive waveguide surface that opposes the third electrically conductive surface and extends alongside the third electrically conductive surface, and an artificial magnetic conductor on at least one of the second electrically conductive surface and the third electrically conductive surface, the artificial magnetic conductor extending on both sides of the waveguide body. The third electrically conductive surface, the waveguide surface, and the artificial magnetic conductor define a waveguide in a gap extending between the third electrically conductive surface and the waveguide surface. The waveguide body includes a first ridge and a second ridge. One end of the first ridge and one end of the second ridge are opposed to each other. As viewed from a direction perpendicular or substantially perpendicular to the waveguide surface, the slot is located between the one end of the first ridge and the one end of the second ridge. The at least one slot is open to an external space through the first electrically conductive surface. At least one of a spacing between the waveguide surface and the third electrically conductive surface and a width of the waveguide surface is varied along a direction that the waveguide body extends.

According to example embodiments of the present disclosure, low-loss antenna devices are realized based on principles different from conventional principles.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 8A is a perspective view showing an example where a waveguide member 122 according to an example embodiment of the present disclosure includes a plurality of dents 122d on the waveguide face 122a.

DETAILED DESCRIPTION

Figure 1:
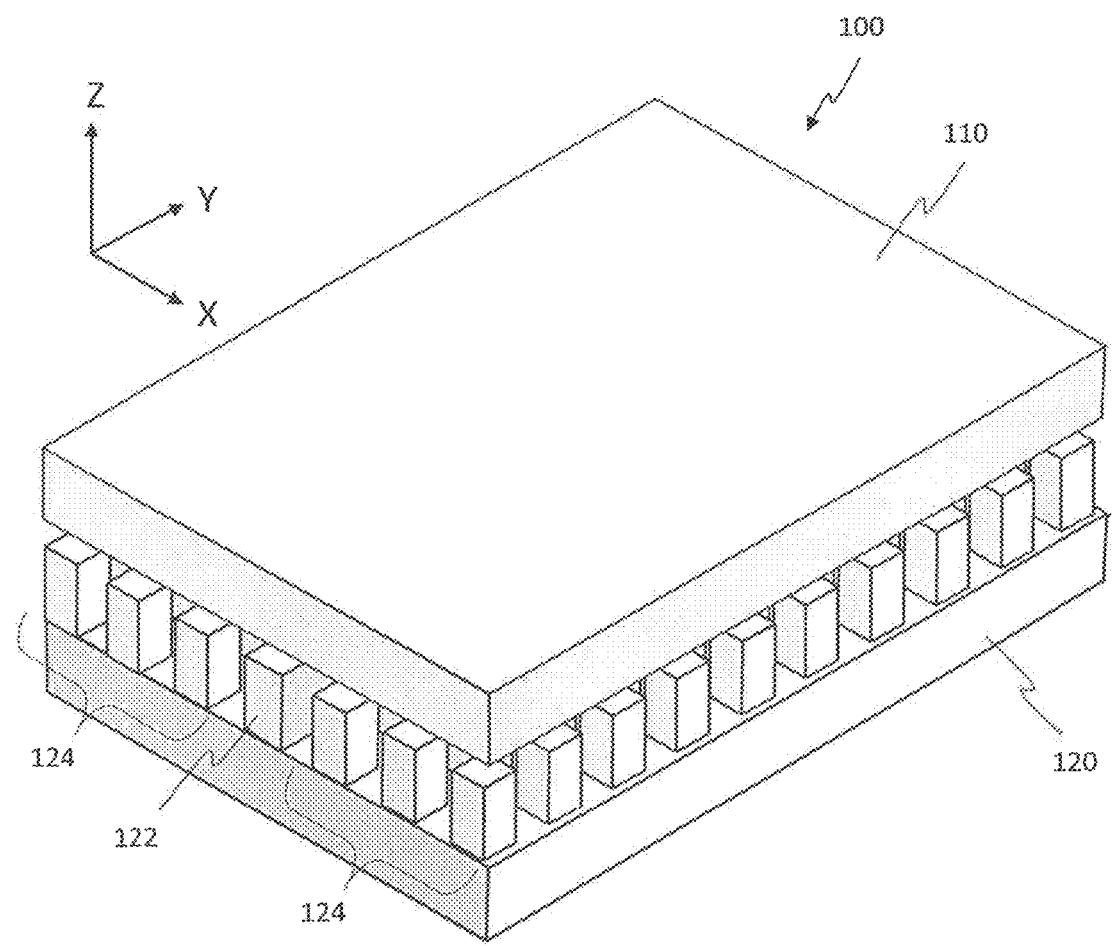
FIG. 1 is a perspective view schematically showing a non-limiting example embodiment showing the fundamental construction of a waveguide device.

Prior to describing example embodiments of the present disclosure, findings that form the basis of the present disclosure will be described.

A ridge waveguide which is disclosed in the aforementioned the specification of U.S. Pat. No. 8,779,995, the specification of U.S. Pat. No. 8,803,638, the specification of European Patent Application Publication No. 1331688, and Kirino et al., "A 76 GHz Multi-Layered Phased Array Antenna Using a Non-Metal Contact Metamaterial Waveguide", IEEE Transaction on Antennas and Propagation, Vol. 60, No. 2, February 2012, pp 840-853 and Kildal et al., "Local Metamaterial-Based Waveguides in Gaps Between Parallel Metal Plates", IEEE Antennas and Wireless Propagation Letters, Vol. 8, 2009, pp 84-87 is provided in a waffle iron structure which is capable of functioning as an artificial magnetic conductor. A ridge waveguide in which such an artificial magnetic conductor is utilized based on the present disclosure (which hereinafter may be referred to as a WRG: Waffle-iron Ridge waveGuide) is able to realize an antenna feeding network with low losses in the microwave or the millimeter wave band. Moreover, use of such a ridge waveguide allows antenna elements to be disposed with a high density. Hereinafter, an example fundamental construction and operation of such a waveguide structure will be described.

An artificial magnetic conductor is a structure which artificially realizes the properties of a perfect magnetic conductor (PMC), which does not exist in nature. One property of a perfect magnetic conductor is that "a magnetic field on its surface has zero tangential component". This property is the opposite of the property of a perfect electric conductor (PEC), i.e., "an electric field on its surface has zero tangential component". Although no perfect magnetic conductor exists in nature, it can be embodied by an artificial structure, e.g., an array of a plurality of electrically conductive rods. An artificial magnetic conductor functions as a perfect magnetic conductor in a specific frequency band which is defined by its structure. An artificial magnetic conductor restrains or prevents an electromagnetic wave of any frequency that is contained in the specific frequency band (propagation-restricted band) from propagating along the surface of the artificial magnetic conductor. For this reason, the surface of an artificial magnetic conductor may be referred to as a high impedance surface.

In the waveguide devices disclosed in the specification of U.S. Pat. No. 8,779,995, the specification of U.S. Pat. No. 8,803,638, the specification of European Patent Application Publication No. 1331688, and Kirino et al., "A 76 GHz Multi-Layered Phased Array Antenna Using a Non-Metal Contact Metamaterial Waveguide", IEEE Transaction on Antennas and Propagation, Vol. 60, No. 2, February 2012, pp 840-853 and Kildal et al., "Local Metamaterial-Based Waveguides in Gaps Between Parallel Metal Plates", IEEE Antennas and Wireless Propagation Letters, Vol. 8, 2009, pp 84-87, an artificial magnetic conductor is realized by a plurality of electrically conductive rods which are arrayed along row and column directions. Such rods are projections which may also be referred to as posts or pins. Each of these waveguide devices includes, as a whole, a pair of opposing electrically conductive plates. One conductive plate has a ridge protruding toward the other conductive plate, and stretches of an artificial magnetic conductor extending on both sides of the ridge. An upper face (i.e., its electrically conductive face) of the ridge opposes, via a gap, an electrically conductive surface of the other conductive plate. An electromagnetic wave (signal wave) of a wavelength which is contained in the propagation-restricted band of the artificial magnetic conductor propagates along the ridge, in the space (gap) between this conductive surface and the upper face of the ridge.

FIG. 1 is a perspective view schematically showing a non-limiting example of a fundamental construction of such a waveguide device. FIG. 1 shows XYZ coordinates along X, Y and Z directions which are orthogonal to one another. The waveguide device 100 shown in the figure includes a plate-like electrically conductive member 110 and a plate shape (plate-like) electrically conductive member 120, which are in opposing and parallel positions to each other. A plurality of electrically conductive rods 124 are arrayed on the conductive member 120.

Note that any structure appearing in a figure of the present application is shown in an orientation that is selected for ease of explanation, which in no way should limit its orientation when an example embodiment of the present disclosure is actually practiced. Moreover, the shape and size of a whole or a part of any structure that is shown in a figure should not limit its actual shape and size.

Figure 2A:
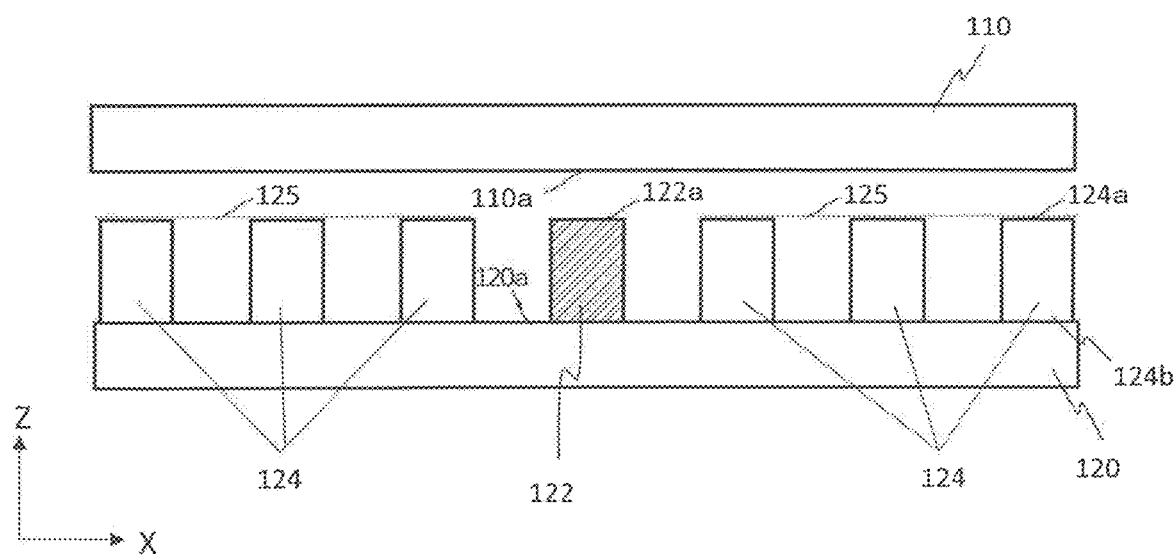
FIG. 2A is a diagram schematically showing a cross-sectional construction of a waveguide device 100 according to an example embodiment of the present disclosure as taken parallel to the XZ plane.

FIG. 2A is a diagram schematically showing the construction of a cross section of the waveguide device 100 in FIG. 1, taken parallel to the XZ plane. As shown in FIG. 2A, the conductive member 110 has an electrically conductive surface 110a on the side facing the conductive member 120. The conductive surface 110a has a two-dimensional expanse along a plane which is orthogonal to the axial direction (i.e., the Z direction) of the conductive rods 124 (i.e., a plane which is parallel to the XY plane). Although the conductive surface 110a is shown to be a smooth plane in this example, the conductive surface 110a does not need to be a plane, as will be described later.

Figure 3:
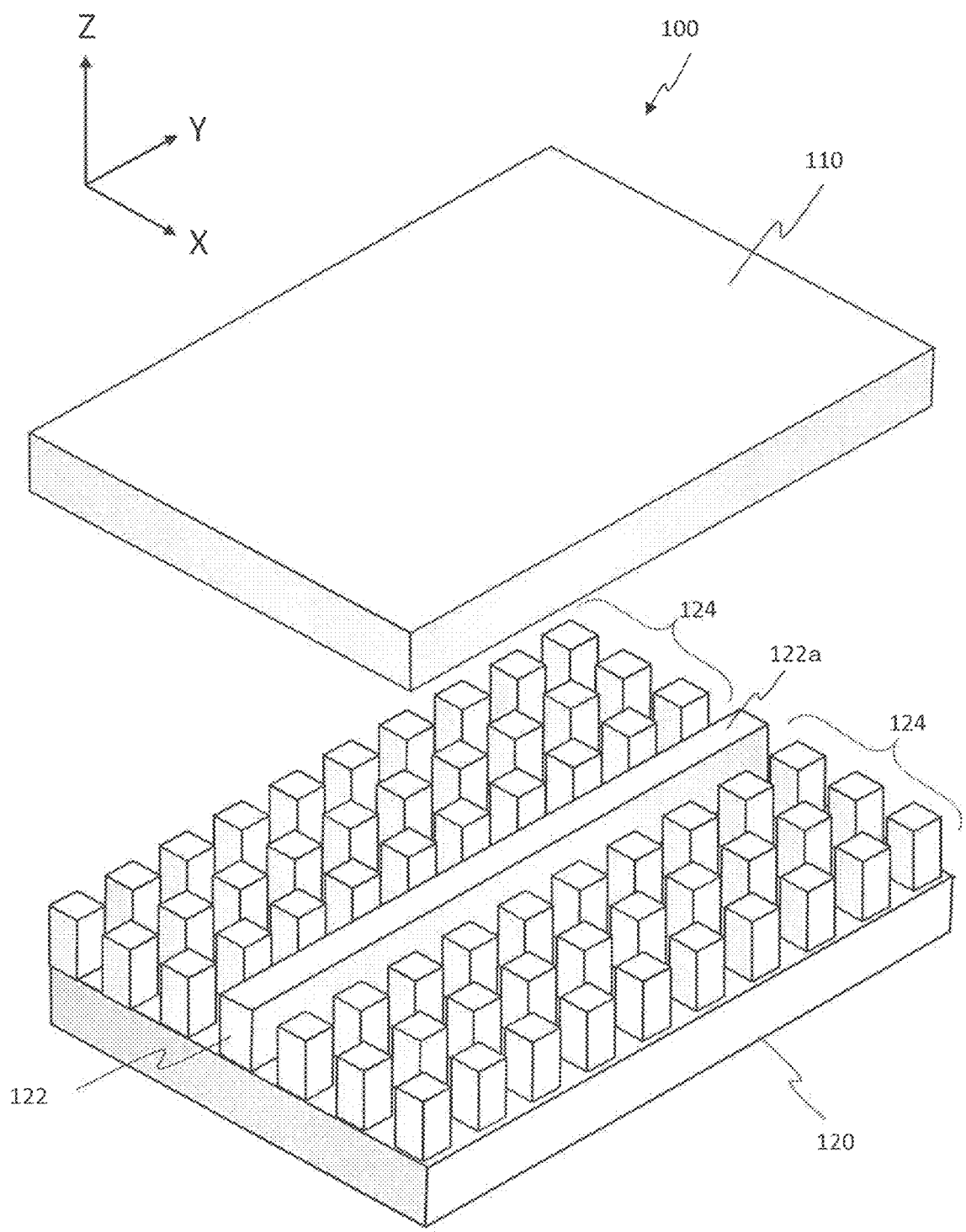
FIG. 3 is a perspective view schematically showing the waveguide device 100, illustrated so that the spacing between a conductive member 110 and a conductive member 120 is exaggerated for ease of understanding.

FIG. 3 is a perspective view schematically showing the waveguide device 100, illustrated so that the spacing between the conductive member 110 and the conductive member 120 is exaggerated for ease of understanding. In an actual waveguide device 100, as shown in FIG. 1 and FIG. 2A, the spacing between the conductive member 110 and the conductive member 120 is narrow, with the conductive member 110 covering over all of the conductive rods 124 on the conductive member 120.

FIG. 1 to FIG. 3 only show portions of the waveguide device 100. The conductive members 110 and 120, the waveguide member 122, and the plurality of conductive rods 124 actually extend to outside of the portions illustrated in the figures. At an end of the waveguide member 122, as will be described later, a choke structure for preventing electromagnetic waves from leaking into the external space is provided. The choke structure may include a row of conductive rods that are adjacent to the end of the waveguide member 122, for example.

See FIG. 2A again. The plurality of conductive rods 124 arrayed on the conductive member 120 each have a leading end 124a opposing the conductive surface 110a. In the example shown in the figure, the leading ends 124a of the plurality of conductive rods 124 are on the same plane. This plane defines the surface 125 of an artificial magnetic conductor. Each conductive rod 124 does not need to be entirely electrically conductive, so long as it at least includes an electrically conductive layer that extends along the upper face and the side face of the rod-like structure. Although this electrically conductive layer may be located at the surface layer of the rod-like structure, the surface layer may be composed of an insulation coating or a resin layer with no electrically conductive layer existing on the surface of the rod-like structure. Moreover, each conductive member 120 does not need to be entirely electrically conductive, so long as it can support the plurality of conductive rods 124 to constitute an artificial magnetic conductor. Of the surfaces of the conductive member 120, a face 120a carrying the plurality of conductive rods 124 may be electrically conductive, such that the electrical conductor electrically interconnects the surfaces of adjacent ones of the plurality of conductive rods 124. Moreover, the electrically conductive layer of the second conductive member 120 may be covered with an insulation coating or a resin layer. In other words, the entire combination of the conductive member 120 and the plurality of conductive rods 124 may at least include an electrically conductive layer with rises and falls opposing the conductive surface 110a of the conductive member 110.

On the conductive member 120, a ridge-like waveguide member 122 is provided among the plurality of conductive rods 124. More specifically, stretches of an artificial magnetic conductor are present on both sides of the waveguide member 122, such that the waveguide member 122 is sandwiched between the stretches of artificial magnetic conductor on both sides. As can be seen from FIG. 3, the waveguide member 122 in this example is supported on the conductive member 120, and extends linearly along the Y direction. In the example shown in the figure, the waveguide member 122 has the same height and width as those of the conductive rods 124. As will be described later, however, the height and width of the waveguide member 122 may have different values from those of the conductive rod 124. Unlike the conductive rods 124, the waveguide member 122 extends along a direction (which in this example is the Y direction) in which to guide electromagnetic waves along the conductive surface 110a. Similarly, the waveguide member 122 does not need to be entirely electrically conductive, but may at least include an electrically conductive waveguide face 122a opposing the conductive surface 110a of the conductive member 110. The conductive member 120, the plurality of conductive rods 124, and the waveguide member 122 may be portions of a continuous single-piece body. Furthermore, the conductive member 110 may also be a portion of such a single-piece body.

On both sides of the waveguide member 122, the space between the surface 125 of each stretch of artificial magnetic conductor and the conductive surface 110a of the conductive member 110 does not allow an electromagnetic wave of any frequency that is within a specific frequency band to propagate. This frequency band is called a "prohibited band". The artificial magnetic conductor is designed so that the frequency of an electromagnetic wave (signal wave) to propagate in the waveguide device 100 (which may hereinafter be referred to as the "operating frequency") is contained in the prohibited band. The prohibited band may be adjusted based on the following: the height of the conductive rods 124, i.e., the depth of each groove formed between adjacent conductive rods 124; the width of each conductive rod 124; the interval between conductive rods 124; and the size of the gap between the leading end 124a and the conductive surface 110a of each conductive rod 124.

Next, with reference to FIG. 4, the dimensions, shape, positioning, and the like of each member will be described.

Figure 4:
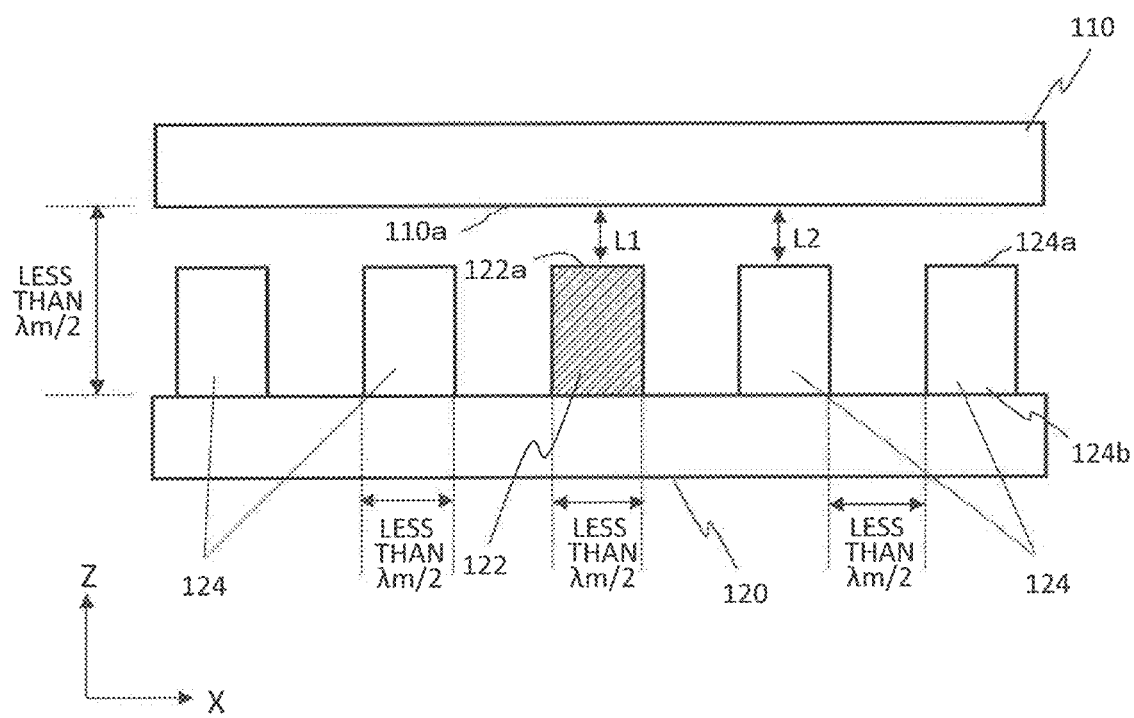
FIG. 4 is a diagram showing an example range of dimension of each member in the structure shown in FIG. 2A.

FIG. 4 is a diagram showing an example range of dimension of each member in the structure shown in FIG. 2A. The waveguide device is used for at least one of transmission and reception of electromagnetic waves of a predetermined band (referred to as the "operating frequency band"). In the present specification, $\lambda o$ denotes a representative value of wavelengths in free space (e.g., a central wavelength corresponding to a center frequency in the operating frequency band) of an electromagnetic wave (signal wave) propagating in a waveguide extending between the conductive surface 110a of the conductive member 110 and the waveguide face 122a of the waveguide member 122. Moreover, $\lambda m$ denotes a wavelength, in free space, of an electromagnetic wave of the highest frequency in the operating frequency band. The end of each conductive rod 124 that is in contact with the conductive member 120 is referred to as the "root". As shown in FIG. 4, each conductive rod 124 has the leading end 124a and the root 124b. Examples of dimensions, shapes, positioning, and the like of the respective members are as follows.

(1) Width of the Conductive Rod

The width (i.e., the size along the X direction and the Y direction) of the conductive rod 124 may be set to less than $\lambda m/2$. Within this range, resonance of the lowest order can be prevented from occurring along the X direction and the Y direction. Since resonance may possibly occur not only in the X and Y directions but also in any diagonal direction in an X-Y cross section, the diagonal length of an X-Y cross section of the conductive rod 124 is also preferably less than $\lambda m/2$. The lower limit values for the rod width and diagonal length will conform to the minimum lengths that are producible under the given manufacturing method, but is not particularly limited.

(2) Distance from the Root of the Conductive Rod to the Conductive Surface of the Conductive Member The distance from the root 124b of each conductive rod 124 to the conductive surface 110a of the conductive member 110 may be longer than the height of the conductive rods 124, while also being less than $\lambda m/2$. When the distance is $\lambda m/2$ or more, resonance may occur between the root 124b of each conductive rod 124 and the conductive surface 110a, thus reducing the effect of signal wave containment.

The distance from the root 124b of each conductive rod 124 to the conductive surface 110a of the conductive member 110 corresponds to the spacing between the conductive member 110 and the conductive member 120. For example, when a signal wave of 76.5±0.5 GHz (which belongs to the millimeter band or the extremely high frequency band) propagates in the waveguide, the wavelength of the signal wave is in the range from 3.8934 mm to 3.9446 mm. Therefore, $\lambda m$ equals 3.8934 mm in this case, so that the spacing between the conductive member 110 and the conductive member 120 may be set to less than a half of 3.8934 mm. So long as the conductive member 110 and the conductive member 120 realize such a narrow spacing while being disposed opposite from each other, the conductive member 110 and the conductive member 120 do not need to be strictly parallel. Moreover, when the spacing between the conductive member 110 and the conductive member 120 is less than $\lambda m/2$, a whole or a part of the conductive member 110 and/or the conductive member 120 may be shaped as a curved surface. On the other hand, the conductive members 110 and 120 each have a planar shape (i.e., the shape of their region as perpendicularly projected onto the XY plane) and a planar size (i.e., the size of their region as perpendicularly projected onto the XY plane) which may be arbitrarily designed depending on the purpose.

Figure 2B:
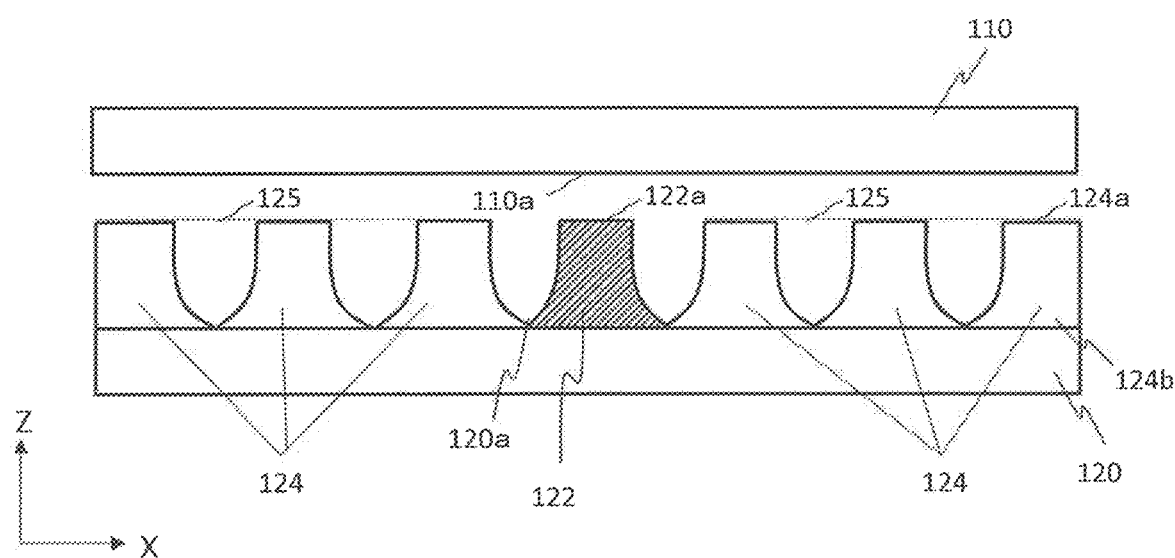
FIG. 2B is a diagram schematically showing another cross-sectional construction of the waveguide device 100 as taken parallel to the XZ plane.

Although the conductive surface 120a is illustrated as a plane in the example shown in FIG. 2A, example embodiments of the present disclosure are not limited thereto. For example, as shown in FIG. 2B, the conductive surface 120a may be the bottom parts of faces each of which has a cross section similar to a U-shape or a V-shape. The conductive surface 120a will have such a structure when each conductive rod 124 or the waveguide member 122 is shaped with a width which increases toward the root. Even with such a structure, the device shown in FIG. 2B can function as the waveguide device according to an example embodiment of the present disclosure so long as the distance between the conductive surface 110a and the conductive surface 120a is less than a half of the wavelength $\lambda m$.

(3) Distance L2 from the Leading End of the Conductive Rod to the Conductive Surface The distance L2 from the leading end 124a of each conductive rod 124 to the conductive surface 110a is set to less than $\lambda m/2$. When the distance is $\lambda m/2$ or more, a propagation mode where electromagnetic waves reciprocate between the leading end 124a of each conductive rod 124 and the conductive surface 110a may occur, thus no longer being able to contain an electromagnetic wave. Note that, among the plurality of conductive rods 124, at least those which are adjacent to the waveguide member 122 do not have their leading ends in electrical contact with the conductive surface 110a. As used herein, the leading end of a conductive rod not being in electrical contact with the conductive surface means either of the following states: there being an air gap between the leading end and the conductive surface; or the leading end of the conductive rod and the conductive surface adjoining each other via an insulating layer which may exist in the leading end of the conductive rod or in the conductive surface.

(4) Arrangement and Shape of Conductive Rods

The interspace between two adjacent conductive rods 124 among the plurality of conductive rods 124 has a width of less than $\lambda m/2$, for example. The width of the interspace between any two adjacent conductive rods 124 is defined by the shortest distance from the surface (side face) of one of the two conductive rods 124 to the surface (side face) of the other. This width of the interspace between rods is to be determined so that resonance of the lowest order will not occur in the regions between rods. The conditions under which resonance will occur are determined based by a combination of: the height of the conductive rods 124; the distance between any two adjacent conductive rods; and the capacitance of the air gap between the leading end 124a of each conductive rod 124 and the conductive surface 110a. Therefore, the width of the interspace between rods may be appropriately determined depending on other design parameters. Although there is no clear lower limit to the width of the interspace between rods, for manufacturing ease, it may be e.g. $\lambda m/16$ or more when an electromagnetic wave in the extremely high frequency range is to be propagated. Note that the interspace does not need to have a constant width. So long as it remains less than $\lambda m/2$, the interspace between conductive rods 124 may vary.

The arrangement of the plurality of conductive rods 124 is not limited to the illustrated example, so long as it exhibits a function of an artificial magnetic conductor. The plurality of conductive rods 124 do not need to be arranged in orthogonal rows and columns; the rows and columns may be intersecting at angles other than 90 degrees. The plurality of conductive rods 124 do not need to form a linear array along rows or columns, but may be in a dispersed arrangement which does not present any straightforward regularity. The conductive rods 124 may also vary in shape and size depending on the position on the conductive member 120.

The surface 125 of the artificial magnetic conductor that are constituted by the leading ends 124a of the plurality of conductive rods 124 does not need to be a strict plane, but may be a plane with minute rises and falls, or even a curved surface. In other words, the conductive rods 124 do not need to be of uniform height, but rather the conductive rods 124 may be diverse so long as the array of conductive rods 124 is able to function as an artificial magnetic conductor.

Each conductive rod 124 does not need to have a prismatic shape as shown in the figure, but may have a cylindrical shape, for example. Furthermore, each conductive rod 124 does not need to have a simple columnar shape. The artificial magnetic conductor may also be realized by any structure other than an array of conductive rods 124, and various artificial magnetic conductors are applicable to the waveguide device of the present disclosure. Note that, when the leading end 124a of each conductive rod 124 has a prismatic shape, its diagonal length is preferably less than $\lambda m/2$. When the leading end 124a of each conductive rod 124 is shaped as an ellipse, the length of its major axis is preferably less than $\lambda m/2$. Even when the leading end 124a has any other shape, the dimension across it is preferably less than $\lambda m/2$ even at the longest position.

The height of each conductive rod 124 (in particular, those conductive rods 124 which are adjacent to the waveguide member 122), i.e., the length from the root 124b to the leading end 124a, may be set to a value which is shorter than the distance (i.e., less than $\lambda m/2$) between the conductive surface 110a and the conductive surface 120a, e.g., $\lambda o/4$.

(5) Width of the Waveguide Face

The width of the waveguide face 122a of the waveguide member 122, i.e., the size of the waveguide face 122a along a direction which is orthogonal to the direction that the waveguide member 122 extends, may be set to less than $\lambda m/2$ (e.g. $\lambda o/8$). If the width of the waveguide face 122a is $\lambda m/2$ or more, resonance will occur along the width direction, which will prevent any WRG from operating as a simple transmission line.

(6) Height of the Waveguide Member

The height (i.e., the size along the Z direction in the example shown in the figure) of the waveguide member 122 is set to less than $\lambda m/2$. The reason is that, if the distance is $\lambda m/2$ or more, the distance between the root 124b of each conductive rod 124 and the conductive surface 110a will be $\lambda m/2$ or more. Similarly, the height of the conductive rods 124 (in particular, those conductive rods 124 which are adjacent to the waveguide member 122) is also set to less than $\lambda m/2$.

(7) Distance L1 Between the Waveguide Face and the Conductive Surface

The distance L1 between the waveguide face 122a of the waveguide member 122 and the conductive surface 110a is set to less than $\lambda m/2$. If the distance is $\lambda m/2$ or more, resonance will occur between the waveguide face 122a and the conductive surface 110a, which will prevent functionality as a waveguide. In one example, the distance L1 is $\lambda m/4$ or less. In order to ensure manufacturing ease, when an electromagnetic wave in the extremely high frequency range is to propagate, the distance L1 is preferably $\lambda m/16$ or more, for example.

The lower limit of the distance L1 between the conductive surface 110a and the waveguide face 122a and the lower limit of the distance L2 between the conductive surface 110a and the leading end 124a of each conductive rod 124 depends on the machining precision, and also on the precision when assembling the two upper/lower conductive members 110 and 120 so as to be apart by a constant distance. When a pressing technique or an injection technique is used, the practical lower limit of the aforementioned distance is about 50 micrometers ($\mu m$). In the case of using an MEMS (Micro-Electro-Mechanical System) technique to make a product in e.g. the terahertz range, the lower limit of the aforementioned distance is about 2 to about 3 $\mu m$.

In the waveguide device 100 of the above-described construction, a signal wave of the operating frequency is unable to propagate in the space between the surface 125 of the artificial magnetic conductor and the conductive surface 110a of the conductive member 110, but propagates in the space between the waveguide face 122a of the waveguide member 122 and the conductive surface 110a of the conductive member 110. Unlike in a hollow waveguide, the width of the waveguide member 122 in such a waveguide structure does not need to be equal to or greater than a half of the wavelength of the electromagnetic wave to propagate. Moreover, the conductive member 110 and the conductive member 120 do not need to be interconnected by a metal wall that extends along the thickness direction (i.e., in parallel to the YZ plane).

Figure 5A:
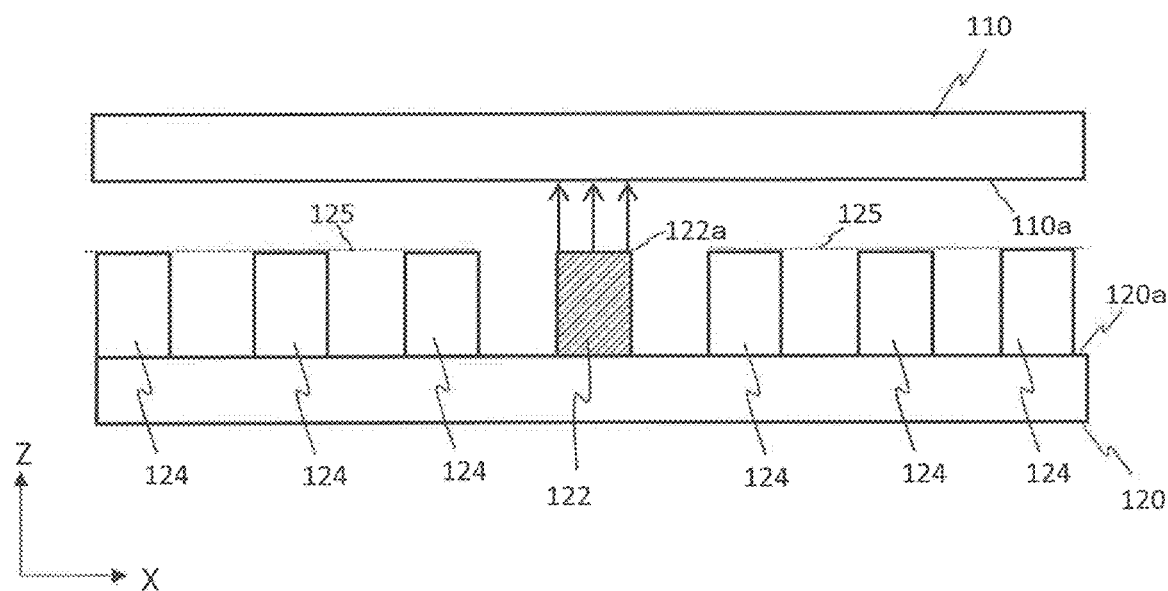
FIG. 5A is a diagram schematically showing an electromagnetic wave that propagates in a narrow space, i.e., a gap between a waveguide face 122a of a waveguide member 122 and a conductive surface 110a of a conductive member 110 according to an example embodiment of the present disclosure.

FIG. 5A schematically shows an electromagnetic wave that propagates in a narrow space, i.e., a gap between the waveguide face 122a of the waveguide member 122 and the conductive surface 110a of the conductive member 110. Three arrows in FIG. 5A schematically indicate the orientation of an electric field of the propagating electromagnetic wave. The electric field of the propagating electromagnetic wave is perpendicular to the conductive surface 110a of the conductive member 110 and to the waveguide face 122a.

On both sides of the waveguide member 122, stretches of artificial magnetic conductor that are created by the plurality of conductive rods 124 are present. An electromagnetic wave propagates in the gap between the waveguide face 122a of the waveguide member 122 and the conductive surface 110a of the conductive member 110. FIG. 5A is schematic, and does not accurately represent the magnitude of an electromagnetic field to be actually created by the electromagnetic wave. A part of the electromagnetic wave (electromagnetic field) propagating in the space over the waveguide face 122a may have a lateral expanse, to the outside (i.e., toward where the artificial magnetic conductor exists) of the space that is delineated by the width of the waveguide face 122a. In this example, the electromagnetic wave propagates in a direction (i.e., the Y direction) which is perpendicular to the plane of FIG. 5A. As such, the waveguide member 122 does not need to extend linearly along the Y direction, but may include a bend(s) and/or a branching portion(s) not shown. Since the electromagnetic wave propagates along the waveguide face 122a of the waveguide member 122, the direction of propagation would change at a bend, whereas the direction of propagation would ramify into plural directions at a branching portion.

In the waveguide structure of FIG. 5A, no metal wall (electric wall), which would be indispensable to a hollow waveguide, exists on both sides of the propagating electromagnetic wave. Therefore, in the waveguide structure of this example, "a constraint due to a metal wall (electric wall)" is not included in the boundary conditions for the electromagnetic field mode to be created by the propagating electromagnetic wave, and the width (size along the X direction) of the waveguide face 122a is less than a half of the wavelength of the electromagnetic wave.

Figure 5B:
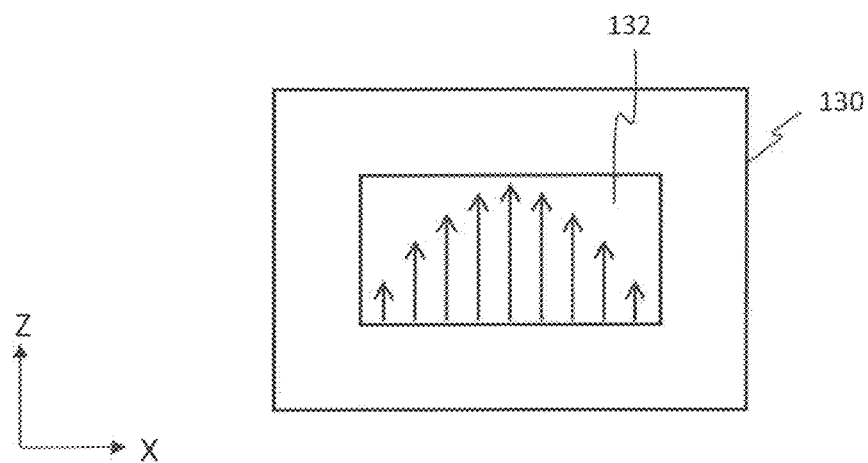
FIG. 5B is a diagram schematically showing a cross section of a hollow waveguide 130 according to an example embodiment of the present disclosure.

For reference, FIG. 5B schematically shows a cross section of a hollow waveguide 130. With arrows, FIG. 5B schematically shows the orientation of an electric field of an electromagnetic field mode ($TE_{10}$) that is created in the internal space 132 of the hollow waveguide 130. The lengths of the arrows correspond to electric field intensities. The width of the internal space 132 of the hollow waveguide 130 needs to be set to be broader than a half of the wavelength. In other words, the width of the internal space 132 of the hollow waveguide 130 cannot be set to be smaller than a half of the wavelength of the propagating electromagnetic wave.

Figure 5C:
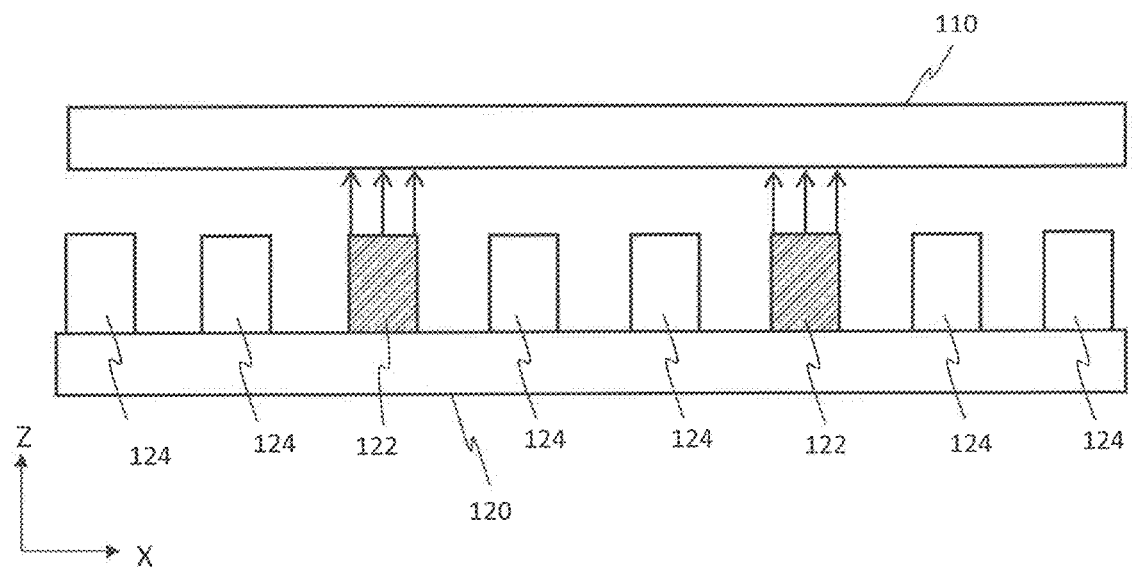
FIG. 5C is a cross-sectional view showing an implementation where two waveguide members 122 are provided on the conductive member 120.

FIG. 5C is a cross-sectional view showing an implementation where two waveguide members 122 are provided on the conductive member 120. Thus, an artificial magnetic conductor that is created by the plurality of conductive rods 124 exists between the two adjacent waveguide members 122. More accurately, stretches of artificial magnetic conductor created by the plurality of conductive rods 124 are present on both sides of each waveguide member 122, such that each waveguide member 122 is able to independently propagate an electromagnetic wave.

Figure 5D:
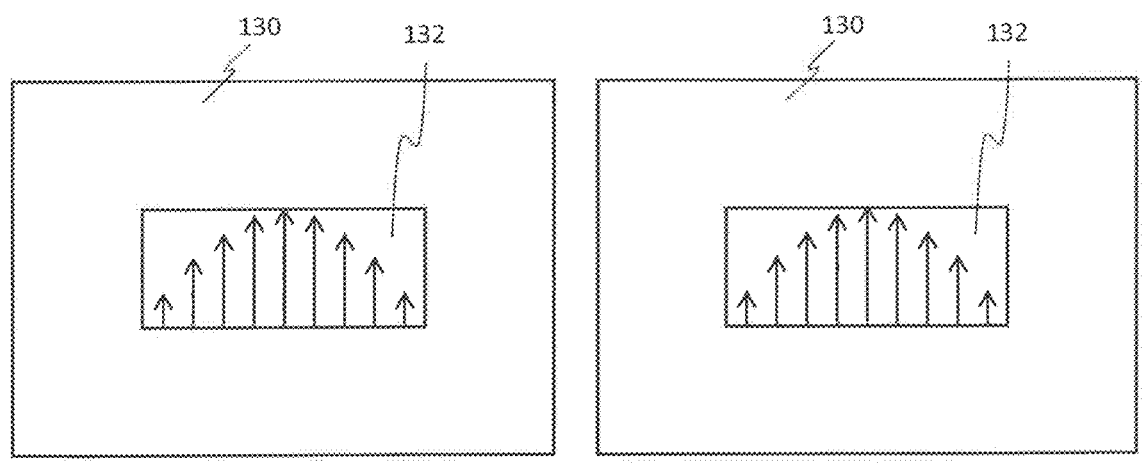
FIG. 5D is a diagram schematically showing a cross section of a waveguide device in which two hollow waveguides 130 are placed side-by-side.

For reference's sake, FIG. 5D schematically shows a cross section of a waveguide device in which two hollow waveguides 130 are placed side-by-side. The two hollow waveguides 130 are electrically insulated from each other. Each space in which an electromagnetic wave is to propagate needs to be surrounded by a metal wall that defines the respective hollow waveguide 130. Therefore, the interval between the internal spaces 132 in which electromagnetic waves are to propagate cannot be made smaller than a total of the thicknesses of two metal walls. Usually, a total of the thicknesses of two metal walls is longer than a half of the wavelength of a propagating electromagnetic wave. Therefore, it is difficult for the interval between the hollow waveguides 130 (i.e., interval between their centers) to be shorter than the wavelength of a propagating electromagnetic wave. Particularly for electromagnetic waves of wavelengths in the extremely high frequency range (i.e., electromagnetic wave wavelength: 10 mm or less) or even shorter wavelengths, a metal wall which is sufficiently thin relative to the wavelength is difficult to be formed. This presents a cost problem in commercially practical implementation.

On the other hand, a waveguide device 100 including an artificial magnetic conductor can easily realize a structure in which waveguide members 122 are placed close to one another. Thus, such a waveguide device 100 can be suitably used in an array antenna that includes plural antenna elements in a close arrangement.

Figure 6A:
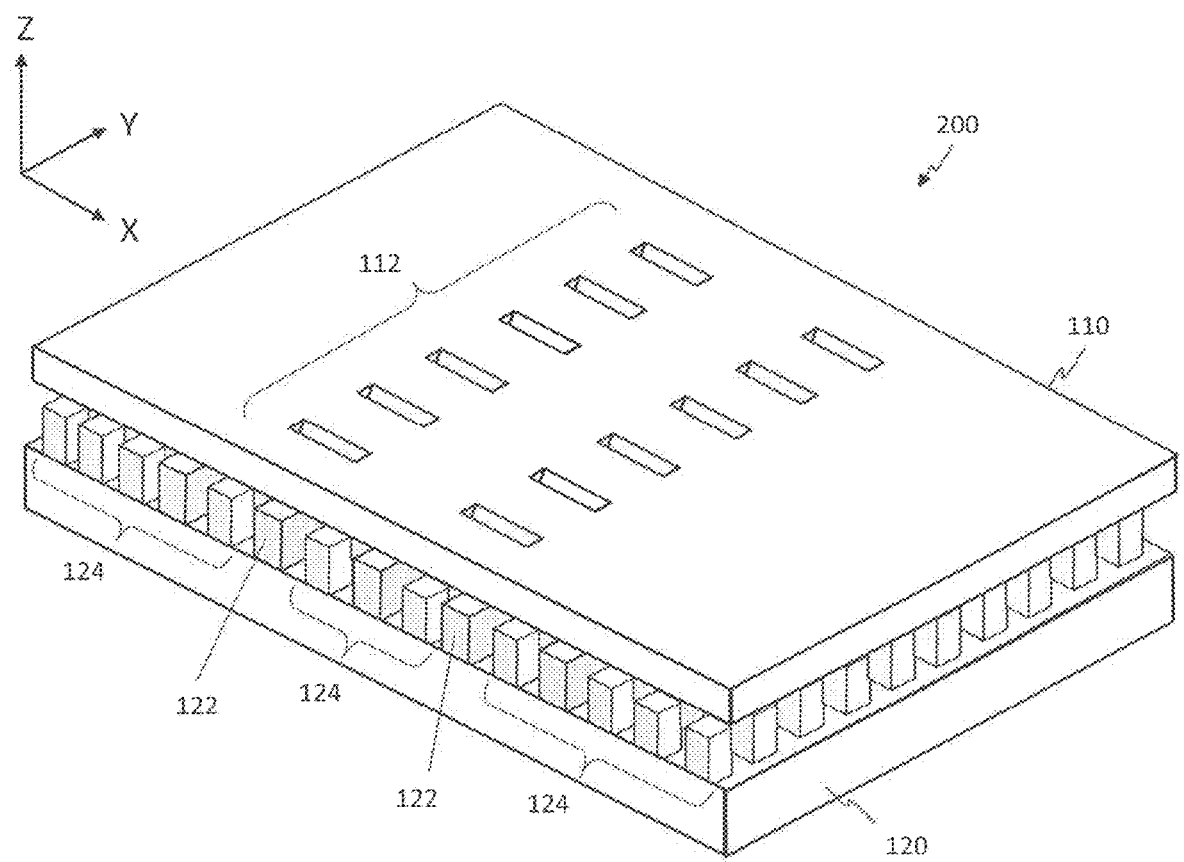
FIG. 6A is a perspective view schematically showing a partial construction of a slot array antenna 200 (Comparative Example) utilizing a WRG structure.
Figure 6B:
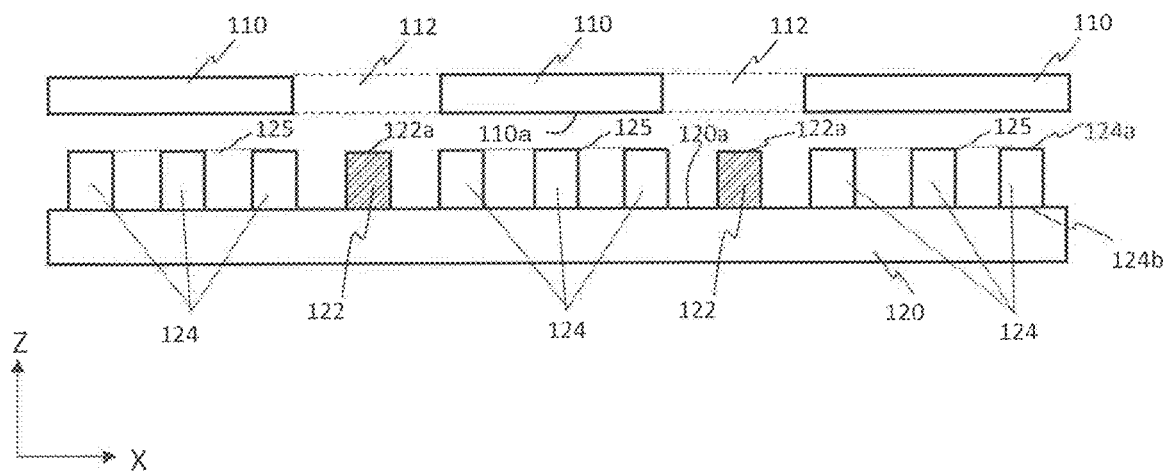
FIG. 6B is a diagram schematically showing a partial cross section which passes through the centers of two slots 112 of a slot array antenna 200 according to an example embodiment of the present disclosure that are arranged along the X direction, the cross section being taken parallel to the XZ plane.

FIG. 6A is a perspective view schematically showing an example construction of a slot array antenna 200 (Comparative Example) utilizing the above-described waveguide structure. FIG. 6B is a diagram schematically showing a partial cross section which passes through the centers of two slots 112 of a slot array antenna 200 that are arranged along the X direction, the cross section being taken parallel to the XZ plane. In the slot array antenna 200, the first conductive member 110 includes a plurality of slots 112 that are arrayed along the X direction and the Y direction. In this example, the plurality of slots 112 include two slot rows. Each slot row includes six slots 112 that are arranged along the Y direction at equal intervals. On the second conductive member 120, two waveguide members 122 that extend along the Y direction are provided. Each waveguide member 122 has an electrically-conductive waveguide face 122a opposing one slot row. In the region between the two waveguide members 122 and in the regions outside the two waveguide members 122, a plurality of conductive rods 124 are provided. The conductive rods 124 constitute an artificial magnetic conductor.

To the waveguide extending between the waveguide face 122a of each waveguide member 122 and the conductive surface 110a of the conductive member 110, an electromagnetic wave is supplied from a transmission circuit not shown. Among the plurality of slot 112 arranged along the Y direction, the distance between the centers of every two adjacent slots 112 is designed so as to have the same value as the wavelength of an electromagnetic wave propagating in the waveguide, for example. As a result, electromagnetic waves with an equal phase will be radiated from the six slots 112 that are arranged along the Y direction.

The slot array antenna 200 shown in FIG. 6A and FIG. 6B is an antenna array whose radiating elements are the plurality of slots 112. With this construction of the slot array antenna 200, the interval between the centers of radiating elements along the X direction can be made shorter than the wavelength λo in free space of an electromagnetic wave propagating in the waveguide, for example.

The inventors have found that an antenna device with low loss can be realized by a structure which is distinct from that of the slot array antenna 200 as described above. Hereinafter, an example construction of an example embodiment of the present disclosure will be described.

<Example Construction of Slot Antenna Device>

First, with reference to FIGS. 7A through 7D, the construction of a slot antenna device 300 (which hereinafter may simply be referred to as an "antenna device 300") according to an illustrative example embodiment of the present disclosure will be described. In the present disclosure, for convenience, "the front side" refers to the side that borders on the free space in which an electromagnetic wave radiated from the antenna device 300 or an electromagnetic wave incident to the antenna device 300 is to propagate; the opposite side is referred to as "the rear side". In the present disclosure, terms such as "first", "second", etc., are employed only for the sake of distinction between members, devices, parts, portions, layers, regions, or the like, without bearing any limitations in meaning.

Figure 7A:
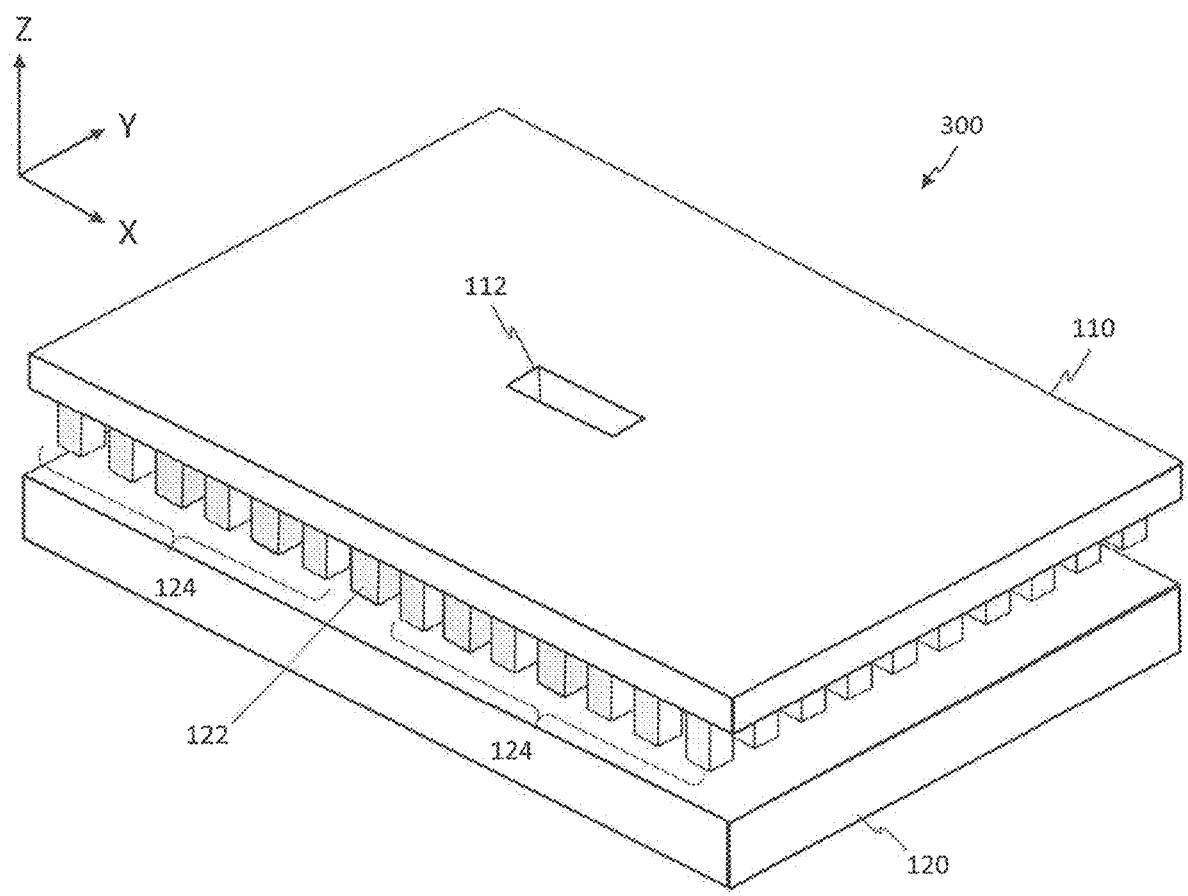
FIG. 7A is a perspective view schematically showing a partial construction of an antenna device 300 according to an illustrative example embodiment of the present disclosure.

FIG. 7A is a perspective view schematically showing a partial construction of the antenna device 300 according to an illustrative example embodiment of the present disclosure. The antenna device 300 includes a first conductive member 110 and a second conductive member 120 that are opposed to each other. The first conductive member 110 has a slot 112. In this example embodiment, unlike in Comparative Example described above, a waveguide member 122 and a plurality of conductive rods 124 are connected to the first conductive member 110, rather than to the second conductive member 120.

Figure 7B:
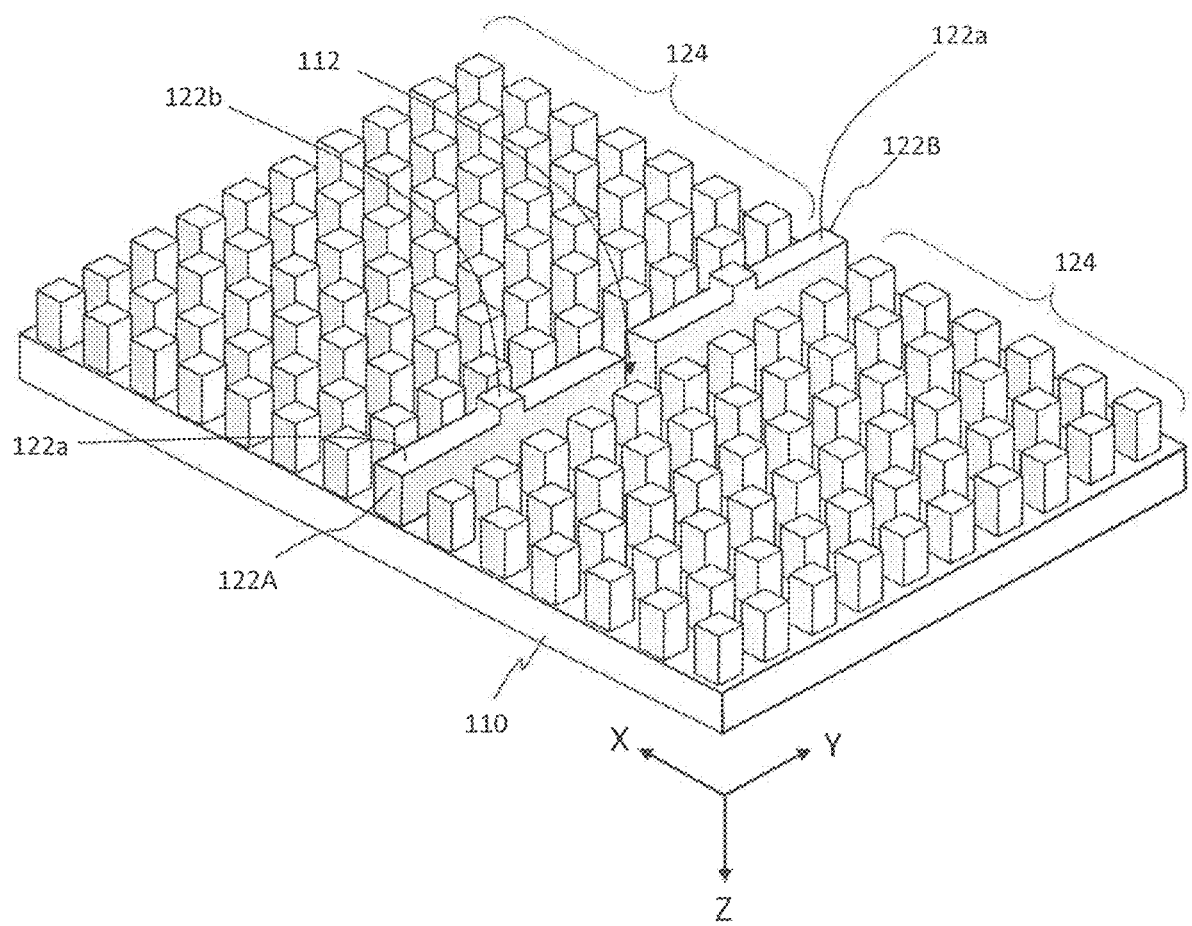
FIG. 7B is a diagram schematically showing the positioning of a first conductive member 110 and a waveguide member 122 and a plurality of conductive rods 124 thereon according to an example embodiment of the present disclosure.

FIG. 7B schematically shows positioning of the first conductive member 110, and the waveguide member 122 and the plurality of conductive rods 124 thereon. The waveguide member 122, which is a ridge-shaped member being provided on the first conductive member 110 and having an electrically-conductive surface, is split into a first ridge 122A and a second ridge 122B at the position of the slot 112. In this example, the first ridge 122A and the second ridge 122B each have a bump 122b in the central portion.

Figure 7C:
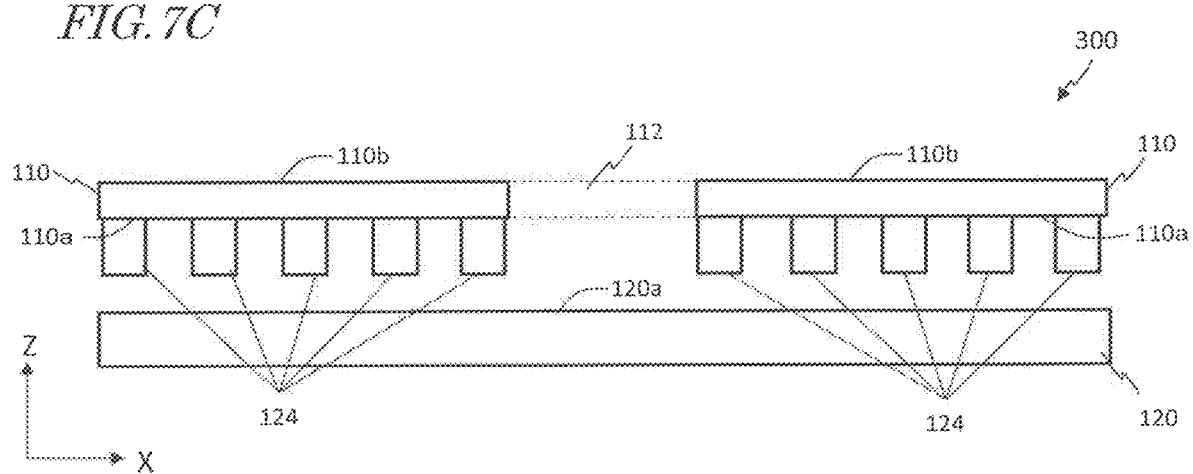
FIG. 7C is a diagram schematically showing a cross section resulting by cutting the antenna device 300 shown in FIG. 7A at a plane which passes through the center of a slot 112 and is parallel to the XZ plane.
Figure 7D:
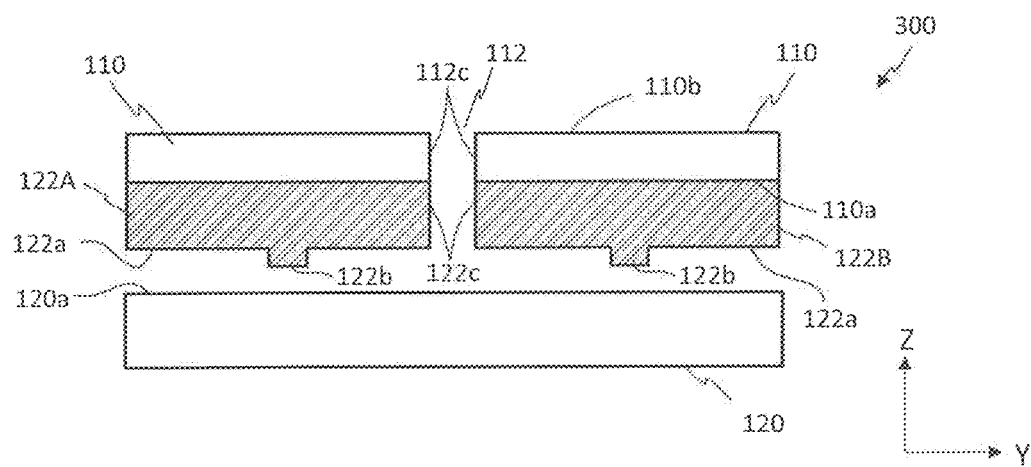
FIG. 7D is a diagram schematically showing a cross section resulting by cutting the antenna device 300 at a plane which passes through the center of a slot 112 and is parallel to the YZ plane.

FIG. 7C is a diagram schematically showing a cross section resulting by cutting the antenna device 300 shown in FIG. 7A at a plane which passes through the center of the slot 112 and is parallel to the XZ plane. FIG. 7D is a diagram schematically showing a cross section resulting by cutting the antenna device 300 at a plane which passes through the center of the slot 112 and is parallel to the YZ plane. In FIG. 7D, only a cross section of the waveguide member 122 is shown hatched. Similar representation may also be adopted in any of the following figures.

The first conductive member 110 has a first conductive surface 110b on the front side and a second conductive surface 110a on the rear side. The first conductive member 110 has at least one slot 112 which extends from the first conductive surface 110b through to the second conductive surface 110a. Although the first conductive member 110 in this example is illustrated as having one slot 112, the first conductive member 110 may have a plurality of slots 112, as is the case with Comparative Example described above.

The second conductive member 120 is on the rear side of the first conductive member 110. The second conductive member 120 has a third conductive surface 120a on the front side, the third conductive surface 120a opposing the second conductive surface 110a.

As shown in FIG. 7D, the waveguide member 122 is on the second conductive surface 110a of the first conductive member 110. The waveguide member 122 has an electrically-conductive waveguide face 122a opposing the third conductive surface 120a of the second conductive member 120. The waveguide member 122 extends alongside the third conductive surface 120a. The waveguide face 122a of the waveguide member 122 has a stripe shape (which may also be referred to as a "strip shape") that extends alongside the third conductive surface 120a.

In the present specification, a "stripe shape" means a shape which is defined by a single stripe, rather than a shape constituted by stripes. Not only shapes that extend linearly in one direction, but also any shape that bends or branches along the way is also encompassed by a "stripe shape". Even in the case where the waveguide face 122a has any portion that undergoes a change in height or width, the shape falls under the meaning of "stripe shape" so long as it includes a portion that extends in one direction as viewed from the normal direction of the waveguide face 122a.

The artificial magnetic conductor in the present example embodiment includes the plurality of conductive rods 124. The artificial magnetic conductor extends on both sides of the waveguide member 122, and suppresses leakage of an electromagnetic wave that propagates along the waveguide member 122. As shown in FIG. 7C, the artificial magnetic conductor is disposed on the second conductive surface 110a. Without being limited to this example, the artificial magnetic conductor may be disposed on the third conductive surface 120a. The artificial magnetic conductor may exist on at least one of the second conductive surface 110a and the third conductive surface 120a.

The third conductive surface 120a, the waveguide face 122a, and the artificial magnetic conductor define a waveguide, in a gap extending between the third conductive surface 120a and the waveguide face 122a. This waveguide is connected to the external space via the slot 112. In other words, the slot 112 is open to the external space.

As shown in FIGS. 7B and 7D, the waveguide member 122 includes the first ridge 122A and the second ridge 122B, which extend along a common path. To "extend along a path" means extending along an imaginary path, and may encompass not only extending along a straight line, but also extending along a curve or a bent line. One end of the first ridge 122A and one end of the second ridge 122B are opposed to each other. One ends of two ridges being opposed to each other means that these end faces of the ridges are disposed so as to face each other.

As viewed from a direction perpendicular to the waveguide face 122a, the slot 112 is located between one end of the first ridge 122A and one end of the second ridge 122B. In the example shown in FIG. 7D, the end faces 122c of the first ridge 122A and the second ridge 122B that oppose each other are continuous with an inner wall surface 112c of the slot 112. In the example shown in FIG. 7D, the inner wall surface of the slot 112 and the end faces 122c of the ridges 122A and 122B are not shown to be stepped where they are continuously connected; however, they may alternatively be stepped.

The size of the gap between the end face 122c of the first ridge 122A and the end face 122c of the second ridge 122B may vary along a direction perpendicular to the waveguide face 122a (i.e., the Z direction). For example, in order to suppress reflection of signal waves, the size of the gap between the first ridge 122A and the second ridge 122B may be locally adjusted. The size of the gap between the two end faces 122c is designed so that the waveguide extending between the waveguide face 122a and the third conductive surface 120a couples with the external space via the gap between the two end faces 122c and the interior of the slot 112.

The waveguide extending between the waveguide face 122a of the first ridge 122A and the third conductive surface 120a, or the waveguide extending between the waveguide face 122a of the second ridge 122B and the third conductive surface 120a, is to be connected to a transmitter or receiver not shown in use. During transmission, an electromagnetic wave which is supplied from the transmitter propagates in the waveguide, and passes between the two end faces 122c of the ridges 122A and 122B and through the interior of the slot 112, so as to be radiated to the external space. During reception, an electromagnetic wave which impinges on the slot 112 from the external space passes through the interior of the slot 112 and between the end faces 122c of the ridges 122A and 122B, and propagates along the ridge 122A or 122B, so as to be received by the reception circuit.

In this example, the ridges 122A and 122B each have a bump 122b in the central portion. The bump 122b narrows the interval between the waveguide face 122a and the third conductive surface 120a. The bumps 122b are provided in order to adjust the wavelength or phase of a signal wave propagating in the waveguide extending between the waveguide face 122a and the third conductive surface 120a. Providing the bumps 122b provides the effect of locally increasing the capacitance of the waveguide extending between the waveguide face 122a and the third conductive surface 120a, thus shortening the signal wave wavelength. Based on this effect, e.g. during transmission, the phase of a signal wave at the position of the slot 112 can be adjusted so that desired radiation characteristics will be achieved. Such a structure is especially effective in applications where, in a construction where the first conductive member 110 includes a plurality of slot 112 that are arranged along the Y direction, for example, all slots 112 are to radiate signal waves with an equal phase. By providing the bumps 122b, the wavelength of a signal wave in the waveguide is shortened, whereby the intervals between slots can be reduced.

Without being limited to a construction where bumps 122b are provided on the waveguide face 122a, such phase adjustment is also possible in other constructions. For example, similar effects can also be obtained in a construction where at least one dent is provided on the waveguide face 122a.

Figure 8A:
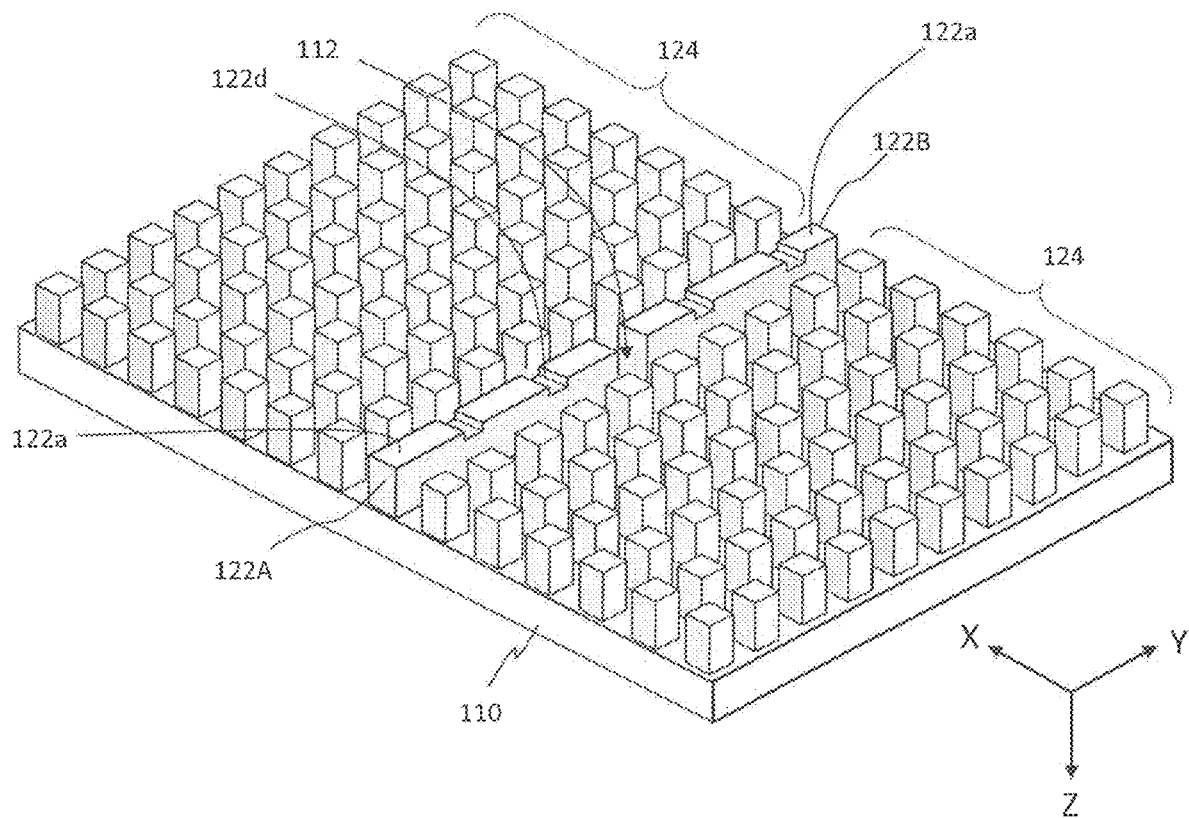
Figure 8B:
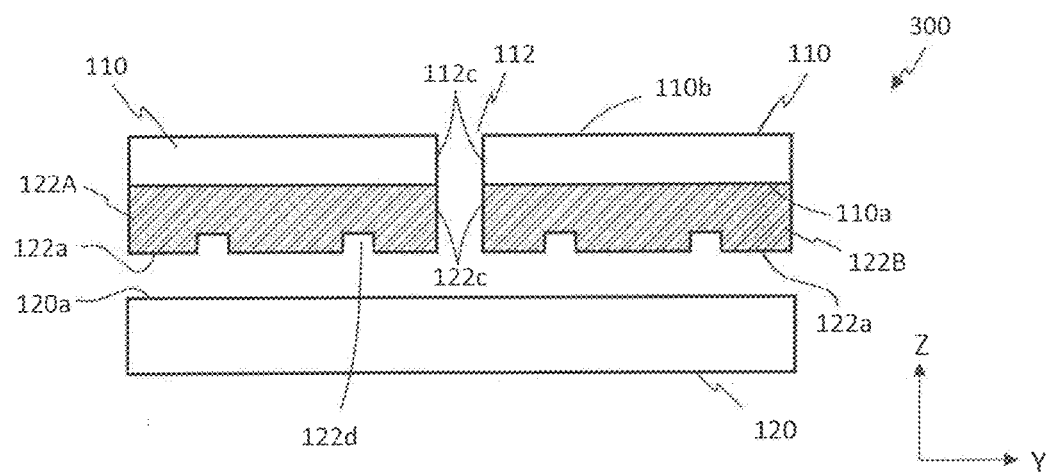
FIG. 8B is a diagram showing a cross section of a slot antenna device 300 that passes through the center of the slot 112 and is parallel to the YZ plane.

FIG. 8A is a perspective view showing an example where the waveguide member 122 has a plurality of dents 122d on the waveguide face 122a. FIG. 8A shows the first conductive member 110 and the waveguide member 122 thereon, with an example arrangement of ridges 122A and 122B and a plurality of conductive rods 124 on the waveguide member 122. FIG. 8B is a diagram showing a cross section of the slot antenna device 300 that passes through the center of the slot 112 and is parallel to the YZ plane.

In this example, the waveguide member 122 has a plurality of dents 122d serving to broaden the spacing between the waveguide face 122a and the third conductive surface 120a. Two of the dents 122d are provided in between the central portion of the first ridge 122A and its opposite ends. Two other dents 122d are provided in between the central portion of the second ridge 122B and its opposite ends. By providing such dents 122d on the waveguide face 122a, the inductance of the waveguide extending between the waveguide face 122a and the third conductive surface 120a is locally increased, thereby creating an effect of shortening the wavelength of a signal wave. Based on this effect, e.g. during transmission, the phase of a signal wave at the position of each slot 112 can be adjusted so that desired radiation characteristics will be achieved.

The bumps 122b or dents 122d in each of the above examples may be provided on the third conductive surface 120a, rather than on the waveguide face 122a. Such a construction will also attain effects similar to those attained by a construction in which bumps 122b or dents 122d are provided on the waveguide face 122a. The bumps 122b or dents 122d may be provided on both of the waveguide face 122a and the third conductive surface 120a.

The aforementioned effects of wavelength or phase adjustment can also be attained in the case where, instead of providing the bumps 122b or dents 122d, the width of the waveguide face 122a is allowed to vary along the direction that the waveguide face 122a extends. Creating broad portions at which the width of the waveguide face 122a is broader than in any adjacent site provides effects similar to those attained by the bumps 122b. Creating narrow portions at which the width of the waveguide face 122a is narrower than in any adjacent site provides effects similar to those attained by the dents 122d. A construction in which the waveguide member 122 has broad portions or narrow portions realizes wavelength or phase adjustments similar to what is described above. A structure in which any two or more of bumps, dents, broad portions, and narrow portions are combined may also be used.

Thus, in a slot antenna device according to an example embodiment of the present disclosure, at least one of the spacing between the waveguide face 122a and the third conductive surface 120a and the width of the waveguide face 122a is varied along a direction that the waveguide member 122 or the waveguide extends. In one example embodiment, at least one of the second conductive member 120 and the waveguide member 122 has at least one bump or at least one dent. In another example embodiment, the waveguide member 122 has at least one broad portion or at least one narrow portion. The spacing between the waveguide face 122a and the third conductive surface 120a, or the width of the waveguide face 122a, may be varied periodically or aperiodically along the direction that the waveguide extends. The waveguide face 122a and the third conductive surface 120a may take a variety of structures depending on the radiation characteristics or reception characteristics that are required of the slot antenna device 300.

<Example Construction of Slot Antenna Device Having a Plurality of Slots>

The wavelength or phase adjustment function according to an example embodiment of the present disclosure is especially effective in a slot antenna device having a plurality of slots as radiating elements. Hereinafter, such a slot antenna device will be described more specifically. In the absence of contradictions, the construction of each of the examples described below is applicable to a slot antenna device having a single slot. Moreover, the constructions of the examples described below may be used in combinations. In the following description, a slot antenna device may be referred to as a "slot array antenna" or simply as an "array antenna".

Depending on the purpose, an array antenna may employ different methods of exciting each radiating element. For example, in a radar device in which a WRG waveguide is used, a different method of exciting each radiating element will be employed depending on the target radar characteristics, e.g., maximizing the radar efficiency, or reducing side lobes while sacrificing radar efficiency. Herein, a design method that maximizes the gain of an array antenna in order to maximize its radar efficiency will be described as an example. In order to maximize the gain of an array antenna, it is known that the density with which the radiating elements composing an array are disposed may be maximized, and all of the radiating elements may be excited with an equiamplitude and equiphase. In order to realize this, standing-wave series feed may be used, for example. Standing-wave series feed is a feed method which excites all radiating elements in an array antenna with an equiamplitude and equiphase, by utilizing its nature that "identical voltages and currents exist at positions which are distant by one wavelength on a path upon which a standing wave is created".

Herein, a common design procedure for achieving standing-wave series feed will be described. First, a waveguide is constructed so that an electromagnetic wave (signal wave) is allowed to undergo total reflection in at least one of the two ends of a feeding path, such that a standing wave is created on the feeding path. Next, at a plurality of positions which are distant by one wavelength on the feeding path, a plurality of radiating elements having an identical impedance which is small enough not to substantially affect the standing wave are inserted in series to the path, such that the standing wave current has the largest amplitude at these positions. As a result, excitation with an equiamplitude and equiphase based on standing-wave series feed is realized.

Thus, the principle of standing-wave series feed is easy to understand. However, it has been found that merely applying such a construction to a WRG-based array antenna will not easily achieve excitation with an equiamplitude and equiphase. It has been found through the inventors' study that, in order to excite all radiating elements with an equiamplitude and equiphase, it is effective to adjust the phase of a signal wave to propagate through the WRG, by providing on the WRG a portion(s) having a different capacitance or inductance from that of any other portion. A different capacitance or inductance from that of any other portion may be obtained by, for example, introducing a portion(s) at which the distance between the waveguide face and the electrically conductive surface of an opposing conductive member or the width of the waveguide face differs relative to any adjacent site. Such phase adjustments are needed not only in the case of exciting all radiating elements with an equiamplitude and equiphase, but also in attaining other purposes, such as reducing side lobes while sacrificing efficiency. For example, differences in phase and amplitude may be introduced between adjacent radiating elements so that desired excitation states are realized at the respective slot positions, or some other adjustments may be made. Moreover, similar phase adjustments are needed not only when adopting standing-wave feed, but also when adopting traveling-wave feed.

In a conventional WRG-based array antenna which is disclosed in the aforementioned the specification of U.S. Pat. No. 8,779,995, identical dents (notches) or broad portions are disposed over the entire path with a certain short period, and no structure is provided for adjusting the signal wave phase. In the construction disclosed in the specification of U.S. Pat. No. 8,779,995, given a wavelength $\lambda_R$ of a signal wave in a waveguide where no dents or broad portions are provided, dents or broad portions are periodically disposed with a period which is smaller than $\lambda_R/4$. Such a structure affects the characteristic impedance on the transmission line as a distributed constant circuit, and consequently shortens the wavelength of the signal wave within the waveguide. However, it is unable to adjust the excitation state of each slot in accordance with the desired antenna characteristics.

The reason is that, when constructing a slot array antenna by disposing a plurality of slots on the ridge waveguide which is disclosed in the specification of U.S. Pat. No. 8,779,995, the slot impedance is large enough to significantly distort the waveform of a signal wave propagating through the waveguide. Therefore, when adopting the minute periodic structure disclosed in the specification of U.S. Pat. No. 8,779,995, it is presumably difficult to adjust the intensity and phase of an electromagnetic wave which is radiated from each of the plurality of slots depending on the purpose. This means that, in a WRG-based radar device or the like, in order to attain the target radar characteristics, one cannot design the waveguide and the slots independently of each other. In other words, in order to attain desired characteristics, e.g., maximizing efficiency or reducing side lobes while sacrificing efficiency, the waveguide and the slots both need to be optimized simultaneously. When one of the inventors filed an application for the disclosure of the specification of U.S. Pat. No. 8,779,995, such influences of slot impedance had not been recognized at all.

In order to obtain desired antenna characteristics, the inventors have considered, between two adjacent slots along the direction that the waveguide member extends, introducing additional elements (e.g., dents or bumps) at an interval which is longer than $\lambda_R/4$. The inventors have further studied disposing additional elements such as dents or bumps between two adjacent slots, in an aperiodic manner along the transmission line. The inventors have also studied a structure in which the spacing between the second conductive member and the waveguide member and/or the width of the waveguide face of the waveguide member varies (i.e., inductance and/or capacitance varies) in three or more steps along the waveguide face. As a result, they have succeeded in adjusting the wavelength of the signal wave within the waveguide, and also adjusting the intensity and the phase of the propagating signal wave at the slots. $\lambda_R$ is longer than a wavelength $\lambda_o$ in free space, but less than 1.15$\lambda_o$. Therefore, the aforementioned "interval which is longer than $\lambda_R/4$" can also be read as an "interval which is longer than 1.15$\lambda_o/4$". If the aforementioned interval is greater than $\lambda_R/4$ but only by a small difference, a sufficient amount of phase adjustment may not be obtained in the propagating signal wave. In such a case, a site in which additional elements are disposed at an interval which is equal to or greater than 1.5$\lambda_o/4$ may be introduced.

In the present specification, an "additional element" means a structure on a transmission line which locally changes at least one of inductance and capacitance. In the present specification, "inductance" and "capacitance" refer to inductance and capacitance values per unit length in a direction along the transmission line (i.e., the direction that the waveguide member extends), where the unit length is equal to or less than $\frac{1}{10}$ of the free-space wavelength $\lambda_o$. Without being limited to a dent or a bump, an additional element may be a "broad portion" at which the waveguide face has a greater width than at the other adjacent portions, or a "narrow portion" at which the waveguide face has a smaller width than at the other adjacent portions, for example. Alternatively, it may be a portion that is composed of a material whose dielectric constant is different from that of any other portion. Such an additional element(s) may be provided on an electrically-conductive waveguide face of a waveguide member, or on a conductive surface of a conductive member opposing the waveguide face.

Now, with reference to FIGS. 9A through 9F, example slot array antenna constructions according to illustrative example embodiments of the present disclosure will be described.

Figure 9A:
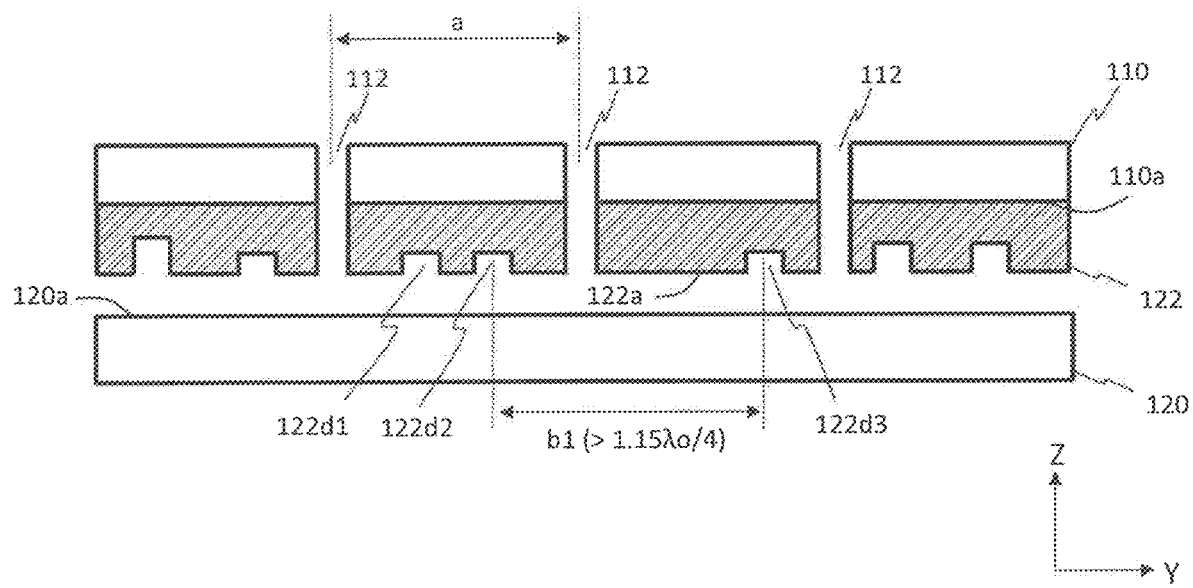
FIG. 9A is a cross-sectional view schematically showing the structure of a slot array antenna according to another example embodiment of the present disclosure.

FIG. 9A is a cross-sectional view schematically showing the structure of a slot array antenna according to an illustrative example embodiment of the present disclosure. FIG. 9A is a cross-sectional view resulting by cutting the slot array antenna along a plane which is parallel to the YZ plane and which extends through the center of the plurality of slots 112. A first conductive member 110 of this slot array antenna has a plurality of slots 112 that are arranged along the Y direction. The waveguide member 122 extends along the Y direction and includes a plurality of ridges which are arranged along the Y direction at intervals. Each of the plurality of slots 112 is located between opposing ends of two adjacent ridges among the plurality of ridges, as viewed from a direction that is perpendicular to the conductive surface 110a or the waveguide face 122a. In this example, the first conductive member 110 has three slots 112, whereas the waveguide member 122 has four ridges. The number of slots 112 and the number of ridges in the waveguide member 122 may be different from those illustrated in this example.

A plurality of dents are provided on the waveguide member 122. Positions of the dents are selected so that changes are introduced in the signal wave phase at the positions of the plurality of slots 112 so as to provide characteristics as desired. In this example, the two dents 122d1 and 122d2 in the second ridge from the left are at symmetric positions with respect to an XZ plane extending through the midpoint between two adjacent slots 112 along the Y direction. The number, shapes, and sizes of dents, as well as their positions on the ridge, differ from ridge to ridge. Thus, it is not necessary that all ridges in the waveguide member 122 are identical in structure.

In the construction of FIG. 9A, the plurality of dents of the waveguide member 122 include a first dent 122d1, a second dent 122d2, and a third dent 122d3 which are adjacent to one another in this order along the Y direction. The distance between the centers of the first dent 122d1 and the second dent 122d2 is different from the distance between the centers of the second dent 122d2 and the third dent 122d3. Thus, in the construction shown in FIG. 9A, at least in the region shown in the figure, the spacing between the second conductive surface 110a on the rear side of the first conductive member 110 and the waveguide face 122a of the waveguide member 122 is varied aperiodically along the Y direction. The first to third dents may be in any arbitrary positions so long as they are provided between the two endmost slots among the plurality of slots 112. The plurality of dents may instead be provided on the third conductive surface 120a on the front side of the second conductive member 120.

In the construction shown in FIG. 9A, the distance b1 between the center of the second dent 122d2 and the center of the third dent 122d3 is longer than 1.15λo/4. More preferably, the distance b1 is equal to or greater than 1.5λo/4. Now, let the distance between the centers of two adjacent slots 112 along the Y direction be a. The distance a may be, for example, designed to be approximately equal to the wavelength λg of an electromagnetic wave propagating in the waveguide. The wavelength λg is a wavelength which has varied from the wavelength $\lambda_R$ due to the additional elements being provided. Although it may depend on the design, λg may be shorter than $\lambda_R$, for example. In that case, a<$\lambda_R$, and therefore the distance (>$\lambda_R$/4) between the centers of the two adjacent dents 122d2 and 122d3 is longer than a/4. In the construction of FIG. 9A, the distance between the centers of the first dent 122d1 and the second dent 122d2 may be equal to or less than 1.15λo/4.

In the construction of FIG. 9A, each dent functions as an element to locally increase the inductance of the transmission line. Although the bottom of each dent and any site other than the dents are shown to be flat, they may not be flat.

In the construction of FIG. 9A, the first dent 122d1 and the second dent 122d2 are provided on one ridge, whereas the third dent 122d3 is provided on another ridge. Without being limited to such an implementation, for example, the first to third dents may be provided on one ridge, or they may be respectively provided on three different ridges.

Figure 9B:
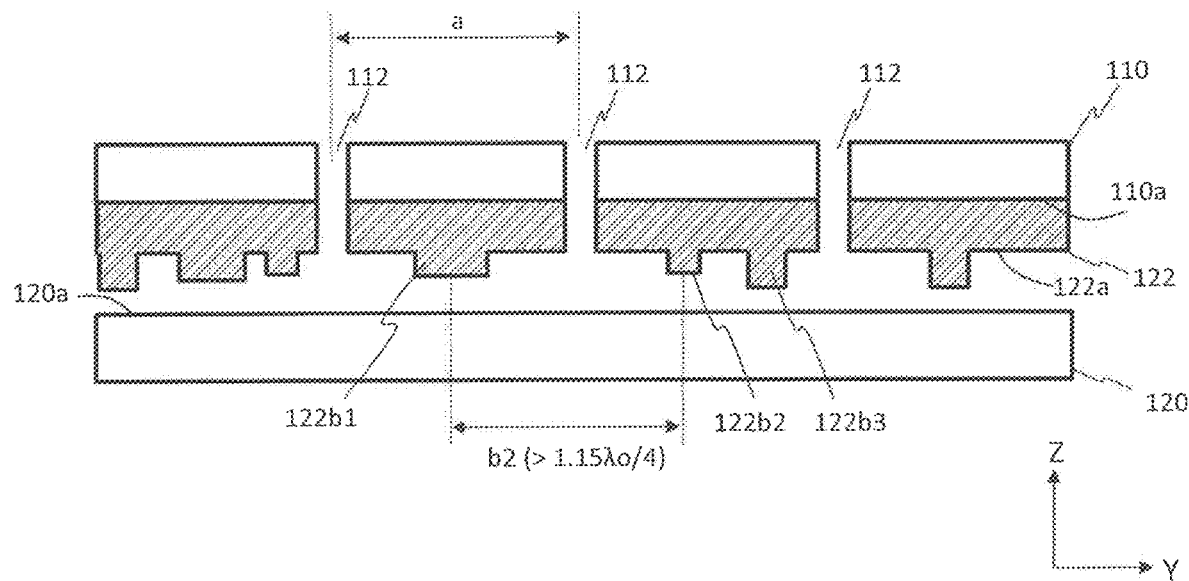
FIG. 9B is a cross-sectional view showing a slot antenna device according to still another example embodiment.

FIG. 9B is a cross-sectional view showing a slot antenna device according to still another example embodiment. In this example, a plurality of bumps are provided on the waveguide member 122. The positions of the bumps are selected so that the signal wave phase is varied at the positions of the plurality of slots 112, such that characteristics that are suited for a given purpose will be attained. As shown in the figure, the number, shapes, and sizes of bumps, as well as their positions on the ridge, may differ from ridge to ridge.

In the construction of FIG. 9B, the plurality of bumps on the waveguide member 122 include a first bump 122b1, a second bump 122b2, and a third bump 122b3, which are adjacent to one another and consecutively follow along the Y direction (first direction). The distance between the centers of the first bump 122b1 and the second bump 122b2 is different from the distance between the centers of the second bump 122b2 and the third bump 122b3. Thus, in the construction shown in FIG. 9B, at least within the illustrated region, the spacing between the second conductive surface 110a and the waveguide face 122a is varied aperiodically along the Y direction. The aforementioned first to third bumps (or the first to third dents) may be in any positions so long as they are provided between the two endmost slots among the plurality of slots 112. The plurality of bumps may be provided on the third conductive surface 120a.

In the construction shown in FIG. 9B, the distance b2 between the center of the first bump 122b1 and the center of the second bump 122b2 is longer than 1.15λo/4. More preferably, the distance b2 is 1.5λo/4 or greater. When $\lambda_g$ is shorter than $\lambda_R$, a<$\lambda_R$; therefore, the distance (>$\lambda_R$/4) between the centers of the two adjacent bumps 122b1 and 122b2 is longer than a/4. In the construction shown in FIG. 9B, the distance between the centers of the second bump 122b2 and the third bump 122b3 may be equal to or less than 1.15λo/4.

In the construction of FIG. 9B, each bump functions as an element to locally increase the capacitance of the transmission line. Although the top of each bump and any site other than the bumps are shown to be flat, they may not be flat.

In the construction of FIG. 9B, the second bump 122b2 and the third bump 122b3 are provided on one ridge, whereas the first bump 122b1 is provided on another ridge. Without being limited to such an implementation, for example, the first to third bumps may be provided on one ridge, or they may be respectively provided on three different ridges.

Aperiodic constructions similar to those in FIGS. 9A and 9B can also be realized by, instead of providing dents or bumps, providing broad portions or narrow portions. For example, consider a case where the waveguide member 122 includes a plurality of broad portions on the waveguide face 122a, the plurality of broad portions expanding the width of the waveguide face 122a relative to any adjacent site. In this case, the plurality of broad portions include a first broad portion, a second broad portion, and a third broad portion, which are adjacent to one another and consecutively follow along the Y direction, and they may be disposed so that the distance between the centers of the first broad portion and the second broad portion is different from the distance between the centers of the second broad portion and the third broad portion. Similarly, consider a case where the waveguide member 122 includes a plurality of narrow portions narrowing the width of the waveguide face 122a relative to any adjacent site on the waveguide face 122a. In this case, the plurality of narrow portions include a first narrow portion, a second narrow portion, and a third narrow portion which are adjacent to one another and consecutively follow along the Y direction, and they may be disposed so that the distance between the centers of the first narrow portion and the second narrow portion is different from the distance between the centers of the second narrow portion and the third narrow portion. The first to third broad portions (or the first to third narrow portions) may be in any positions so long as they are provided between the two endmost slots among the plurality of slots 112.

In the construction of FIGS. 9A and 9B, the waveguide existing between the third conductive surface 120a and the waveguide face 122a includes a plurality of positions at which the inductance (or capacitance) of the waveguide exhibits local maximums or local minimums. The plurality of positions include a first position, a second position, and a third position which are adjacent to one another and consecutively follow along the Y direction. The distance between the centers of the first position and the second position is different from the distance between the centers of the second position and the third position. Thus, within a region where a plurality of slots are provided, a structure where aperiodic variations in inductance or capacitance are at least locally introduced allows the phase of an electromagnetic wave propagating in the waveguide to be adjusted in accordance with the desired characteristics. The aforementioned first to third positions may be in any positions so long as they are provided between the two endmost slots.

Figure 9C:
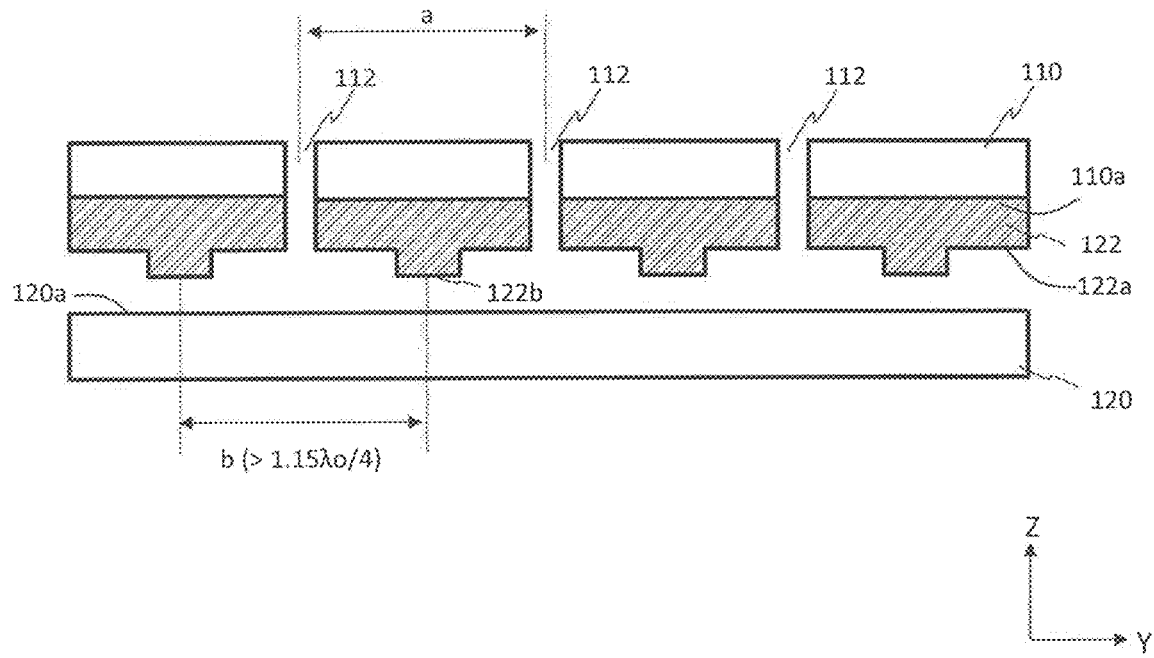
FIG. 9C is a cross-sectional view schematically showing the structure of a slot array antenna according to still another example embodiment of the present disclosure.

FIG. 9C is a cross-sectional view schematically showing the structure of a slot array antenna according to another example embodiment of the present disclosure. In this slot array antenna, as viewed from a direction perpendicular to the waveguide face 122a, a bump 122b is provided at every midpoint between two adjacent slots 112. Without being limited to the positions shown in the figure, the bumps 122b may be in other positions. In such a construction, each bump 122b functions as an element to locally increase the capacitance of the transmission line. In this example, too, the top of each bump 122b and any other site are flat. The distance b between the centers of two adjacent bumps 122b along the Y direction satisfies $b>1.15\lambda o/4$. More preferably, the distance b satisfies $b>1.5\lambda o/8$. Similar characteristics can also be obtained with a construction in which broad portions are provided instead of bumps 122b, or bumps are provided on the third conductive surface 120a rather than on the waveguide face 122a.

In the construction of FIG. 9C, the spacing between the third conductive surface 120a and the waveguide face 122a is varied periodically along the Y direction. However, the period of variation is longer than $1.15\lambda o/4$ or $\lambda_R/4$. The period is equal to the distance (slot interval) between the centers of two adjacent slots 112. When such a periodic construction is adopted, the period may be set to a value which is equal to or greater than ½ of the slot interval. In other words, at least one of the spacing between the third conductive surface 120a and the waveguide face 122a and the width of the waveguide face 122a may vary along the Y direction, with a period which is equal to or greater than ½ of the distance between the centers of two adjacent slots 112. Alternatively, at least one of inductance and capacitance of the waveguide extending between the third conductive surface 120a and the waveguide face 122a may vary along the Y direction with a period which is equal to or greater than ½ of the distance between the centers of two adjacent slots 112.

Figure 9D:
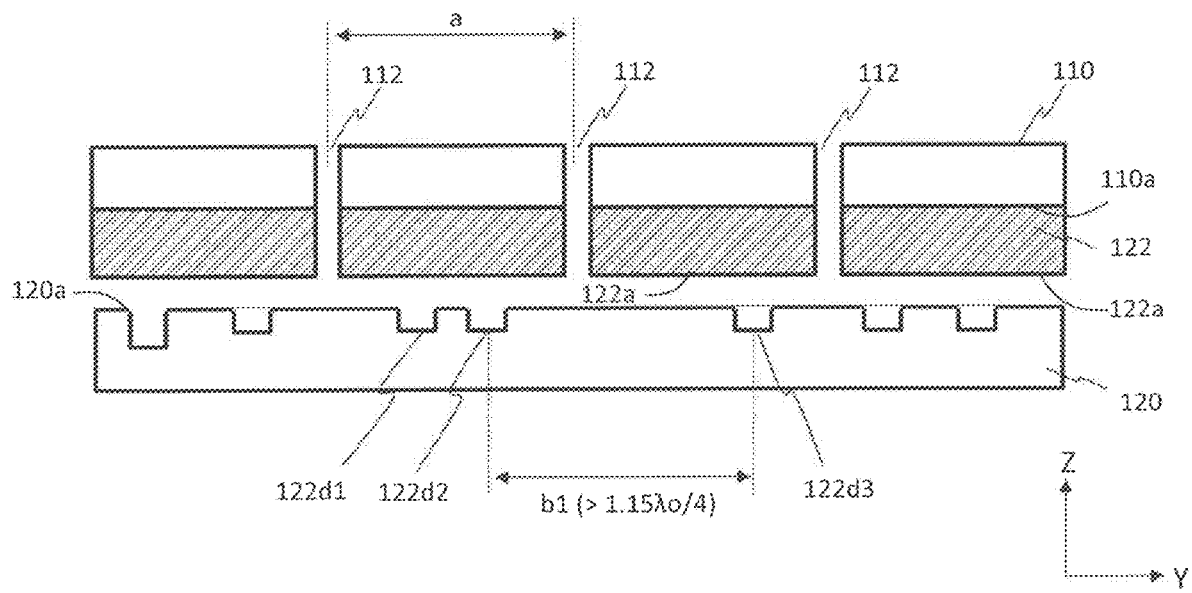
FIG. 9D is a cross-sectional view schematically showing the structure of a slot array antenna according to still another example embodiment of the present disclosure.

FIG. 9D is a cross-sectional view schematically showing the structure of a slot array antenna according to still another example embodiment of the present disclosure. In this slot array antenna, a plurality of dents are provided on the third conductive surface 120a of the first conductive member 110. The positions along the Y direction of the plurality of dents are identical to the positions along the Y direction of the plurality of dents in FIG. 9A. The waveguide face 122a of the waveguide member 122 has no bumps or dents, and is flat.

Figure 9E:
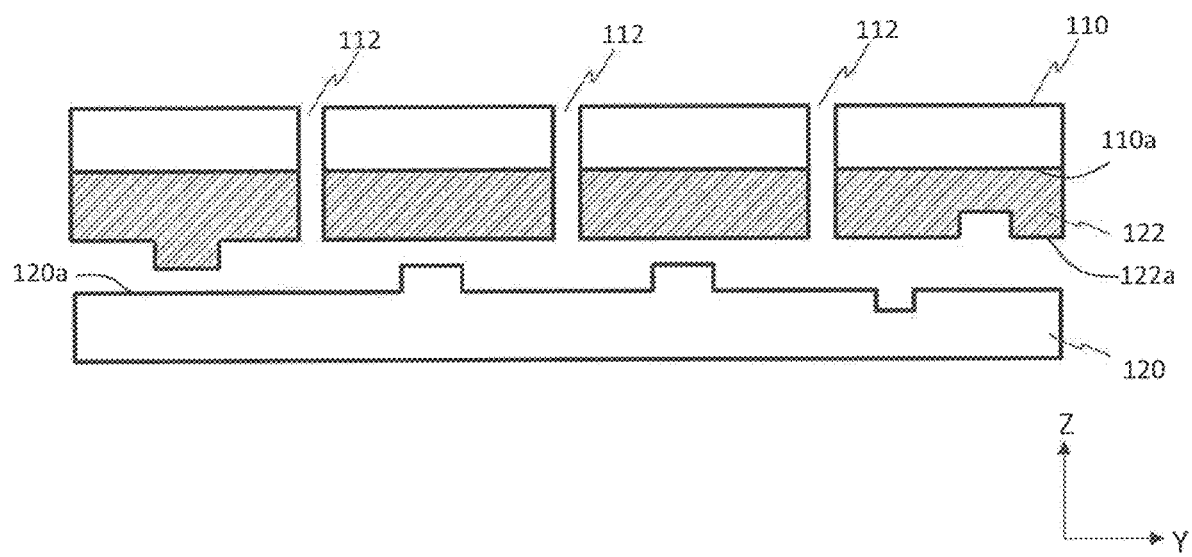
FIG. 9E is a cross-sectional view schematically showing the structure of a slot array antenna according to still another example embodiment of the present disclosure.

FIG. 9E is a cross-sectional view schematically showing the structure of a slot array antenna according to still another example embodiment of the present disclosure. In this slot array antenna, each of the third conductive surface 120a and the waveguide face 122a has both dents and bumps.

As shown in FIGS. 9D and 9E, the third conductive surface 120a of the second conductive member 120 may have at least one of the bumps and the dents. In that case, in terms of fabrication, the width of any dent or bump along the X direction, i.e., the direction which is orthogonal to the direction that the waveguide member 122 extends, is preferably broader than the width of the waveguide member 122, because it will relax the accuracy of alignment along the X direction that is required between the dents or bumps on the second conductive member 120 and the waveguide member 122. However, without limitation, the width of any dent or bump on the second conductive member 120 along the X direction may be equal to or narrower than the width of the waveguide face 122a of the waveguide member 122.

In the slot array antennas according to the example embodiments shown in FIGS. 9A through 9E, a waveguide which is constituted by the third conductive surface 120a and the waveguide face 122a includes: at least one minimal position at which at least one of inductance and capacitance of the waveguide exhibits a local minimum; and at least one maximal position at which at least one of inductance and capacitance of the waveguide exhibits a local maximum. A "minimal position" is a position in the neighborhood of a position along the Y direction at which a function concerning coordinates along the Y direction indicating inductance or capacitance of the waveguide (or the transmission line) takes a local minimum value. On the other hand, a "maximal position" is a position in the neighborhood of a position along the Y direction at which the aforementioned function takes a local maximum value. As in the examples shown in FIGS. 9A through 9E, when a local maximum or a local minimum of inductance or capacitance is ascribable to a dent with a flat bottom or a bump with a flat top, the central portion of the dent or bump is regarded as a "maximal position" or a "minimal position". In the example constructions shown in FIGS. 9A through 9D, the center of each dent is a "maximal position" at which inductance takes a local maximum, and the center of the portion between two adjacent dents is a "minimal position" at which inductance takes a local minimum. On the other hand, in the example constructions shown in FIGS. 9B and 9C, the center of each bump is a "maximal position" at which capacitance takes a local maximum, and the center of the portion between two adjacent bumps is a "minimal position" at which capacitance takes a local minimum. Similarly in the example shown in FIG. 9E, there are a plurality of maximal positions and a plurality of minimal positions.

Figure 9F:
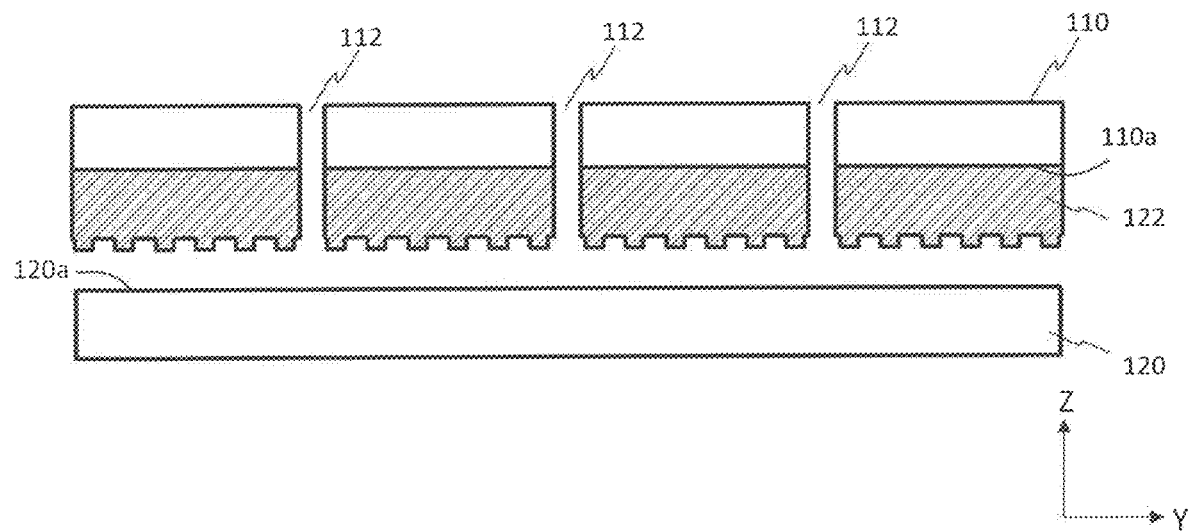
FIG. 9F is a cross-sectional view schematically showing the structure of a slot array antenna according to still another example embodiment of the present disclosure.

FIG. 9F is a cross-sectional view showing an example embodiment where a plurality of bumps or dents are arranged on the waveguide face of the waveguide member 122. In this slot array antenna, a plurality of minute dents or bumps are periodically arrayed on the ridge 122. The period of this array is smaller than $\lambda_R/4$, where $\lambda_R$ is the wavelength of a signal wave in the waveguide with no dents or bumps being provided. Since the wavelength $\lambda_R$ is less than 1.15 times the free-space wavelength $\lambda o$, the period of the array of dents 122d is less than $1.15\lambda o/4$. Therefore, in the construction shown in FIG. 9F, the distance b between the center of a dent and the center of an adjacent bump along the Y direction is shorter than $1.15\lambda o/8$.

Figure 10:
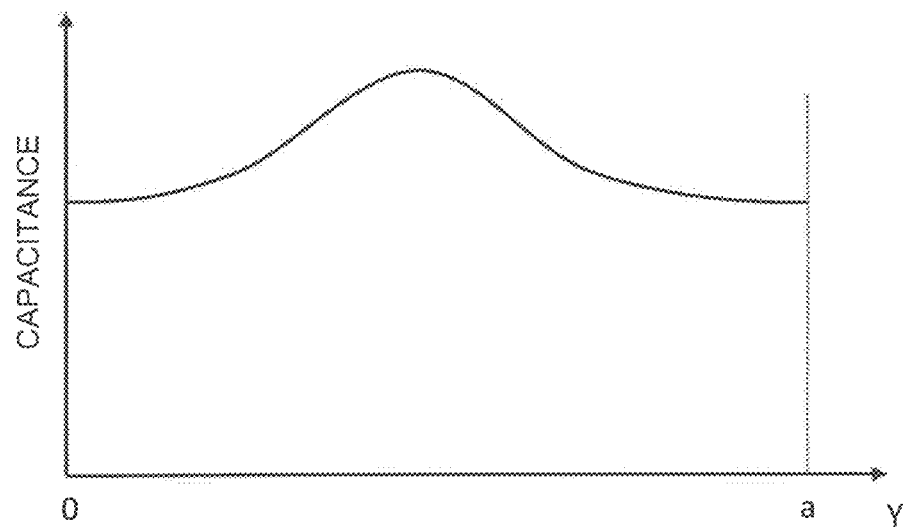
FIG. 10 is a graph schematically showing a Y direction dependence of capacitance of the waveguide in the construction shown in FIG. 9C.
Figure 11:
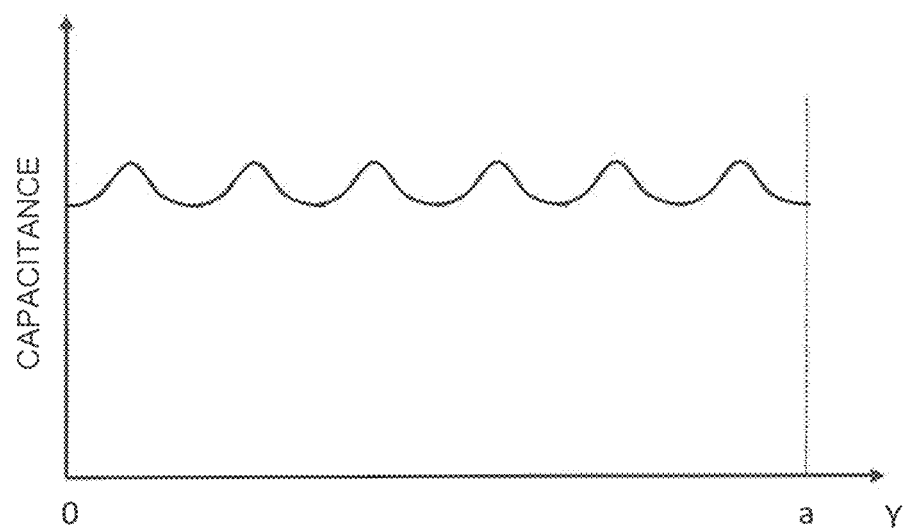
FIG. 11 is a graph schematically showing a Y direction dependence of capacitance of the waveguide in the construction shown in FIG. 9F.

Now, with reference to FIG. 10 and FIG. 11, the construction shown in FIG. 9C and the construction shown in FIG. 9F will be compared.

FIG. 10 is a graph schematically showing a Y direction dependence of capacitance of the waveguide in the construction shown in FIG. 9C. FIG. 11 is a graph schematically showing a Y direction dependence of capacitance of the waveguide in the construction shown in FIG. 9F. These graphs illustrate change in capacitance within a range of Y=0 to a, where the origin of Y coordinates is defined at the position of one slot 112. Note that FIG. 10 and FIG. 11 illustrate tendencies of change in capacitance along the Y direction, rather than being exact. As shown in FIG. 10 and FIG. 11, capacitance changes along the Y direction in both of the construction of FIG. 9C and the construction of FIG. 9F, but with different periods. In the construction of FIG. 9C, after exhibiting a local minimum near a slot, capacitance exhibits a local maximum in the neighborhood of a bump 122b. The minimal position exhibiting a local minimum and the maximal position adjacent thereto along the Y direction and exhibiting a local maximum are distant from each other by about ½ of the slot interval a. On the other hand, the construction of FIG. 9F is oscillating with a fine period which is less than ¼ of the wavelength $\lambda_R$ of an electromagnetic wave on a ridge waveguide lacking the dents or bumps.

In the case where the slot array is designed so that electromagnetic waves with an identical phase are radiated from the respective slots, the interval between adjacent slots along the Y direction is substantially equal to the wavelength $\lambda g$ of a transmission wave on the transmission line. Therefore, in that case, capacitance is varied with a long period which is about the same as the wavelength $\lambda g$ in the construction of FIG. 9C, whereas capacitance oscillates with a short period which is less than ¼ of the wavelength $\lambda_R$ in the construction of FIG. 9F. In a short modulation structure measuring less than ¼ of the wavelength $\lambda_R$, a transmission wave will hardly be reflected by each individual modulation, and the transmission wave will behave as if propagating in a medium which is near uniform. On the other hand, in a long modulation structure measuring equal to or greater than ¼ of the wavelength $\lambda_R$, a transmission wave can be reflected by each individual modulation.

Although the term "wavelength" is used in the description of the constructions of FIGS. 9A through 9F, this is for convenience of explanation. When capacitance or inductance is varied at long intervals, a transmission wave will undergo complex reflections, and the wavelength of an actual transmission wave has yet been directly confirmed. However, by imparting variations with a long period to capacitance or inductance, in a WRG-based slot antenna, the excitation state of each slot can be appropriately adjusted so as to achieve desired antenna characteristics. In such a state, the wavelength $\lambda g$ of a transmission wave is presumed to be substantially equal to the interval between two adjacent slots 112. The following description will assume that, even when capacitance or inductance is varied with a long period, a wavelength $\lambda g$ can still be adaptively defined for each situation.

As described above, at least one of inductance and capacitance changes between two adjacent slots in a direction along the waveguide member in the example embodiments shown in FIGS. 9A through 9E, on the basis of a modulation structure which is longer than ¼ of the wavelength $\lambda_R$. The actual manner of such change can be arbitrarily altered by adjusting the positions of additional elements such as bumps, dents, broad portions, and narrow portions. On the other hand, in the example embodiment shown in FIG. 9F, between two adjacent slots, at least one of inductance and capacitance varies along a direction conforming to the waveguide member, on the basis of modulation structures which are shorter than ¼ of the wavelength $\lambda_R$. Similarly to the periodic structures disclosed in the specification of U.S. Pat. No. 8,779,995, these structures provide the effect of uniformly shorten the wavelength of a signal wave in the waveguide. Unlike the constructions shown in FIGS. 9A through 9E, the signal wave phase at the position of each slot 112 cannot be finely adjusted; in applications which do not require such fine adjustments, the construction shown in FIG. 9F will be applicable.

Figure 12:
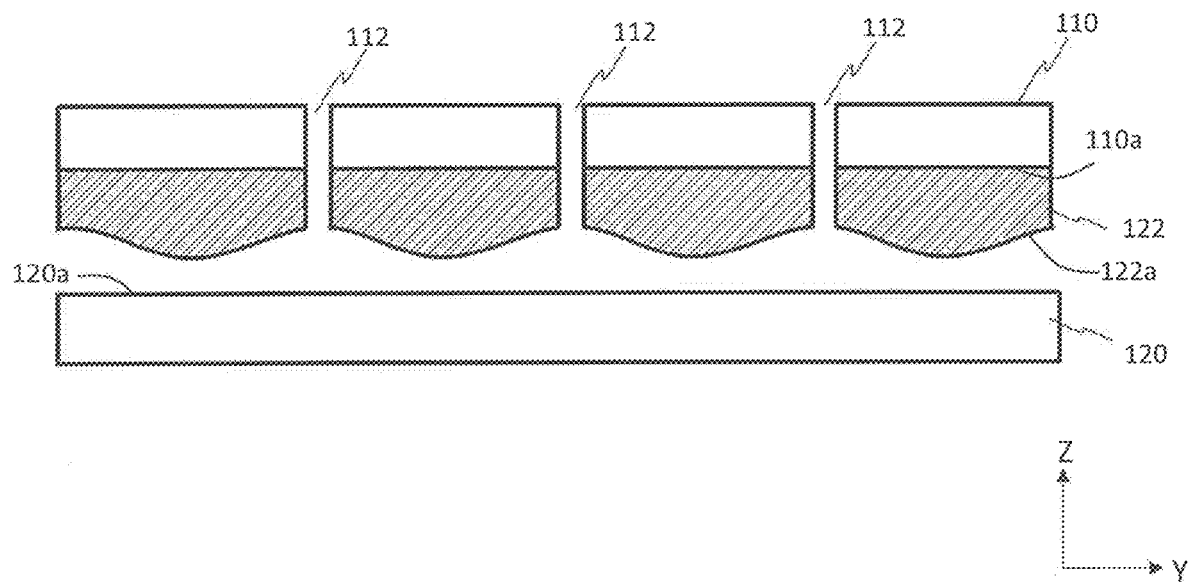
FIG. 12 is a cross-sectional view schematically showing still another example embodiment of the present disclosure.

FIG. 12 is a cross-sectional view showing another example embodiment of the present disclosure. As illustrated in FIG. 12, a construction where the height of the waveguide face 122a of the ridge 122 from the second conductive surface 110a is allowed to smoothly vary may also be adopted. Such a construction also provides effects similar to those attained by the construction of FIG. 9C. Similar effects can also be obtained by ensuring that the waveguide face has smoothly varying width. Thus, example embodiments of the present disclosure encompass a construction which has smoothly varying distance between the third conductive surface 120a of the second conductive member 120 and the waveguide face 122a of the waveguide member 122, and also a construction where the waveguide face 122a has smoothly varying width. Example embodiments of the present disclosure are not limited to constructions where additional elements are clearly defined (e.g., a construction where bumps or dents are arrayed).

In the present specification, bumps that serve to narrow the spacing between the third conductive surface 120a of the second conductive member 120 and the waveguide face 122a of the waveguide member 122 relative to any adjacent site, and broad portions that serve to broaden the width of the waveguide face 122a relative to any adjacent site, may be referred to as "first type of additional elements". A first type of additional element has the function of increasing the capacitance of the transmission line. Moreover, dents that serve to broaden the spacing between the third conductive surface 120a of the second conductive member 120 and the waveguide face 122a relative to any adjacent site, and narrow portions that serve to narrow the width of the waveguide face relative to any adjacent site, may be referred to as "second type of additional elements". A second type of additional element has the function of increasing the inductance of the transmission line. In one implementation, the additional elements include a first type of additional element(s) and/or a second type of additional element(s). A first type of additional element may be adjacent to a second type of additional element, or to a site where no additional element is provided (which may be referred to as a "neutral portion" in the present specification). Similarly, a second type of additional element may be adjacent to a first type of additional element or a neutral portion. The distance between the centers of such two adjacent elements may be set to a value which is longer than ⅛ of the wavelength $\lambda_R$ within the waveguide, or a value which is longer than 1.15/8 of the central wavelength $\lambda o$ in free space, for example. More preferably, the distance between the centers of between two adjacent elements may be set to a value which is equal to or greater than 1.5/8 of $\lambda o$.

In an example embodiment of the present disclosure, a special structure which can be regarded as a bump and yet a narrow portion, or a special structure which can be regarded as a dent and yet a broad portion, may be used as an additional element. In the present specification, a structure which is a bump that narrows the spacing between the conductive surface and the waveguide face relative to any adjacent site and yet is a narrow portion that narrows the width of the waveguide face relative to any adjacent site may be referred to as a "third type of additional element". Moreover, a structure which is a dent that broadens the spacing between the conductive surface and the waveguide face relative to any adjacent site and yet is a broad portion that broadens the width of the waveguide face relative to any adjacent site may be referred to as a "fourth type of additional element". Depending on its structure, a third type of additional element and a fourth type of additional element may each function as a capacitance component or as an inductance component. The additional elements may include a third type of additional element(s) and/or a fourth type of additional element(s) as such. A third type of additional element may be adjacent to a fourth type of additional element, or a neutral portion where no additional element is provided. Similarly, a fourth type of additional element may be adjacent to a third type of additional element or a neutral portion. The distance between the centers of such two adjacent elements may be set to a value which is longer than ⅛ of $\lambda_R$, or a value which is longer than 1.15/8 of λo, for example. More preferably, this distance between centers may be equal to or greater than 1.5/8 of λo.

Figure 13A:
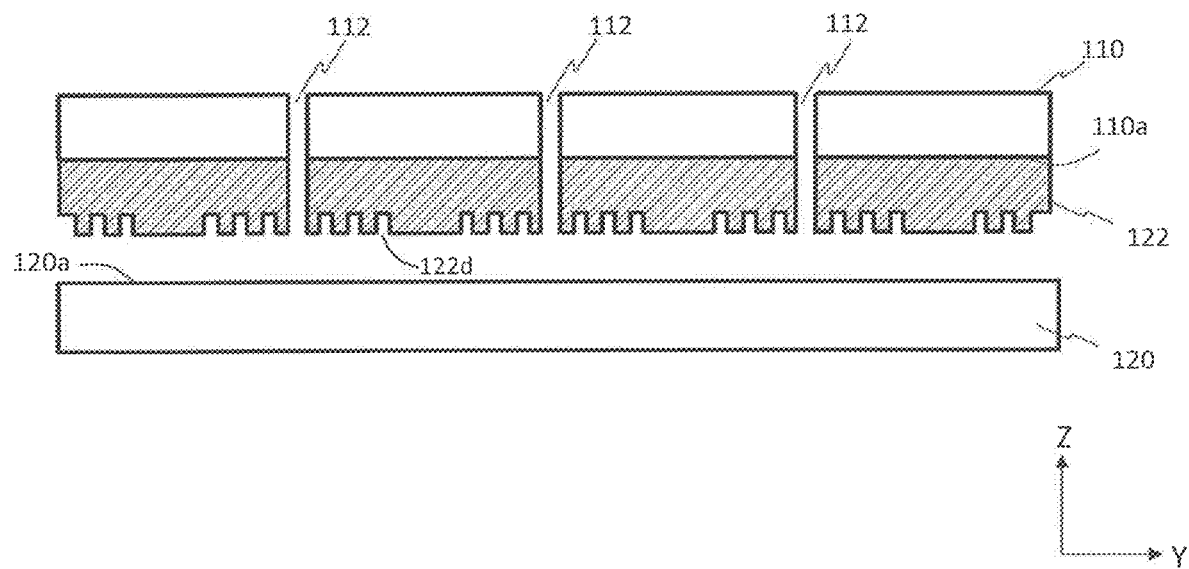
FIG. 13A is a cross-sectional view schematically showing still another example embodiment of the present disclosure.

An example embodiment of the present disclosure may also locally include any structure having a period which is less than ¼ of the wavelength $\lambda_R$ in a waveguide lacking bumps or dents, etc. FIG. 13A is a cross-sectional view schematically showing an example of such construction. In this example, the waveguide member 122 has a plurality of minute dents 122d. Each dent 122d has a dimension which is less than $\lambda_R$/8 along the Y direction. The plurality of dents 122d are provided at positions near the opposite ends of each ridge, without being provided in the central portion. The period of the plurality of dents 122d at the opposite ends of each ridge is less than $\lambda_R$/4.

Figure 13B:
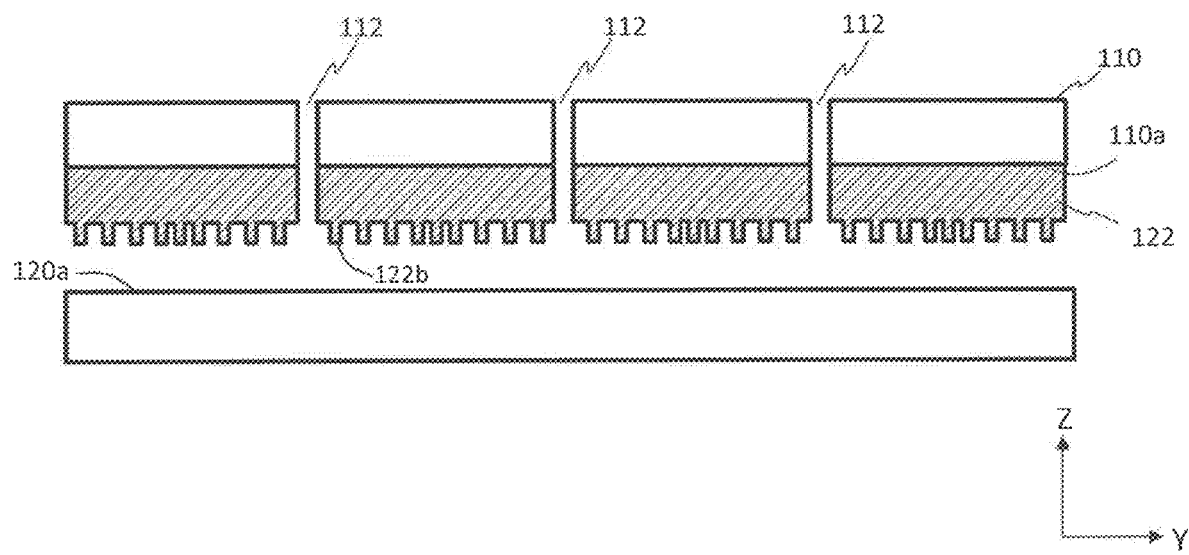
FIG. 13B is a cross-sectional view schematically showing still another example embodiment of the present disclosure.

FIG. 13B is a cross-sectional view schematically showing still another example embodiment of the present disclosure. In this example, the waveguide member 122 has a plurality of minute bumps 122b. The size of each bump along the Y direction is less than $\lambda_R$/8. In each ridge of the waveguide member 122, the density of the bumps 122b is higher near the central portion, and becomes lower toward the opposite ends. As in this example, based on how dense or sparse the minute additional elements are (i.e., differences in density), variations in average inductance or capacitance may be caused. In such an implementation, a "maximal position" and a "minimal position" each refer to a region with some expanse that contains a plurality of minute additional elements.

In the examples shown in FIG. 13A and FIG. 13B, the minute dents 122d and the minute bumps 122b are disposed at intervals which may locally be shorter than $\lambda_R$/4 or 1.15λo/4. However, with respect to each repetition unit consisting of bumps and dents, the repetition period is longer than $\lambda_R$/4 or 1.15λo/4. Stated otherwise, modulation with a period which is longer than $\lambda_R$/4 or 1.15λo/4 is superposed on the intervals between the minute dents 122d and the minute bumps 122b.

Figure 13C:
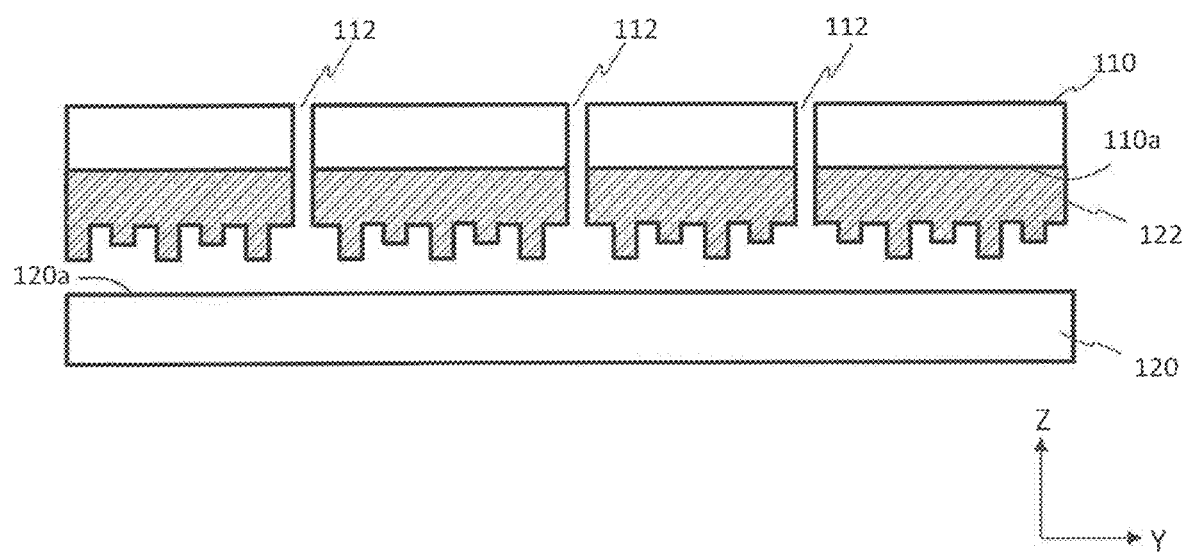
FIG. 13C is a cross-sectional view schematically showing still another example embodiment of the present disclosure.

FIG. 13C is a cross-sectional view schematically showing still another example embodiment of the present disclosure. In this example embodiment, the waveguide member 122 includes two types of bumps with different heights. The two types of bumps alternate at equal intervals. The spacing between the waveguide face 122a of the waveguide member 122 and the third conductive surface 120a of the second conductive member 120 is varied periodically along the Y direction. In other words, inductance and/or capacitance of the waveguide is varied periodically along the Y direction. The period of this variation is shorter than ½ of the slot interval. In this example, three kinds of positions with mutually varying spacing between the conductive surface 120a and the waveguide face 122a occur so as to be adjacent along the Y direction. Thus, the waveguide member 122 may be structured so that a plurality of bumps with different heights are provided thereon. By appropriately setting the bump heights in accordance with the desired characteristics, it becomes possible to adjust the phase of an electromagnetic wave propagating in the waveguide and adjust the excitation state of each slot 112. Without being limited to a plurality of bumps with different heights, similar adjustments may also be made by providing a plurality of dents with different depths, or a plurality of broad portions or narrow portions with different widths. Instead of the waveguide member 122, a plurality of bumps or a plurality of dents may be provided on the second conductive member 120. Between the two endmost slots among the plurality of slots 112, the spacing between the third conductive surface 120a and the waveguide face 122a or the width of the waveguide face 122a may vary in four or more steps.

Figure 13D:
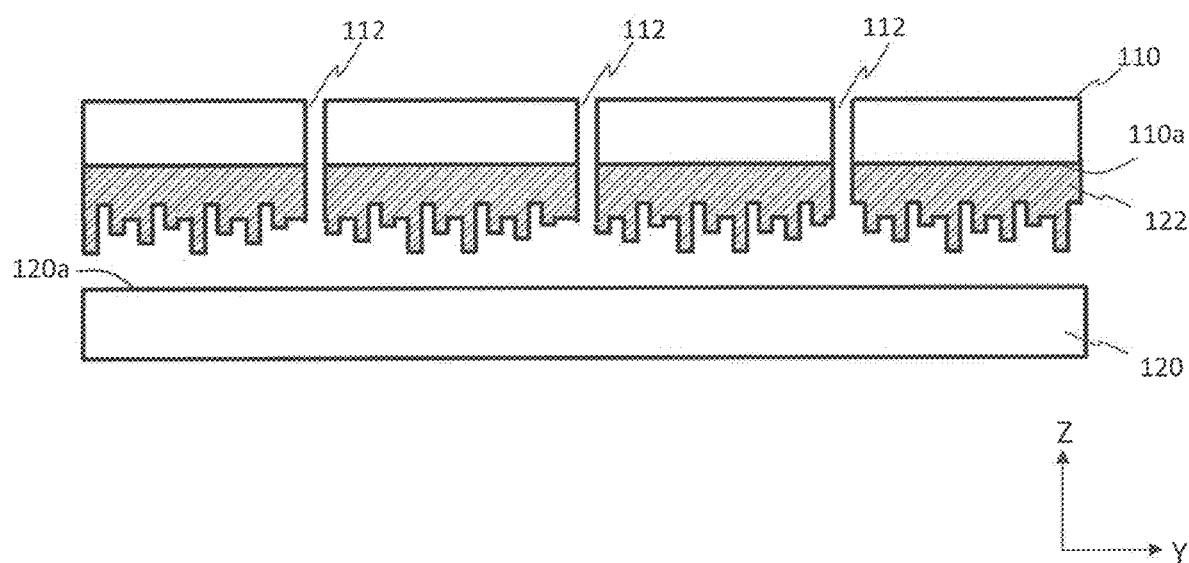
FIG. 13D is a cross-sectional view schematically showing still another example embodiment of the present disclosure.

FIG. 13D is a diagram showing an example construction in which the spacing (gap) between the conductive surface 120a and the waveguide face 122a is allowed to vary at more positions than in the example of FIG. 13C, so that the gap is varied over a shorter distance. In this example, there exist six kinds of positions with mutually varying spacing between the conductive surface 120a and the waveguide face 122a. Although the gap varies over a distance which is shorter than $\lambda_R$/4 or 1.15λo/4, with respect to each repetition unit consisting of bumps and dents, the repetition period is longer than $\lambda_R$/4 or 1.15λo/4.

As in the examples shown in FIG. 13C and FIG. 13D, the waveguide existing between the conductive member 120 and the waveguide member 122 may include at least three kinds of places with mutually varying spacing between the conductive surface 120a and the waveguide face 122a. Similarly, the waveguide member 122 may include at least three kinds of places with mutually varying width of the waveguide face 122a. It is not necessary that all of the at least three places are provided between every two adjacent slots along the Y direction among the plurality of slots 112; rather, it suffices if the at least three places are provided between the two endmost slots. In these implementations, the spacing between the conductive surface 120a and the waveguide face 122a or the width of the waveguide face 122a may vary along the waveguide face 122a either periodically or aperiodically. In the case where it varies periodically, its period may be equal to or less than $\lambda_R$/4 or 1.15λo/4 as described above, or greater than these values.

Figure 14A:
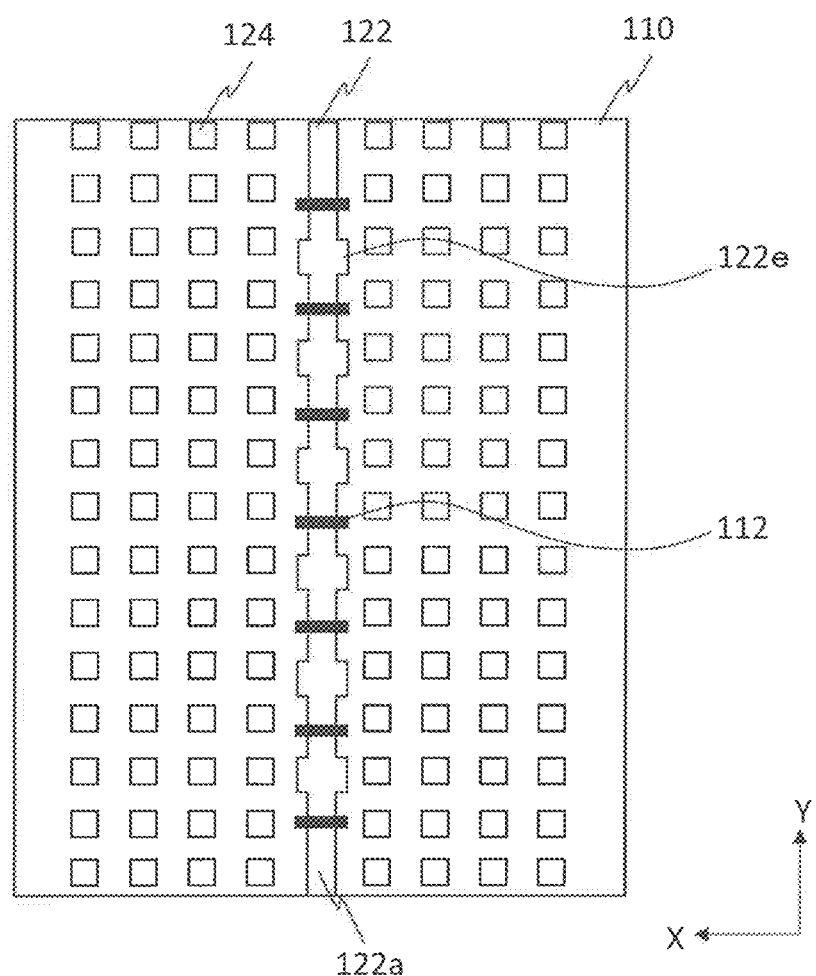
FIG. 14A is a diagram showing still another structure for the waveguide member 122.

FIG. 14A is a diagram showing still another structure for the waveguide member 122. FIG. 14A is an upper plan view showing an example arrangement of the first conductive member 110, the waveguide member 122, and the plurality of rods 124. In this example, rather than allowing the distance between the conductive surface 120a of the second conductive member 120 and the waveguide face 122a to vary, it is the width of the waveguide face 122a that is varied. In such a construction, too, the capacitance near the center between two adjacent slots 112 along the Y direction (in which the waveguide member 122 extends) is increased, and thus effects similar to those attained by the construction shown in e.g. FIG. 9C are obtained. Although this example employs broad portions 122e instead of the aforementioned bumps, narrow portions may be used instead of the aforementioned dents. Furthermore, structures featuring changes in both height and width from those portions (i.e., neutral portions) which lack any additional elements may also be used as additional elements. Moreover, instead of bumps, dents, broad portions, or narrow portions, portions having a different dielectric constant from the surrounding dielectric constant may be provided as additional elements, at appropriate positions in between the conductive surface 110a and the waveguide face 122a.

Figure 14B:
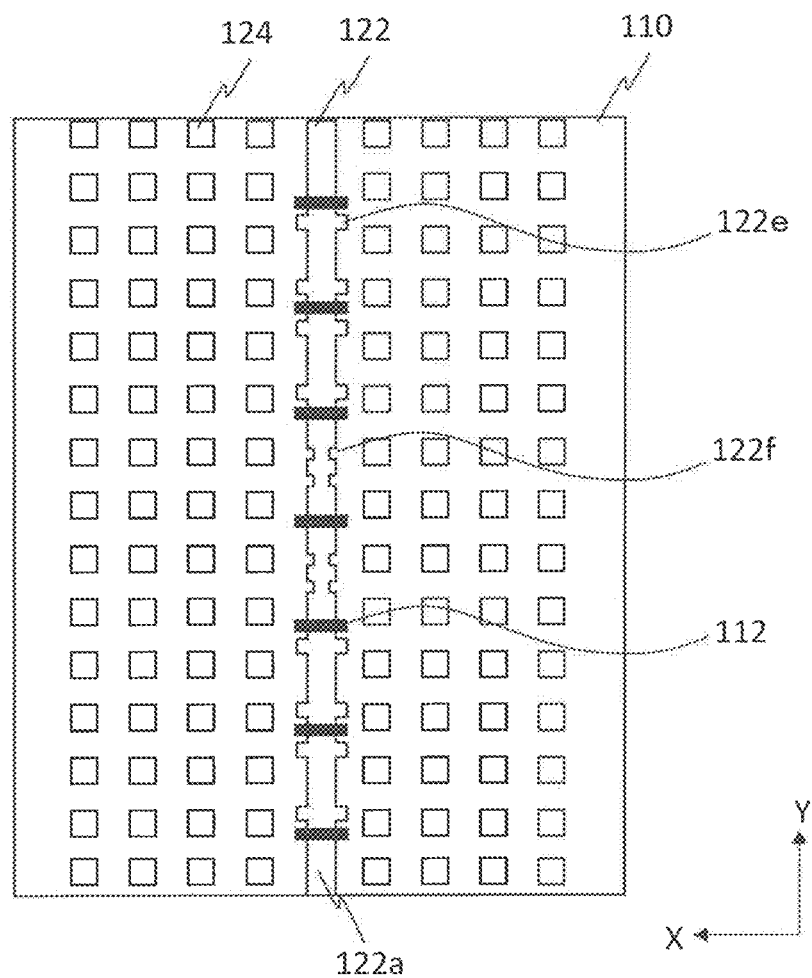
FIG. 14B is a diagram showing still another structure for the waveguide member 122.

FIG. 14B is a diagram showing still another structure for the waveguide member 122. This figure is drawn in the same manner as FIG. 14A. While FIG. 14A illustrates an example where the broad portions 122e are disposed at equal intervals along the Y direction, in which the waveguide member 122 extends, the broad portions 122e in this example are not disposed at equal intervals. The interval between the first broad portion 122e and the second broad portion 122e, as counted from the top of the Y direction in FIG. 14B, is larger than the interval between the second broad portion 122e and the third broad portion 122e. Moreover, the waveguide member 122 also includes narrow portions 122f. The fourth broad portion 122e is followed by four narrow portions 122f. Among these, the interval between the first narrow portion 122f and the second narrow portion 122f, as counted from the top of the Y direction, is smaller than the interval between the second narrow portion 122f and the third narrow portion 122f.

Thus, by locally varying the intervals between broad portions or narrow portions (i.e., portions with narrowed width), or providing both of broad and narrow portions, required characteristics can be conferred to the slot array antenna.

Additional elements according to an example embodiment of the present disclosure may be regarded as elements which are, as if lumped-parameter elements, locally added to a distributed constant circuit that has a certain characteristic impedance. Disposing such additional elements at appropriate positions allows flexible adjustments as are adapted to the application or purpose. For example, gain may be maximized by: adjusting the wavelength of a signal wave within the waveguide to a desired length; and applying standing-wave series feed or traveling-wave feed to effect excitation with an equiamplitude and equiphase. Alternatively, it is possible to adjust directivity characteristics through intentionally introducing a desired phase difference between the slots, or to radiate electromagnetic waves with a desired intensity from a plurality of slots by applying traveling-wave feed. Thus, the technique of the present disclosure is applicable to a broad range of purposes or applications.

Next, more specific example constructions for waveguide device according to example embodiments of the present disclosure will be described. Note however that unnecessarily detailed descriptions may be omitted. For example, detailed descriptions on what is well known in the art or redundant descriptions on what is substantially the same constitution may be omitted. This is to avoid lengthy description, and facilitate the understanding of those skilled in the art. The accompanying drawings and the following description, which are provided by the inventors so that those skilled in the art can sufficiently understand the present disclosure, are not intended to limit the scope of claims. In the present specification, identical or similar constituent elements are denoted by identical reference numerals.

Example Embodiment 1

Figure 15A:
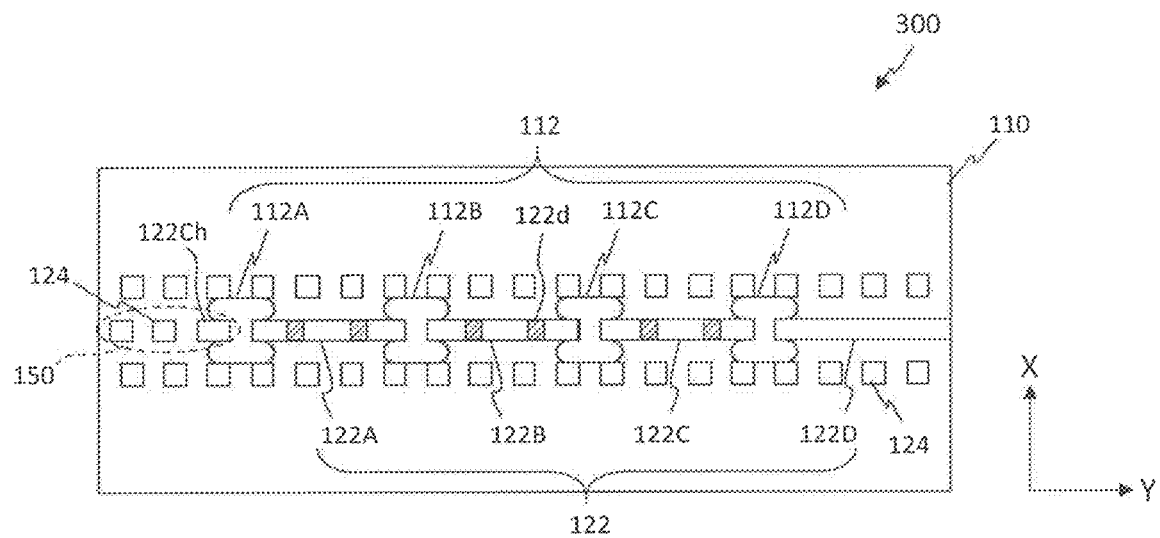
FIG. 15A is a plan view schematically showing a partial construction of an antenna device 300 according to a first example embodiment of the present disclosure.
Figure 15B:
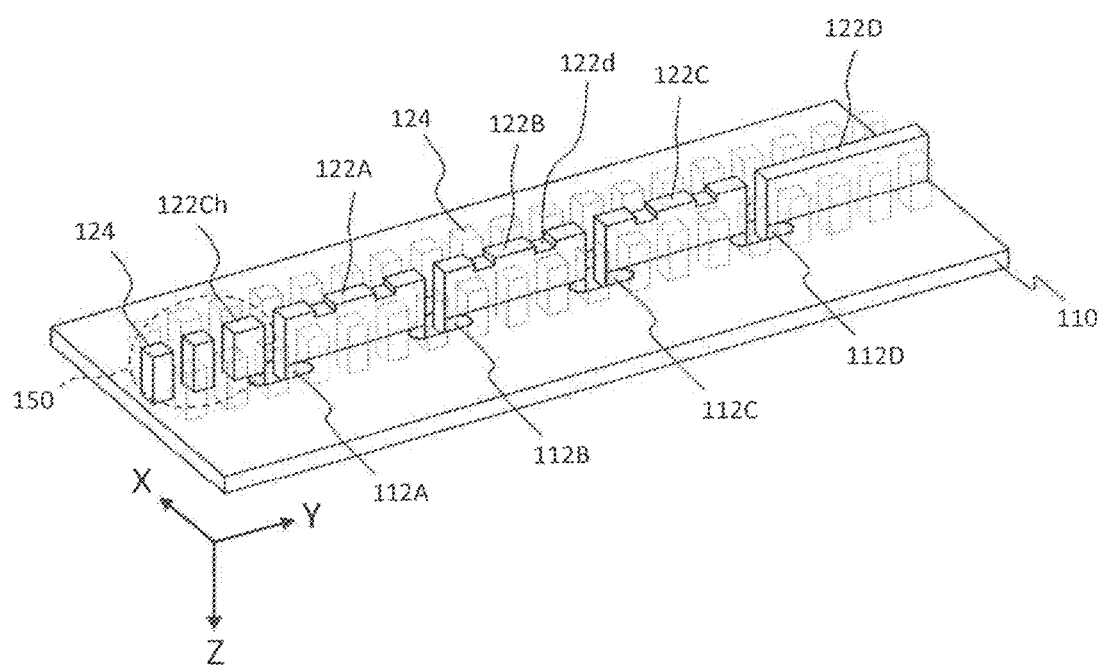
FIG. 15B is a perspective view showing more specifically the structure of a first conductive member 110, and a waveguide member 122 thereon, of the antenna device 300.
Figure 15C:
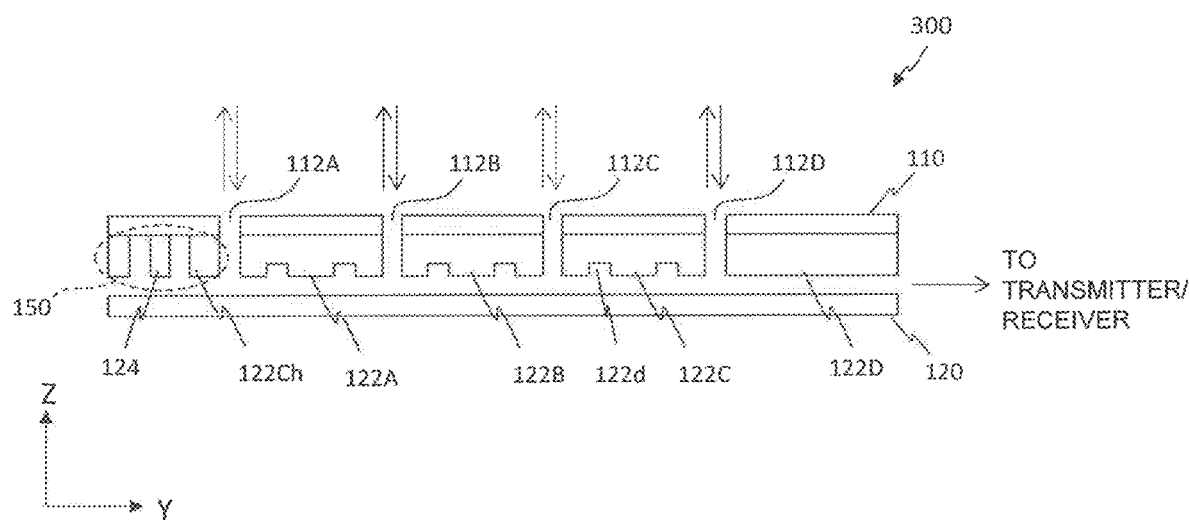
FIG. 15C is a diagram schematically showing a cross-sectional structure of the antenna device 300 as taken on a cross section which passes through the centers of a plurality of slots 112 and is parallel to the YZ plane.

FIG. 15A is a plan view schematically showing a partial construction of a slot antenna device 300 (which may hereinafter be simply referred to as the "antenna device 300") according to a first example embodiment of the present disclosure. FIG. 15B is a perspective view showing more specifically the structure of a first conductive member 110, and a waveguide member 122 thereon, of the antenna device 300. In FIG. 15B, a plurality of conductive rods 124 are shown with thin-colored lines except for a few. FIG. 15C is a diagram schematically showing a cross-sectional structure of the antenna device 300 as taken on a cross section which passes through the centers of a plurality of slots 112 and is parallel to the YZ plane.

The antenna device 300 of the present example embodiment has a slot antenna array structure whose radiating elements are a plurality of slots 112. The first conductive member 110 has the plurality of slots 112. The plurality of slots 112 are arrayed along the Y direction, in which the waveguide member 122 extends. The plurality of slots 112 include four slots 112A, 112B, 112C and 112D.

The waveguide member 122 is split into a plurality of portions ("ridges") at the positions of the plurality of slots 112. The waveguide member 122 in the present example embodiment includes five ridges 122Ch, 122A, 122B, 122C and 122D that are on a straight line. As viewed from a direction perpendicular to the waveguide face of the waveguide member 122, each slot 112 is located between ends of two adjacent ones of the plurality of ridges. Specifically, the slot 112A is located between the ridge 122Ch and the ridge 122A. The slot 112B is located between the ridge 122A and the ridge 122B. The slot 112C is located between the ridge 122B and the ridge 122C. The slot 112D is located between the ridge 122C and the ridge 122D.

In the following description, without distinction, the slots 112A, 112B, 112C and 112D may collectively be represented as "slots 112". Similarly, without distinction, the ridges 122Ch, 122A, 122B, 122C and 122D may collectively be represented as "ridges 122". The same is true of any other constituent element.

Adjacent to the endmost slot 112A among the plurality of slots 112, a choke structure 150 is provided. The choke structure 150 may be composed of, for example: an additional transmission line having a length of approximately λo/8; and a row of plural grooves of having a depth of approximately λo/4, or a row of plural conductive rods 124 having a height of approximately λo/4, that are disposed at an end of the additional transmission line. In the present example embodiment, the choke structure 150 includes the ridge 122Ch and one or more conductive rods 124 that are closely located to the ridge 122Ch along the Y direction. In this case, the additional transmission line corresponds to the waveguide extending between the ridge 122Ch and the third conductive surface 120a. In the following description, the ridge which is included in the choke structure 150 will be referred to as a "choke ridge".

The choke structure 150 confers a phase difference of about 180° (π) between an incident wave and a reflected wave, thereby restraining electromagnetic waves from leaking at the end of the waveguide member 122. Rather than on the first conductive member 110, such a choke structure 150 may be provided on the second conductive member 120.

Conventionally it has been believed that the length of the additional transmission line of a choke structure should be $\lambda r/4$. Herein, $\lambda r$ is the wavelength of a signal wave on the transmission line. However, the inventors have found that, even when the length of the additional transmission line of the choke structure is shorter than $\lambda r/4$, leakage of electromagnetic waves can still be suppressed, and an actually better functionality than in the case of $\lambda r/4$ may be obtained. In actuality, the length of the additional transmission line is preferably $\lambda o/4$ or less, i.e., shorter than $\lambda r/4$. In the present example embodiment, the length of the additional transmission line, i.e., the length of the choke ridge 122Ch along the Y direction, is set to be equal to or greater than $\lambda o/16$ and less than $\lambda o/4$, for example.

The conductive rods 124 included in the choke structure 150 may have a different shape from that of the conductive rods 124 which are included in the artificial magnetic conductor extending on both sides of the waveguide member 122. The choke ridge 122Ch may have the same shape as the conductive rod 124.

In the present example embodiment, the artificial magnetic conductor extending on both sides of the waveguide member 122 includes a row of conductive rods 124 that lie adjacent to the waveguide member 122 in the +X direction and a row of conductive rods 124 that lie adjacent to the waveguide member 122 in the −X direction. In each such row of conductive rods 124, the plurality of conductive rods 124 are arranged along the Y direction. The artificial magnetic conductor on one side of the waveguide member 122 may include two or more rows of conductive rods 124. As will be described later, in the present disclosure, even a single row of conductive rods 124 is to be regarded as an artificial magnetic conductor.

The waveguide member 122 has a plurality of dents 122d on the waveguide face. Each of the three ridges 122A, 122B and 122C has two dents 122d, which are respectively located between the central portion of the ridge on the waveguide face and the opposite ends. The dents 122d appropriately adjust the relative phase differences among signal waves at the positions of the slots 112, whereby desired radiation characteristics or reception characteristics are realized.

As shown in FIG. 15C, the waveguide extending between the waveguide member 122 and the second conductive member 120 is connected to a transmitter or a receiver, either directly or via another waveguide. The other waveguide may include another ridge waveguide not shown, hollow waveguide, or microstrip line, for example. The transmitter or receiver may be provided in a different layer from the layer in which the waveguide shown in FIG. 15C is formed. In that case, a waveguide that connects between such layers is to be employed.

The transmitter is a device or circuit which feeds power to the waveguide in the antenna device 300 and causes a signal wave to be radiated from each slot 112. The receiver is a device or circuit which receives a signal wave that has impinged on each slot 112 of the antenna device 300 and propagated through the waveguide. Each of the transmitter and the receiver may be implemented as a millimeter wave integrated circuit, for example. The antenna device 300 may be connected to a device that functions both as a transmitter and as a receiver.

During transmission, a signal wave which is supplied from the transmitter propagates through the waveguide extending between the waveguide member 122 and the second conductive member 120 and excites the plurality of slots 112. As a result, signal waves are radiated. Conversely, during reception, signal waves impinging on the plurality of slots 112 propagate through the waveguide extending between the waveguide member 122 and the second conductive member 120 and arrive at the receiver. As a result, signal waves are received.

The intervals between the plurality of slots 112 is set to be approximately equal to the wavelength of a signal wave propagating in the waveguide, for example. In that case, signal waves with an equal phase are radiated from the respective slots 112. For other purposes, e.g., reducing side lobes, etc., the intervals between slots 112 may be different from the wavelength of a signal wave in the waveguide.

Figure 15D:
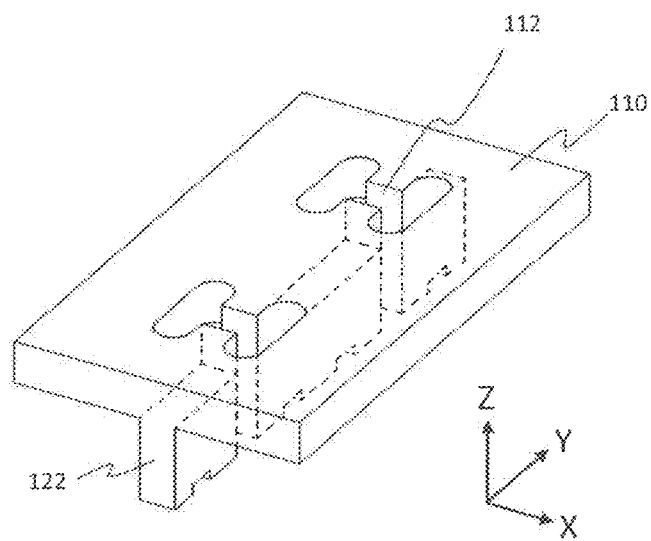
FIG. 15D is a perspective view showing two adjacent radiating elements among the plurality of radiating elements in Example Embodiment 1 according to the present disclosure.

FIG. 15D is a perspective view showing two adjacent radiating elements among the plurality of radiating elements in the present example embodiment. In FIG. 15D, the plurality of conductive rods 124 and the second conductive member 120 are omitted from illustration.

According to the present example embodiment, a cross section of each slot 112 that is perpendicular to its center axis has an H shape. The center axis of a slot 112 is defined as an axis which passes through the center of the slot 112 and is perpendicular to the apertured plane of the slot 112. An "H shape" is meant to be a shape which, like the alphabetical letter "H", includes two vertical portions that are substantially parallel to each other and a lateral portion that connects between the central portions of the two vertical portions. Using an H-shaped slot 112 allows the width along a direction perpendicular to the E plane to be reduced as compared to the shape of the slot 112 shown in FIG. 7A. Note that the E plane is a plane that contains electric field vectors to be created in the central portion of a slot 112. In the examples of FIG. 7A and FIG. 15A, the E plane is parallel to the YZ plane.

With the above construction, a slot antenna device for transmission purposes or for reception purposes is realized whose radiating elements are the plurality of slots 112. Since a WRG structure is utilized as in Comparative Example, a low-loss antenna can be realized even in the high-frequency regions, as compared to an antenna utilizing microstrip lines. Furthermore, according to the present example embodiment, the plurality of dents 122d in the waveguide face of the waveguide member 122 appropriately adjust the excitation state of each slot.

Example Embodiment 2

Next, a second example embodiment of the present disclosure will be described.

Figure 16A:
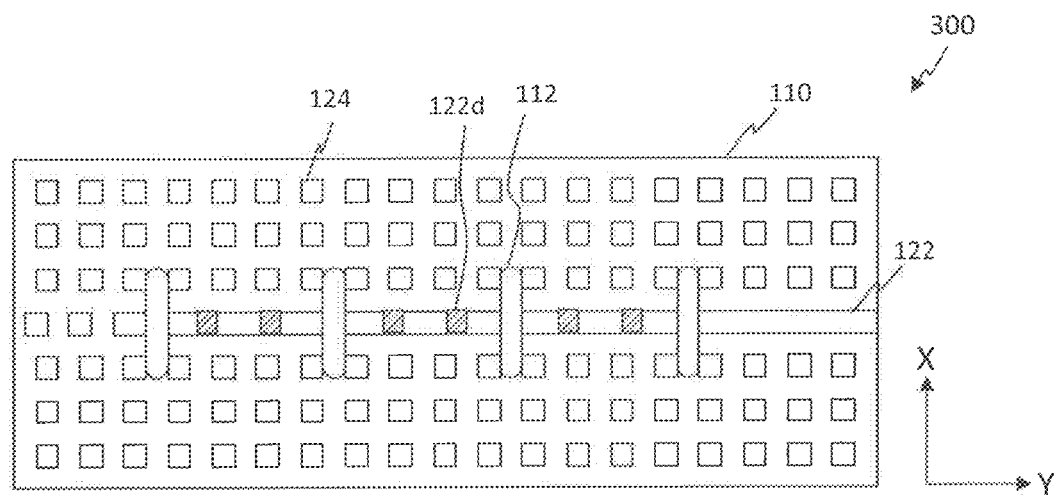
FIG. 16A is a plan view showing a partial construction of an antenna device 300 according to Example Embodiment 2 according to the present disclosure.

FIG. 16A is a plan view showing a partial construction of a slot antenna device 300 according to the present example embodiment. A difference between the present example embodiment and Example Embodiment 1 is that the shape of the opening of each slot 112 is an I shape. An "I shape" is meant to be a shape which, like the alphabetical letter "I", extends in the manner of a straight line. Otherwise, the present example embodiment is similar to Example Embodiment 1.

Figure 16B:
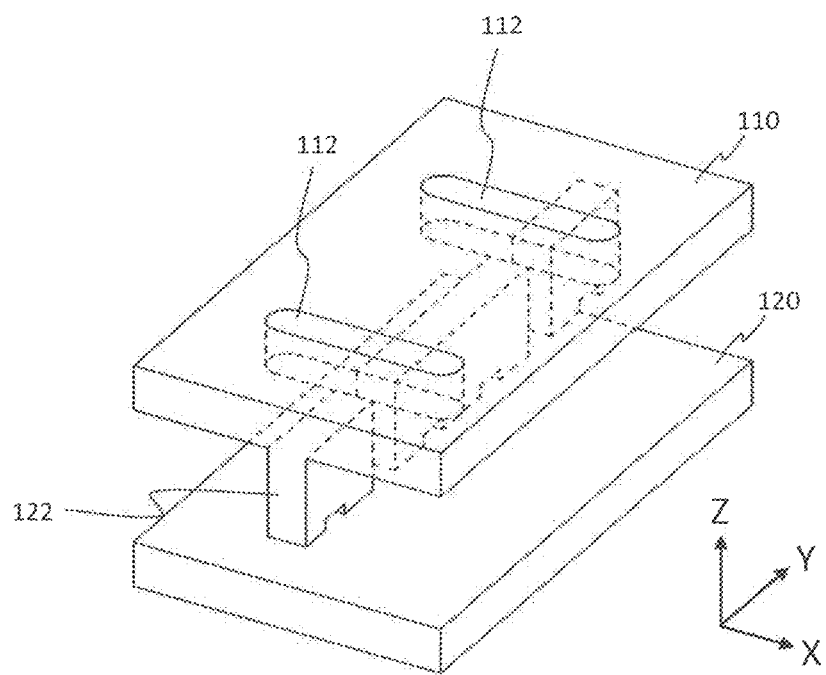
FIG. 16B is a perspective view showing two radiating elements among four radiating elements according to an example embodiment of the present disclosure.

FIG. 16B is a perspective view showing two radiating elements among four radiating elements. In FIG. 16B, the plurality of conductive rods 124 are omitted from illustration. Even when I-shaped slots 112 are used as radiating elements, an efficient slot antenna can be realized, similarly to Example Embodiment 1.

The first conductive surface 110b of the first conductive member 110 may have a shape that defines at least one horn which communicates with at least one slot 112. By providing such a horn(s), the degree of impedance matching is increased, whereby signal wave reflection can be suppressed.

Figure 17:
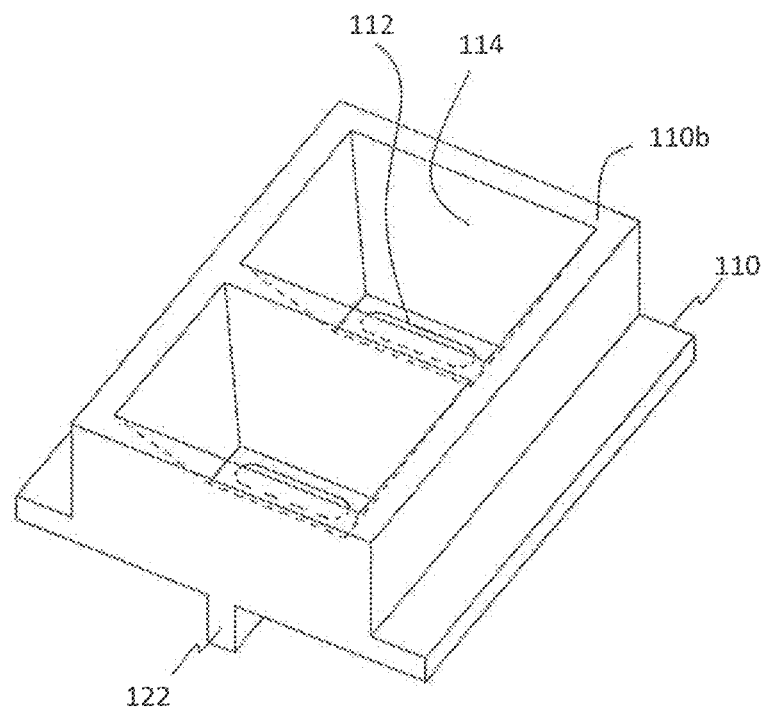
FIG. 17 a perspective view showing two radiating elements according to a variant of Example Embodiment 2.

FIG. 17 is a perspective view showing two radiating elements according to a variant of Example Embodiment 2. In FIG. 17, the plurality of conductive rods 124 and the second conductive member 120 are omitted from illustration. In this variant, the first conductive surface 110b of the first conductive member 110 on the front side has a shape that defines a plurality of horns 114 respectively communicating with the plurality of slots 112. In this example, the plurality of slots 112 are open to the external space respectively through the plurality of horns 114. By providing such horns 114, the characteristic impedance within each slot can be brought gradually closer to the characteristic impedance in free space, whereby an improved radiation efficiency can be obtained.

Figure 18A:
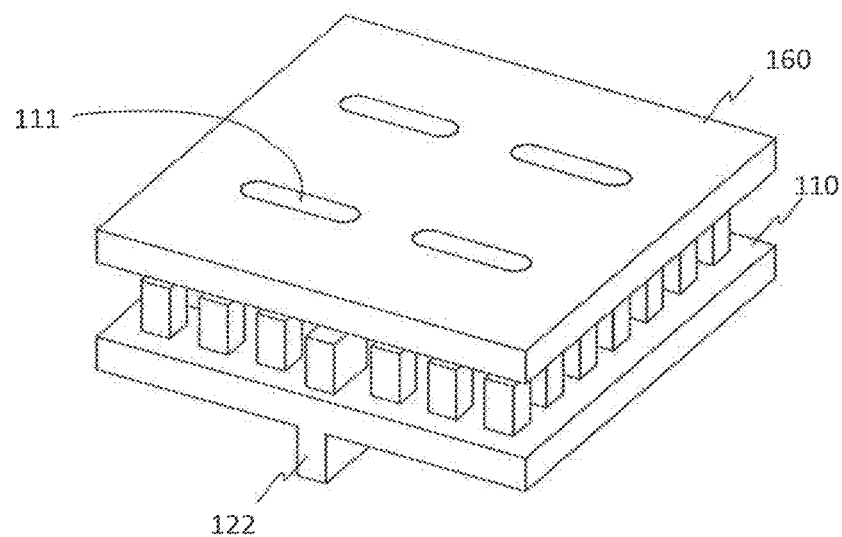
FIG. 18A is a perspective view showing a radiating element according to another variant of Example Embodiment 2.
Figure 18B:
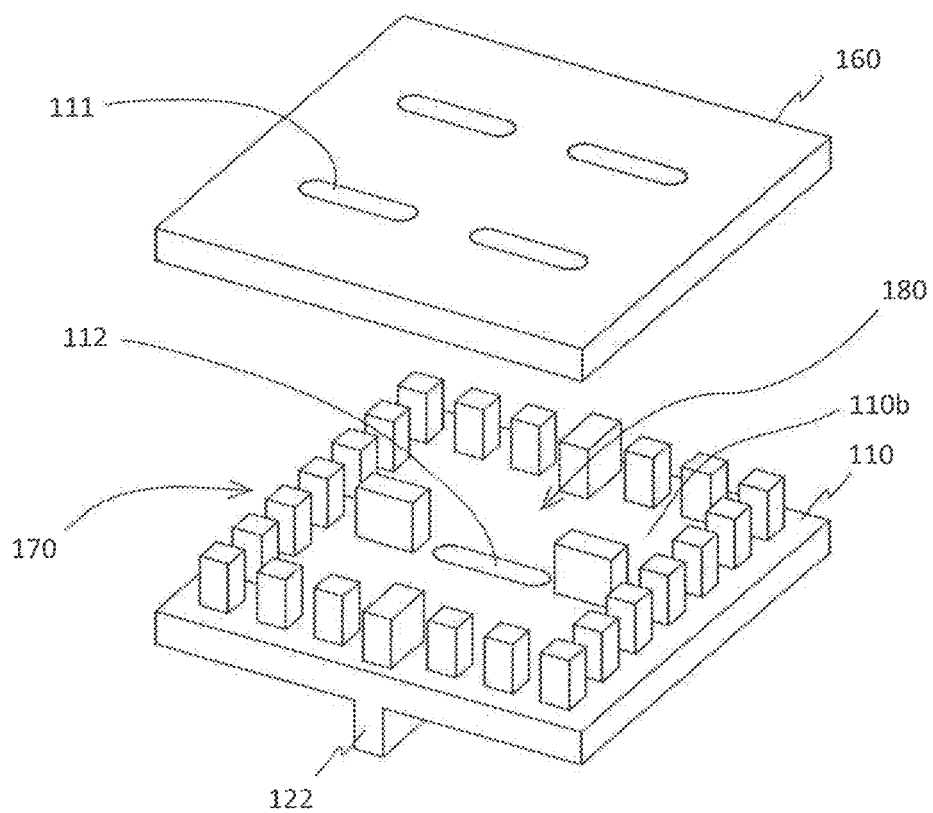
FIG. 18B is a perspective view showing the interior of a radiating element according to another variant of Example Embodiment 2.

FIG. 18A is a perspective view showing one radiating element according to another variant of Example Embodiment 2. The slot antenna device of this example further includes another conductive member 160 having a conductive surface that opposes the conductive surface 110b on the front side of the first conductive member 110. The other conductive member 160 has four other slots 111 in this example. FIG. 18B is a diagram showing the radiating element of FIG. 18A, illustrated so that the spacing between the first conductive member 110 and the other conductive member 160 is exaggerated. In FIGS. 18A and 18B, the plurality of conductive rods 124 extending on both sides of the waveguide member 122 and the second conductive member 120 having a conductive surface opposing the waveguide face of the waveguide member 122 are omitted from illustration.

In FIG. 17, the slots 112 are respectively shown to communicate with the horns 114; in the example of FIG. 18A, however, the slot 112 communicates with a cavity 180. The cavity 180 is a flat hollow space that is surrounded by the first conductive surface 110b, a plurality of conductive rods 170 on the front side of the first conductive member 110, and the conductive surface on the rear side of the conductive member 160. In this example, the slot 112 is open to the external space via the cavity 180. In the examples of FIGS. 18A and 18B, a gap exists between the leading ends of the plurality of conductive rods 170 and the conductive surface on the rear side of the other conductive member 160. The roots of the plurality of conductive rods 170 connect to the first conductive surface 110b of the first conductive member 110. A construction may be adopted in which the plurality of conductive rods 170 are connected to the other conductive member 160. In that case, however, it is ensured that a gap exists between the leading ends of the plurality of conductive rods 170 and the first conductive surface 110b.

The other conductive member 160 has four other slots 111, such that all slots 111 communicate with the cavity 180. A signal wave which is radiated from the slot 112 into the cavity 180 is radiated toward the front side of the other conductive member 160 via the four other slots 111. Note that a structure may be adopted in which horns are disposed on the front side of the other conductive member 160, the other slots 111 opening at the bottoms of the horns. In this case, a signal wave which is radiated from the slot 112 is radiated via the cavity 180, the other slots 111, and the horns.

Figure 19:
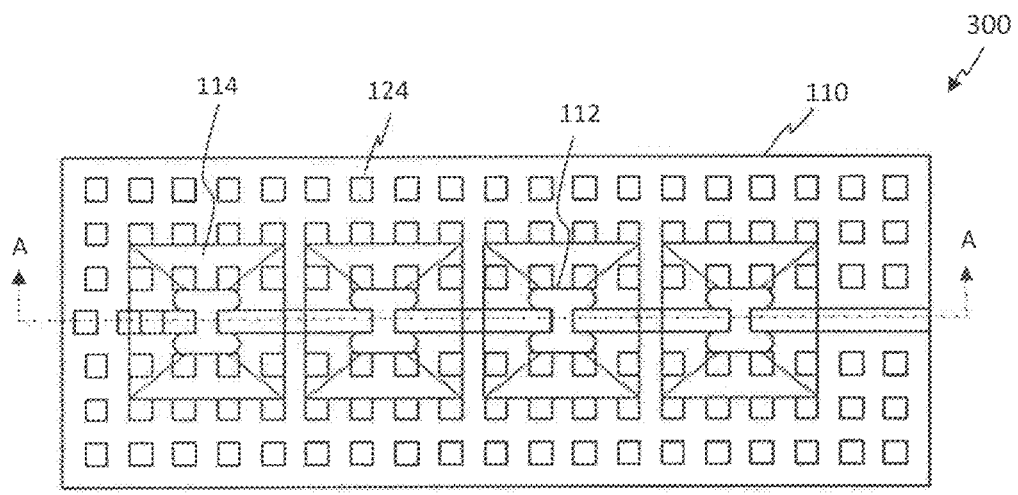
FIG. 19 is a diagram showing a first conductive member 110 of a slot antenna device 300 according to an example embodiment of the present disclosure in which a plurality of horns 114 are provided respectively around a plurality of H-shaped slots 112, as viewed from the rear side.
Figure 20:
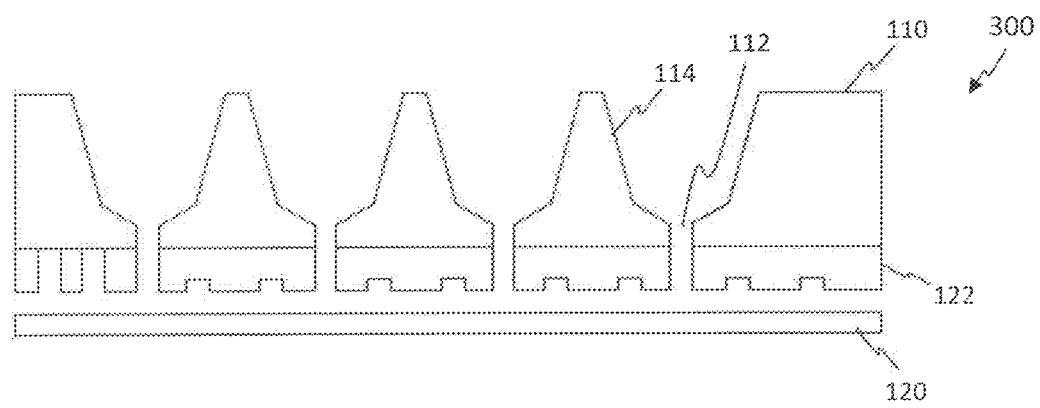
FIG. 20 is a cross-sectional view taken along line B-B in FIG. 19.

Horns as shown in FIG. 17 may be provided for the slot antenna device 300 having H-shaped slots 112 of Example Embodiment 1. For example, a construction as shown in FIGS. 19 and 20 may be adopted. FIG. 19 is a diagram showing a first conductive member 110 of a slot antenna device 300 in which a plurality of horns 114 are provided respectively around a plurality of H-shaped slots 112, as viewed from the rear side. In FIG. 19, the horns 114 that actually are at the back of the plane of the figure are also illustrated in order to facilitate understanding of their relative positioning. FIG. 20 is a cross-sectional view taken along line A-A in FIG. 19. In this example, too, providing the horns 114 allows to suppress reflection when passing through the slots 112.

Example Embodiment 3

Next, a third example embodiment of the present disclosure will be described. An antenna device 300 according to the present example embodiment includes at least three stacked conductive members. The transmitter or receiver is disposed in a layer that is located more toward the rear side than is the second conductive member 120.

Figure 21A:
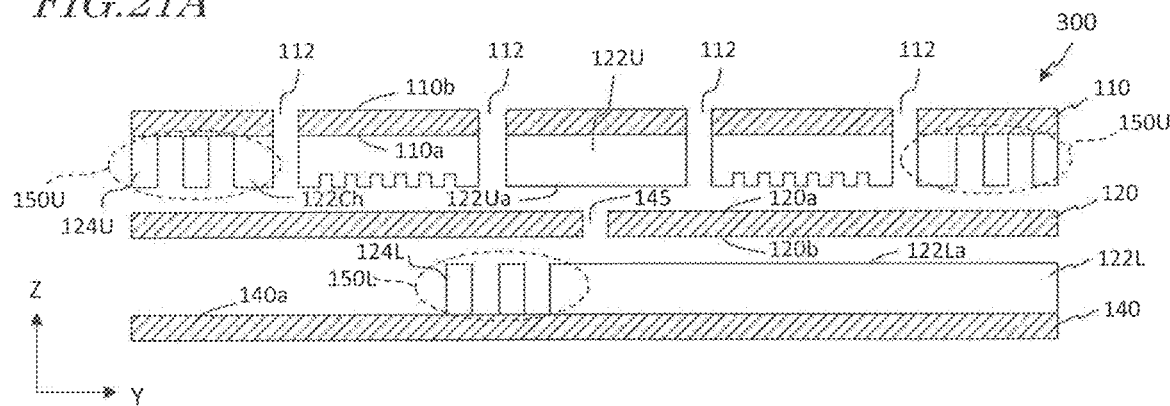
FIG. 21A is a cross-sectional view schematically showing the construction of an antenna device 300 according to Example Embodiment 3.

FIG. 21A is a cross-sectional view schematically showing the construction of the antenna device 300 of the present example embodiment. In addition to a first conductive member 110 and a second conductive member 120, the antenna device 300 includes a third conductive member 140. Furthermore, in addition to a first waveguide member 122U that is connected to the first conductive member 110, the antenna device 300 includes a second waveguide member 122L. The second waveguide member 122L is disposed between the second conductive member 120 and the third conductive member 140.

The first conductive member 110 is basically similar in structure to the first conductive member 110 in Example Embodiment or Example Embodiment 2. However, in the present example embodiment, two choke structures 150U are provided close to both ends of the waveguide member 122U. The choke structures 150U restrain signal waves that are supplied in branches from the central portion of the row of four slots 112 from propagating beyond the two slots 112 at opposite ends.

The first waveguide member 122U has a plurality of dents that are periodically arranged on the waveguide face 122La along the Y direction. These dents shorten the wavelength within the waveguide, whereby the intervals between the slots 112 can be reduced.

In addition to the third conductive surface 120a on the front side, the second conductive member 120 has a fourth conductive surface 120b on the rear side. The second conductive member 120 has a port 145 (throughhole) which extends from the third conductive surface 120a through to the fourth conductive surface 120b. The port 145 is opposed to the central portion of the waveguide face 122Ua of the waveguide member 122U. In other words, as viewed from a direction perpendicular to the first conductive surface 110b, the port 145 is located in the center of the row of four slots 112.

The third conductive member 140 has a fifth conductive surface 140a on the front side, the fifth conductive surface 140a opposing the fourth conductive surface 120b. On the fifth conductive surface 140a of the third conductive member 140, the ridge-shaped second waveguide member 122L is provided.

The second waveguide member 122L extends in the Y direction, along the fourth conductive surface 120b. The second waveguide member 122L has an electrically-conductive waveguide face 122La opposing the fourth conductive surface 120b. The waveguide face 122La also opposes the port 145. As viewed from a direction perpendicular to the waveguide face 122La, the second waveguide member 122L extends to a position slightly beyond the port 145.

An artificial magnetic conductor not shown extends on both sides of the second waveguide member 122L. The artificial magnetic conductor can be realized by a plurality of conductive rods that are disposed on at least one of the fourth conductive surface 120b and the fifth conductive surface 140a. The fourth conductive surface 120b, the waveguide face 122La, and the artificial magnetic conductor define a second waveguide in a gap extending between the fourth conductive surface 120b and the waveguide face 122La. Via the port 145, the second waveguide is connected to a first waveguide extending between the waveguide face 122Ua of the first waveguide member 122U and the third conductive surface 120a of the second conductive member 120. The second waveguide is connected to a transmitter or receiver, either directly or via another waveguide not shown.

A choke structure 150L is disposed at an end of the second waveguide member 122L. In a view resulting by projecting the opening of the port 145 onto the waveguide face 122La, a portion spanning the range from the edge to one end of the waveguide member 122L will now be referred to as the waveguide member end. The choke structure 150L includes one or more conductive rods 124L that are disposed on the fifth conductive surface 140a, with a gap existing between the waveguide member end and the one end of the waveguide member 122L. The length of the waveguide member end along the Y direction is about the same as the length of the choke ridge 122Ch along the Y direction. With such a choke structure 150L, leakage of a signal wave propagating along the second waveguide member 122L is suppressed.

In the present example embodiment, a signal wave which is supplied from the transmitter during transmission propagates along the waveguide face 122La of the second waveguide member 122L, and passes through the port 145 to branch out in two directions. The signal waves having branched propagate along the waveguide face 122Ua of the first waveguide member 122U, and excite the four slots 112. As viewed from a direction perpendicular to the waveguide face 122Ua, the four slots 112 are in symmetric positions with respect to the port 145. The distances between the centers of these slots 112 are shorter than the wavelength of a signal wave in free space. Therefore, the four slots 112 are excited with an equal phase. With such a construction, too, the plurality of dents arranged on the waveguide face 122Ua provided the effect of shortening the wavelength of a signal wave in the waveguide, whereby the four slots 112 can be excited with an equal phase. Among the four slots 112, the two slots 112 that are adjacent to the port 145 are at equal distances from the port 145, and therefore are excited with an equal phase without having to provide a plurality of dents on the waveguide face 122Ua. For other purposes, e.g., reducing side lobes, etc., the plurality of slots 112 may be excited with different phases.

Next, variants of the present example embodiment will be described.

Figure 21B:
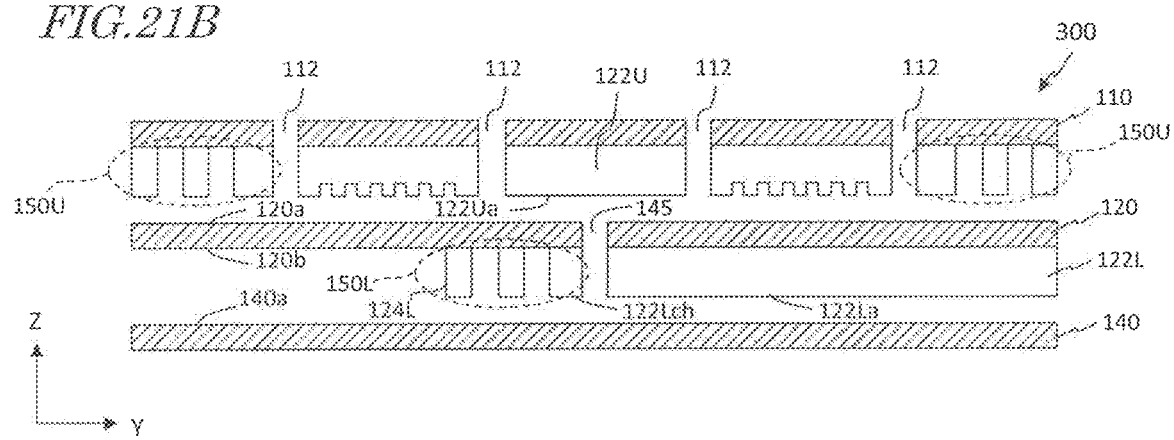
FIG. 21B is a cross-sectional view showing a first variant of Example Embodiment 3 according to the present disclosure.

FIG. 21B is a cross-sectional view showing a first variant of the present example embodiment. In this variant, the second waveguide member 122L and the plurality of conductive rods 124L are disposed on the fourth conductive surface 120b of the second conductive member 120, rather than on the fifth conductive surface 140a of the third conductive member 140. Therefore, the choke structure 150L is also provided on the fourth conductive surface 120b. The waveguide face 122La of the second waveguide member 122L is opposed to the fifth conductive surface 140a.

The second waveguide member 122L extends alongside the fifth conductive surface 140a.

An end face of the second waveguide member 122L is connected to the inner wall surface of the port 145. Although the end face of the second waveguide member 122L and the inner wall surface of the port 145 are not shown to be stepped, they may alternatively be stepped. Similarly to the choke structures 150U on the first conductive member 110, the choke structure 150L includes a choke ridge 122Lch and one or more conductive rods 124L.

In this variant, the fifth conductive surface 140a, the waveguide face 122La, and the artificial magnetic conductor extending on both sides of the waveguide member 122L define a second waveguide in a gap extending between the fifth conductive surface 140a and the waveguide face 122La. Via the port 145, the second waveguide is connected to a first waveguide extending between the waveguide face 122Ua of the waveguide member 122U and the third conductive surface 120a. The second waveguide is connected to a transmitter or receiver, either directly or via another waveguide not shown.

In the examples shown in FIG. 21A and FIG. 21B, the first waveguide members 110 include four slots 112 that are arranged along the Y direction in which the waveguide member 122U extends. Without being limited to four slots 112, there may be five, or even more slots 112. Moreover, the slots 112 do not need to be in symmetric positions with respect to the port 145. For example, three ports may be provided in the +Y direction, and two ports may be provided in the −Y direction, of the port 145.

Figure 21C:
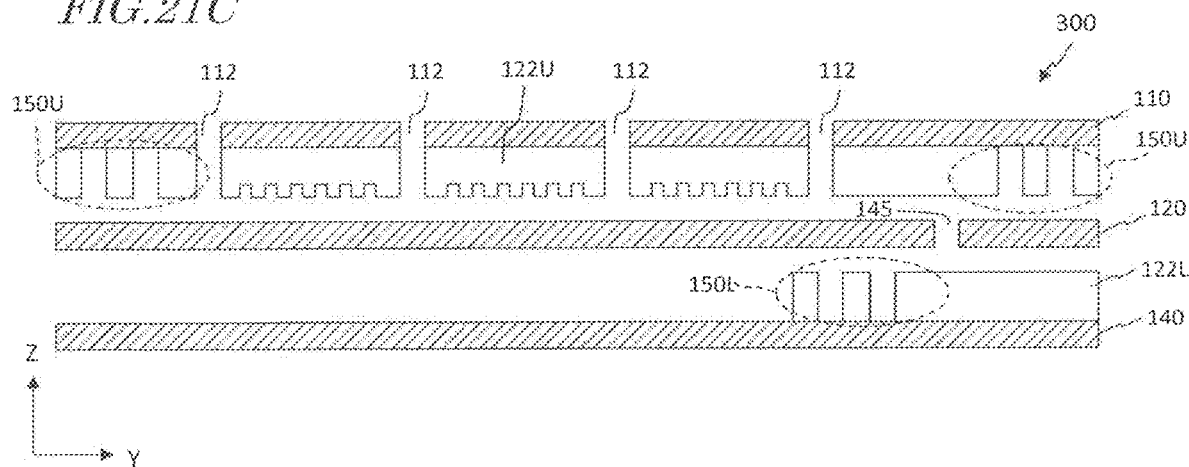
FIG. 21C is a cross-sectional view showing another variant of Example Embodiment 3.

FIG. 21C is a cross-sectional view showing another variant of the present example embodiment. In this example, the port 145 in the second conductive member 120 is located close to one end of the waveguide member 122U. Therefore, a signal wave propagates from one end to the other end of the waveguide member 122U. In this manner, feeding may be performed from an end of the waveguide member 122U. Apart from the example of FIG. 21C, the second waveguide member 122L and the artificial magnetic conductor extending on both sides thereof may be located on the second conductive member 120, in a manner shown in FIG. 21B. Such a construction will also provide similar characteristics.

Although each conductive member includes a single waveguide member in the above example embodiment, it may include a plurality of waveguide members.

In the example embodiments illustrated in FIGS. 21A through 21C, the dents on the waveguide face 122La are shown to be periodically arranged. However, their arrangement does not need to be periodic; and they do not need to be dents, either. Selections may be made from among the dents or bumps shown in FIGS. 9A through 9E, depending on the purpose. The dents or bumps shown in FIG. 12 or FIGS. 13A through 13C may also be selected.

Figure 22:
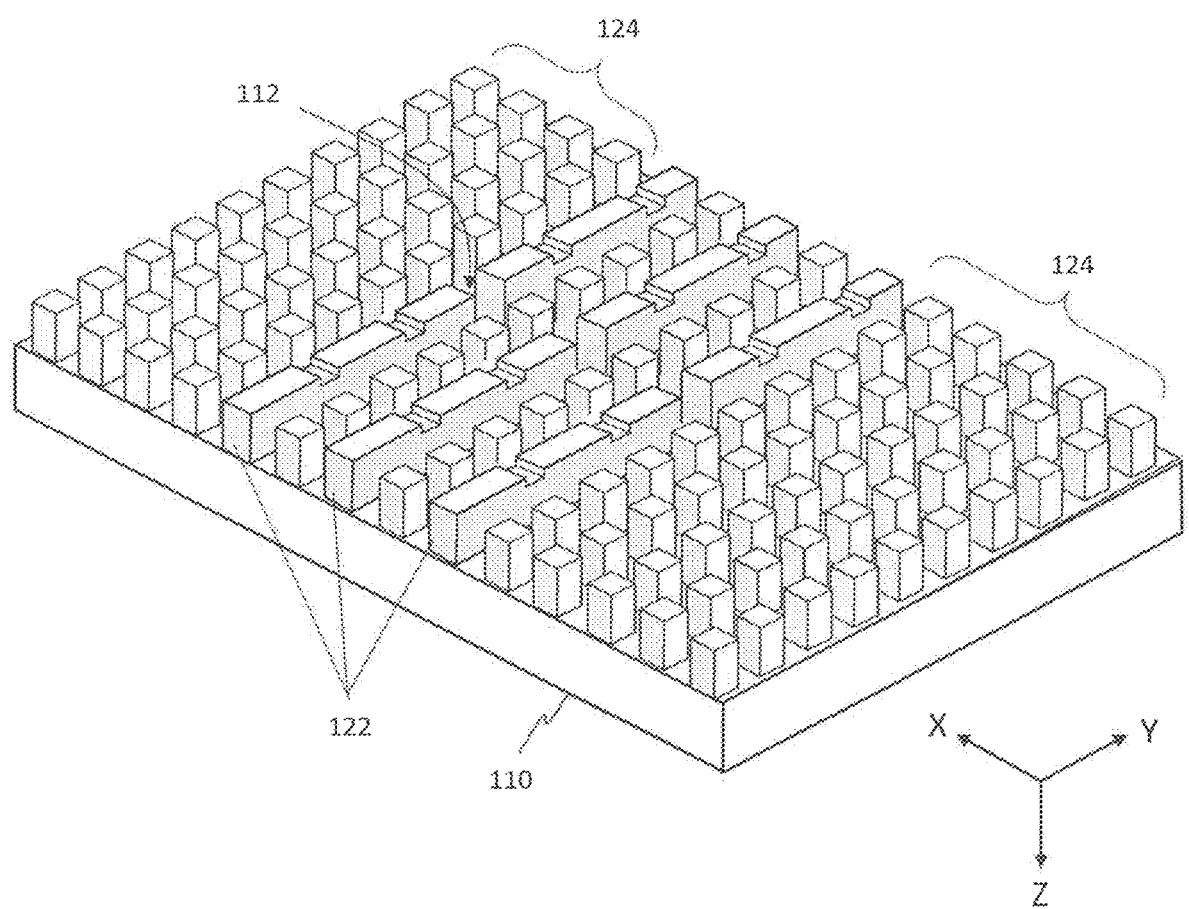
FIG. 22 is a perspective view showing an example antenna device 300 according to an example embodiment of the present disclosure including a plurality of waveguide members 122.

FIG. 22 is a perspective view showing an example antenna device 300 including a plurality of waveguide members 122. The antenna device 300 includes a plurality of ridge-shaped waveguide members 122 on the second conductive surface 110a of the first conductive member 110. The first conductive member 110 has a plurality of slots 112. The plurality of waveguide members 122 each include a plurality of ridges extending along a common path. As viewed from a direction perpendicular to the waveguide faces of the plurality of waveguide members 122, each of the plurality of slots 112 is located between two adjacent ones of the plurality of ridges. Although FIG. 22 illustrates an example where the slots 112 are in a one-dimensional array, they may constitute a two-dimensional array. To the plurality of slots 112, an identical signal wave that has branched out in a feeding path not shown may be supplied, or different signal waves may be supplied.

In Example embodiments 1 to 3, a plurality of dents 122d are made in the waveguide face 122a of the waveguide member 122. Instead of such dents 122d, narrow portions which are smaller in width than in any adjacent site, or bumps or broad portions, may be provided. Such dents or bumps may be provided on the third conductive surface 120a of the second conductive member 120 opposing the waveguide face 122a. By appropriately disposing these additional elements, the phase differences among signal waves at the positions of the slots 112 can be adjusted according to the purpose.

(Other Variants)

Next, with reference to FIG. 23, example cross-sectional shapes of the port 145 or the slots 111, 112 will be described more specifically. In the following description, the port 145 and the slots 111, 112 may be collectively referred to as "throughholes". Any port 145 or slot 111, 112 according to an example embodiment of the present disclosure permits the following modifications.

Figure 23:
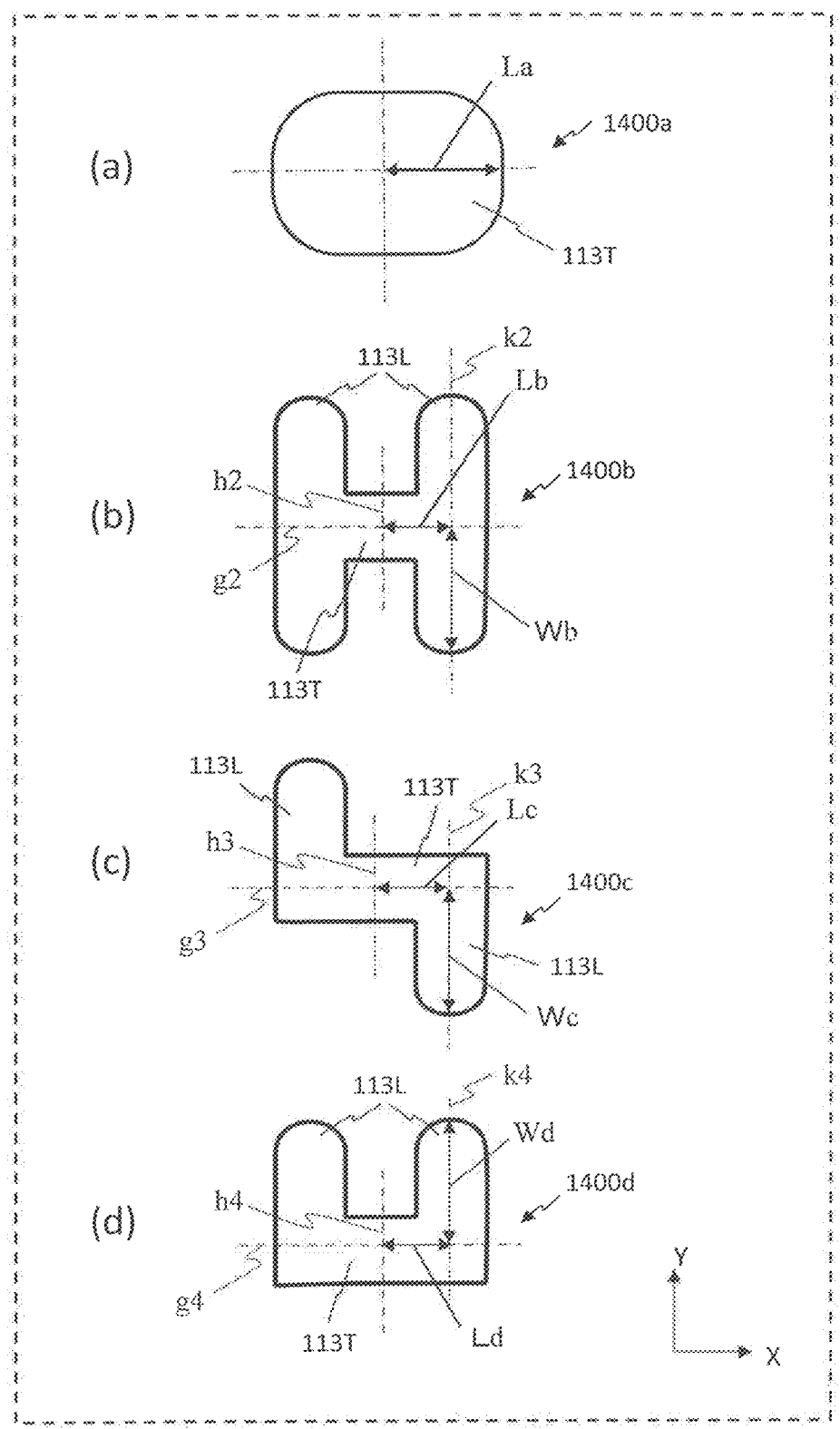
FIG. 23 is a diagram that describes example cross-sectional shapes of a port 145 or slots 111, 112 more specifically.

In FIG. 23, (a) shows an example throughhole 1400a having the shape of an ellipse. The semimajor axis La of the throughhole 1400a, indicated by arrowheads in the figure, is chosen so that higher-order resonance will not occur and that the impedance will not be too small. More specifically, La may be set so that $\lambda o/4 < La < \lambda o/2$, where $\lambda o$ is a wavelength in free space corresponding to the center frequency in the operating frequency band.

In FIG. 23, (b) shows an example throughhole 1400b having an H shape which includes a pair of vertical portions 113L and a lateral portion 113T interconnecting the pair of vertical portions 113L. The lateral portion 113T is substantially perpendicular to the pair of vertical portions 113L, and connects between substantial central portions of the pair of vertical portions 113L. The shape and size of such an H-shaped throughhole 1400b are also to be determined so that higher-order resonance will not occur and that the impedance will not be too small. The distance between a point of intersection between the center line g2 of the lateral portion 113T and the center line h2 of the entire H shape perpendicular to the lateral portion 113T and a point of intersection between the center line g2 and the center line k2 of a vertical portion 113L is denoted as Lb. The distance between a point of intersection between the center line g2 and the center line k2 and the end of the vertical portion 113L is denoted as Wb. The sum of Lb and Wb is chosen so as to satisfy $\lambda o/4 < Lb+Wb < \lambda o/2$. Choosing the distance Wb to be relatively long allows the distance Lb to be relatively short. As a result, the width of the H shape along the X direction can be e.g. less than $\lambda o/2$, whereby the interval between the lateral portions 113T along the length direction can be made short.

In FIG. 23, (c) shows an example throughhole 1400c which includes a lateral portion 113T and a pair of vertical portions 113L extending from both ends of the lateral portion 113T. The directions in which the pair of vertical portions 113L extend from the lateral portion 113T are substantially perpendicular to the lateral portion 113T, and are opposite to each other. The distance between a point of intersection between the center line g3 of the lateral portion 113T and the center line h3 of the overall shape which is perpendicular to the lateral portion 113T and a point of intersection between the center line g3 and the center line k3 of a vertical portion 113L is denoted as Lc. The distance between a point of intersection between the center line g3 and the center line k3 and the end of the vertical portion 113L is denoted as Wc. The sum of Lc and Wc is chosen so as to satisfy $\lambda o/4 < Lc+Wc < \lambda o/2$. Choosing the distance Wc to be relatively long allows the distance Lc to be relatively short. As a result, the width along the X direction of the overall shape in (c) of FIG. 23 can be e.g. less than $\lambda o/2$, whereby the interval between the lateral portions 113T along the length direction can be made short.

In FIG. 23, (d) shows an example throughhole 1400d which includes a lateral portion 113T and a pair of vertical portions 113L extending from both ends of the lateral portion 113T in an identical direction which is perpendicular to the lateral portion 113T. Such a shape may be referred to as a "U shape" in the present specification. Note that the shape shown in (d) of FIG. 23 may be regarded as an upper half shape of an H shape. The distance between a point of intersection between the center line g4 of the lateral portion 113T and the center line h4 of the overall U shape which is perpendicular to the lateral portion 113T and a point of intersection between the center line g4 and the center line k4 of a vertical portion 113L is denoted as Ld. The distance between a point of intersection between the center line g4 and the center line k4 and the end of the vertical portion 113L is denoted as Wd. The sum of Ld and Wd is chosen so as to satisfy $\lambda o/4 < Ld+Wd < \lambda o/2$. Choosing the distance Wd to be relatively long allows the distance Ld to be relatively short. As a result, the width along the X direction of the U shape can be e.g. less than $\lambda o/2$, whereby the interval between the lateral portions 113T along the length direction can be made short.

Next, variants of waveguide structures including the waveguide member 122, the conductive members 110 and 120, and the conductive rods 124 will be described. The following variants are applicable to the WRG structure in any place in each example embodiment described above.

Figure 24A:
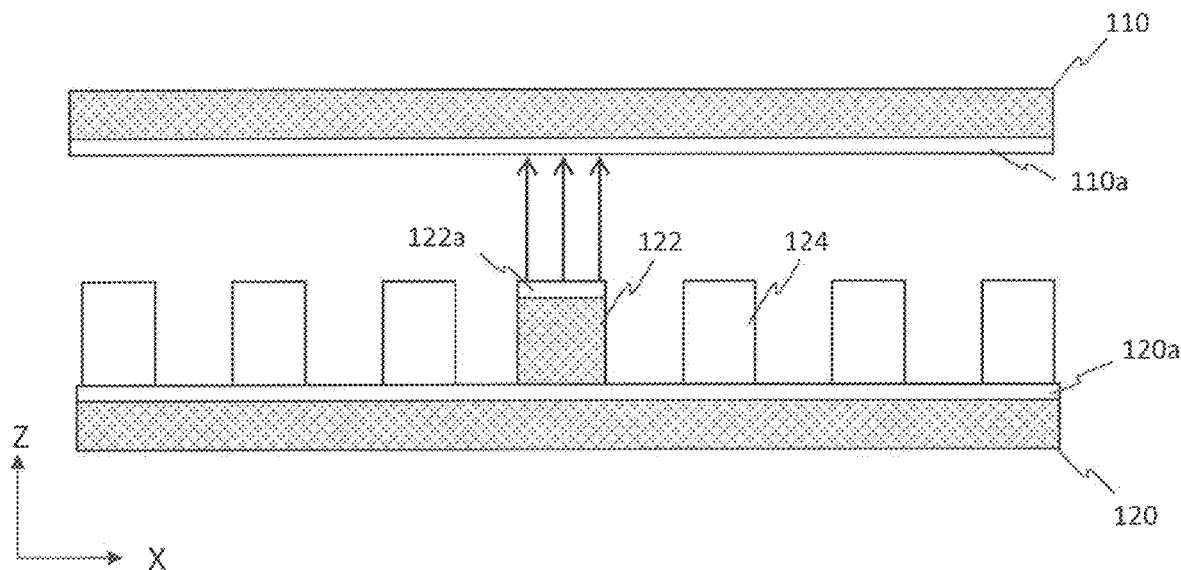
FIG. 24A is a cross-sectional view showing an example structure according to a preferred embodiment of the present disclosure in which only a waveguide face 122a, defining an upper face of the waveguide member 122, is electrically conductive, while any portion of the waveguide member 122 other than the waveguide face 122a is not electrically conductive.

FIG. 24A is a cross-sectional view showing an example structure in which only the waveguide face 122a, defining an upper face of the waveguide member 122, is electrically conductive, while any portion of the waveguide member 122 other than the waveguide face 122a is not electrically conductive. Both of the conductive member 110 and the conductive member 120 alike are only electrically conductive at their surface that has the waveguide member 122 provided thereon (i.e., the conductive surface 110a, 120a), while not being electrically conductive in any other portions. Thus, each of the waveguide member 122, the conductive member 110, and the conductive member 120 does not need to be electrically conductive.

Figure 24B:
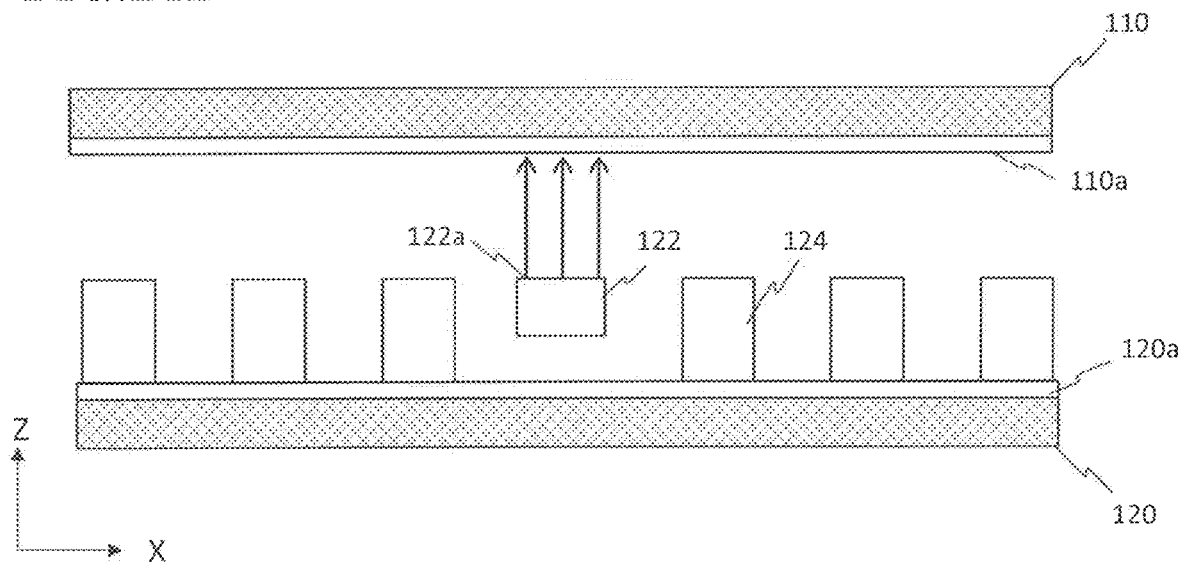
FIG. 24B is a diagram showing a variant in which the waveguide member 122 is not formed on the conductive member 120.

FIG. 24B is a diagram showing a variant in which the waveguide member 122 is not formed on the conductive member 120. In this example, the waveguide member 122 is fixed to a supporting member (e.g., the inner wall of the housing) that supports the conductive member 110 and the conductive member. A gap exists between the waveguide member 122 and the conductive member 120. Thus, the waveguide member 122 does not need to be connected to the conductive member 120.

Figure 24C:
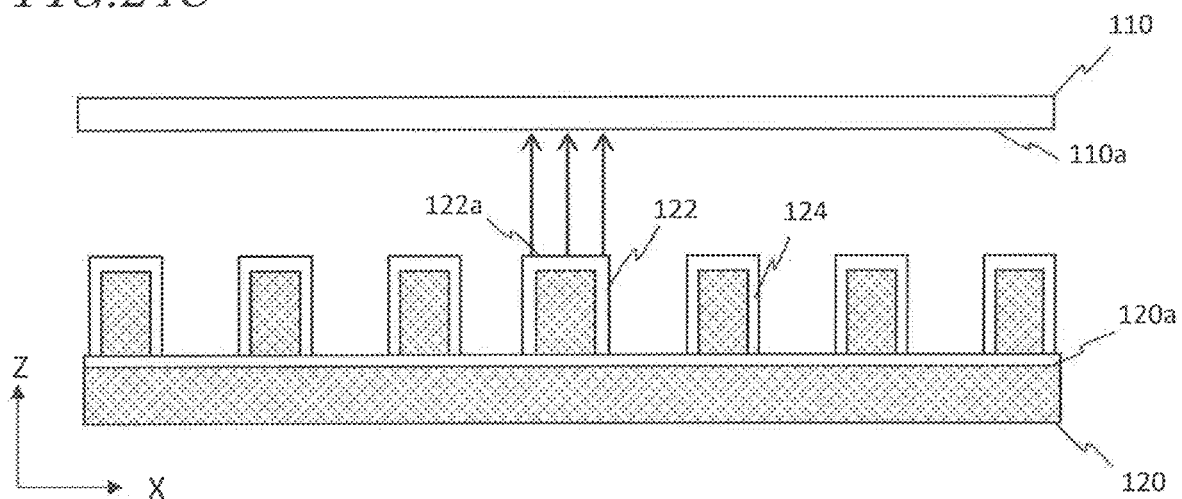
FIG. 24C is a diagram showing an example structure according to the present disclosure where the conductive member 120, the waveguide member 122, and each of the plurality of conductive rods 124 are composed of a dielectric surface that is coated with an electrically conductive material such as a metal.

FIG. 24C is a diagram showing an example structure where the conductive member 120, the waveguide member 122, and each of the plurality of conductive rods 124 are composed of a dielectric surface that is coated with an electrically conductive material such as a metal. The conductive member 120, the waveguide member 122, and the plurality of conductive rods 124 are connected to one another via the electrical conductor. On the other hand, the conductive member 110 is made of an electrically conductive material such as a metal.

Figure 24D:
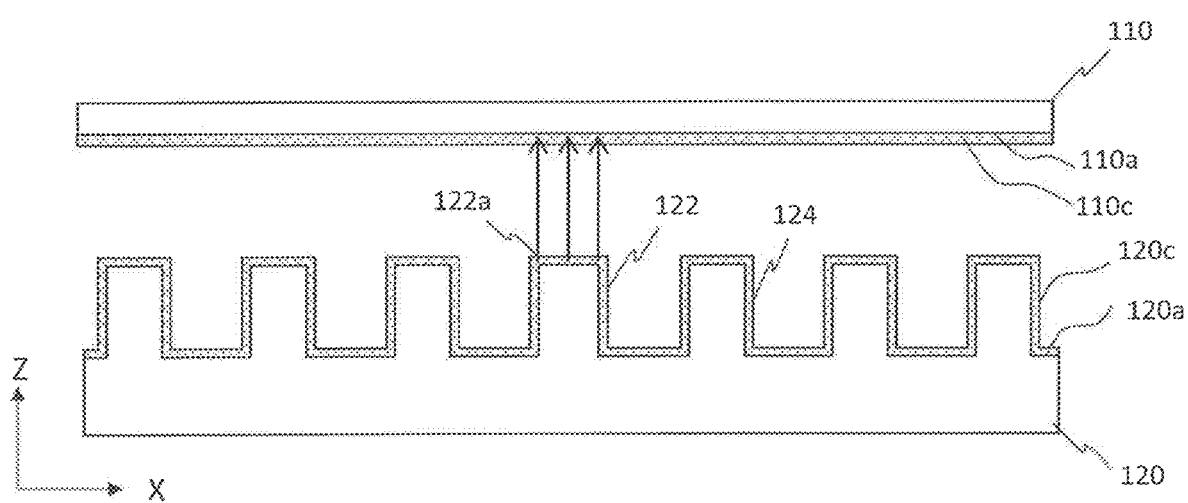
FIG. 24D is a diagram showing an example structure according to the present disclosure in which dielectric layers 110c and 120c are respectively provided on the outermost surfaces of conductive members 110 and 120, a waveguide member 122, and conductive rods 124.
Figure 24E:
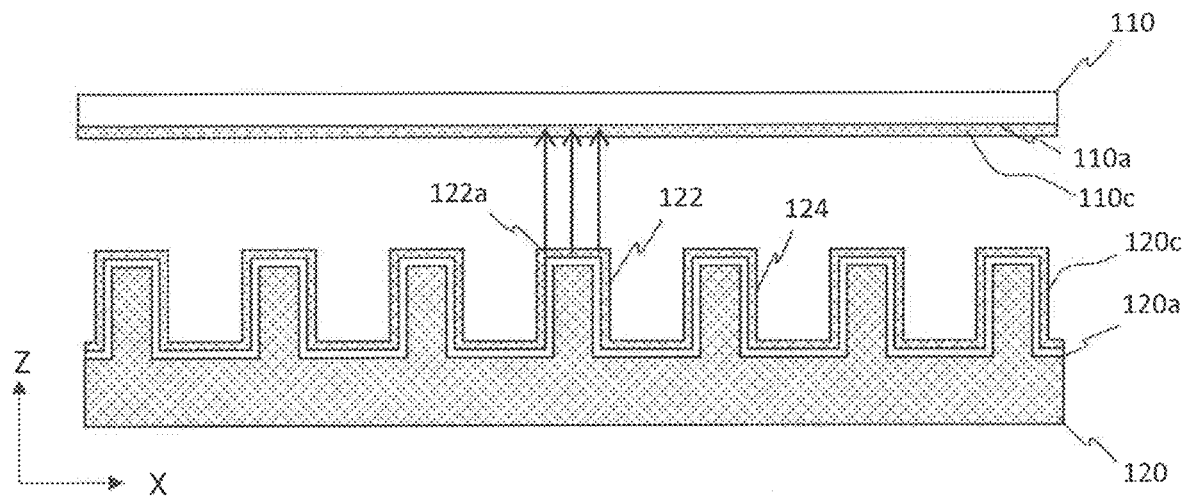
FIG. 24E is a diagram showing another example structure according to the present disclosure in which dielectric layers 110c and 120c are respectively provided on the outermost surfaces of conductive members 110 and 120, a waveguide member 122, and conductive rods 124.

FIG. 24D and FIG. 24E are diagrams each showing an example structure in which dielectric layers 110c and 120c are respectively provided on the outermost surfaces of conductive members 110 and 120, a waveguide member 122, and conductive rods 124. FIG. 24D shows an example structure in which the surface of metal conductive members, which are electrical conductors, are covered with a dielectric layer. FIG. 24E shows an example where the conductive member 120 is structured so that the surface of members which are composed of a dielectric, e.g., resin, is covered with an electrical conductor such as a metal, this metal layer being further coated with a dielectric layer. The dielectric layer that covers the metal surface may be a coating of resin or the like, or an oxide film of passivation coating or the like which is generated as the metal becomes oxidized.

The dielectric layer on the outermost surface will allow losses to be increased in the electromagnetic wave propagating through the WRG waveguide, but is able to protect the conductive surfaces 110a and 120a (which are electrically conductive) from corrosion. It also prevents influences of a DC voltage, or an AC voltage of such a low frequency that it is not capable of propagation on certain WRG waveguides.

Figure 24F:
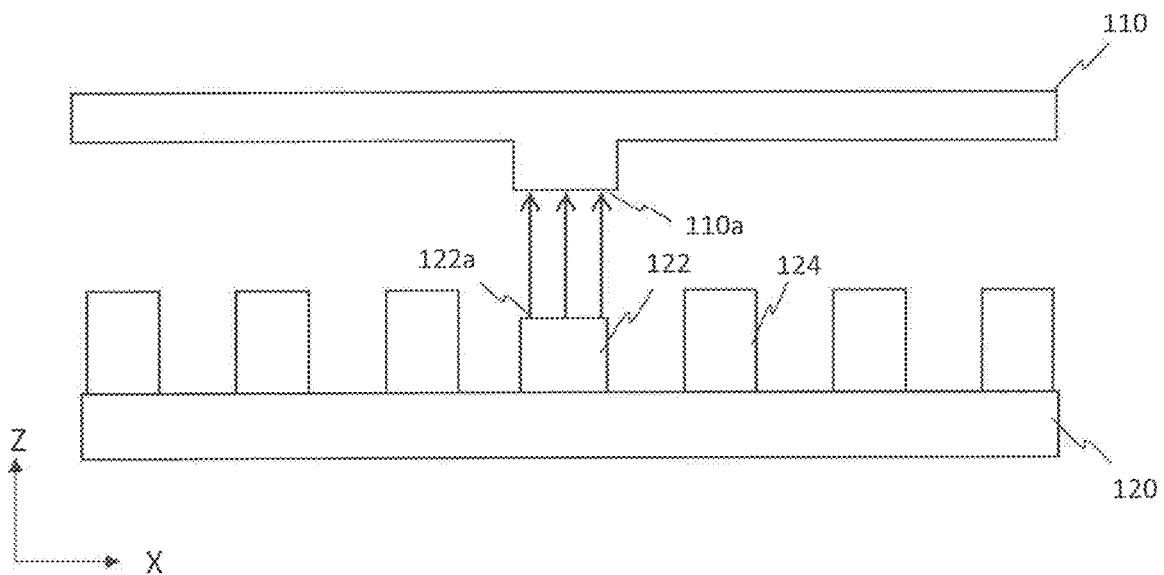
FIG. 24F is a diagram showing an example where the height of the waveguide member 122 is lower than the height of the conductive rods 124, and a portion of a conductive surface 110a of the conductive member 110 that opposes the waveguide face 122a protrudes toward the waveguide member 122.

FIG. 24F is a diagram showing an example where the height of the waveguide member 122 is lower than the height of the conductive rods 124, and the portion of the conductive surface 110a of the conductive member 110 that opposes the waveguide face 122a protrudes toward the waveguide member 122. Even such a structure will operate in a similar manner to the above-described example embodiment, so long as the ranges of dimensions depicted in FIG. 4 are satisfied.

Figure 24G:
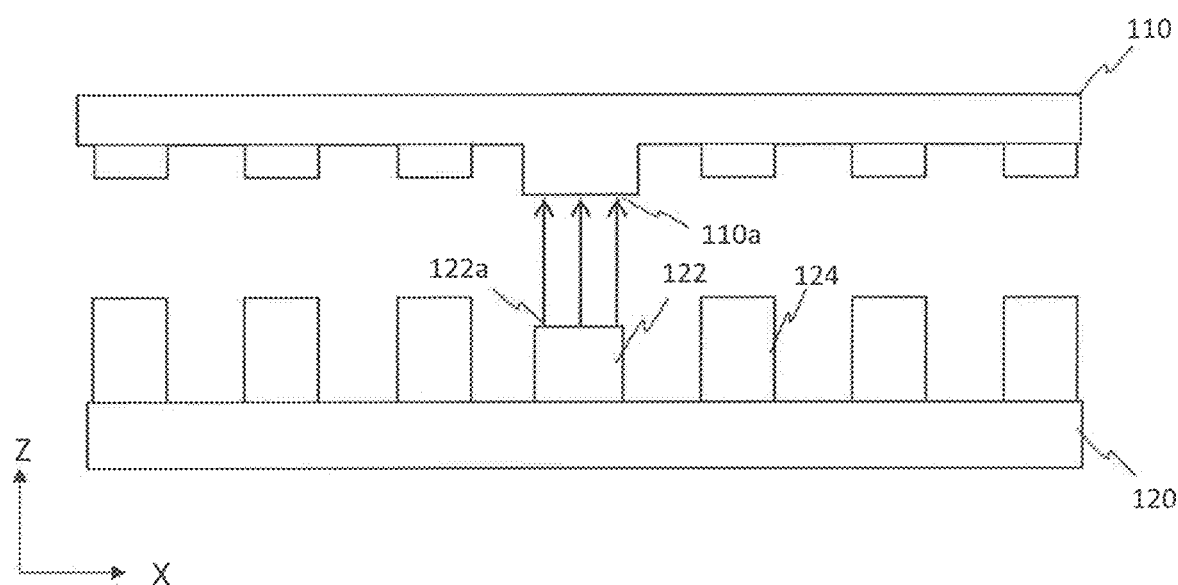
FIG. 24G is a diagram showing an example where, further in the structure of FIG. 24F, portions of the conductive surface 110a that oppose the conductive rods 124 protrude toward the conductive rods 124.

FIG. 24G is a diagram showing an example where, further in the structure of FIG. 24F, portions of the conductive surface 110a that oppose the conductive rods 124 protrude toward the conductive rods 124. Even such a structure will operate in a similar manner to the above-described example embodiment, so long as the ranges of dimensions depicted in FIG. 4 are satisfied. Instead of a structure in which the conductive surface 110a partially protrudes, a structure in which the conductive surface 110a is partially dented may be adopted.

Figure 25A:
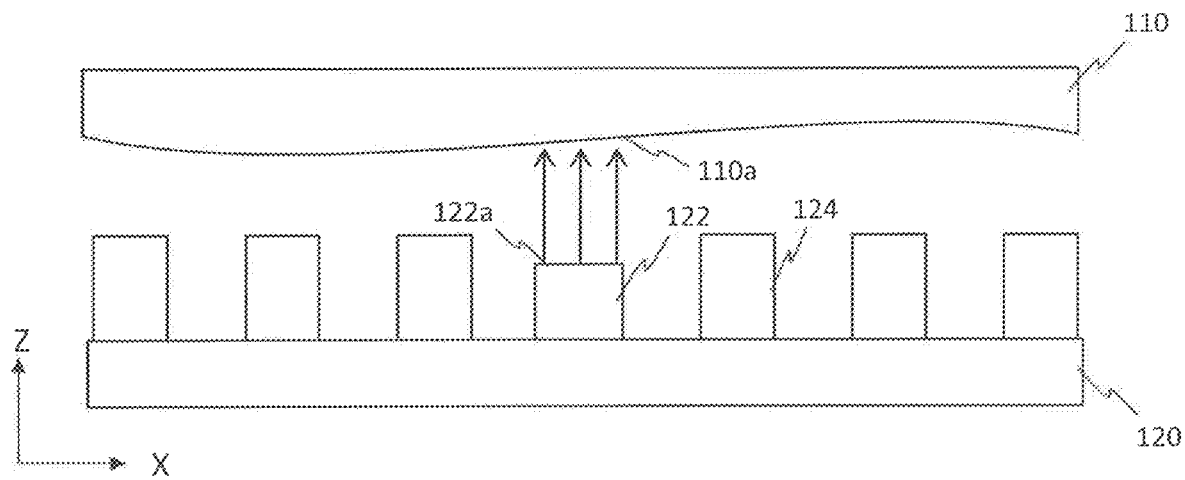
FIG. 25A is a diagram showing an example where a conductive surface 110a of the conductive member 110 is shaped as a curved surface.
Figure 25B:
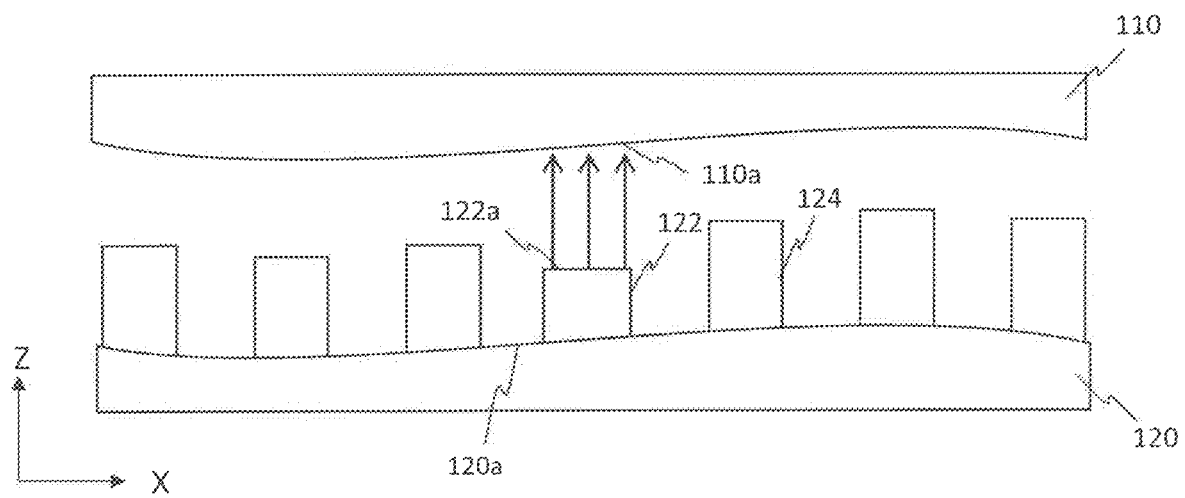
FIG. 25B is a diagram showing an example where also a conductive surface 120a of the conductive member 120 is shaped as a curved surface.

FIG. 25A is a diagram showing an example where a conductive surface 110a of the conductive member 110 is shaped as a curved surface. FIG. 25B is a diagram showing an example where also a conductive surface 120a of the conductive member 120 is shaped as a curved surface. As demonstrated by these examples, the conductive surfaces 110a and 120a may not be shaped as planes, but may be shaped as curved surfaces. A conductive member having a conductive surface which is a curved surface is also qualifies as a conductive member having a "plate shape".

In the waveguide device 100 of the above-described construction, a signal wave of the operating frequency is unable to propagate in the space between the surface 125 of the artificial magnetic conductor and the conductive surface 110a of the conductive member 110, but propagates in the space between the waveguide face 122a of the waveguide member 122 and the conductive surface 110a of the conductive member 110. Unlike in a hollow waveguide, the width of the waveguide member 122 in such a waveguide structure does not need to be equal to or greater than a half of the wavelength of the electromagnetic wave to propagate. Moreover, the conductive member 110 and the conductive member 120 do not need to be electrically interconnected by a metal wall that extends along the thickness direction (i.e., in parallel to the YZ plane).

A slot antenna device or a slot array antenna according to an example embodiment of the present disclosure can be suitably used in a radar device or a radar system to be incorporated in moving entities such as vehicles, marine vessels, aircraft, robots, or the like, for example. A radar device would include a slot array antenna according to an example embodiment of the present disclosure and a microwave integrated circuit that is connected to the slot array antenna. A radar system would include the radar device and a signal processing circuit that is connected to the microwave integrated circuit of the radar device. A slot antenna device according to an example embodiment of the present disclosure includes a multilayered WRG structure which permits downsizing, and thus allows the area of the face on which antenna elements are arrayed to be significantly reduced, as compared to a construction in which a conventional hollow waveguide is used. Therefore, a radar system incorporating the antenna device can be easily mounted in a narrow place such as a face of a rearview mirror in a vehicle that is opposite to its specular surface, or a small-sized moving entity such as a UAV (an Unmanned Aerial Vehicle, a so-called drone). Note that, without being limited to the implementation where it is mounted in a vehicle, a radar system may be used while being fixed on the road or a building, for example.

A slot antenna device according to an example embodiment of the present disclosure can also be used in a wireless communication system. Such a wireless communication system would include a slot antenna device according to any of the above example embodiments and a communication circuit (a transmission circuit or a reception circuit). Details of example applications to wireless communication systems will be described later.

A slot antenna device according to an example embodiment of the present disclosure can further be used as an antenna in an indoor positioning system (IPS). An indoor positioning system is able to identify the position of a moving entity, such as a person or an automated guided vehicle (AGV), that is in a building. An antenna device can also be used as a radio wave transmitter (beacon) for use in a system which provides information to an information terminal device (e.g., a smartphone) that is carried by a person who has visited a store or any other facility. In such a system, once every several seconds, a beacon may radiate an electromagnetic wave carrying an ID or other information superposed thereon, for example. When the information terminal device receives this electromagnetic wave, the information terminal device transmits the received information to a remote server computer via telecommunication lines. Based on the information that has been received from the information terminal device, the server computer identifies the position of that information terminal device, and provides information which is associated with that position (e.g., product information or a coupon) to the information terminal device.

The present specification employs the term "artificial magnetic conductor" in describing the technique according to the present disclosure, this being in line with what is set forth in a paper by one of the inventors Kirino (Kirino et al., "A 76 GHz Multi-Layered Phased Array Antenna Using a Non-Metal Contact Metamaterial Waveguide", IEEE Transaction on Antennas and Propagation, Vol. 60, No. 2, February 2012, pp 840-853) as well as a paper by Kildal et al., who published a study directed to related subject matter around the same time. However, it has been found through a study by the inventors that the disclosure according to the present disclosure does not necessarily require an "artificial magnetic conductor" under its conventional definition. That is, while a periodic structure has been believed to be a requirement for an artificial magnetic conductor, the disclosure according to the present disclosure does not necessary require a periodic structure in order to be practiced.

The artificial magnetic conductor that is described in the present disclosure consists of rows of conductive rods. Therefore, in order to stop the electromagnetic waves leaking away from the waveguide face, it has been believed essential that there exist at least two rows of conductive rods on one side of the waveguide member(s), such rows of conductive rods extending along the waveguide member(s) (ridge(s)). The reason is that it takes at least two rows of conductive rods for them to have a "period". However, according to a study by the inventors, even when only one row of conductive rods exists between two waveguide members that extend in parallel to each other, the intensity of a signal that leaks from one waveguide member to the other waveguide member can be suppressed to −10 dB or less, which is a practically sufficient value in many applications. The reason why such a sufficient level of separation is achieved with only an imperfect periodic structure is so far unclear. However, in view of this fact, in the present disclosure, the notion of "artificial magnetic conductor" is extended so that the term also encompasses a structure including only one row of conductive rods for convenience sake.

Application Example 1: Onboard Radar System

Next, as an Application Example of utilizing the above-described slot array antenna, an instance of an onboard radar system including a slot array antenna will be described. A transmission wave used in an onboard radar system may have a frequency of e.g. 76 gigahertz (GHz) band, which will have a wavelength $\lambda o$ of about 4 mm in free space.

In safety technology of automobiles, e.g., collision avoidance systems or automated driving, it is particularly essential to identify one or more vehicles (targets) that are traveling ahead of the driver's vehicle. As a method of identifying vehicles, techniques of estimating the directions of arriving waves by using a radar system have been under development.

Figure 26:
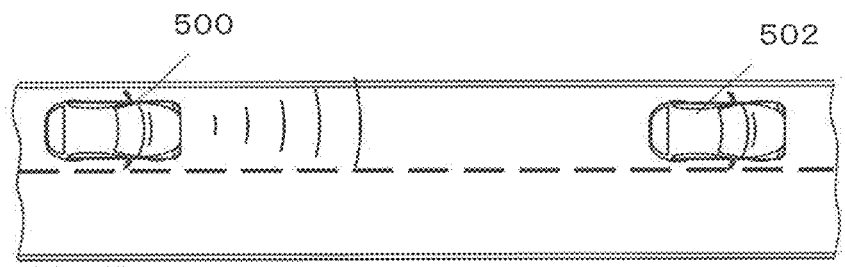
FIG. 26 is a diagram showing a driver's vehicle 500, and a preceding vehicle 502 that is traveling in the same lane as the driver's vehicle 500 according to an example embodiment of the present disclosure.

FIG. 26 shows a driver's vehicle 500, and a preceding vehicle 502 that is traveling in the same lane as the driver's vehicle 500. The driver's vehicle 500 includes an onboard radar system which incorporates a slot array antenna according to any of the above-described example embodiments. When the onboard radar system of the driver's vehicle 500 radiates a radio frequency transmission signal, the transmission signal reaches the preceding vehicle 502 and is reflected therefrom, so that a part of the signal returns to the driver's vehicle 500. The onboard radar system receives this signal to calculate a position of the preceding vehicle 502, a distance ("range") to the preceding vehicle 502, velocity, etc.

Figure 27:
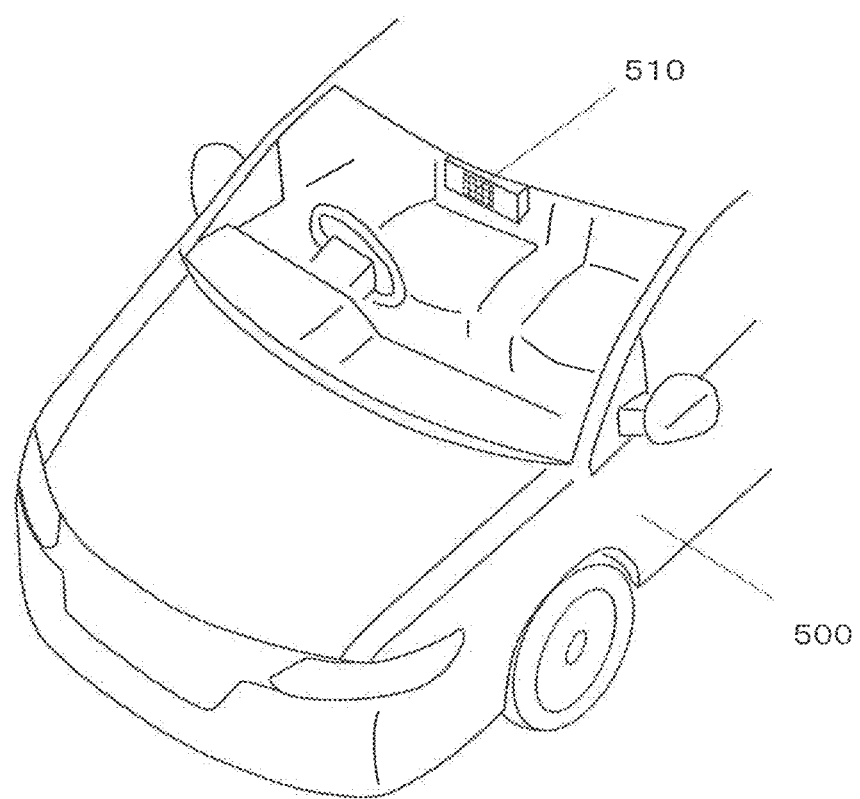
FIG. 27 is a diagram showing an onboard radar system 510 of the driver's vehicle 500.

FIG. 27 shows the onboard radar system 510 of the driver's vehicle 500. The onboard radar system 510 is provided within the vehicle. More specifically, the onboard radar system 510 is disposed on a face of the rearview mirror that is opposite to its specular surface. From within the vehicle, the onboard radar system 510 radiates a radio frequency transmission signal in the direction of travel of the vehicle 500, and receives a signal(s) which arrives from the direction of travel.

The onboard radar system 510 of this Application Example includes a slot array antenna according to an example embodiment of the present disclosure. The slot array antenna may include a plurality of waveguide members that are parallel to one another. They are to be arranged so that the plurality of waveguide members each extend in a direction which coincides with the vertical direction, and that the plurality of waveguide members are arranged in a direction which coincides with the horizontal direction. As a result, the lateral and vertical dimensions of the plurality of slots as viewed from the front can be further reduced.

Example dimensions of an antenna device including the above array antenna may be 60 mm (wide)×30 mm (long)× 10 mm (deep). It will be appreciated that this is a very small size for a millimeter wave radar system of the 76 GHz band.

Note that many a conventional onboard radar system is provided outside the vehicle, e.g., at the tip of the front nose. The reason is that the onboard radar system is relatively large in size, and thus is difficult to be provided within the vehicle as in the present disclosure. The onboard radar system 510 of this Application Example may be installed within the vehicle as described above, but may instead be mounted at the tip of the front nose. Since the footprint of the onboard radar system on the front nose is reduced, other parts can be more easily placed.

The Application Example allows the interval between a plurality of waveguide members (ridges) that are used in the transmission antenna to be narrow, which also narrows the interval between a plurality of slots to be provided opposite from a number of adjacent waveguide members. This reduces the influences of grating lobes. For example, when the interval between the centers of two laterally adjacent slots is shorter than the free-space wavelength $\lambda o$ of the transmission wave (i.e., less than about 4 mm), no grating lobes will occur frontward. As a result, influences of grating lobes are reduced. Note that grating lobes will occur when the interval at which the antenna elements are arrayed is greater than a half of the wavelength of an electromagnetic wave. If the interval at which the antenna elements are arrayed is less than the wavelength, no grating lobes will occur frontward. Therefore, in the case where no beam steering is performed to impart phase differences among the radio waves radiated from the respective antenna elements composing an array antenna, grating lobes will exert substantially no influences so long as the interval at which the antenna elements are arrayed is smaller than the wavelength. By adjusting the array factor of the transmission antenna, the directivity of the transmission antenna can be adjusted. A phase shifter may be provided so as to be able to individually adjust the phases of electromagnetic waves that are transmitted on plural waveguide members. In that case, in order to avoid the influences of grating lobes, it is preferable that the interval between antenna elements is less than the free-space wavelength $\lambda o$ of the transmission wave. Even in that case, grating lobes will appear as the phase shift amount is increased. However, when the intervals between the antenna elements is reduced to less than a half of the free space wavelength $\lambda o$ of the transmission wave, grating lobes will not appear irrespective of the phase shift amount. By providing a phase shifter, the directivity of the transmission antenna can be changed in any desired direction. Since the construction of a phase shifter is well-known, description thereof will be omitted.

A reception antenna according to the Application Example is able to reduce reception of reflected waves associated with grating lobes, thereby being able to improve the precision of the below-described processing. Hereinafter, an example of a reception process will be described.

Figure 28A:
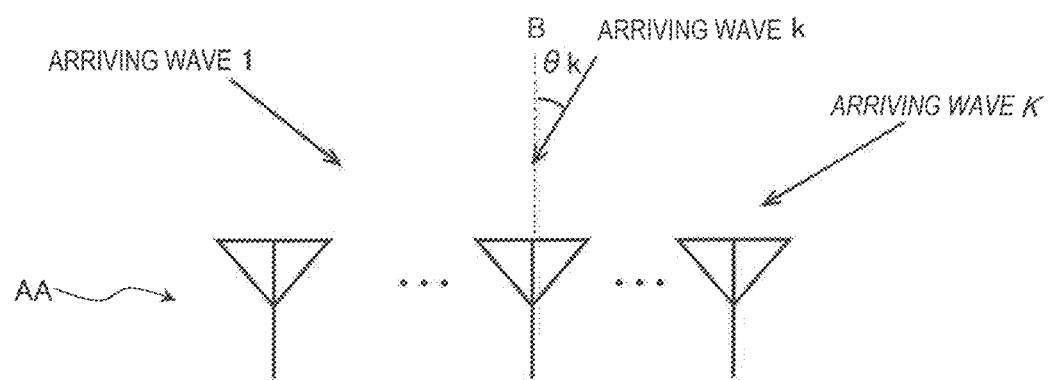
FIG. 28A is a diagram showing a relationship between an array antenna AA of the onboard radar system 510 and plural arriving waves k.

FIG. 28A shows a relationship between an array antenna AA of the onboard radar system 510 and plural arriving waves k (k: an integer from 1 to K; the same will always apply below. K is the number of targets that are present in different azimuths). The array antenna AA includes M antenna elements in a linear array. Principlewise, an antenna can be used for both transmission and reception, and therefore the array antenna AA can be used for both a transmission antenna and a reception antenna. Hereinafter, an example method of processing an arriving wave which is received by the reception antenna will be described.

The array antenna AA receives plural arriving waves that simultaneously impinge at various angles. Some of the plural arriving waves may be arriving waves which have been radiated from the transmission antenna of the same onboard radar system 510 and reflected by a target(s). Furthermore, some of the plural arriving waves may be direct or indirect arriving waves that have been radiated from other vehicles.

The incident angle of each arriving wave (i.e., an angle representing its direction of arrival) is an angle with respect to the broadside B of the array antenna AA. The incident angle of an arriving wave represents an angle with respect to a direction which is perpendicular to the direction of the line along which antenna elements are arrayed.

Now, consider a $k^{th}$ arriving wave. Where K arriving waves are impinging on the array antenna from K targets existing at different azimuths, a "$k^{th}$ arriving wave" means an arriving wave which is identified by an incident angle $\theta_k$.

Figure 28B:
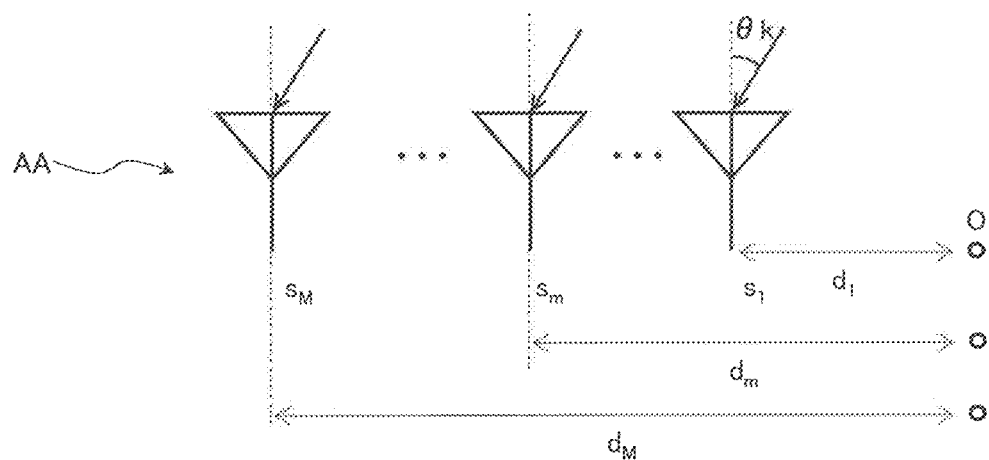
FIG. 28B is a diagram showing the array antenna AA receiving the $k^{th}$ arriving wave.

FIG. 28B shows the array antenna AA receiving the $k^{th}$ arriving wave. The signals received by the array antenna AA can be expressed as a "vector" having M elements, by Math. 1.

$$S = [s_1, s_2, \ldots, s_M]^T \quad \text{(Math. 1)}$$

In the above, $s_m$ (where m is an integer from 1 to M; the same will also be true hereinbelow) is the value of a signal which is received by an $m^{th}$ antenna element. The superscript $^T$ means transposition. S is a column vector. The column vector S is defined by a product of multiplication between a direction vector (referred to as a steering vector or a mode vector) as determined by the construction of the array antenna and a complex vector representing a signal from each target (also referred to as a wave source or a signal source). When the number of wave sources is K, the waves of signals arriving at each individual antenna element from the respective K wave sources are linearly superposed. In this state, $s_m$ can be expressed by Math. 2.

$$s_m = \sum_{k=1}^{K} a_k \exp\left\{j\left(\frac{2\pi}{\lambda} d_m \sin\theta_k + \varphi_k\right)\right\} \quad \text{[Math. 2]}$$

In Math. 2, $a_k$, $\theta_k$ and $\varphi_k$ respectively denote the amplitude, incident angle, and initial phase of the $k^{th}$ arriving wave. Moreover, $\lambda$ denotes the wavelength of an arriving wave, and j is an imaginary unit.

As will be understood from Math. 2, $s_m$ is expressed as a complex number consisting of a real part (Re) and an imaginary part (Im).

When this is further generalized by taking noise (internal noise or thermal noise) into consideration, the array reception signal X can be expressed as Math. 3.

$$X = S + N \quad \text{(Math. 3)}$$

N is a vector expression of noise.

The signal processing circuit generates a spatial covariance matrix Rxx (Math. 4) of arriving waves by using the array reception signal X expressed by Math. 3, and further determines eigenvalues of the spatial covariance matrix Rxx.

$$R_{xx} = XX^H = \begin{bmatrix} Rxx_{11} & \cdots & Rxx_{1M} \\ \vdots & \ddots & \vdots \\ Rxx_{M1} & \cdots & Rxx_{MM} \end{bmatrix} \quad \text{[Math. 4]}$$

In the above, the superscript H means complex conjugate transposition (Hermitian conjugate).

Among the eigenvalues, the number of eigenvalues which have values equal to or greater than a predetermined value that is defined based on thermal noise (signal space eigenvalues) corresponds to the number of arriving waves. Then, angles that produce the highest likelihood as to the directions of arrival of reflected waves (i.e. maximum likelihood) are calculated, whereby the number of targets and the angles at which the respective targets are present can be identified. This process is known as a maximum likelihood estimation technique.

Figure 29:
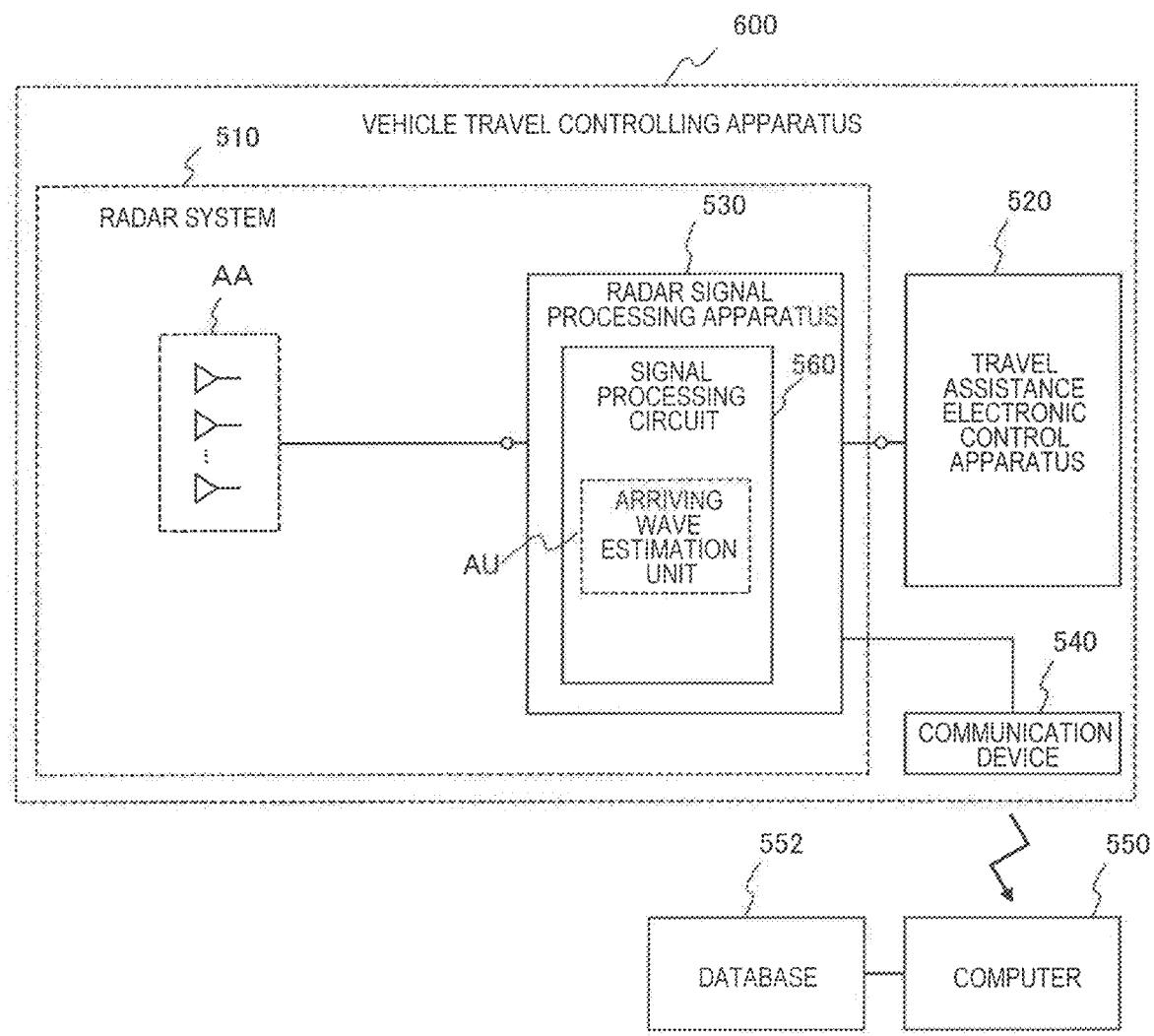
FIG. 29 is a block diagram showing an example fundamental construction of a vehicle travel controlling apparatus 600 according to an example embodiment of the present disclosure.

Next, see FIG. 29. FIG. 29 is a block diagram showing an example fundamental construction of a vehicle travel controlling apparatus 600 according to the present disclosure. The vehicle travel controlling apparatus 600 shown in FIG. 29 includes a radar system 510 which is mounted in a vehicle, and a travel assistance electronic control apparatus 520 which is connected to the radar system 510. The radar system 510 includes an array antenna AA and a radar signal processing apparatus 530.

The array antenna AA includes a plurality of antenna elements, each of which outputs a reception signal in response to one or plural arriving waves. As mentioned earlier, the array antenna AA is capable of radiating a millimeter wave of a high frequency.

In the radar system 510, the array antenna AA needs to be attached to the vehicle, while at least some of the functions of the radar signal processing apparatus 530 may be implemented by a computer 550 and a database 552 which are provided externally to the vehicle travel controlling apparatus 600 (e.g., outside of the driver's vehicle). In that case, the portions of the radar signal processing apparatus 530 that are located within the vehicle may be perpetually or occasionally connected to the computer 550 and database 552 external to the vehicle so that bidirectional communications of signal or data are possible. The communications are to be performed via a communication device 540 of the vehicle and a commonly-available communications network.

The database 552 may store a program which defines various signal processing algorithms. The content of the data and program needed for the operation of the radar system 510 may be externally updated via the communication device 540. Thus, at least some of the functions of the radar system 510 can be realized externally to the driver's vehicle (which is inclusive of the interior of another vehicle), by a cloud computing technique. Therefore, an "onboard" radar system in the meaning of the present disclosure does not require that all of its constituent elements be mounted within the (driver's) vehicle. However, for simplicity, the present application will describe an implementation in which all constituent elements according to the present disclosure are mounted in a single vehicle (i.e., the driver's vehicle), unless otherwise specified.

The radar signal processing apparatus 530 includes a signal processing circuit 560. The signal processing circuit 560 directly or indirectly receives reception signals from the array antenna AA, and inputs the reception signals, or a secondary signal(s) which has been generated from the reception signals, to an arriving wave estimation unit AU. A part or a whole of the circuit (not shown) which generates a secondary signal(s) from the reception signals does not need to be provided inside of the signal processing circuit 560. A part or a whole of such a circuit (preprocessing circuit) may be provided between the array antenna AA and the radar signal processing apparatus 530.

The signal processing circuit 560 is configured to perform computation by using the reception signals or secondary signal(s), and output a signal indicating the number of arriving waves. As used herein, a "signal indicating the number of arriving waves" can be said to be a signal indicating the number of preceding vehicles (which may be one preceding vehicle or plural preceding vehicles) ahead of the driver's vehicle.

The signal processing circuit 560 may be configured to execute various signal processing which is executable by known radar signal processing apparatuses. For example, the signal processing circuit 560 may be configured to execute "super-resolution algorithms" such as the MUSIC method, the ESPRIT method, or the SAGE method, or other algorithms for direction-of-arrival estimation of relatively low resolution.

The arriving wave estimation unit AU shown in FIG. 29 estimates an angle representing the azimuth of each arriving wave by an arbitrary algorithm for direction-of-arrival estimation, and outputs a signal indicating the estimation result. The signal processing circuit 560 estimates the distance to each target as a wave source of an arriving wave, the relative velocity of the target, and the azimuth of the target by using a known algorithm which is executed by the arriving wave estimation unit AU, and output a signal indicating the estimation result.

In the present disclosure, the term "signal processing circuit" is not limited to a single circuit, but encompasses any implementation in which a combination of plural circuits is conceptually regarded as a single functional part. The signal processing circuit 560 may be realized by one or more System-on-Chips (SoCs). For example, a part or a whole of the signal processing circuit 560 may be an FPGA (Field-Programmable Gate Array), which is a programmable logic device (PLD). In that case, the signal processing circuit 560 includes a plurality of computation elements (e.g., general-purpose logics and multipliers) and a plurality of memory elements (e.g., look-up tables or memory blocks). Alternatively, the signal processing circuit 560 may be a set of a general-purpose processor(s) and a main memory device(s). The signal processing circuit 560 may be a circuit which includes a processor core(s) and a memory device(s). These may function as the signal processing circuit 560.

The travel assistance electronic control apparatus 520 is configured to provide travel assistance for the vehicle based on various signals which are output from the radar signal processing apparatus 530. The travel assistance electronic control apparatus 520 instructs various electronic control units to fulfill predetermined functions, e.g., a function of issuing an alarm to prompt the driver to make a braking operation when the distance to a preceding vehicle (vehicular gap) has become shorter than a predefined value; a function of controlling the brakes; and a function of controlling the accelerator. For example, in the case of an operation mode which performs adaptive cruise control of the driver's vehicle, the travel assistance electronic control apparatus 520 sends predetermined signals to various electronic control units (not shown) and actuators, to maintain the distance of the driver's vehicle to a preceding vehicle at a predefined value, or maintain the traveling velocity of the driver's vehicle at a predefined value.

In the case of the MUSIC method, the signal processing circuit 560 determines eigenvalues of the spatial covariance matrix, and, as a signal indicating the number of arriving waves, outputs a signal indicating the number of those eigenvalues ("signal space eigenvalues") which are greater than a predetermined value (thermal noise power) that is defined based on thermal noise.

Figure 30:
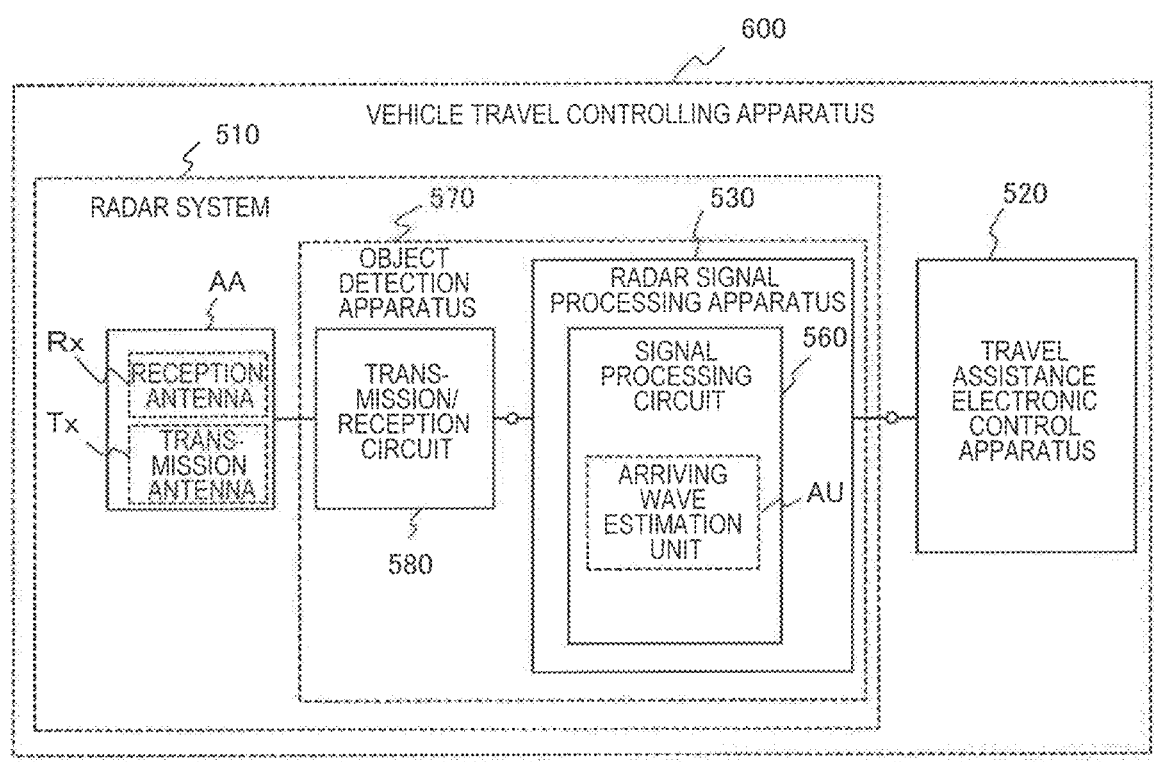
FIG. 30 is a block diagram showing another example construction of the vehicle travel controlling apparatus 600.

Next, see FIG. 30. FIG. 30 is a block diagram showing another example construction for the vehicle travel controlling apparatus 600. The radar system 510 in the vehicle travel controlling apparatus 600 of FIG. 30 includes an array antenna AA, which includes an array antenna that is dedicated to reception only (also referred to as a reception antenna) Rx and an array antenna that is dedicated to transmission only (also referred to as a transmission antenna) Tx; and an object detection apparatus 570.

At least one of the transmission antenna Tx and the reception antenna Rx has the aforementioned waveguide structure. The transmission antenna Tx radiates a transmission wave, which may be a millimeter wave, for example. The reception antenna Rx that is dedicated to reception only outputs a reception signal in response to one or plural arriving waves (e.g., a millimeter wave(s)).

A transmission/reception circuit 580 sends a transmission signal for a transmission wave to the transmission antenna Tx, and performs "preprocessing" for reception signals of reception waves received at the reception antenna Rx. A part or a whole of the preprocessing may be performed by the signal processing circuit 560 in the radar signal processing apparatus 530. A typical example of preprocessing to be performed by the transmission/reception circuit 580 may be generating a beat signal from a reception signal, and converting a reception signal of analog format into a reception signal of digital format.

In the present specification, any device that includes a transmission antenna, a reception antenna, a transmission/reception circuit, and a waveguide device which allows electromagnetic waves to propagate between the transmission antenna and reception antenna and the transmission/reception circuit is referred to as a "radar device". Moreover, a device that includes a signal processing apparatus (including a signal processing circuit), e.g., an object detection apparatus, in addition to a radar device is referred to as a "radar system".

Note that the radar system according to the present disclosure may, without being limited to the implementation where it is mounted in the driver's vehicle, be used while being fixed on the road or a building.

Next, an example of a more specific construction of the vehicle travel controlling apparatus 600 will be described.

Figure 31:
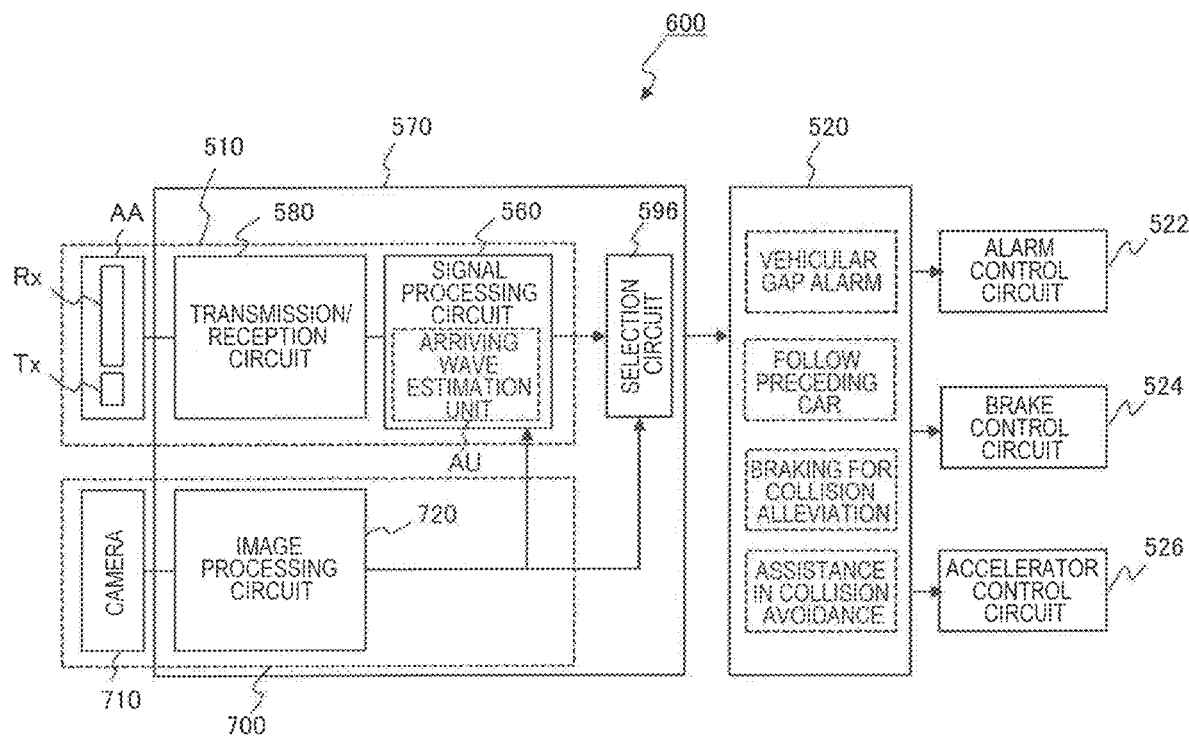
FIG. 31 is a block diagram showing an example of a more specific construction of the vehicle travel controlling apparatus 600.

FIG. 31 is a block diagram showing an example of a more specific construction of the vehicle travel controlling apparatus 600. The vehicle travel controlling apparatus 600 shown in FIG. 31 includes a radar system 510 and an onboard camera system 700. The radar system 510 includes an array antenna AA, a transmission/reception circuit 580 which is connected to the array antenna AA, and a signal processing circuit 560.

The onboard camera system 700 includes an onboard camera 710 which is mounted in a vehicle, and an image processing circuit 720 which processes an image or video that is acquired by the onboard camera 710.

The vehicle travel controlling apparatus 600 of this Application Example includes an object detection apparatus 570 which is connected to the array antenna AA and the onboard camera 710, and a travel assistance electronic control apparatus 520 which is connected to the object detection apparatus 570. The object detection apparatus 570 includes a transmission/reception circuit 580 and an image processing circuit 720, in addition to the above-described radar signal processing apparatus 530 (including the signal processing circuit 560). The object detection apparatus 570 detects a target on the road or near the road, by using not only the information which is obtained by the radar system 510 but also the information which is obtained by the image processing circuit 720. For example, while the driver's vehicle is traveling in one of two or more lanes of the same direction, the image processing circuit 720 can distinguish which lane the driver's vehicle is traveling in, and supply that result of distinction to the signal processing circuit 560. When the number and azimuth(s) of preceding vehicles are to be recognized by using a predetermined algorithm for direction-of-arrival estimation (e.g., the MUSIC method), the signal processing circuit 560 is able to provide more reliable information concerning a spatial distribution of preceding vehicles by referring to the information from the image processing circuit 720.

Note that the onboard camera system 700 is an example of a means for identifying which lane the driver's vehicle is traveling in. The lane position of the driver's vehicle may be identified by any other means. For example, by utilizing an ultra-wide band (UWB) technique, it is possible to identify which one of a plurality of lanes the driver's vehicle is traveling in. It is widely known that the ultra-wide band technique is applicable to position measurement and/or radar. Using the ultra-wide band technique enhances the range resolution of the radar, so that, even when a large number of vehicles exist ahead, each individual target can be detected with distinction, based on differences in distance. This makes it possible to accurately identify distance from a guardrail on the road shoulder, or from the median strip. The width of each lane is predefined based on each country's law or the like. By using such information, it becomes possible to identify where the lane in which the driver's vehicle is currently traveling is. Note that the ultra-wide band technique is an example. A radio wave based on any other wireless technique may be used. Moreover, LIDAR (Light Detection and Ranging) may be used together with a radar. LIDAR is sometimes called "laser radar".

The array antenna AA may be a generic millimeter wave array antenna for onboard use. The transmission antenna Tx in this Application Example radiates a millimeter wave as a transmission wave ahead of the vehicle. A portion of the transmission wave is reflected off a target which is typically a preceding vehicle, whereby a reflected wave occurs from the target being a wave source. A portion of the reflected wave reaches the array antenna (reception antenna) AA as an arriving wave. Each of the plurality of antenna elements of the array antenna AA outputs a reception signal in response to one or plural arriving waves. In the case where the number of targets functioning as wave sources of reflected waves is K (where K is an integer of one or more), the number of arriving waves is K, but this number K of arriving waves is not known beforehand.

The example of FIG. 29 assumes that the radar system 510 is provided as an integral piece, including the array antenna AA, on the rearview mirror. However, the number and positions of array antennas AA are not limited to any specific number or specific positions. An array antenna AA may be disposed on the rear surface of the vehicle so as to be able to detect targets that are behind the vehicle. Moreover, a plurality of array antennas AA may be disposed on the front surface and the rear surface of the vehicle. The array antenna(s) AA may be disposed inside the vehicle. Even in the case where a horn antenna whose respective antenna elements include horns as mentioned above is to be adopted as the array antenna(s) AA, the array antenna(s) with such antenna elements may be situated inside the vehicle.

The signal processing circuit 560 receives and processes the reception signals which have been received by the reception antenna Rx and subjected to preprocessing by the transmission/reception circuit 580. This process encompasses inputting the reception signals to the arriving wave estimation unit AU, or alternatively, generating a secondary signal(s) from the reception signals and inputting the secondary signal(s) to the arriving wave estimation unit AU.

In the example of FIG. 31, a selection circuit 596 which receives the signal being output from the signal processing circuit 560 and the signal being output from the image processing circuit 720 is provided in the object detection apparatus 570. The selection circuit 596 allows one or both of the signal being output from the signal processing circuit 560 and the signal being output from the image processing circuit 720 to be fed to the travel assistance electronic control apparatus 520.

Figure 32:
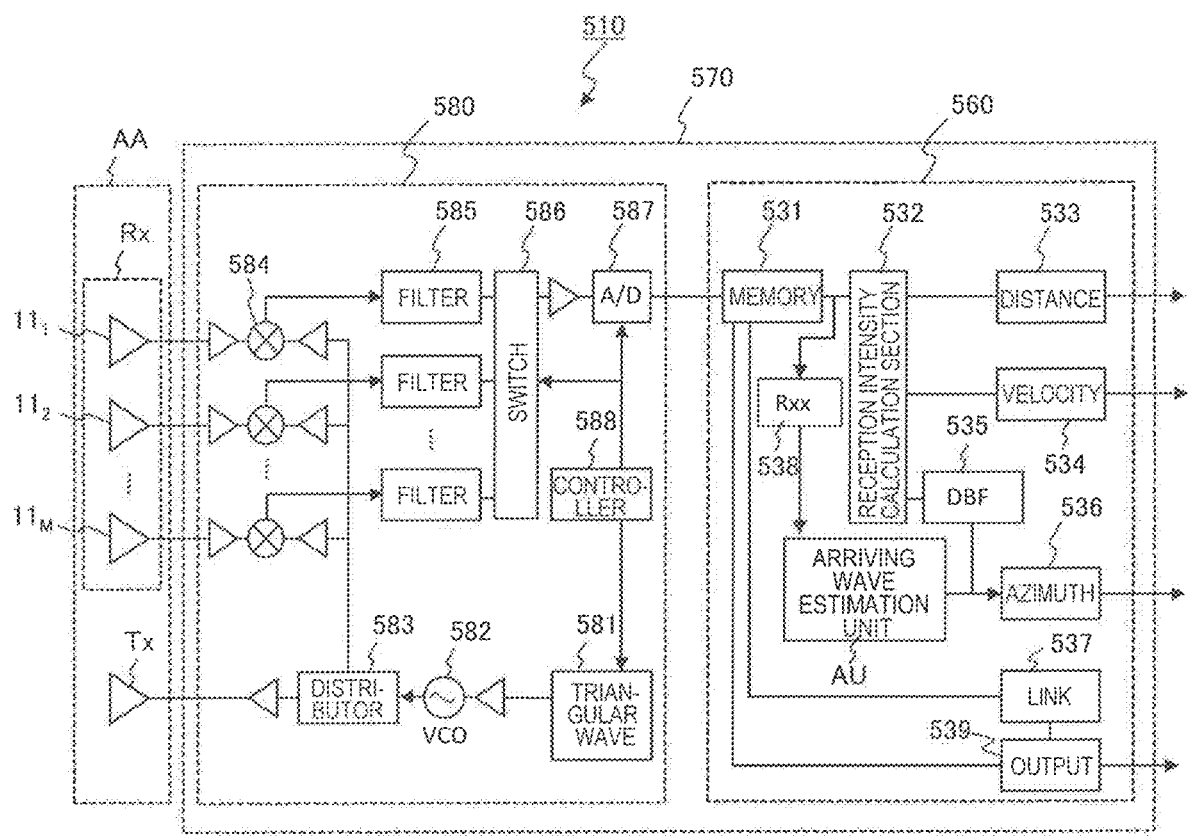
FIG. 32 is a block diagram showing a more detailed example construction of the radar system 510 according to this Application Example.

FIG. 32 is a block diagram showing a more detailed example construction of the radar system 510 according to this Application Example.

As shown in FIG. 32, the array antenna AA includes a transmission antenna Tx which transmits a millimeter wave and reception antennas Rx which receive arriving waves reflected from targets. Although only one transmission antenna Tx is illustrated in the figure, two or more kinds of transmission antennas with different characteristics may be provided. The array antenna AA includes M antenna elements $11_1, 11_2, \ldots, 11_M$ (where M is an integer of 3 or more). In response to the arriving waves, the plurality of antenna elements $11_1, 11_2, \ldots, 11_M$ respectively output reception signals $s_1, s_2, \ldots, s_M$ (FIG. 28B).

In the array antenna AA, the antenna elements $11_1$ to $11_M$ are arranged in a linear array or a two-dimensional array at fixed intervals, for example. Each arriving wave will impinge on the array antenna AA from a direction at an angle θ with respect to the normal of the plane in which the antenna elements $11_1$ to $11_M$ are arrayed. Thus, the direction of arrival of an arriving wave is defined by this angle θ.

When an arriving wave from one target impinges on the array antenna AA, this approximates to a plane wave impinging on the antenna elements $11_1$ to $11_M$ from azimuths of the same angle θ. When K arriving waves impinge on the array antenna AA from K targets with different azimuths, the individual arriving waves can be identified in terms of respectively different angles $θ_1$ to $θ_K$.

As shown in FIG. 32, the object detection apparatus 570 includes the transmission/reception circuit 580 and the signal processing circuit 560.

The transmission/reception circuit 580 includes a triangular wave generation circuit 581, a VCO (voltage controlled oscillator) 582, a distributor 583, mixers 584, filters 585, a switch 586, an A/D converter 587, and a controller 588. Although the radar system in this Application Example is configured to perform transmission and reception of millimeter waves by the FMCW method, the radar system of the present disclosure is not limited to this method. The transmission/reception circuit 580 is configured to generate a beat signal based on a reception signal from the array antenna AA and a transmission signal from the transmission antenna Tx.

The signal processing circuit 560 includes a distance detection section 533, a velocity detection section 534, and an azimuth detection section 536. The signal processing circuit 560 is configured to process a signal from the A/D converter 587 in the transmission/reception circuit 580, and output signals respectively indicating the detected distance to the target, the relative velocity of the target, and the azimuth of the target.

First, the construction and operation of the transmission/reception circuit 580 will be described in detail.

Figure 33:
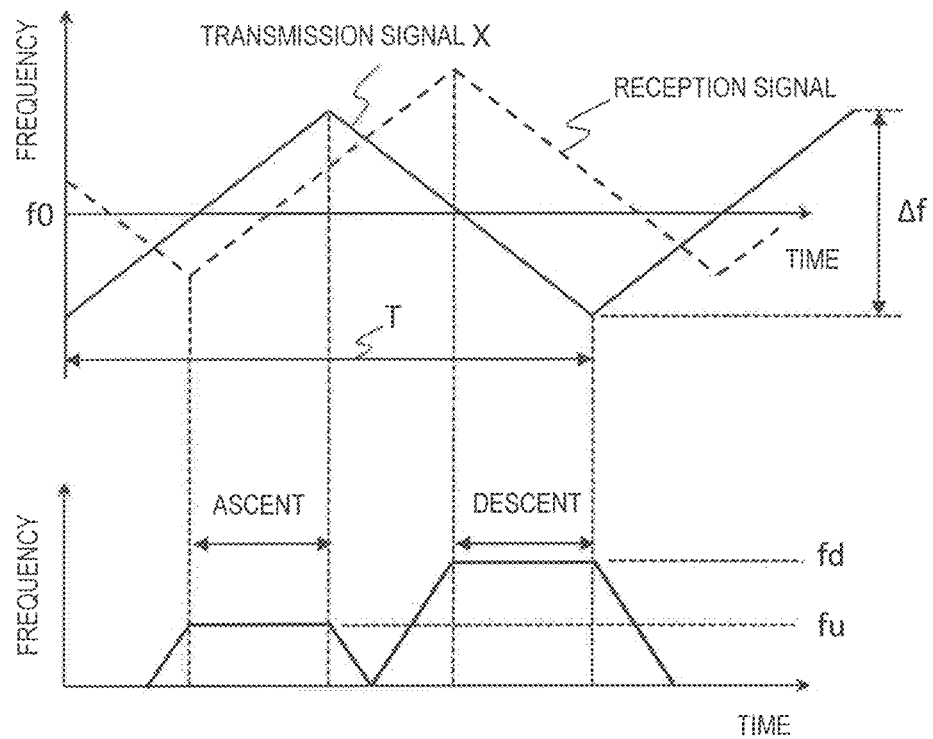
FIG. 33 is a diagram showing change in frequency of a transmission signal which is modulated based on the signal that is generated by a triangular wave generation circuit 581 according to an example embodiment of the present disclosure.

The triangular wave generation circuit 581 generates a triangular wave signal, and supplies it to the VCO 582. The VCO 582 outputs a transmission signal having a frequency as modulated based on the triangular wave signal. FIG. 33 is a diagram showing change in frequency of a transmission signal which is modulated based on the signal that is generated by the triangular wave generation circuit 581. This waveform has a modulation width $\Delta f$ and a center frequency of f0. The transmission signal having a thus modulated frequency is supplied to the distributor 583. The distributor 583 allows the transmission signal obtained from the VCO 582 to be distributed among the mixers 584 and the transmission antenna Tx. Thus, the transmission antenna radiates a millimeter wave having a frequency which is modulated in triangular waves, as shown in FIG. 33.

In addition to the transmission signal, FIG. 33 also shows an example of a reception signal from an arriving wave which is reflected from a single preceding vehicle. The reception signal is delayed from the transmission signal. This delay is in proportion to the distance between the driver's vehicle and the preceding vehicle. Moreover, the frequency of the reception signal increases or decreases in accordance with the relative velocity of the preceding vehicle, due to the Doppler effect.

When the reception signal and the transmission signal are mixed, a beat signal is generated based on their frequency difference. The frequency of this beat signal (beat frequency) differs between a period in which the transmission signal increases in frequency (ascent) and a period in which the transmission signal decreases in frequency (descent). Once a beat frequency for each period is determined, based on such beat frequencies, the distance to the target and the relative velocity of the target are calculated.

Figure 34:
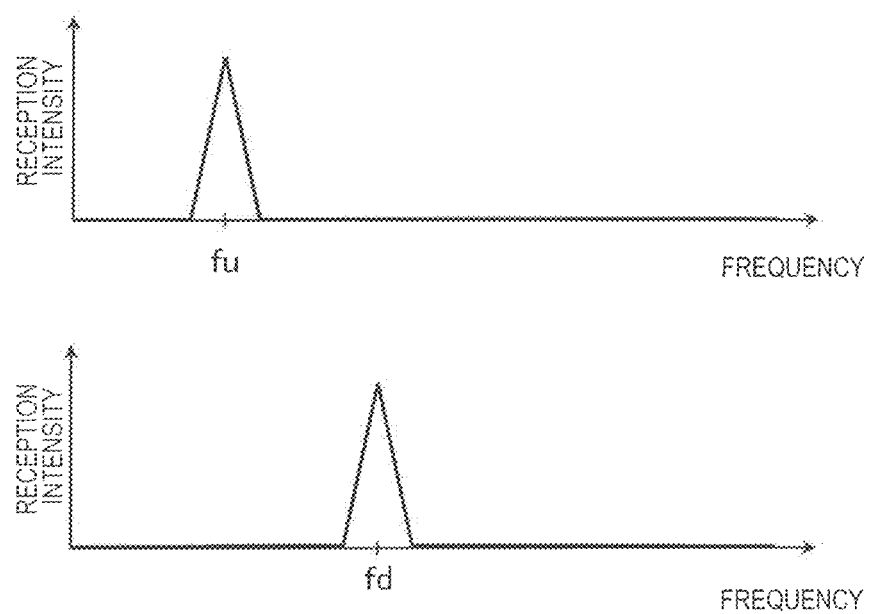
FIG. 34 is a diagram showing a beat frequency fu in an "ascent" period and a beat frequency fd in a "descent" period according to an example embodiment of the present disclosure.

FIG. 34 shows a beat frequency fu in an "ascent" period and a beat frequency fd in a "descent" period. In the graph of FIG. 34, the horizontal axis represents frequency, and the vertical axis represents signal intensity. This graph is obtained by subjecting the beat signal to time-frequency conversion. Once the beat frequencies fu and fd are obtained, based on a known equation, the distance to the target and the relative velocity of the target are calculated. In this Application Example, with the construction and operation described below, beat frequencies corresponding to each antenna element of the array antenna AA are obtained, thus enabling estimation of the position information of a target.

In the example shown in FIG. 32, reception signals from channels $Ch_1$ to $Ch_M$ corresponding to the respective antenna elements $11_1$ to $11_M$ are each amplified by an amplifier, and input to the corresponding mixers 584. Each mixer 584 mixes the transmission signal into the amplified reception signal. Through this mixing, a beat signal is generated corresponding to the frequency difference between the reception signal and the transmission signal. The generated beat signal is fed to the corresponding filter 585. The filters 585 apply bandwidth control to the beat signals on the channels $Ch_1$ to $Ch_M$, and supply bandwidth-controlled beat signals to the switch 586.

The switch 586 performs switching in response to a sampling signal which is input from the controller 588. The controller 588 may be composed of a microcomputer, for example. Based on a computer program which is stored in a memory such as a ROM, the controller 588 controls the entire transmission/reception circuit 580. The controller 588 does not need to be provided inside the transmission/reception circuit 580, but may be provided inside the signal processing circuit 560. In other words, the transmission/reception circuit 580 may operate in accordance with a control signal from the signal processing circuit 560. Alternatively, some or all of the functions of the controller 588 may be realized by a central processing unit which controls the entire transmission/reception circuit 580 and signal processing circuit 560.

The beat signals on the channels $Ch_1$ to $Ch_M$ having passed through the respective filters 585 are consecutively supplied to the A/D converter 587 via the switch 586. In synchronization with the sampling signal, the A/D converter 587 converts the beat signals on the channels $Ch_1$ to $Ch_M$, which are input from the switch 586, into digital signals.

Hereinafter, the construction and operation of the signal processing circuit 560 will be described in detail. In this Application Example, the distance to the target and the relative velocity of the target are estimated by the FMCW method. Without being limited to the FMCW method as described below, the radar system can also be implemented by using other methods, e.g., 2 frequency CW and spread spectrum methods.

In the example shown in FIG. 32, the signal processing circuit 560 includes a memory 531, a reception intensity calculation section 532, a distance detection section 533, a velocity detection section 534, a DBF (digital beam forming) processing section 535, an azimuth detection section 536, a target link processing section 537, a matrix generation section 538, a target output processing section 539, and an arriving wave estimation unit AU. As mentioned earlier, a part or a whole of the signal processing circuit 560 may be implemented by FPGA, or by a set of a general-purpose processor(s) and a main memory device(s). The memory 531, the reception intensity calculation section 532, the DBF processing section 535, the distance detection section 533, the velocity detection section 534, the azimuth detection section 536, the target link processing section 537, and the arriving wave estimation unit AU may be individual parts that are implemented in distinct pieces of hardware, or functional blocks of a single signal processing circuit.

Figure 35:
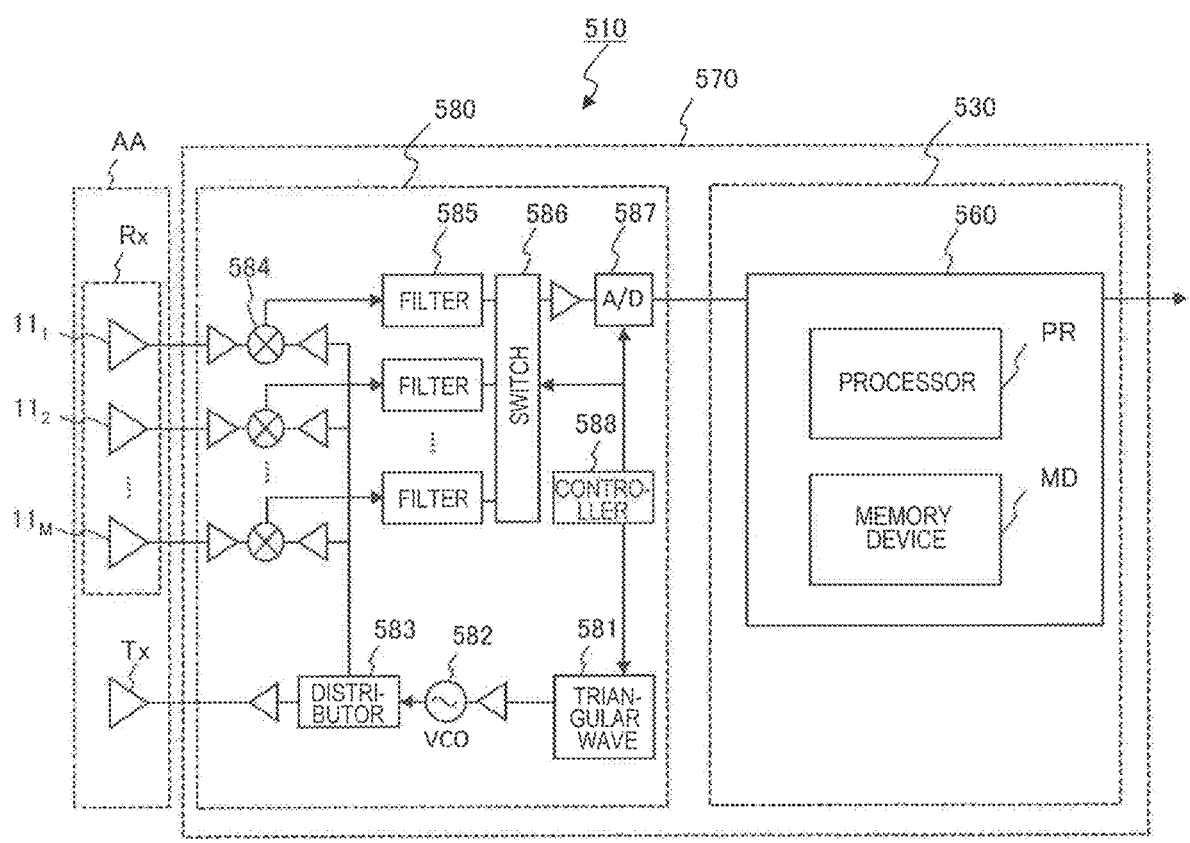
FIG. 35 is a diagram showing an example implementation in which a signal processing circuit 560 is implemented in hardware including a processor PR and a memory device MD.

FIG. 35 shows an example implementation in which the signal processing circuit 560 is implemented in hardware including a processor PR and a memory device MD. In the signal processing circuit 560 with this construction, too, a computer program that is stored in the memory device MD may fulfill the functions of the reception intensity calculation section 532, the DBF processing section 535, the distance detection section 533, the velocity detection section 534, the azimuth detection section 536, the target link processing section 537, the matrix generation section 538, and the arriving wave estimation unit AU shown in FIG. 32.

The signal processing circuit 560 in this Application Example is configured to estimate the position information of a preceding vehicle by using each beat signal converted into a digital signal as a secondary signal of the reception signal, and output a signal indicating the estimation result. Hereinafter, the construction and operation of the signal processing circuit 560 in this Application Example will be described in detail.

For each of the channels $Ch_1$ to $Ch_M$, the memory 531 in the signal processing circuit 560 stores a digital signal which is output from the A/D converter 587. The memory 531 may be composed of a generic storage medium such as a semiconductor memory or a hard disk and/or an optical disk.

The reception intensity calculation section 532 applies Fourier transform to the respective beat signals for the channels $Ch_1$ to $Ch_M$ (shown in the lower graph of FIG. 33) that are stored in the memory 531. In the present specification, the amplitude of a piece of complex number data after the Fourier transform is referred to as "signal intensity". The reception intensity calculation section 532 converts the complex number data of a reception signal from one of the plurality of antenna elements, or a sum of the complex number data of all reception signals from the plurality of antenna elements, into a frequency spectrum. In the resultant spectrum, beat frequencies corresponding to respective peak values, which are indicative of presence and distance of targets (preceding vehicles), can be detected. Taking a sum of the complex number data of the reception signals from all antenna elements will allow the noise components to average out, whereby the S/N ratio is improved.

In the case where there is one target, i.e., one preceding vehicle, as shown in FIG. 34, the Fourier transform will produce a spectrum having one peak value in a period of increasing frequency (the "ascent" period) and one peak value in a period of decreasing frequency ("the descent" period). The beat frequency of the peak value in the "ascent" period is denoted by "fu", whereas the beat frequency of the peak value in the "descent" period is denoted by "fd".

From the signal intensities of beat frequencies, the reception intensity calculation section 532 detects any signal intensity that exceeds a predefined value (threshold value), thus determining the presence of a target. Upon detecting a signal intensity peak, the reception intensity calculation section 532 outputs the beat frequencies (fu, fd) of the peak values to the distance detection section 533 and the velocity detection section 534 as the frequencies of the object of interest. The reception intensity calculation section 532 outputs information indicating the frequency modulation width Δf to the distance detection section 533, and outputs information indicating the center frequency f0 to the velocity detection section 534.

In the case where signal intensity peaks corresponding to plural targets are detected, the reception intensity calculation section 532 find associations between the ascents peak values and the descent peak values based on predefined conditions. Peaks which are determined as belonging to signals from the same target are given the same number, and thus are fed to the distance detection section 533 and the velocity detection section 534.

When there are plural targets, after the Fourier transform, as many peaks as there are targets will appear in the ascent portions and the descent portions of the beat signal. In proportion to the distance between the radar and a target, the reception signal will become more delayed and the reception signal in FIG. 33 will shift more toward the right. Therefore, a beat signal will have a greater frequency as the distant between the target and the radar increases.

Based on the beat frequencies fu and fd which are input from the reception intensity calculation section 532, the distance detection section 533 calculates a distance R through the equation below, and supplies it to the target link processing section 537.

$$R=\{c \cdot T/(2 \cdot \Delta f)\} \cdot \{(fu+fd)/2\}$$

Moreover, based on the beat frequencies fu and fd being input from the reception intensity calculation section 532, the velocity detection section 534 calculates a relative velocity V through the equation below, and supplies it to the target link processing section 537.

$$V=\{c/(2 \cdot f0)\} \cdot \{(fu-fd)/2\}$$

In the equation which calculates the distance R and the relative velocity V, c is velocity of light, and T is the modulation period.

Note that the lower limit resolution of distance R is expressed as c/(2Δf). Therefore, as Δf increases, the resolution of distance R increases. In the case where the frequency f0 is in the 76 GHz band, when Δf is set on the order of 660 megahertz (MHz), the resolution of distance R will be on the order of 0.23 meters (m), for example. Therefore, if two preceding vehicles are traveling abreast of each other, it may be difficult with the FMCW method to identify whether there is one vehicle or two vehicles. In such a case, it might be possible to run an algorithm for direction-of-arrival estimation that has an extremely high angular resolution to separate between the azimuths of the two preceding vehicles and enable detection.

By utilizing phase differences between signals from the antenna elements $11_1, 11_2, \ldots, 11_M$, the DBF processing section 535 allows the incoming complex data corresponding to the respective antenna elements, which has been Fourier transformed with respect to the time axis, to be Fourier transformed with respect to the direction in which the antenna elements are arrayed. Then, the DBF processing section 535 calculates spatial complex number data indicating the spectrum intensity for each angular channel as determined by the angular resolution, and outputs it to the azimuth detection section 536 for the respective beat frequencies.

The azimuth detection section 536 is provided for the purpose of estimating the azimuth of a preceding vehicle. Among the values of spatial complex number data that has been calculated for the respective beat frequencies, the azimuth detection section 536 chooses an angle θ that takes the largest value, and outputs it to the target link processing section 537 as the azimuth at which an object of interest exists.

Note that the method of estimating the angle θ indicating the direction of arrival of an arriving wave is not limited to this example. Various algorithms for direction-of-arrival estimation that have been mentioned earlier can be employed.

The target link processing section 537 calculates absolute values of the differences between the respective values of distance, relative velocity, and azimuth of the object of interest as calculated in the current cycle and the respective values of distance, relative velocity, and azimuth of the object of interest as calculated 1 cycle before, which are read from the memory 531. Then, if the absolute value of each difference is smaller than a value which is defined for the respective value, the target link processing section 537 determines that the target that was detected 1 cycle before and the target detected in the current cycle are an identical target. In that case, the target link processing section 537 increments the count of target link processes, which is read from the memory 531, by one.

If the absolute value of a difference is greater than predetermined, the target link processing section 537 determines that a new object of interest has been detected. The target link processing section 537 stores the respective values of distance, relative velocity, and azimuth of the object of interest as calculated in the current cycle and also the count of target link processes for that object of interest to the memory 531.

In the signal processing circuit 560, the distance to the object of interest and its relative velocity can be detected by using a spectrum which is obtained through a frequency analysis of beat signals, which are signals generated based on received reflected waves.

The matrix generation section 538 generates a spatial covariance matrix by using the respective beat signals for the channels $Ch_1$ to $Ch_M$ (lower graph in FIG. 33) stored in the memory 531. In the spatial covariance matrix of Math. 4, each component is the value of a beat signal which is expressed in terms of real and imaginary parts. The matrix generation section 538 further determines eigenvalues of the spatial covariance matrix Rxx, and inputs the resultant eigenvalue information to the arriving wave estimation unit AU.

When a plurality of signal intensity peaks corresponding to plural objects of interest have been detected, the reception intensity calculation section 532 numbers the peak values respectively in the ascent portion and in the descent portion, beginning from those with smaller frequencies first, and output them to the target output processing section 539. In the ascent and descent portions, peaks of any identical number correspond to the same object of interest. The identification numbers are to be regarded as the numbers assigned to the objects of interest. For simplicity of illustration, a leader line from the reception intensity calculation section 532 to the target output processing section 539 is conveniently omitted from FIG. 32.

When the object of interest is a structure ahead, the target output processing section 539 outputs the identification number of that object of interest as indicating a target. When receiving results of determination concerning plural objects of interest, such that all of them are structures ahead, the target output processing section 539 outputs the identification number of an object of interest that is in the lane of the driver's vehicle as the object position information indicating where a target is. Moreover, When receiving results of determination concerning plural objects of interest, such that all of them are structures ahead and that two or more objects of interest are in the lane of the driver's vehicle, the target output processing section 539 outputs the identification number of an object of interest that is associated with the largest count of target being read from the link processes memory 531 as the object position information indicating where a target is.

Referring back to FIG. 31, an example where the onboard radar system 510 is incorporated in the example construction shown in FIG. 31 will be described. The image processing circuit 720 acquires information of an object from the video, and detects target position information from the object information. For example, the image processing circuit 720 is configured to estimate distance information of an object by detecting the depth value of an object within an acquired video, or detect size information and the like of an object from characteristic amounts in the video, thus detecting position information of the object.

The selection circuit 596 selectively feeds position information which is received from the signal processing circuit 560 or the image processing circuit 720 to the travel assistance electronic control apparatus 520. For example, the selection circuit 596 compares a first distance, i.e., the distance from the driver's vehicle to a detected object as contained in the object position information from the signal processing circuit 560, against a second distance, i.e., the distance from the driver's vehicle to the detected object as contained in the object position information from the image processing circuit 720, and determines which is closer to the driver's vehicle. For example, based on the result of determination, the selection circuit 596 may select the object position information which indicates a closer distance to the driver's vehicle, and output it to the travel assistance electronic control apparatus 520. If the result of determination indicates the first distance and the second distance to be of the same value, the selection circuit 596 may output either one, or both of them, to the travel assistance electronic control apparatus 520.

If information indicating that there is no prospective target is input from the reception intensity calculation section 532, the target output processing section 539 (FIG. 32) outputs zero, indicating that there is no target, as the object position information. Then, on the basis of the object position information from the target output processing section 539, through comparison against a predefined threshold value, the selection circuit 596 chooses either the object position information from the signal processing circuit 560 or the object position information from the image processing circuit 720 to be used.

Based on predefined conditions, the travel assistance electronic control apparatus 520 having received the position information of a preceding object from the object detection apparatus 570 performs control to make the operation safer or easier for the driver who is driving the driver's vehicle, in accordance with the distance and size indicated by the object position information, the velocity of the driver's vehicle, road surface conditions such as rainfall, snowfall or clear weather, or other conditions. For example, if the object position information indicates that no object has been detected, the travel assistance electronic control apparatus 520 may send a control signal to an accelerator control circuit 526 to increase speed up to a predefined velocity, thereby controlling the accelerator control circuit 526 to make an operation that is equivalent to stepping on the accelerator pedal.

In the case where the object position information indicates that an object has been detected, if it is found to be at a predetermined distance from the driver's vehicle, the travel assistance electronic control apparatus 520 controls the brakes via a brake control circuit 524 through a brake-by-wire construction or the like. In other words, it makes an operation of decreasing the velocity to maintain a constant vehicular gap. Upon receiving the object position information, the travel assistance electronic control apparatus 520 sends a control signal to an alarm control circuit 522 so as to control lamp illumination or control audio through a loudspeaker which is provided within the vehicle, so that the driver is informed of the nearing of a preceding object. Upon receiving object position information including a spatial distribution of preceding vehicles, the travel assistance electronic control apparatus 520 may, if the traveling velocity is within a predefined range, automatically make the steering wheel easier to operate to the right or left, or control the hydraulic pressure on the steering wheel side so as to force a change in the direction of the wheels, thereby providing assistance in collision avoidance with respect to the preceding object.

The object detection apparatus 570 may be arranged so that, if a piece of object position information which was being continuously detected by the selection circuit 596 for a while in the previous detection cycle but which is not detected in the current detection cycle becomes associated with a piece of object position information from a camera-detected video indicating a preceding object, then continued tracking is chosen, and object position information from the signal processing circuit 560 is output with priority.

An example specific construction and an example operation for the selection circuit 596 to make a selection between the outputs from the signal processing circuit 560 and the image processing circuit 720 are disclosed in the specification of U.S. Pat. No. 8,446,312, the specification of U.S. Pat. No. 8,730,096, and the specification of U.S. Pat. No. 8,730,099. The entire disclosure thereof is incorporated herein by reference.

[First Variant]

In the radar system for onboard use of the above Application Example, the (sweep) condition for a single instance of FMCW (Frequency Modulated Continuous Wave) frequency modulation, i.e., a time span required for such a modulation (sweep time), is e.g. 1 millisecond, although the sweep time could be shortened to about 100 microseconds.

However, in order to realize such a rapid sweep condition, not only the constituent elements involved in the radiation of a transmission wave, but also the constituent elements involved in the reception under that sweep condition must also be able to rapidly operate. For example, an A/D converter 587 (FIG. 32) which rapidly operates under that sweep condition will be needed. The sampling frequency of the A/D converter 587 may be 10 MHz, for example. The sampling frequency may be faster than 10 MHz.

In the present variant, a relative velocity with respect to a target is calculated without utilizing any Doppler shift-based frequency component. In this variant, the sweep time is Tm=100 microseconds, which is very short. The lowest frequency of a detectable beat signal, which is 1/Tm, equals 10 kHz in this case. This would correspond to a Doppler shift of a reflected wave from a target which has a relative velocity of approximately 20 m/second. In other words, so long as one relies on a Doppler shift, it would be impossible to detect relative velocities that are equal to or smaller than this. Thus, a method of calculation which is different from a Doppler shift-based method of calculation is preferably adopted.

As an example, this variant illustrates a process that utilizes a signal (upbeat signal) representing a difference between a transmission wave and a reception wave which is obtained in an upbeat (ascent) portion where the transmission wave increases in frequency. A single sweep time of FMCW is 100 microseconds, and its waveform is a sawtooth shape which is composed only of an upbeat portion. In other words, in this variant, the signal wave which is generated by the triangular wave/CW wave generation circuit 581 has a sawtooth shape. The sweep width in frequency is 500 MHz. Since no peaks are to be utilized that are associated with Doppler shifts, the process is not one that generates an upbeat signal and a downbeat signal to utilize the peaks of both, but will rely on only one of such signals. Although a case of utilizing an upbeat signal will be illustrated herein, a similar process can also be performed by using a downbeat signal.

The A/D converter 587 (FIG. 32) samples each upbeat signal at a sampling frequency of 10 MHz, and outputs several hundred pieces of digital data (hereinafter referred to as "sampling data"). The sampling data is generated based on upbeat signals after a point in time where a reception wave is obtained and until a point in time at which a transmission wave completes transmission, for example. Note that the process may be ended as soon as a certain number of pieces of sampling data are obtained.

In this variant, 128 upbeat signals are transmitted/received in series, for each of which some several hundred pieces of sampling data are obtained. The number of upbeat signals is not limited to 128. It may be 256, or 8. An arbitrary number may be selected depending on the purpose.

The resultant sampling data is stored to the memory 531. The reception intensity calculation section 532 applies a two-dimensional fast Fourier transform (FFT) to the sampling data. Specifically, first, for each of the sampling data pieces that have been obtained through a single sweep, a first FFT process (frequency analysis process) is performed to generate a power spectrum. Next, the velocity detection section 534 performs a second FFT process for the processing results that have been collected from all sweeps.

When the reflected waves are from the same target, peak components in the power spectrum to be detected in each sweep period will be of the same frequency. On the other hand, for different targets, the peak components will differ in frequency. Through the first FFT process, plural targets that are located at different distances can be separated.

In the case where a relative velocity with respect to a target is non-zero, the phase of the upbeat signal changes slightly from sweep to sweep. In other words, through the second FFT process, a power spectrum whose elements are the data of frequency components that are associated with such phase changes will be obtained for the respective results of the first FFT process.

The reception intensity calculation section 532 extracts peak values in the second power spectrum above, and sends them to the velocity detection section 534.

The velocity detection section 534 determines a relative velocity from the phase changes. For example, suppose that a series of obtained upbeat signals undergo phase changes by every phase θ [RXd]. Assuming that the transmission wave has an average wavelength λ, this means there is a $\lambda/(4\pi/\theta)$ change in distance every time an upbeat signal is obtained. Since this change has occurred over an interval of upbeat signal transmission Tm (=100 microseconds), the relative velocity is determined to be $\{\lambda/(4\pi/\theta)\}/Tm$.

Through the above processes, a relative velocity with respect to a target as well as a distance from the target can be obtained.

[Second Variant]

The radar system 510 is able to detect a target by using a continuous wave(s) CW of one or plural frequencies. This method is especially useful in an environment where a multitude of reflected waves impinge on the radar system 510 from still objects in the surroundings, e.g., when the vehicle is in a tunnel.

The radar system 510 has an antenna array for reception purposes, including five channels of independent reception elements. In such a radar system, the azimuth-of-arrival estimation for incident reflected waves is only possible if there are four or fewer reflected waves that are simultaneously incident. In an FMCW-type radar, the number of reflected waves to be simultaneously subjected to an azimuth-of-arrival estimation can be reduced by exclusively selecting reflected waves from a specific distance. However, in an environment where a large number of still objects exist in the surroundings, e.g., in a tunnel, it is as if there were a continuum of objects to reflect radio waves; therefore, even if one narrows down on the reflected waves based on distance, the number of reflected waves may still not be equal to or smaller than four. However, any such still object in the surroundings will have an identical relative velocity with respect to the driver's vehicle, and the relative velocity will be greater than that associated with any other vehicle that is traveling ahead. On this basis, such still objects can be distinguished from any other vehicle based on the magnitudes of Doppler shifts.

Therefore, the radar system 510 performs a process of: radiating continuous waves CW of plural frequencies; and, while ignoring Doppler shift peaks that correspond to still objects in the reception signals, detecting a distance by using a Doppler shift peak(s) of any smaller shift amount(s). Unlike in the FMCW method, in the CW method, a frequency difference between a transmission wave and a reception wave is ascribable only to a Doppler shift. In other words, any peak frequency that appears in a beat signal is ascribable only to a Doppler shift.

In the description of this variant, too, a continuous wave to be used in the CW method will be referred to as a "continuous wave CW". As described above, a continuous wave CW has a constant frequency; that is, it is unmodulated.

Suppose that the radar system 510 has radiated a continuous wave CW of a frequency fp, and detected a reflected wave of a frequency fq that has been reflected off a target. The difference between the transmission frequency fp and the reception frequency fq is called a Doppler frequency, which approximates to fp−fq=2·Vr·fp/c. Herein, Vr is a relative velocity between the radar system and the target, and c is the velocity of light. The transmission frequency fp, the Doppler frequency (fp−fq), and the velocity of light c are known. Therefore, from this equation, the relative velocity Vr=(fp−fq)·c/2fp can be determined. The distance to the target is calculated by utilizing phase information as will be described later.

In order to detect a distance to a target by using continuous waves CW, a 2 frequency CW method is adopted. In the 2 frequency CW method, continuous waves CW of two frequencies which are slightly apart are radiated each for a certain period, and their respective reflected waves are acquired. For example, in the case of using frequencies in the 76 GHz band, the difference between the two frequencies would be several hundred kHz. As will be described later, it is more preferable to determine the difference between the two frequencies while taking into account the minimum distance at which the radar used is able to detect a target.

Suppose that the radar system 510 has sequentially radiated continuous waves CW of frequencies fp1 and fp2 (fp1<fp2), and that the two continuous waves CW have been reflected off a single target, resulting in reflected waves of frequencies fq1 and fq2 being received by the radar system 510.

Based on the continuous wave CW of the frequency fp1 and the reflected wave (frequency fq1) thereof, a first Doppler frequency is obtained. Based on the continuous wave CW of the frequency fp2 and the reflected wave (frequency fq2) thereof, a second Doppler frequency is obtained. The two Doppler frequencies have substantially the same value. However, due to the difference between the frequencies fp1 and fp2, the complex signals of the respective reception waves differ in phase. By utilizing this phase information, a distance (range) to the target can be calculated.

Specifically, the radar system 510 is able to determine the distance R as R=c·Δφ/4π(fp2−fp1). Herein, Δφ denotes the phase difference between two beat signals, i.e., beat signal 1 which is obtained as a difference between the continuous wave CW of the frequency fp1 and the reflected wave (frequency fq1) thereof and beat signal 2 which is obtained as a difference between the continuous wave CW of the frequency fp2 and the reflected wave (frequency fq2) thereof. The method of identifying the frequency fb1 of the beat signal 1 and the frequency fb2 of the beat signal 2 is identical to that in the aforementioned instance of a beat signal from a continuous wave CW of a single frequency.

Note that a relative velocity Vr under the 2 frequency CW method is determined as follows.

$$Vr=fb1·c/2·fp1 \text{ or } Vr=fb2·c/2·fp2$$

Moreover, the range in which a distance to a target can be uniquely identified is limited to the range defined by Rmax<c/2(fp2−fp1). The reason is that beat signals resulting from a reflected wave from any farther target would produce a Δφ which is greater than 2π, such that they are indistinguishable from beat signals associated with targets at closer positions. Therefore, it is more preferable to adjust the difference between the frequencies of the two continuous waves CW so that Rmax becomes greater than the minimum detectable distance of the radar. In the case of a radar whose minimum detectable distance is 100 m, fp2−fp1 may be made e.g. 1.0 MHz. In this case, Rmax=150 m, so that a signal from any target from a position beyond Rmax is not detected. In the case of mounting a radar which is capable of detection up to 250 m, fp2−fp1 may be made e.g. 500 kHz. In this case, Rmax=300 m, so that a signal from any target from a position beyond Rmax is not detected, either. In the case where the radar has both of an operation mode in which the minimum detectable distance is 100 m and the horizontal viewing angle is 120 degrees and an operation mode in which the minimum detectable distance is 250 m and the horizontal viewing angle is 5 degrees, it is preferable to switch the fp2−fp1 value be 1.0 MHz and 500 kHz for operation in the respective operation modes.

A detection approach is known which, by transmitting continuous waves CW at N different frequencies (where N is an integer of 3 or more), and utilizing phase information of the respective reflected waves, detects a distance to each target. Under this detection approach, distance can be properly recognized up to N−1 targets. As the processing to enable this, a fast Fourier transform (FFT) is used, for example. Given N=64 or 128, an FFT is performed for sampling data of a beat signal as a difference between a transmission signal and a reception signal for each frequency, thus obtaining a frequency spectrum (relative velocity). Thereafter, at the frequency of the CW wave, a further FFT is performed for peaks of the same frequency, thus to derive distance information.

Hereinafter, this will be described more specifically.

Figure 36:
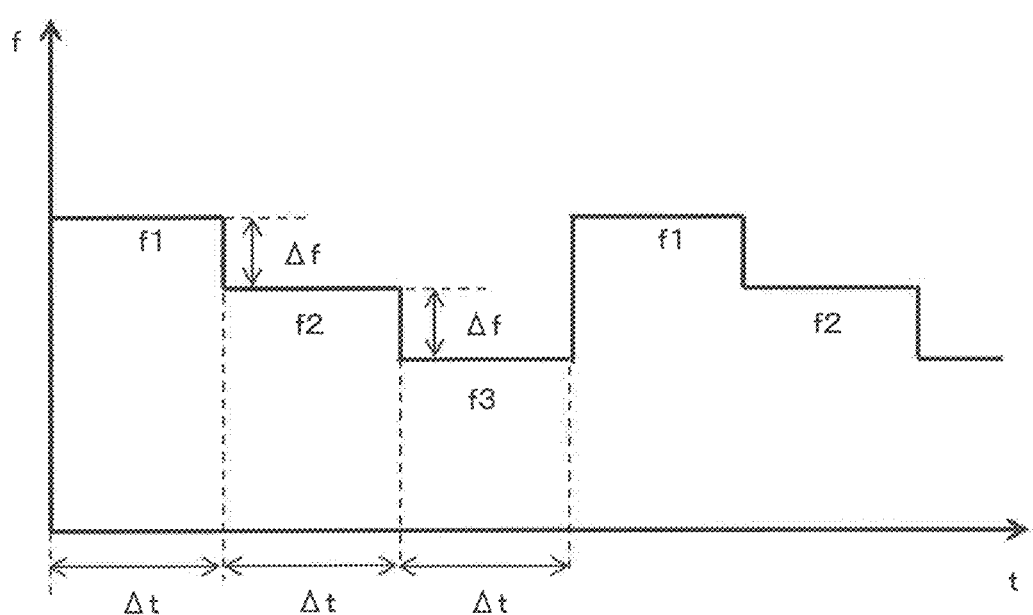
FIG. 36 is a diagram showing a relationship between three frequencies f1, f2 and f3 according to an example embodiment of the present disclosure.

For ease of explanation, first, an instance will be described where signals of three frequencies f1, f2 and f3 are transmitted while being switched over time. It is assumed that f1>f2>f3, and f1−f2=f2−f3=Δf. A transmission time Δt is assumed for the signal wave for each frequency. FIG. 36 shows a relationship between three frequencies f1, f2 and f3.

Via the transmission antenna Tx, the triangular wave/CW wave generation circuit 581 (FIG. 32) transmits continuous waves CW of frequencies f1, f2 and f3, each lasting for the time Δt. The reception antennas Rx receive reflected waves resulting by the respective continuous waves CW being reflected off one or plural targets.

Each mixer 584 mixes a transmission wave and a reception wave to generate a beat signal. The A/D converter 587 converts the beat signal, which is an analog signal, into several hundred pieces of digital data (sampling data), for example.

Using the sampling data, the reception intensity calculation section 532 performs FFT computation. Through the FFT computation, frequency spectrum information of reception signals is obtained for the respective transmission frequencies f1, f2 and f3.

Thereafter, the reception intensity calculation section 532 separates peak values from the frequency spectrum information of the reception signals. The frequency of any peak value which is predetermined or greater is in proportion to a relative velocity with respect to a target. Separating a peak value(s) from the frequency spectrum information of reception signals is synonymous with separating one or plural targets with different relative velocities.

Next, with respect to each of the transmission frequencies f1 to f3, the reception intensity calculation section 532 measures spectrum information of peak values of the same relative velocity or relative velocities within a predefined range.

Now, consider a scenario where two targets A and B exist which have about the same relative velocity but are at respectively different distances. A transmission signal of the frequency f1 will be reflected from both of targets A and B to result in reception signals being obtained. The reflected waves from targets A and B will result in substantially the same beat signal frequency. Therefore, the power spectra at the Doppler frequencies of the reception signals, corresponding to their relative velocities, are obtained as a synthetic spectrum F1 into which the power spectra of two targets A and B have been merged.

Similarly, for each of the frequencies f2 and f3, the power spectra at the Doppler frequencies of the reception signals, corresponding to their relative velocities, are obtained as a synthetic spectrum F1 into which the power spectra of two targets A and B have been merged.

Figure 37:
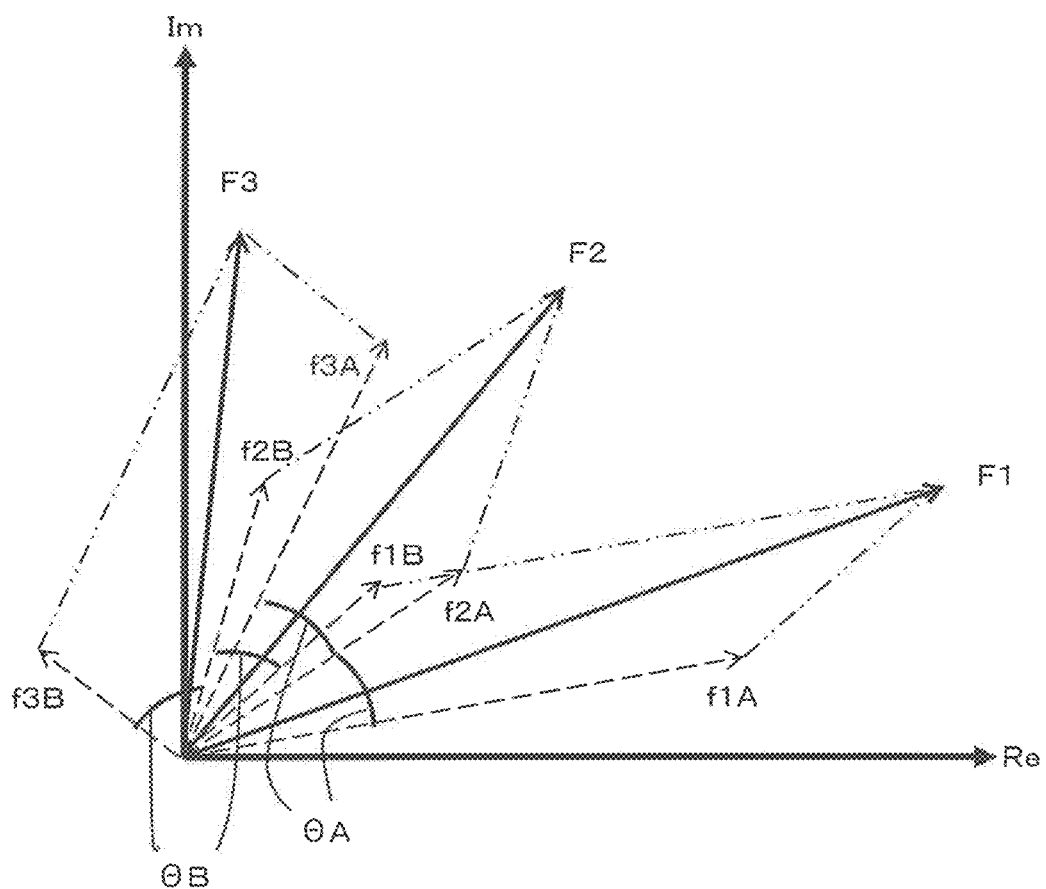
FIG. 37 is a diagram showing a relationship between synthetic spectra F1 to F3 on a complex plane according to an example embodiment of the present disclosure.

FIG. 37 shows a relationship between synthetic spectra F1 to F3 on a complex plane. In the directions of the two vectors composing each of the synthetic spectra F1 to F3, the right vector corresponds to the power spectrum of a reflected wave from target A; i.e., vectors f1A, f2A and f3A, in FIG. 37. On the other hand, in the directions of the two vectors composing each of the synthetic spectra F1 to F3, the left vector corresponds to the power spectrum of a reflected wave from target B; i.e., vectors f1B, f2B and f3B in FIG. 37.

Under a constant difference Δf between the transmission frequencies, the phase difference between the reception signals corresponding to the respective transmission signals of the frequencies f1 and f2 is in proportion to the distance to a target. Therefore, the phase difference between the vectors f1A and f2A and the phase difference between the vectors f2A and f3A are of the same value θA, this phase difference θA being in proportion to the distance to target A. Similarly, the phase difference between the vectors f1B and f2B and the phase difference between the vectors f2B and f3B are of the same value θB, this phase difference θB being in proportion to the distance to target B.

By using a well-known method, the respective distances to targets A and B can be determined from the synthetic spectra F1 to F3 and the difference Δf between the transmission frequencies. This technique is disclosed in U.S. Pat. No. 6,703,967, for example. The entire disclosure of this publication is incorporated herein by reference.

Similar processing is also applicable when the transmitted signals have four or more frequencies.

Note that, before transmitting continuous waves CW at N different frequencies, a process of determining the distance to and relative velocity of each target may be performed by the 2 frequency CW method. Then, under predetermined conditions, this process may be switched to a process of transmitting continuous waves CW at N different frequencies. For example, FFT computation may be performed by using the respective beat signals at the two frequencies, and if the power spectrum of each transmission frequency undergoes a change over time of 30% or more, the process may be switched. The amplitude of a reflected wave from each target undergoes a large change over time due to multipath influences and the like. When there exists a change of a predetermined magnitude or greater, it may be considered that plural targets may exist.

Moreover, the CW method is known to be unable to detect a target when the relative velocity between the radar system and the target is zero, i.e., when the Doppler frequency is zero. However, when a pseudo Doppler signal is determined by the following methods, for example, it is possible to detect a target by using that frequency.

(Method 1) A mixer that causes a certain frequency shift in the output of a receiving antenna is added. By using a transmission signal and a reception signal with a shifted frequency, a pseudo Doppler signal can be obtained.

(Method 2) A variable phase shifter to introduce phase changes continuously over time is inserted between the output of a receiving antenna and a mixer, thus adding a pseudo phase difference to the reception signal. By using a transmission signal and a reception signal with an added phase difference, a pseudo Doppler signal can be obtained.

An example of specific construction and operation of inserting a variable phase shifter to generate a pseudo Doppler signal under Method 2 is disclosed in Japanese Laid-Open Patent Publication No. 2004-257848. The entire disclosure of this publication is incorporated herein by reference.

When targets with zero or very little relative velocity need to be detected, the aforementioned processes of generating a pseudo Doppler signal may be adopted, or the process may be switched to a target detection process under the FMCW method.

Next, with reference to FIG. 38, a procedure of processing to be performed by the object detection apparatus 570 of the onboard radar system 510 will be described.

The example below will illustrate a case where continuous waves CW are transmitted at two different frequencies fp1 and fp2 (fp1<fp2), and the phase information of each reflected wave is utilized to respectively detect a distance with respect to a target.

Figure 38:
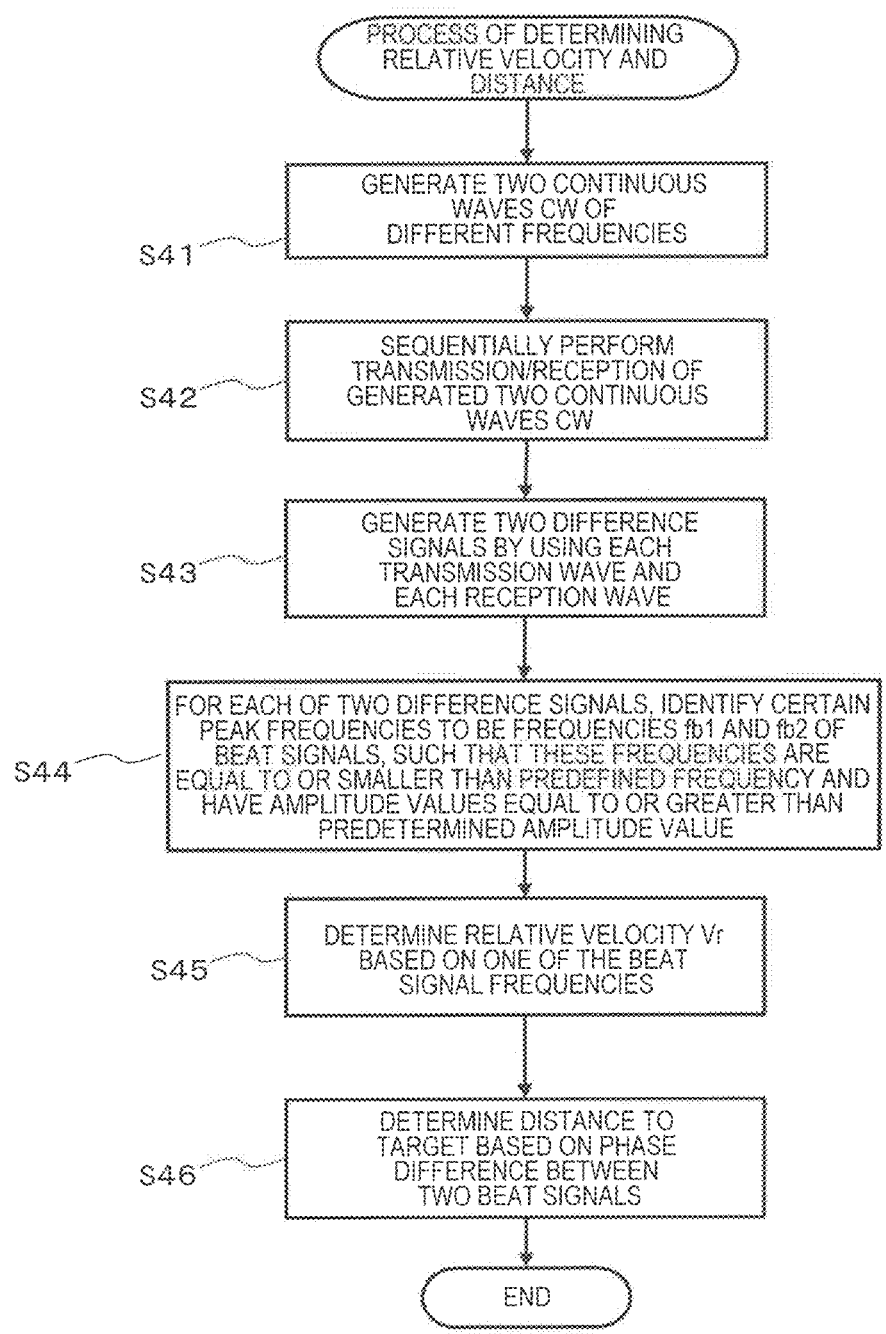
FIG. 38 is a flowchart showing the procedure of a process of determining relative velocity and distance according to an example embodiment of the present disclosure.

FIG. 38 is a flowchart showing the procedure of a process of determining relative velocity and distance according to this variant.

At step S41, the triangular wave/CW wave generation circuit 581 generates two continuous waves CW of frequencies which are slightly apart, i.e., frequencies fp1 and fp2.

At step S42, the transmission antenna Tx and the reception antennas Rx perform transmission/reception of the generated series of continuous waves CW. Note that the process of step S41 and the process of step S42 are to be performed in parallel fashion respectively by the triangular wave/CW wave generation circuit 581 and the transmission antenna Tx/reception antenna Rx, rather than step S42 following only after completion of step S41.

At step S43, each mixer 584 generates a difference signal by utilizing each transmission wave and each reception wave, whereby two difference signals are obtained. Each reception wave is inclusive of a reception wave emanating from a still object and a reception wave emanating from a target. Therefore, next, a process of identifying frequencies to be utilized as the beat signals is performed. Note that the process of step S41, the process of step S42, and the process of step S43 are to be performed in parallel fashion by the triangular wave/CW wave generation circuit 581, the transmission antenna Tx/reception antenna Rx, and the mixers 584, rather than step S42 following only after completion of step S41, or step S43 following only after completion of step S42.

At step S44, for each of the two difference signals, the object detection apparatus 570 identifies certain peak frequencies to be frequencies fb1 and fb2 of beat signals, such that these frequencies are equal to or smaller than a frequency which is predefined as a threshold value and yet they have amplitude values which are equal to or greater than a predetermined amplitude value, and that the difference between the two frequencies is equal to or smaller than a predetermined value.

At step S45, based on one of the two beat signal frequencies identified, the reception intensity calculation section 532 detects a relative velocity. The reception intensity calculation section 532 calculates the relative velocity according to Vr=fb1·c/2·fp1, for example. Note that a relative velocity may be calculated by utilizing each of the two beat signal frequencies, which will allow the reception intensity calculation section 532 to verify whether they match or not, thus enhancing the precision of relative velocity calculation.

At step S46, the reception intensity calculation section 532 determines a phase difference $\Delta\varphi$ between two beat signals 1 and 2, and determines a distance R=c·$\Delta\varphi$/4$\pi$(fp2−fp1) to the target.

Through the above processes, the relative velocity and distance to a target can be detected.

Note that continuous waves CW may be transmitted at N different frequencies (where N is 3 or more), and by utilizing phase information of the respective reflected wave, distances to plural targets which are of the same relative velocity but at different positions may be detected.

In addition to the radar system 510, the vehicle 500 described above may further include another radar system. For example, the vehicle 500 may further include a radar system having a detection range toward the rear or the sides of the vehicle body. In the case of incorporating a radar system having a detection range toward the rear of the vehicle body, the radar system may monitor the rear, and if there is any danger of having another vehicle bump into the rear, make a response by issuing an alarm, for example. In the case of incorporating a radar system having a detection range toward the sides of the vehicle body, the radar system may monitor an adjacent lane when the driver's vehicle changes its lane, etc., and make a response by issuing an alarm or the like as necessary.

The applications of the above-described radar system 510 are not limited to onboard use only. Rather, the radar system 510 may be used as sensors for various purposes. For example, it may be used as a radar for monitoring the surroundings of a house or any other building. Alternatively, it may be used as a sensor for detecting the presence or absence of a person at a specific indoor place, or whether or not such a person is undergoing any motion, etc., without utilizing any optical images.

[Supplementary Details of Processing]

Other example embodiments will be described in connection with the 2 frequency CW or FMCW techniques for array antennas as described above. As described earlier, in the example of FIG. 32, the reception intensity calculation section 532 applies a Fourier transform to the respective beat signals for the channels $Ch_1$ to $Ch_M$ (lower graph in FIG. 33) stored in the memory 531. These beat signals are complex signals, in order that the phase of the signal of computational interest be identified. This allows the direction of an arriving wave to be accurately identified. In this case, however, the computational load for Fourier transform increases, thus calling for a larger-scaled circuit.

In order to solve this problem, a scalar signal may be generated as a beat signal. For each of a plurality of beat signals that have been generated, two complex Fourier transforms may be performed with respect to the spatial axis direction, which conforms to the antenna array, and to the time axis direction, which conforms to the lapse of time, thus to obtain results of frequency analysis. As a result, with only a small amount of computation, beam formation can eventually be achieved so that directions of arrival of reflected waves can be identified, whereby results of frequency analysis can be obtained for the respective beams. As a patent document related to the present disclosure, the entire disclosure of the specification of U.S. Pat. No. 6,339,395 is incorporated herein by reference.

[Optical Sensor, e.g., Camera, and Millimeter Wave Radar]

Next, a comparison between the above-described array antenna and conventional antennas, as well as an example application in which both of the present array antenna and an optical sensor (e.g., a camera) are utilized, will be described. Note that LIDAR or the like may be employed as the optical sensor.

A millimeter wave radar is able to directly detect a distance (range) to a target and a relative velocity thereof. Another characteristic is that its detection performance is not much deteriorated in the nighttime (including dusk), or in bad weather, e.g., rainfall, fog, or snowfall. On the other hand, it is believed that it is not just as easy for a millimeter wave radar to take a two-dimensional grasp of a target as it is for a camera. On the other hand, it is relatively easy for a camera to take a two-dimensional grasp of a target and recognize its shape. However, a camera may not be able to image a target in nighttime or bad weather, which presents a considerable problem. This problem is particularly outstanding when droplets of water have adhered to the portion through which to ensure lighting, or the eyesight is narrowed by a fog. This problem similarly exists for LIDAR or the like, which also pertains to the realm of optical sensors.

In these years, in answer to increasing demand for safer vehicle operation, driver assist systems for preventing collisions or the like are being developed. A driver assist system acquires an image in the direction of vehicle travel with a sensor such as a camera or a millimeter wave radar, and when any obstacle is recognized that is predicted to hinder vehicle travel, brakes or the like are automatically applied to prevent collisions or the like. Such a function of collision avoidance is expected to operate normally, even in nighttime or bad weather.

Hence, driver assist systems of a so-called fusion construction are gaining prevalence, where, in addition to a conventional optical sensor such as a camera, a millimeter wave radar is mounted as a sensor, thus realizing a recognition process that takes advantage of both. Such a driver assist system will be discussed later.

On the other hand, higher and higher functions are being required of the millimeter wave radar itself. A millimeter wave radar for onboard use mainly uses electromagnetic waves of the 76 GHz band. The antenna power of its antenna is restricted to below a certain level under each country's law or the like. For example, it is restricted to 0.01 W or below in Japan. Under such restrictions, a millimeter wave radar for onboard use is expected to satisfy the required performance that, for example, its detection range is 200 m or more; the antenna size is 60 mm×60 mm or less; its horizontal detection angle is 90 degrees or more; its range resolution is 20 cm or less; it is capable of short-range detection within 10 m; and so on. Conventional millimeter wave radars have used microstrip lines as waveguides, and patch antennas as antennas (hereinafter, these will both be referred to as "patch antennas"). However, with a patch antenna, it has been difficult to attain the aforementioned performance.

By using a slot array antenna to which the technique of the present disclosure is applied, the inventors have successfully achieved the aforementioned performance. As a result, a millimeter wave radar has been realized which is smaller in size, more efficient, and higher-performance than are conventional patch antennas and the like. In addition, by combining this millimeter wave radar and an optical sensor such as a camera, a small-sized, highly efficient, and high-performance fusion apparatus has been realized which has existed never before. This will be described in detail below.

Figure 39:
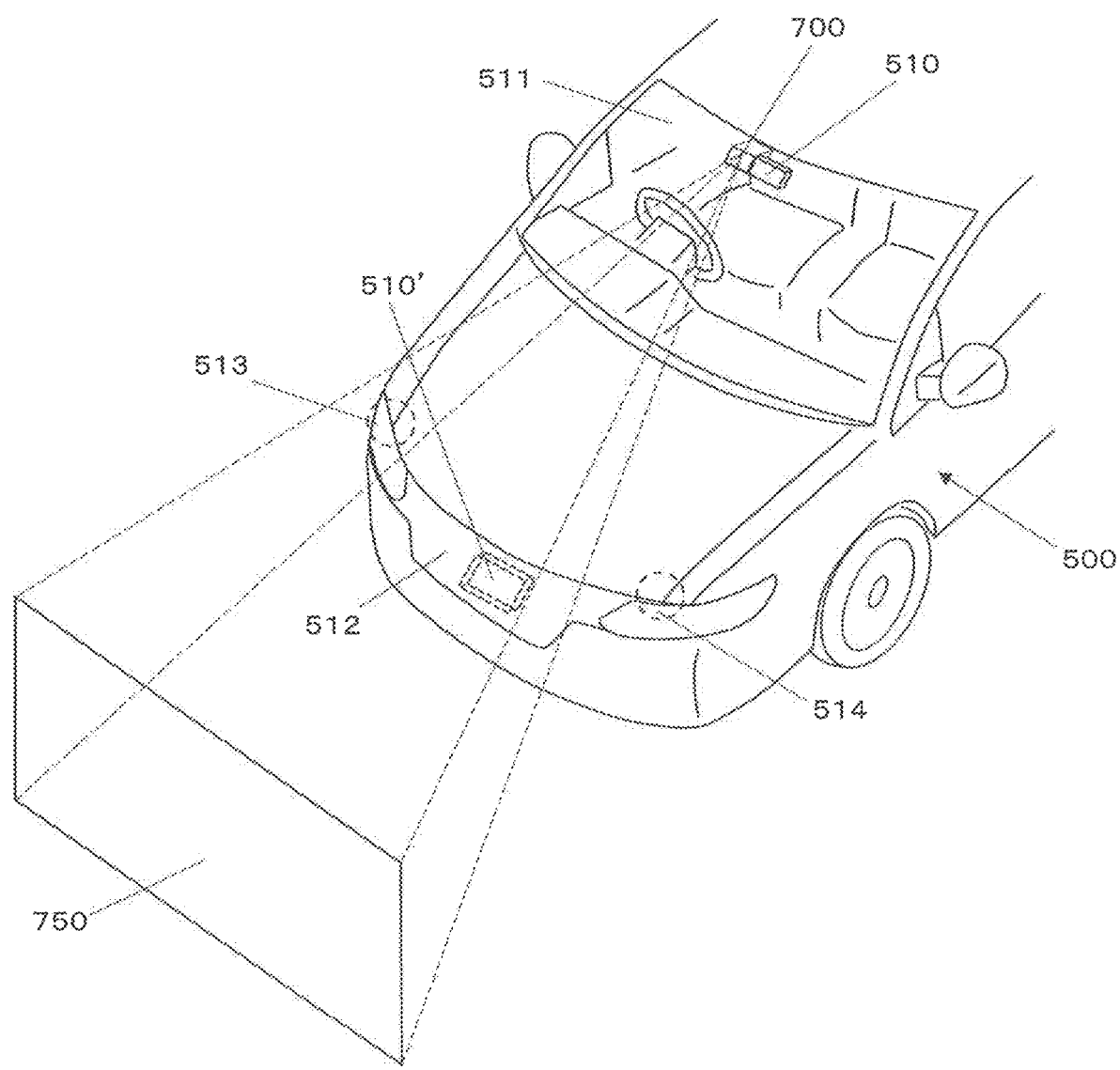
FIG. 39 is a diagram concerning a fusion apparatus in which a radar system 510 according to an example embodiment of the present disclosure including a slot array antenna and an onboard camera system 700 are included.

FIG. 39 is a diagram concerning a fusion apparatus in a vehicle 500, the fusion apparatus including an onboard camera system 700 and a radar system 510 (hereinafter referred to also as the millimeter wave radar 510) having a slot array antenna to which the technique of the present disclosure is applied. With reference to this figure, various example embodiments will be described below.

[Installment of Millimeter Wave Radar within Vehicle Room]

A conventional patch antenna-based millimeter wave radar 510' is placed behind and inward of a grill 512 which is at the front nose of a vehicle. An electromagnetic wave that is radiated from an antenna goes through the apertures in the grill 512, and is radiated ahead of the vehicle 500. In this case, no dielectric layer, e.g., glass, exists that decays or reflects electromagnetic wave energy, in the region through which the electromagnetic wave passes. As a result, an electromagnetic wave that is radiated from the patch antenna-based millimeter wave radar 510' reaches over a long range, e.g., to a target which is 150 m or farther away. By receiving with the antenna the electromagnetic wave reflected therefrom, the millimeter wave radar 510' is able to detect a target. In this case, however, since the antenna is placed behind and inward of the grill 512 of the vehicle, the radar may be broken when the vehicle collides into an obstacle. Moreover, it may be soiled with mud or the like in rain, etc., and the soil that has adhered to the antenna may hinder radiation and reception of electromagnetic waves.

Similarly to the conventional manner, the millimeter wave radar 510 incorporating a slot array antenna according to an example embodiment of the present disclosure may be placed behind the grill 512, which is located at the front nose of the vehicle (not shown). This allows the energy of the electromagnetic wave to be radiated from the antenna to be utilized by 100%, thus enabling long-range detection beyond the conventional level, e.g., detection of a target which is at a distance of 250 m or more.

Furthermore, the millimeter wave radar 510 according to an example embodiment of the present disclosure can also be placed within the vehicle room, i.e., inside the vehicle. In that case, the millimeter wave radar 510 is placed inward of the windshield 511 of the vehicle, to fit in a space between the windshield 511 and a face of the rearview mirror (not shown) that is opposite to its specular surface. On the other hand, the conventional patch antenna-based millimeter wave radar 510' cannot be placed inside the vehicle room mainly for the two following reasons. A first reason is its large size, which prevents itself from being accommodated within the space between the windshield 511 and the rearview mirror. A second reason is that an electromagnetic wave that is radiated ahead reflects off the windshield 511 and decays due to dielectric loss, thus becoming unable to travel the desired distance. As a result, if a conventional patch antenna-based millimeter wave radar is placed within the vehicle room, only targets which are 100 m ahead or less can be detected, for example. On the other hand, a millimeter wave radar according to an example embodiment of the present disclosure is able to detect a target which is at a distance of 200 m or more, despite reflection or decay at the windshield 511. This performance is equivalent to, or even greater than, the case where a conventional patch antenna-based millimeter wave radar is placed outside the vehicle room.

[Fusion Construction Based on Millimeter Wave Radar and Camera, Etc., being Placed within Vehicle Room]

Currently, an optical imaging device such as a CCD camera is used as the main sensor in many a driver assist system (Driver Assist System). Usually, a camera or the like is placed within the vehicle room, inward of the windshield 511, in order to account for unfavorable influences of the external environment, etc. In this context, in order to minimize the optical effect of raindrops and the like, the camera or the like is placed in a region which is swept by the wipers (not shown) but is inward of the windshield 511.

In recent years, due to needs for improved performance of a vehicle in terms of e.g. automatic braking, there has been a desire for automatic braking or the like that is guaranteed to work regardless of whatever external environment may exist. In this case, if the only sensor in the driver assist system is an optical device such as a camera, a problem exists in that reliable operation is not guaranteed in nighttime or bad weather. This has led to the need for a driver assist system that incorporates not only an optical sensor (such as a camera) but also a millimeter wave radar, these being used for cooperative processing, so that reliable operation is achieved even in nighttime or bad weather.

As described earlier, a millimeter wave radar incorporating the present slot array antenna permits itself to be placed within the vehicle room, due to downsizing and remarkable enhancement in the efficiency of the radiated electromagnetic wave over that of a conventional patch antenna. By taking advantage of these properties, as shown in FIG. 39, the millimeter wave radar 510, which incorporates not only an optical sensor (onboard camera system) 700 such as a camera but also a slot array antenna according to the present disclosure, allows both to be placed inward of the windshield 511 of the vehicle 500. This has created the following novel effects.

(1) It is easier to install the driver assist system on the vehicle 500. The conventional patch antenna-based millimeter wave radar 510' has required a space behind the grill 512, which is at the front nose, in order to accommodate the radar. Since this space may include some sites that affect the structural design of the vehicle, if the size of the radar device is changed, it may have been necessary to reconsider the structural design. This inconvenience is avoided by placing the millimeter wave radar within the vehicle room.

Figure 40:
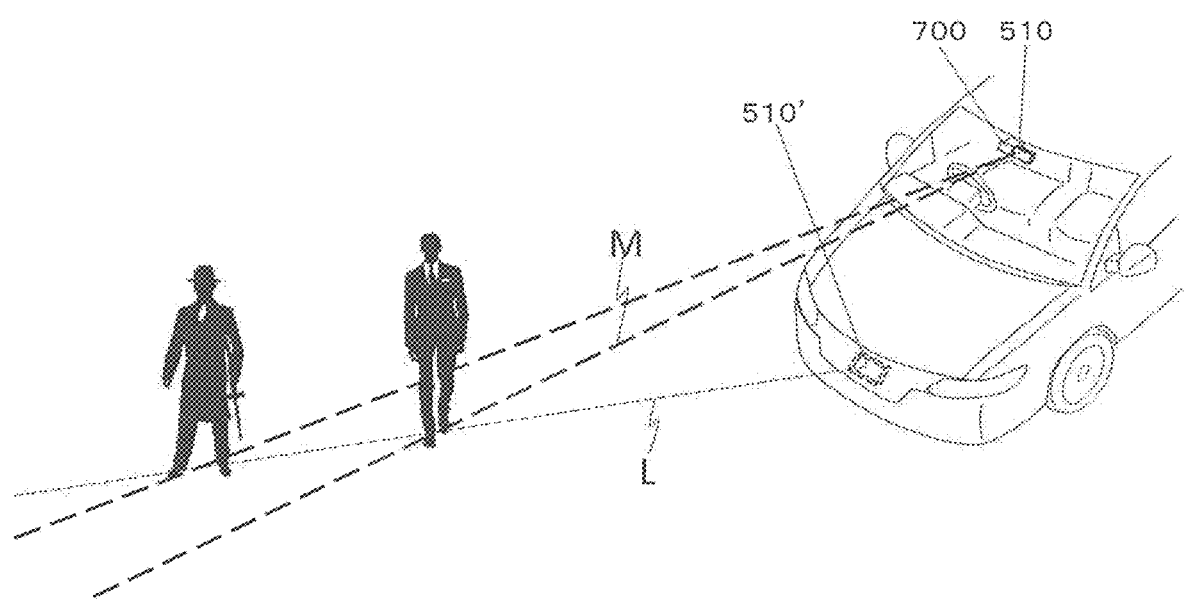
FIG. 40 is a diagram illustrating how placing a millimeter wave radar 510 and a camera at substantially the same position within the vehicle room may allow them to acquire an identical field of view and line of sight, thus facilitating a matching process.

(2) Free from the influences of rain, nighttime, or other external environment factors to the vehicle, more reliable operation can be achieved. Especially, as shown in FIG. 40, by placing the millimeter wave radar (onboard camera system) 510 and the onboard camera system 700 at substantially the same position within the vehicle room, they can attain an identical field of view and line of sight, thus facilitating the "matching process" which will be described later, i.e., a process through which to establish that respective pieces of target information captured by them actually come from an identical object. On the other hand, if the millimeter wave radar 510' were placed behind the grill 512, which is at the front nose outside the vehicle room, its radar line of sight L would differ from a radar line of sight M of the case where it was placed within the vehicle room, thus resulting in a large offset with the image to be acquired by the onboard camera system 700.

(3) Reliability of the millimeter wave radar device is improved. As described above, since the conventional patch antenna-based millimeter wave radar 510' is placed behind the grill 512, which is at the front nose, it is likely to gather soil, and may be broken even in a minor collision accident or the like. For these reasons, cleaning and functionality checks are always needed. Moreover, as will be described below, if the position or direction of attachment of the millimeter wave radar becomes shifted due to an accident or the like, it is necessary to reestablish alignment with respect to the camera. The chances of such occurrences are reduced by placing the millimeter wave radar within the vehicle room, whereby the aforementioned inconveniences are avoided.

In a driver assist system of such fusion construction, the optical sensor, e.g., a camera, and the millimeter wave radar 510 incorporating the present slot array antenna may have an integrated construction, i.e., being in fixed position with respect to each other. In that case, certain relative positioning should be kept between the optical axis of the optical sensor such as a camera and the directivity of the antenna of the millimeter wave radar, as will be described later. When this driver assist system having an integrated construction is fixed within the vehicle room of the vehicle 500, the optical axis of the camera, etc., should be adjusted so as to be oriented in a certain direction ahead of the vehicle. For these matters, see the specification of US Patent Application Publication No. 2015/0264230, the specification of US Patent Application Publication No. 2016/0264065, U.S. patent application Ser. No. 15/248,141, U.S. patent application Ser. No. 15/248,149, and U.S. patent application Ser. No. 15/248,156, which are incorporated herein by reference. Related techniques concerning the camera are described in the specification of U.S. Pat. No. 7,355,524, and the specification of U.S. Pat. No. 7,420,159, the entire disclosure of each which is incorporated herein by reference.

Regarding placement of an optical sensor such as a camera and a millimeter wave radar within the vehicle room, see, for example, the specification of U.S. Pat. No. 8,604,968, the specification of U.S. Pat. No. 8,614,640, and the specification of U.S. Pat. No. 7,978,122, the entire disclosure of each which is incorporated herein by reference. However, at the time when these patents were filed for, only conventional antennas with patch antennas were the known millimeter wave radars, and thus observation was not possible over sufficient distances. For example, the distance that is observable with a conventional millimeter wave radar is considered to be at most 100 m to 150 m. Moreover, when a millimeter wave radar is placed inward of the windshield, the large radar size inconveniently blocks the driver's field of view, thus hindering safe driving. On the other hand, a millimeter wave radar incorporating a slot array antenna according to an example embodiment of the present disclosure is capable of being placed within the vehicle room because of its small size and remarkable enhancement in the efficiency of the radiated electromagnetic wave over that of a conventional patch antenna. This enables a long-range observation over 200 m, while not blocking the driver's field of view.

[Adjustment of Position of Attachment Between Millimeter Wave Radar and Camera, Etc.,]

In the processing under fusion construction (which hereinafter may be referred to as a "fusion process"), it is desired that an image which is obtained with a camera or the like and the radar information which is obtained with the millimeter wave radar map onto the same coordinate system because, if they differ as to position and target size, cooperative processing between both will be hindered.

This involves adjustment from the following three standpoints.

(1) The optical axis of the camera or the like and the antenna directivity of the millimeter wave radar must have a certain fixed relationship.

It is required that the optical axis of the camera or the like and the antenna directivity of the millimeter wave radar are matched. Alternatively, a millimeter wave radar may include two or more transmission antennas and two or more reception antennas, the directivities of these antennas being intentionally made different. Therefore, it is necessary to guarantee that at least a certain known relationship exists between the optical axis of the camera or the like and the directivities of these antennas.

In the case where the camera or the like and the millimeter wave radar have the aforementioned integrated construction, i.e., being in fixed position to each other, the relative positioning between the camera or the like and the millimeter wave radar stays fixed. Therefore, the aforementioned requirements are satisfied with respect to such an integrated construction. On the other hand, in a conventional patch antenna or the like, where the millimeter wave radar is placed behind the grill 512 of the vehicle 500, the relative positioning between them is usually to be adjusted according to (2) below.

(2) A certain fixed relationship exists between an image acquired with the camera or the like and radar information of the millimeter wave radar in an initial state (e.g., upon shipment) of having been attached to the vehicle.

The positions of attachment of the optical sensor such as a camera and the millimeter wave radar 510 or 510' on the vehicle 500 will finally be determined in the following manner. At a predetermined position 800 ahead of the vehicle 500, a chart to serve as a reference or a target which is subject to observation by the radar (which will hereinafter be referred to as, respectively, a "reference chart" and a "reference target", and collectively as the "benchmark") is accurately positioned. This is observed with an optical sensor such as a camera or with the millimeter wave radar 510. The observation information regarding the observed benchmark is compared against previously-stored shape information or the like of the benchmark, and the current offset information is quantitated. Based on this offset information, by at least one of the following means, the positions of attachment of an optical sensor such as a camera and the millimeter wave radar 510 or 510' are adjusted or corrected. Any other means may also be employed that can provide similar results.

(i) Adjust the positions of attachment of the camera and the millimeter wave radar so that the benchmark will come at a midpoint between the camera and the millimeter wave radar. This adjustment may be done by using a jig or tool, etc., which is separately provided.

(ii) Determine an offset amounts of the camera and the axis/directivity of the millimeter wave radar relative to the benchmark, and through image processing of the camera image and radar processing, correct for these offset amounts in the directivity.

What is to be noted is that, in the case where the optical sensor such as a camera and the millimeter wave radar 510 incorporating a slot array antenna according to an example embodiment of the present disclosure have an integrated construction, i.e., being in fixed position to each other, adjusting an offset of either the camera or the radar with respect to the benchmark will make the offset amount known for the other as well, thus making it unnecessary to check for the other's offset with respect to the benchmark.

Specifically, with respect to the onboard camera system 700, a reference chart may be placed at a predetermined position 750, and an image taken by the camera is compared against advance information indicating where in the field of view of the camera the reference chart image is supposed to be located, thereby detecting an offset amount. Based on this, the camera is adjusted by at least one of the above means (i) and (ii). Next, the offset amount which has been ascertained for the camera is translated into an offset amount of the millimeter wave radar. Thereafter, an offset amount adjustment is made with respect to the radar information, by at least one of the above means (i) and (ii).

Alternatively, this may be performed on the basis of the millimeter wave radar 510. In other words, with respect to the millimeter wave radar 510, a reference target may be placed at a predetermined position 800, and the radar information thereof is compared against advance information indicating where in the field of view of the millimeter wave radar 510 the reference target is supposed to be located, thereby detecting an offset amount. Based on this, the millimeter wave radar 510 is adjusted by at least one of the above means (i) and (ii). Next, the offset amount which has been ascertained for the millimeter wave radar is translated into an offset amount of the camera. Thereafter, an offset amount adjustment is made with respect to the image information obtained by the camera, by at least one of the above means (i) and (ii).

(3) Even after an initial state of the vehicle, a certain relationship is maintained between an image acquired with the camera or the like and radar information of the millimeter wave radar.

Usually, an image acquired with the camera or the like and radar information of the millimeter wave radar are supposed to be fixed in the initial state, and hardly vary unless in an accident of the vehicle or the like. However, if an offset in fact occurs between these, an adjustment is possible by the following means.

The camera is attached in such a manner that portions 513 and 514 (characteristic points) that are characteristic of the driver's vehicle fit within its field of view, for example. The positions at which these characteristic points are actually imaged by the camera are compared against the information of the positions to be assumed by these characteristic points when the camera is attached accurately in place, and an offset amount(s) is detected therebetween. Based on this detected offset amount(s), the position of any image that is taken thereafter may be corrected, whereby an offset of the physical position of attachment of the camera can be corrected for. If this correction sufficiently embodies the performance that is required of the vehicle, then the adjustment per the above (2) may not be needed. By regularly performing this adjustment during startup or operation of the vehicle 500, even if an offset of the camera or the like occurs anew, it is possible to correct for the offset amount, thus helping safe travel.

However, this means is generally considered to result in poorer accuracy of adjustment than with the above means (2). When making an adjustment based on an image which is obtained by imaging a benchmark with the camera, the azimuth of the benchmark can be determined with a high precision, whereby a high accuracy of adjustment can be easily achieved. However, since this means utilizes a part of the vehicle body for the adjustment instead of a benchmark, it is rather difficult to enhance the accuracy of azimuth determination. Thus, the resultant accuracy of adjustment will be somewhat inferior. However, it may still be effective as a means of correction when the position of attachment of the camera or the like is considerably altered for reasons such as an accident or a large external force being applied to the camera or the like within the vehicle room, etc.

[Mapping of Target as Detected by Millimeter Wave Radar and Camera or the Like: Matching Process]

In a fusion process, for a given target, it needs to be established that an image thereof which is acquired with a camera or the like and radar information which is acquired with the millimeter wave radar pertain to "the same target". For example, suppose that two obstacles (first and second obstacles), e.g., two bicycles, have appeared ahead of the vehicle 500. These two obstacles will be captured as camera images, and detected as radar information of the millimeter wave radar. At this time, the camera image and the radar information with respect to the first obstacle need to be mapped to each other so that they are both directed to the same target. Similarly, the camera image and the radar information with respect to the second obstacle need to be mapped to each other so that they are both directed to the same target. If the camera image of the first obstacle and the radar information of the second obstacle are mistakenly recognized to pertain to an identical object, a considerable accident may occur. Hereinafter, in the present specification, such a process of determining whether a target in the camera image and a target in the radar image pertain to the same target may be referred to as a "matching process".

This matching process may be implemented by various detection devices (or methods) described below. Hereinafter, these will be specifically described. Note that the each of the following detection devices is to be installed in the vehicle, and at least includes a millimeter wave radar detection section, an image detection section (e.g., a camera) which is oriented in a direction overlapping the direction of detection by the millimeter wave radar detection section, and a matching section. Herein, the millimeter wave radar detection section includes a slot array antenna according to any of the example embodiments of the present disclosure, and at least acquires radar information in its own field of view. The image acquisition section at least acquires image information in its own field of view. The matching section includes a processing circuit which matches a result of detection by the millimeter wave radar detection section against a result of detection by the image detection section to determine whether or not the same target is being detected by the two detection sections. Herein, the image detection section may be composed of a selected one of, or selected two or more of, an optical camera, LIDAR, an infrared radar, and an ultrasonic radar. The following detection devices differ from one another in terms of the detection process at their respective matching section.

In a first detection device, the matching section performs two matches as follows. A first match involves, for a target of interest that has been detected by the millimeter wave radar detection section, obtaining distance information and lateral position information thereof, and also finding a target that is the closest to the target of interest among a target or two or more targets detected by the image detection section, and detecting a combination(s) thereof. A second match involves, for a target of interest that has been detected by the image detection section, obtaining distance information and lateral position information thereof, and also finding a target that is the closest to the target of interest among a target or two or more targets detected by the millimeter wave radar detection section, and detecting a combination(s) thereof. Furthermore, this matching section determines whether there is any matching combination between the combination(s) of such targets as detected by the millimeter wave radar detection section and the combination(s) of such targets as detected by the image detection section. Then, if there is any matching combination, it is determined that the same object is being detected by the two detection sections. In this manner, a match is attained between the respective targets that have been detected by the millimeter wave radar detection section and the image detection section.

A related technique is described in the specification of U.S. Pat. No. 7,358,889, the entire disclosure of which is incorporated herein by reference. In this publication, the image detection section is illustrated by way of a so-called stereo camera that includes two cameras. However, this technique is not limited thereto. In the case where the image detection section includes a single camera, detected targets may be subjected to an image recognition process or the like as appropriate, in order to obtain distance information and lateral position information of the targets. Similarly, a laser sensor such as a laser scanner may be used as the image detection section.

In a second detection device, the matching section matches a result of detection by the millimeter wave radar detection section and a result of detection by the image detection section every predetermined period of time. If the matching section determines that the same target was being detected by the two detection sections in the previous result of matching, it performs a match by using this previous result of matching. Specifically, the matching section matches a target which is currently detected by the millimeter wave radar detection section and a target which is currently detected by the image detection section, against the target which was determined in the previous result of matching to be being detected by the two detection sections. Then, based on the result of matching for the target which is currently detected by the millimeter wave radar detection section and the result of matching for the target which is currently detected by the image detection section, the matching section determines whether or not the same target is being detected by the two detection sections. Thus, rather than directly matching the results of detection by the two detection sections, this detection device performs a chronological match between the two results of detection and a previous result of matching. Therefore, the accuracy of detection is improved over the case of only performing a momentary match, whereby stable matching is realized. In particular, even if the accuracy of the detection section drops momentarily, matching is still possible because of utilizing past results of matching. Moreover, by utilizing the previous result of matching, this detection device is able to easily perform a match between the two detection sections.

In the current match which utilizes the previous result of matching, if the matching section of this detection device determines that the same object is being detected by the two detection sections, then the matching section of this detection device excludes this determined object in performing matching between objects which are currently detected by the millimeter wave radar detection section and objects which are currently detected by the image detection section. Then, this matching section determines whether there exists any identical object that is currently detected by the two detection sections. Thus, while taking into account the result of chronological matching, the detection device also makes a momentary match based on two results of detection that are obtained from moment to moment. As a result, the detection device is able to surely perform a match for any object that is detected during the current detection.

A related technique is described in the specification of U.S. Pat. No. 7,417,580, the entire disclosure of which is incorporated herein by reference. In this publication, the image detection section is illustrated by way of a so-called stereo camera that includes two cameras. However, this technique is not limited thereto. In the case where the image detection section includes a single camera, detected targets may be subjected to an image recognition process or the like as appropriate, in order to obtain distance information and lateral position information of the targets. Similarly, a laser sensor such as a laser scanner may be used as the image detection section.

In a third detection device, the two detection sections and matching section perform detection of targets and performs matches therebetween at predetermined time intervals, and the results of such detection and the results of such matching are chronologically stored to a storage medium, e.g., memory. Then, based on a rate of change in the size of a target in the image as detected by the image detection section, and on a distance to a target from the driver's vehicle and its rate of change (relative velocity with respect to the driver's vehicle) as detected by the millimeter wave radar detection section, the matching section determines whether the target which has been detected by the image detection section and the target which has been detected by the millimeter wave radar detection section are an identical object.

When determining that these targets are an identical object, based on the position of the target in the image as detected by the image detection section, and on the distance to the target from the driver's vehicle and/or its rate of change as detected by the millimeter wave radar detection section, the matching section predicts a possibility of collision with the vehicle.

A related technique is described in the specification of U.S. Pat. No. 6,903,677, the entire disclosure of which is incorporated herein by reference.

As described above, in a fusion process of a millimeter wave radar and an imaging device such as a camera, an image which is obtained with the camera or the like and radar information which is obtained with the millimeter wave radar are matched against each other. A millimeter wave radar incorporating the aforementioned array antenna according to an example embodiment of the present disclosure can be constructed so as to have a small size and high performance. Therefore, high performance and downsizing, etc., can be achieved for the entire fusion process including the aforementioned matching process. This improves the accuracy of target recognition, and enables safer travel control for the vehicle.

[Other Fusion Processes]

In a fusion process, various functions are realized based on a matching process between an image which is obtained with a camera or the like and radar information which is obtained with the millimeter wave radar detection section. Examples of processing apparatuses that realize representative functions of a fusion process will be described below.

Each of the following processing apparatuses is to be installed in a vehicle, and at least includes: a millimeter wave radar detection section to transmit or receive electromagnetic waves in a predetermined direction; an image acquisition section, such as a monocular camera, that has a field of view overlapping the field of view of the millimeter wave radar detection section; and a processing section which obtains information therefrom to perform target detection and the like. The millimeter wave radar detection section acquires radar information in its own field of view. The image acquisition section acquires image information in its own field of view. A selected one, or selected two or more of, an optical camera, LIDAR, an infrared radar, and an ultrasonic radar may be used as the image acquisition section. The processing section can be implemented by a processing circuit which is connected to the millimeter wave radar detection section and the image acquisition section. The following processing apparatuses differ from one another with respect to the content of processing by this processing section.

In a first processing apparatus, the processing section extracts, from an image which is captured by the image acquisition section, a target which is recognized to be the same as the target which is detected by the millimeter wave radar detection section. In other words, a matching process according to the aforementioned detection device is performed. Then, it acquires information of a right edge and a left edge of the extracted target image, and derives locus approximation lines, which are straight lines or predetermined curved lines for approximating loci of the acquired right edge and the left edge, are derived for both edges. The edge which has a larger number of edges existing on the locus approximation line is selected as a true edge of the target. The lateral position of the target is derived on the basis of the position of the edge that has been selected as a true edge. This permits a further improvement on the accuracy of detection of a lateral position of the target.

A related technique is described in the specification of U.S. Pat. No. 8,610,620, the entire disclosure of which is incorporated herein by reference.

In a second processing apparatus, in determining the presence of a target, the processing section alters a determination threshold to be used in checking for a target presence in radar information, on the basis of image information. Thus, if a target image that may be an obstacle to vehicle travel has been confirmed with a camera or the like, or if the presence of a target has been estimated, etc., for example, the determination threshold for the target detection by the millimeter wave radar detection section can be optimized so that more accurate target information can be obtained. In other words, if the possibility of the presence of an obstacle is high, the determination threshold is altered so that this processing apparatus will surely be activated. On the other hand, if the possibility of the presence of an obstacle is low, the determination threshold is altered so that unwanted activation of this processing apparatus is prevented. This permits appropriate activation of the system.

Furthermore in this case, based on radar information, the processing section may designate a region of detection for the image information, and estimate a possibility of the presence of an obstacle on the basis of image information within this region. This makes for a more efficient detection process.

A related technique is described in the specification of U.S. Pat. No. 7,570,198, the entire disclosure of which is incorporated herein by reference.

In a third processing apparatus, the processing section performs combined displaying where images obtained from a plurality of different imaging devices and a millimeter wave radar detection section and an image signal based on radar information are displayed on at least one display device. In this displaying process, horizontal and vertical synchronizing signals are synchronized between the plurality of imaging devices and the millimeter wave radar detection section, and among the image signals from these devices, selective switching to a desired image signal is possible within one horizontal scanning period or one vertical scanning period. This allows, on the basis of the horizontal and vertical synchronizing signals, images of a plurality of selected image signals to be displayed side by side; and, from the display device, a control signal for setting a control operation in the desired imaging device and the millimeter wave radar detection section is sent.

When a plurality of different display devices display respective images or the like, it is difficult to compare the respective images against one another. Moreover, when display devices are provided separately from the third processing apparatus itself, there is poor operability for the device. The third processing apparatus would overcome such shortcomings.

A related technique is described in the specification of U.S. Pat. No. 6,628,299 and the specification of U.S. Pat. No. 7,161,561, the entire disclosure of each of which is incorporated herein by reference.

In a fourth processing apparatus, with respect to a target which is ahead of a vehicle, the processing section instructs an image acquisition section and a millimeter wave radar detection section to acquire an image and radar information containing that target. From within such image information, the processing section determines a region in which the target is contained. Furthermore, the processing section extracts radar information within this region, and detects a distance from the vehicle to the target and a relative velocity between the vehicle and the target. Based on such information, the processing section determines a possibility that the target will collide against the vehicle. This enables an early detection of a possible collision with a target.

A related technique is described in the specification of U.S. Pat. No. 8,068,134, the entire disclosure of which is incorporated herein by reference.

In a fifth processing apparatus, based on radar information or through a fusion process which is based on radar information and image information, the processing section recognizes a target or two or more targets ahead of the vehicle. The "target" encompasses any moving entity such as other vehicles or pedestrians, traveling lanes indicated by white lines on the road, road shoulders and any still objects (including gutters, obstacles, etc.), traffic lights, pedestrian crossings, and the like that may be there. The processing section may encompass a GPS (Global Positioning System) antenna. By using a GPS antenna, the position of the driver's vehicle may be detected, and based on this position, a storage device (referred to as a map information database device) that stores road map information may be searched in order to ascertain a current position on the map. This current position on the map may be compared against a target or two or more targets that have been recognized based on radar information or the like, whereby the traveling environment may be recognized. On this basis, the processing section may extract any target that is estimated to hinder vehicle travel, find safer traveling information, and display it on a display device, as necessary, to inform the driver.

A related technique is described in the specification of U.S. Pat. No. 6,191,704, the entire disclosure of which is incorporated herein by reference.

The fifth processing apparatus may further include a data communication device (having communication circuitry) that communicates with a map information database device which is external to the vehicle. The data communication device may access the map information database device, with a period of e.g. once a week or once a month, to download the latest map information therefrom. This allows the aforementioned processing to be performed with the latest map information.

Furthermore, the fifth processing apparatus may compare between the latest map information that was acquired during the aforementioned vehicle travel and information that is recognized of a target or two or more targets based on radar information, etc., in order to extract target information (hereinafter referred to as "map update information") that is not included in the map information. Then, this map update information may be transmitted to the map information database device via the data communication device. The map information database device may store this map update information in association with the map information that is within the database, and update the current map information itself, if necessary. In performing the update, respective pieces of map update information that are obtained from a plurality of vehicles may be compared against one another to check certainty of the update.

Note that this map update information may contain more detailed information than the map information which is carried by any currently available map information database device. For example, schematic shapes of roads may be known from commonly-available map information, but it typically does not contain information such as the width of the road shoulder, the width of the gutter that may be there, any newly occurring bumps or dents, shapes of buildings, and so on. Neither does it contain heights of the roadway and the sidewalk, how a slope may connect to the sidewalk, etc. Based on conditions which are separately set, the map information database device may store such detailed information (hereinafter referred to as "map update details information") in association with the map information. Such map update details information provides a vehicle (including the driver's vehicle) with information which is more detailed than the original map information, thereby rending itself available for not only the purpose of ensuring safe vehicle travel but also some other purposes. As used herein, a "vehicle (including the driver's vehicle)" may be e.g. an automobile, a motorcycle, a bicycle, or any autonomous vehicle to become available in the future, e.g., an electric wheelchair. The map update details information is to be used when any such vehicle may travel.

(Recognition Via Neural Network)

Each of the first to fifth processing apparatuses may further include a sophisticated apparatus of recognition. The sophisticated apparatus of recognition may be provided external to the vehicle. In that case, the vehicle may include a high-speed data communication device that communicates with the sophisticated apparatus of recognition. The sophisticated apparatus of recognition may be constructed from a neural network, which may encompass so-called deep learning and the like. This neural network may include a convolutional neural network (hereinafter referred to as "CNN"), for example. A CNN, a neural network that has proven successful in image recognition, is characterized by possessing one or more sets of two layers, namely, a convolutional layer and a pooling layer.

There exists at least three kinds of information as follows, any of which may be input to a convolutional layer in the processing apparatus:

(1) information that is based on radar information which is acquired by the millimeter wave radar detection section;

(2) information that is based on specific image information which is acquired, based on radar information, by the image acquisition section; or (3) fusion information that is based on radar information and image information which is acquired by the image acquisition section, or information that is obtained based on such fusion information.

Based on information of any of the above kinds, or information based on a combination thereof, product-sum operations corresponding to a convolutional layer are performed. The results are input to the subsequent pooling layer, where data is selected according to a predetermined rule. In the case of max pooling where a maximum value among pixel values is chosen, for example, the rule may dictate that a maximum value be chosen for each split region in the convolutional layer, this maximum value being regarded as the value of the corresponding position in the pooling layer.

A sophisticated apparatus of recognition that is composed of a CNN may include a single set of a convolutional layer and a pooling layer, or a plurality of such sets which are cascaded in series. This enables accurate recognition of a target, which is contained in the radar information and the image information, that may be around a vehicle.

Related techniques are described in the U.S. Pat. No. 8,861,842, the specification of U.S. Pat. No. 9,286,524, and the specification of US Patent Application Publication No. 2016/0140424, the entire disclosure of each of which is incorporated herein by reference.

In a sixth processing apparatus, the processing section performs processing that is related to headlamp control of a vehicle. When a vehicle travels in nighttime, the driver may check whether another vehicle or a pedestrian exists ahead of the driver's vehicle, and control a beam(s) from the headlamp(s) of the driver's vehicle to prevent the driver of the other vehicle or the pedestrian from being dazzled by the headlamp(s) of the driver's vehicle. This sixth processing apparatus automatically controls the headlamp(s) of the driver's vehicle by using radar information, or a combination of radar information and an image taken by a camera or the like.

Based on radar information, or through a fusion process based on radar information and image information, the processing section detects a target that corresponds to a vehicle or pedestrian ahead of the vehicle. In this case, a vehicle ahead of a vehicle may encompass a preceding vehicle that is ahead, a vehicle or a motorcycle in the oncoming lane, and so on. When detecting any such target, the processing section issues a command to lower the beam(s) of the headlamp(s). Upon receiving this command, the control section (control circuit) which is internal to the vehicle may control the headlamp(s) to lower the beam(s) therefrom.

Related techniques are described in the specification of U.S. Pat. No. 6,403,942, the specification of U.S. Pat. No. 6,611,610, the specification of U.S. Pat. No. 8,543,277, the specification of U.S. Pat. No. 8,593,521, and the specification of U.S. Pat. No. 8,636,393, the entire disclosure of each of which is incorporated herein by reference.

According to the above-described processing by the millimeter wave radar detection section, and the above-described fusion process by the millimeter wave radar detection section and an imaging device such as a camera, the millimeter wave radar can be constructed so as to have a small size and high performance, whereby high performance and downsizing, etc., can be achieved for the radar processing or the entire fusion process. This improves the accuracy of target recognition, and enables safer travel control for the vehicle.

Application Example 2: Various Monitoring Systems (Natural Elements, Buildings, Roads, Watch, Security)

A millimeter wave radar (radar system) incorporating an array antenna according to an example embodiment of the present disclosure also has a wide range of applications in the fields of monitoring, which may encompass natural elements, weather, buildings, security, nursing care, and the like. In a monitoring system in this context, a monitoring apparatus that includes the millimeter wave radar may be installed e.g. at a fixed position, in order to perpetually monitor a subject(s) of monitoring. Regarding the given subject(s) of monitoring, the millimeter wave radar has its resolution of detection adjusted and set to an optimum value.

A millimeter wave radar incorporating an array antenna according to an example embodiment of the present disclosure is capable of detection with a radio frequency electromagnetic wave exceeding e.g. 100 GHz. As for the modulation band in those schemes which are used in radar recognition, e.g., the FMCW method, the millimeter wave radar currently achieves a wide band exceeding 4 GHz, which supports the aforementioned Ultra Wide Band (UWB). Note that the modulation band is related to the range resolution. In a conventional patch antenna, the modulation band was up to about 600 MHz, thus resulting in a range resolution of 25 cm. On the other hand, a millimeter wave radar associated with the present array antenna has a range resolution of 3.75 cm, indicative of a performance which rivals the range resolution of conventional LIDAR. Whereas an optical sensor such as LIDAR is unable to detect a target in nighttime or bad weather as mentioned above, a millimeter wave radar is always capable of detection, regardless of daytime or nighttime and irrespective of weather. As a result, a millimeter wave radar associated with the present array antenna is available for a variety of applications which were not possible with a millimeter wave radar incorporating any conventional patch antenna.

Figure 41:
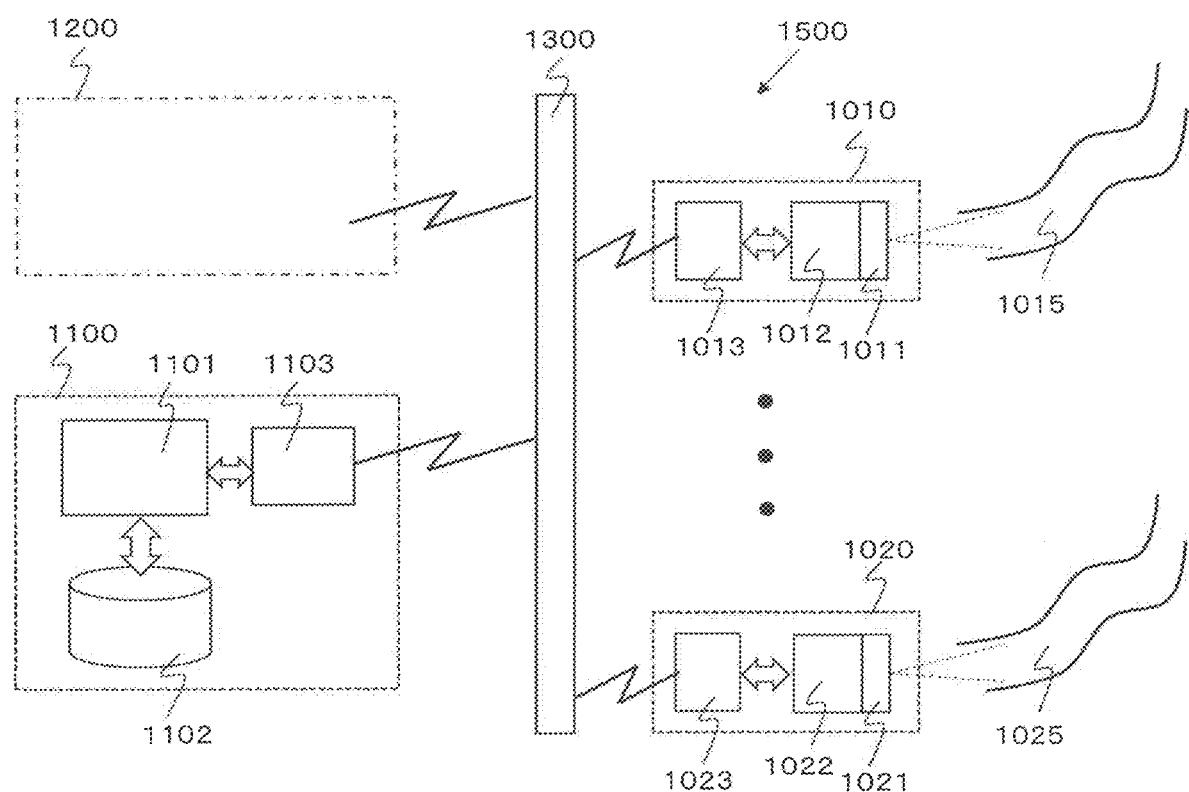
FIG. 41 is a diagram showing an example construction of a monitoring system 1500 based on millimeter wave radar according to an example embodiment of the present disclosure.

FIG. 41 is a diagram showing an example construction for a monitoring system 1500 based on millimeter wave radar. The monitoring system 1500 based on millimeter wave radar at least includes a sensor section 1010 and a main section 1100. The sensor section 1010 at least includes an antenna 1011 which is aimed at the subject of monitoring 1015, a millimeter wave radar detection section 1012 which detects a target based on a transmitted or received electromagnetic wave, and a communication section (communication circuit) 1013 which transmits detected radar information. The main section 1100 at least includes a communication section (communication circuit) 1103 which receives radar information, a processing section (processing circuit) 1101 which performs predetermined processing based on the received radar information, and a data storage section (storage medium) 1102 in which past radar information and other information that is needed for the predetermined processing, etc., are stored. Telecommunication lines 1300 exist between the sensor section 1010 and the main section 1100, via which transmission and reception of information and commands occur between them. As used herein, the telecommunication lines may encompass any of a general-purpose communications network such as the Internet, a mobile communications network, dedicated telecommunication lines, and so on, for example. Note that the present monitoring system 1500 may be arranged so that the sensor section 1010 and the main section 1100 are directly connected, rather than via telecommunication lines. In addition to the millimeter wave radar, the sensor section 1010 may also include an optical sensor such as a camera. This will permit target recognition through a fusion process which is based on radar information and image information from the camera or the like, thus enabling a more sophisticated detection of the subject of monitoring 1015 or the like.

Hereinafter, examples of monitoring systems embodying these applications will be specifically described.

[Natural Element Monitoring System]

A first monitoring system is a system that monitors natural elements (hereinafter referred to as a "natural element monitoring system"). With reference to FIG. 41, this natural element monitoring system will be described. Subjects of monitoring 1015 of the natural element monitoring system 1500 may be, for example, a river, the sea surface, a mountain, a volcano, the ground surface, or the like. For example, when a river is the subject of monitoring 1015, the sensor section 1010 being secured to a fixed position perpetually monitors the water surface of the river 1015. This water surface information is perpetually transmitted to a processing section 1101 in the main section 1100. Then, if the water surface reaches a certain height or above, the processing section 1101 informs a distinct system 1200 which separately exists from the monitoring system (e.g., a weather observation monitoring system), via the telecommunication lines 1300. Alternatively, the processing section 1101 may send information to a system (not shown) which manages the water gate, whereby the system if instructed to automatically close a water gate, etc. (not shown) which is provided at the river 1015.

The natural element monitoring system 1500 is able to monitor a plurality of sensor sections 1010, 1020, etc., with the single main section 1100. When the plurality of sensor sections are distributed over a certain area, the water levels of rivers in that area can be grasped simultaneously. This allows to make an assessment as to how the rainfall in this area may affect the water levels of the rivers, possibly leading to disasters such as floods. Information concerning this can be conveyed to the distinct system 1200 (e.g., a weather observation monitoring system) via the telecommunication lines 1300. Thus, the distinct system 1200 (e.g., a weather observation monitoring system) is able to utilize the conveyed information for weather observation or disaster prediction in a wider area.

The natural element monitoring system 1500 is also similarly applicable to any natural element other than a river. For example, the subject of monitoring of a monitoring system that monitors tsunamis or storm surges is the sea surface level. It is also possible to automatically open or close the water gate of a seawall in response to a rise in the sea surface level. Alternatively, the subject of monitoring of a monitoring system that monitors landslides to be caused by rainfall, earthquakes, or the like may be the ground surface of a mountainous area, etc.

[Traffic Monitoring System]

A second monitoring system is a system that monitors traffic (hereinafter referred to as a "traffic monitoring system"). The subject of monitoring of this traffic monitoring system may be, for example, a railroad crossing, a specific railroad, an airport runway, a road intersection, a specific road, a parking lot, etc.

For example, when the subject of monitoring is a railroad crossing, the sensor section 1010 is placed at a position where the inside of the crossing can be monitored. In this case, in addition to the millimeter wave radar, the sensor section 1010 may also include an optical sensor such as a camera, which will allow a target (subject of monitoring) to be detected from more perspectives, through a fusion process based on radar information and image information. The target information which is obtained with the sensor section 1010 is sent to the main section 1100 via the telecommunication lines 1300. The main section 1100 collects other information (e.g., train schedule information) that may be needed in a more sophisticated recognition process or control, and issues necessary control instructions or the like based thereon. As used herein, a necessary control instruction may be, for example, an instruction to stop a train when a person, a vehicle, etc. is found inside the crossing when it is closed.

If the subject of monitoring is a runway at an airport, for example, a plurality of sensor sections 1010, 1020, etc., may be placed along the runway so as to set the runway to a predetermined resolution, e.g., a resolution that allows any foreign object on the runway that is 5 cm by 5 cm or larger to be detected. The monitoring system 1500 perpetually monitors the runway, regardless of daytime or nighttime and irrespective of weather. This function is enabled by the very ability of the millimeter wave radar according to an example embodiment of the present disclosure to support UWB. Moreover, since the present millimeter wave radar device can be embodied with a small size, a high resolution, and a low cost, it provides a realistic solution for covering the entire runway surface from end to end. In this case, the main section 1100 keeps the plurality of sensor sections 1010, 1020, etc., under integrated management. If a foreign object is found on the runway, the main section 1100 transmits information concerning the position and size of the foreign object to an air-traffic control system (not shown). Upon receiving this, the air-traffic control system temporarily prohibits takeoff and landing on that runway. In the meantime, the main section 1100 transmits information concerning the position and size of the foreign object to a separately-provided vehicle, which automatically cleans the runway surface, etc., for example. Upon receive this, the cleaning vehicle may autonomously move to the position where the foreign object exists, and automatically remove the foreign object. Once removal of the foreign object is completed, the cleaning vehicle transmits information of the completion to the main section 1100. Then, the main section 1100 again confirms that the sensor section 1010 or the like which has detected the foreign object now reports that "no foreign object exists" and that it is safe now, and informs the air-traffic control system of this. Upon receiving this, the air-traffic control system may lift the prohibition of takeoff and landing from the runway.

Furthermore, in the case where the subject of monitoring is a parking lot, for example, it may be possible to automatically recognize which position in the parking lot is currently vacant. A related technique is described in the specification of U.S. Pat. No. 6,943,726, the entire disclosure of which is incorporated herein by reference.

[Security Monitoring System]

A third monitoring system is a system that monitors a trespasser into a piece of private land or a house (hereinafter referred to as a "security monitoring system"). The subject of monitoring of this security monitoring system may be, for example, a specific region within a piece of private land or a house, etc.

For example, if the subject of monitoring is a piece of private land, the sensor section(s) 1010 may be placed at one position, or two or more positions where the sensor section(s) 1010 is able to monitor it. In this case, in addition to the millimeter wave radar, the sensor section(s) 1010 may also include an optical sensor such as a camera, which will allow a target (subject of monitoring) to be detected from more perspectives, through a fusion process based on radar information and image information. The target information which was obtained by the sensor section 1010($s$) is sent to the main section 1100 via the telecommunication lines 1300. The main section 1100 collects other information (e.g., reference data or the like needed to accurately recognize whether the trespasser is a person or an animal such as a dog or a bird) that may be needed in a more sophisticated recognition process or control, and issues necessary control instructions or the like based thereon. As used herein, a necessary control instruction may be, for example, an instruction to sound an alarm or activate lighting that is installed in the premises, and also an instruction to directly report to a person in charge of the premises via mobile telecommunication lines or the like, etc. The processing section 1101 in the main section 1100 may allow an internalized, sophisticated apparatus of recognition (that adopts deep learning or a like technique) to recognize the detected target. Alternatively, such a sophisticated apparatus of recognition may be provided externally, in which case the sophisticated apparatus of recognition may be connected via the telecommunication lines 1300.

A related technique is described in the specification of U.S. Pat. No. 7,425,983, the entire disclosure of which is incorporated herein by reference.

Another example embodiment of such a security monitoring system may be a human monitoring system to be installed at a boarding gate at an airport, a station wicket, an entrance of a building, or the like. The subject of monitoring of such a human monitoring system may be, for example, a boarding gate at an airport, a station wicket, an entrance of a building, or the like.

If the subject of monitoring is a boarding gate at an airport, the sensor section(s) 1010 may be installed in a machine for checking personal belongings at the boarding gate, for example. In this case, there may be two checking methods as follows. In a first method, the millimeter wave radar transmits an electromagnetic wave, and receives the electromagnetic wave as it reflects off a passenger (which is the subject of monitoring), thereby checking personal belongings or the like of the passenger. In a second method, a weak millimeter wave which is radiated from the passenger's own body is received by the antenna, thus checking for any foreign object that the passenger may be hiding. In the latter method, the millimeter wave radar preferably has a function of scanning the received millimeter wave. This scanning function may be implemented by using digital beam forming, or through a mechanical scanning operation. Note that the processing by the main section 1100 may utilize a communication process and a recognition process similar to those in the above-described examples.

[Building Inspection System (Non-Destructive Inspection)]

A fourth monitoring system is a system that monitors or checks the concrete material of a road, a railroad overpass, a building, etc., or the interior of a road or the ground, etc., (hereinafter referred to as a "building inspection system").

The subject of monitoring of this building inspection system may be, for example, the interior of the concrete material of an overpass or a building, etc., or the interior of a road or the ground, etc.

For example, if the subject of monitoring is the interior of a concrete building, the sensor section 1010 is structured so that the antenna 1011 can make scan motions along the surface of a concrete building. As used herein, "scan motions" may be implemented manually, or a stationary rail for the scan motion may be separately provided, upon which to cause the movement by using driving power from an electric motor or the like. In the case where the subject of monitoring is a road or the ground, the antenna 1011 may be installed face-down on a vehicle or the like, and the vehicle may be allowed to travel at a constant velocity, thus creating a "scan motion". The electromagnetic wave to be used by the sensor section 1010 may be a millimeter wave in e.g. the so-called terahertz region, exceeding 100 GHz. As described earlier, even with an electromagnetic wave over e.g. 100 GHz, an array antenna according to an example embodiment of the present disclosure can be adapted to have smaller losses than do conventional patch antennas or the like. An electromagnetic wave of a higher frequency is able to permeate deeper into the subject of checking, such as concrete, thereby realizing a more accurate non-destructive inspection. Note that the processing by the main section 1100 may also utilize a communication process and a recognition process similar to those in the other monitoring systems described above.

A related technique is described in the specification of U.S. Pat. No. 6,661,367, the entire disclosure of which is incorporated herein by reference.

[Human Monitoring System]

A fifth monitoring system is a system that watches over a person who is subject to nursing care (hereinafter referred to as a "human watch system"). The subject of monitoring of this human watch system may be, for example, a person under nursing care or a patient in a hospital, etc.

For example, if the subject of monitoring is a person under nursing care within a room of a nursing care facility, the sensor section(s) 1010 is placed at one position, or two or more positions inside the room where the sensor section(s) 1010 is able to monitor the entirety of the inside of the room. In this case, in addition to the millimeter wave radar, the sensor section 1010 may also include an optical sensor such as a camera. In this case, the subject of monitoring can be monitored from more perspectives, through a fusion process based on radar information and image information. On the other hand, when the subject of monitoring is a person, from the standpoint of privacy protection, monitoring with a camera or the like may not be appropriate. Therefore, sensor selections must be made while taking this aspect into consideration. Note that target detection by the millimeter wave radar will allow a person, who is the subject of monitoring, to be captured not by his or her image, but by a signal (which is, as it were, a shadow of the person). Therefore, the millimeter wave radar may be considered as a desirable sensor from the standpoint of privacy protection.

Information of the person under nursing care which has been obtained by the sensor section(s) 1010 is sent to the main section 1100 via the telecommunication lines 1300. The main section 1100 collects other information (e.g., reference data or the like needed to accurately recognize target information of the person under nursing care) that may be needed in a more sophisticated recognition process or control, and issues necessary control instructions or the like based thereon. As used herein, a necessary control instruction may be, for example, an instruction to directly report a person in charge based on the result of detection, etc. The processing section 1101 in the main section 1100 may allow an internalized, sophisticated apparatus of recognition (that adopts deep learning or a like technique) to recognize the detected target. Alternatively, such a sophisticated apparatus of recognition may be provided externally, in which case the sophisticated apparatus of recognition may be connected via the telecommunication lines 1300.

In the case where a person is the subject of monitoring of the millimeter wave radar, at least the two following functions may be added.

A first function is a function of monitoring the heart rate and/or the respiratory rate. In the case of a millimeter wave radar, an electromagnetic wave is able to see through the clothes to detect the position and motions of the skin surface of a person's body. First, the processing section 1101 detects a person who is the subject of monitoring and an outer shape thereof. Next, in the case of detecting a heart rate, for example, a position on the body surface where the heartbeat motions are easy to detect may be identified, and the motions there may be chronologically detected. This allows a heart rate per minute to be detected, for example. The same is also true when detecting a respiratory rate. By using this function, the health status of a person under nursing care can be perpetually checked, thus enabling a higher-quality watch over a person under nursing care.

A second function is a function of fall detection. A person under nursing care such as an elderly person may fall from time to time, due to weakened legs and feet. When a person falls, the velocity or acceleration of a specific site of the person's body, e.g., the head, will reach a certain level or greater. When the subject of monitoring of the millimeter wave radar is a person, the relative velocity or acceleration of the target of interest can be perpetually detected. Therefore, by identifying the head as the subject of monitoring, for example, and chronologically detecting its relative velocity or acceleration, a fall can be recognized when a velocity of a certain value or greater is detected. When recognizing a fall, the processing section 1101 can issue an instruction or the like corresponding to pertinent nursing care assistance, for example.

Note that the sensor section(s) 1010 is secured to a fixed position(s) in the above-described monitoring system or the like. However, the sensor section(s) 1010 can also be installed on a moving entity, e.g., a robot, a vehicle, a flying object such as a drone. As used herein, the vehicle or the like may encompass not only an automobile, but also a smaller sized moving entity such as an electric wheelchair, for example. In this case, this moving entity may include an internal GPS unit which allows its own current position to be always confirmed. In addition, this moving entity may also have a function of further improving the accuracy of its own current position by using map information and the map update information which has been described with respect to the aforementioned fifth processing apparatus.

Furthermore, in any device or system that is similar to the above-described first to third detection devices, first to sixth processing apparatuses, first to fifth monitoring systems, etc., a like construction may be adopted to utilize an array antenna or a millimeter wave radar according to an example embodiment of the present disclosure.

Application Example 3: Communication System

[First Example of Communication System]

The waveguide device and antenna device (array antenna) according to the present disclosure can be used for the transmitter and/or receiver with which a communication system (telecommunication system) is constructed. The waveguide device and antenna device according to the present disclosure are composed of layered conductive members, and therefore are able to keep the transmitter and/or receiver size smaller than in the case of using a hollow waveguide. Moreover, there is no need for dielectric, and thus the dielectric loss of electromagnetic waves can be kept smaller than in the case of using a microstrip line. Therefore, a communication system including a small and highly efficient transmitter and/or receiver can be constructed.

Such a communication system may be an analog type communication system which transmits or receives an analog signal that is directly modulated. However, a digital communication system may be adopted in order to construct a more flexible and higher-performance communication system.

Hereinafter, with reference to FIG. 42, a digital communication system 800A in which a waveguide device and an antenna device according to an example embodiment of the present disclosure are used will be described.

Figure 42:
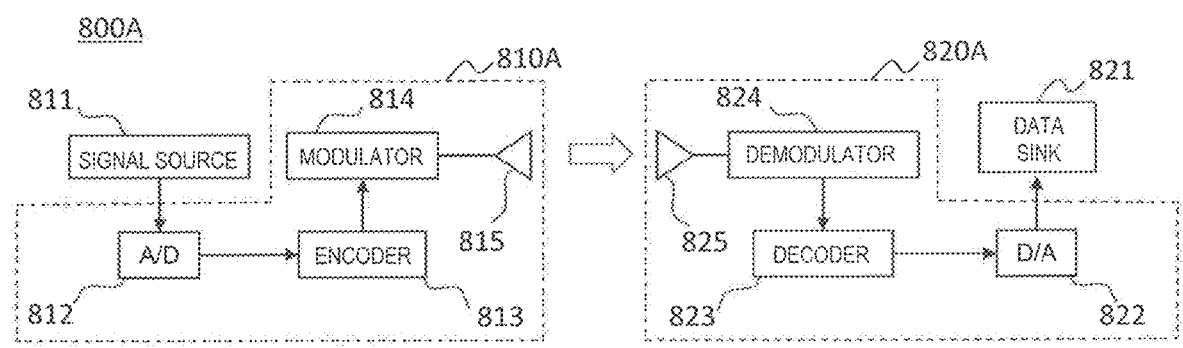
FIG. 42 is a block diagram showing a construction of a digital communication system 800A according to an example embodiment of the present disclosure.

FIG. 42 is a block diagram showing a construction for the digital communication system 800A. The communication system 800A includes a transmitter 810A and a receiver 820A. The transmitter 810A includes an analog to digital (A/D) converter 812, an encoder 813, a modulator 814, and a transmission antenna 815. The receiver 820A includes a reception antenna 825, a demodulator 824, a decoder 823, and a digital to analog (D/A) converter 822. The at least one of the transmission antenna 815 and the reception antenna 825 may be implemented by using an array antenna according to an example embodiment of the present disclosure. In this example application, the circuitry including the modulator 814, the encoder 813, the A/D converter 812, and so on, which are connected to the transmission antenna 815, is referred to as the transmission circuit. The circuitry including the demodulator 824, the decoder 823, the D/A converter 822, and so on, which are connected to the reception antenna 825, is referred to as the reception circuit. The transmission circuit and the reception circuit may be collectively referred to as the communication circuit.

With the analog to digital (A/D) converter 812, the transmitter 810A converts an analog signal which is received from the signal source 811 to a digital signal. Next, the digital signal is encoded by the encoder 813. As used herein, "encoding" means altering the digital signal to be transmitted into a format which is suitable for communication. Examples of such encoding include CDM (Code-Division Multiplexing) and the like. Moreover, any conversion for effecting TDM (Time-Division Multiplexing) or FDM (Frequency Division Multiplexing), or OFDM (Orthogonal Frequency Division Multiplexing) is also an example of encoding. The encoded signal is converted by the modulator 814 into a radio frequency signal, so as to be transmitted from the transmission antenna 815.

In the field of communications, a wave representing a signal to be superposed on a carrier wave may be referred to as a "signal wave"; however, the term "signal wave" as used in the present specification does not carry that definition. A "signal wave" as referred to in the present specification is broadly meant to be any electromagnetic wave to propagate in a waveguide, or any electromagnetic wave for transmission/reception via an antenna element.

The receiver 820A restores the radio frequency signal that has been received by the reception antenna 825 to a low-frequency signal at the demodulator 824, and to a digital signal at the decoder 823. The decoded digital signal is restored to an analog signal by the digital to analog (D/A) converter 822, and is sent to a data sink (data receiver) 821. Through the above processes, a sequence of transmission and reception processes is completed.

When the communicating agent is a digital appliance such as a computer, analog to digital conversion of the transmission signal and digital to analog conversion of the reception signal are not needed in the aforementioned processes. Thus, the analog to digital converter 812 and the digital to analog converter 822 in FIG. 42 may be omitted. A system of such construction is also encompassed within a digital communication system.

In a digital communication system, in order to ensure signal intensity or expand channel capacity, various methods may be adopted. Many such methods are also effective in a communication system which utilizes radio waves of the millimeter wave band or the terahertz band.

Radio waves in the millimeter wave band or the terahertz band have higher straightness than do radio waves of lower frequencies, and undergoes less diffraction, i.e., bending around into the shadow side of an obstacle. Therefore, it is not uncommon for a receiver to fail to directly receive a radio wave that has been transmitted from a transmitter. Even in such situations, reflected waves may often be received, but a reflected wave of a radio wave signal is often poorer in quality than is the direct wave, thus making stable reception more difficult. Furthermore, a plurality of reflected waves may arrive through different paths. In that case, the reception waves with different path lengths might differ in phase from one another, thus causing multi-path fading.

As a technique for improving such situations, a so-called antenna diversity technique may be used. In this technique, at least one of the transmitter and the receiver includes a plurality of antennas. If the plurality of antennas are parted by distances which differ from one another by at least about the wavelength, the resulting states of the reception waves will be different. Accordingly, the antenna that is capable of transmission/reception with the highest quality among all is selectively used, thereby enhancing the reliability of communication. Alternatively, signals which are obtained from more than one antenna may be merged for an improved signal quality.

In the communication system 800A shown in FIG. 42, for example, the receiver 820A may include a plurality of reception antennas 825. In this case, a switcher exists between the plurality of reception antennas 825 and the demodulator 824. Through the switcher, the receiver 820A connects the antenna that provides the highest-quality signal among the plurality of reception antennas 825 to the demodulator 824. In this case, the transmitter 810A may also include a plurality of transmission antennas 815.

[Second Example of Communication System]

Figure 43:
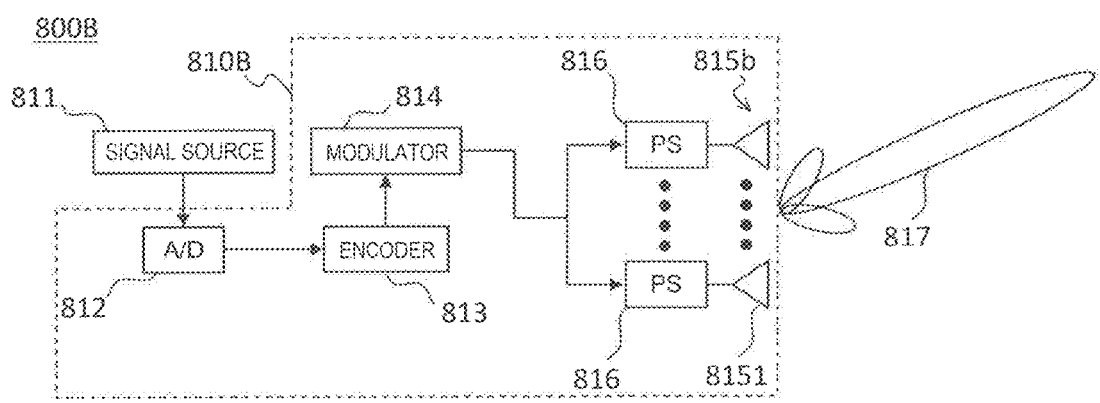
FIG. 43 is a block diagram showing an example communication system 800B according to an example embodiment of the present disclosure including a transmitter 810B which is capable of changing its radio wave radiation pattern.

FIG. 43 is a block diagram showing an example of a communication system 800B including a transmitter 810B which is capable of varying the radiation pattern of radio waves. In this example application, the receiver is identical to the receiver 820A shown in FIG. 42; for this reason, the receiver is omitted from illustration in FIG. 43. In addition to the construction of the transmitter 810A, the transmitter 810B also includes an antenna array 815*b*, which includes a plurality of antenna elements 8151. The antenna array 815*b* may be an array antenna according to an example embodiment of the present disclosure. The transmitter 810B further includes a plurality of phase shifters (PS) 816 which are respectively connected between the modulator 814 and the plurality of antenna elements 8151. In the transmitter 810B, an output of the modulator 814 is sent to the plurality of phase shifters 816, where phase differences are imparted and the resultant signals are led to the plurality of antenna elements 8151. In the case where the plurality of antenna elements 8151 are disposed at equal intervals, if a radio frequency signal whose phase differs by a certain amount with respect to an adjacent antenna element is fed to each antenna element 8151, a main lobe 817 of the antenna array 815b will be oriented in an azimuth which is inclined from the front, this inclination being in accordance with the phase difference. This method may be referred to as beam forming.

The azimuth of the main lobe 817 may be altered by allowing the respective phase shifters 816 to impart varying phase differences. This method may be referred to as beam steering. By finding phase differences that are conducive to the best transmission/reception state, the reliability of communication can be enhanced. Although the example here illustrates a case where the phase difference to be imparted by the phase shifters 816 is constant between any adjacent antenna elements 8151, this is not limiting. Moreover, phase differences may be imparted so that the radio wave will be radiated in an azimuth which allows not only the direct wave but also reflected waves to reach the receiver.

A method called null steering can also be used in the transmitter 810B. This is a method where phase differences are adjusted to create a state where the radio wave is radiated in no specific direction. By performing null steering, it becomes possible to restrain radio waves from being radiated toward any other receiver to which transmission of the radio wave is not intended. This can avoid interference. Although a very broad frequency band is available to digital communication utilizing millimeter waves or terahertz waves, it is nonetheless preferable to make as efficient a use of the bandwidth as possible. By using null steering, plural instances of transmission/reception can be performed within the same band, whereby efficiency of utility of the bandwidth can be enhanced. A method which enhances the efficiency of utility of the bandwidth by using techniques such as beam forming, beam steering, and null steering may sometimes be referred to as SDMA (Spatial Division Multiple Access).

[Third Example of Communication System]

In order to increase the channel capacity in a specific frequency band, a method called MIMO (Multiple-Input and Multiple-Output) may be adopted. Under MIMO, a plurality of transmission antennas and a plurality of reception antennas are used. A radio wave is radiated from each of the plurality of transmission antennas. In one example, respectively different signals may be superposed on the radio waves to be radiated. Each of the plurality of reception antennas receives all of the transmitted plurality of radio waves. However, since different reception antennas will receive radio waves that arrive through different paths, differences will occur among the phases of the received radio waves. By utilizing these differences, it is possible to, at the receiver side, separate the plurality of signals which were contained in the plurality of radio waves.

The waveguide device and antenna device according to the present disclosure can also be used in a communication system which utilizes MIMO. Hereinafter, an example such a communication system will be described.

Figure 44:
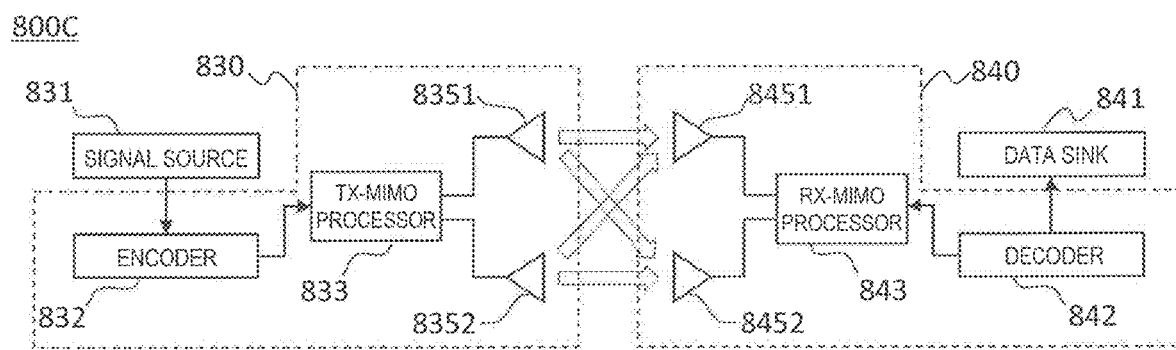
FIG. 44 is a block diagram showing an example communication system 800C according to an example embodiment of the present disclosure implementing a MIMO function.

FIG. 44 is a block diagram showing an example of a communication system 800C implementing a MIMO function. In the communication system 800C, a transmitter 830 includes an encoder 832, a TX-MIMO processor 833, and two transmission antennas 8351 and 8352. A receiver 840 includes two reception antennas 8451 and 8452, an RX-MIMO processor 843, and a decoder 842. Note that the number of transmission antennas and the number of reception antennas may each be greater than two. Herein, for ease of explanation, an example where there are two antennas of each kind will be illustrated. In general, the channel capacity of an MIMO communication system will increase in proportion to the number of whichever is the fewer between the transmission antennas and the reception antennas.

Having received a signal from the data signal source 831, the transmitter 830 encodes the signal at the encoder 832 so that the signal is ready for transmission. The encoded signal is distributed by the TX-MIMO processor 833 between the two transmission antennas 8351 and 8352.

In a processing method according to one example of the MIMO method, the TX-MIMO processor 833 splits a sequence of encoded signals into two, i.e., as many as there are transmission antennas 8352, and sends them in parallel to the transmission antennas 8351 and 8352. The transmission antennas 8351 and 8352 respectively radiate radio waves containing information of the split signal sequences. When there are N transmission antennas, the signal sequence is split into N. The radiated radio waves are simultaneously received by the two reception antennas 8451 and 8452. In other words, in the radio waves which are received by each of the reception antennas 8451 and 8452, the two signals which were split at the time of transmission are mixedly contained. Separation between these mixed signals is achieved by the RX-MIMO processor 843.

The two mixed signals can be separated by paying attention to the phase differences between the radio waves, for example. A phase difference between two radio waves of the case where the radio waves which have arrived from the transmission antenna 8351 are received by the reception antennas 8451 and 8452 is different from a phase difference between two radio waves of the case where the radio waves which have arrived from the transmission antenna 8352 are received by the reception antennas 8451 and 8452. That is, the phase difference between reception antennas differs depending on the path of transmission/reception. Moreover, unless the spatial relationship between a transmission antenna and a reception antenna is changed, the phase difference therebetween remains unchanged. Therefore, based on correlation between reception signals received by the two reception antennas, as shifted by a phase difference which is determined by the path of transmission/reception, it is possible to extract any signal that is received through that path of transmission/reception. The RX-MIMO processor 843 may separate the two signal sequences from the reception signal e.g. by this method, thus restoring the signal sequence before the split. The restored signal sequence still remains encoded, and therefore is sent to the decoder 842 so as to be restored to the original signal there. The restored signal is sent to the data sink 841.

Although the MIMO communication system 800C in this example transmits or receives a digital signal, an MIMO communication system which transmits or receives an analog signal can also be realized. In that case, in addition to the construction of FIG. 44, an analog to digital converter and a digital to analog converter as have been described with reference to FIG. 42 are provided. Note that the information to be used in distinguishing between signals from different transmission antennas is not limited to phase difference information. Generally speaking, for a different combination of a transmission antenna and a reception antenna, the received radio wave may differ not only in terms of phase, but also in scatter, fading, and other conditions. These are collectively referred to as CSI (Channel State Information). CSI may be utilized in distinguishing between different paths of transmission/reception in a system utilizing MIMO.

Note that it is not an essential requirement that the plurality of transmission antennas radiate transmission waves containing respectively independent signals. So long as separation is possible at the reception antenna side, each transmission antenna may radiate a radio wave containing a plurality of signals. Moreover, beam forming may be performed at the transmission antenna side, while a transmission wave containing a single signal, as a synthetic wave of the radio waves from the respective transmission antennas, may be formed at the reception antenna. In this case, too, each transmission antenna is adapted so as to radiate a radio wave containing a plurality of signals.

In this third example, too, as in the first and second examples, various methods such as CDM, FDM, TDM, and OFDM may be used as a method of signal encoding.

In a communication system, a circuit board that implements an integrated circuit (referred to as a signal processing circuit or a communication circuit) for processing signals may be stacked as a layer on the waveguide device and antenna device according to an example embodiment of the present disclosure. Since the waveguide device and antenna device according to an example embodiment of the present disclosure is structured so that plate-like conductive members are layered therein, it is easy to further stack a circuit board thereupon. By adopting such an arrangement, a transmitter and a receiver which are smaller in volume than in the case where a hollow waveguide or the like is employed can be realized.

In the first to third examples of the communication system as described above, each element of a transmitter or a receiver, e.g., an analog to digital converter, a digital to analog converter, an encoder, a decoder, a modulator, a demodulator, a TX-MIMO processor, or an RX-MIMO processor, is illustrated as one independent element in FIGS. 42, 43, and 44; however, these do not need to be discrete. For example, all of these elements may be realized by a single integrated circuit. Alternatively, some of these elements may be combined so as to be realized by a single integrated circuit. Either case qualifies as an example embodiment of the present disclosure so long as the functions which have been described in the present disclosure are realized thereby.

A slot antenna device according to the present disclosure is usable in any technological field that makes use of an antenna. For example, they are available to various applications where transmission/reception of electromagnetic waves of the gigahertz band or the terahertz band is performed. In particular, they may be used in onboard radar systems, various types of monitoring systems, indoor positioning systems, wireless communication systems, etc., where downsizing is desired.

While the present disclosure has been described with respect to example embodiments thereof, it will be apparent to those skilled in the art that the disclosed disclosure may be modified in numerous ways and may assume many example embodiments other than those specifically described above. Accordingly, it is intended by the appended claims to cover all modifications of the disclosure that fall within the true spirit and scope of the disclosure.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A slot antenna device, comprising:
a first electrical conductor including a first electrically conductive surface on a front side and a second electrically conductive surface on a rear side, and including at least one slot extending from the first electrically conductive surface through to the second electrically conductive surface;
a second electrical conductor on the rear side of the first electrical conductor, the second electrical conductor including a third electrically conductive surface on the front side, the third electrically conductive surface opposing the second electrically conductive surface;
a ridge-shaped waveguide body on the second electrically conductive surface of the first electrical conductor, the waveguide body including an electrically-conductive waveguide surface that opposes the third electrically conductive surface and extending alongside the third electrically conductive surface; and
an artificial magnetic conductor on at least one of the second electrically conductive surface and the third electrically conductive surface, the artificial magnetic conductor extending on both sides of the waveguide body; wherein
the third electrically conductive surface, the waveguide surface, and the artificial magnetic conductor define a waveguide in a gap extending between the third electrically conductive surface and the waveguide surface;
the waveguide body includes a first ridge and a second ridge;
one end of the first ridge and one end of the second ridge are opposed to each other;
as viewed from a direction perpendicular or substantially perpendicular to the waveguide surface, the at least one slot is located between the one end of the first ridge and the one end of the second ridge;
the at least one slot is open to an external space through the first electrically conductive surface; and
at least one of a spacing between the third electrically conductive surface and the waveguide surface and a width of the waveguide surface is varied along a direction that the waveguide body extends.

2. The slot antenna device of claim 1, wherein
at least one of the second electrical conductor and the waveguide body includes:
at least one dent that broadens the spacing between the third electrically conductive surface and the waveguide surface relative to any adjacent site; or
at least one bump that narrows the spacing between the third electrically conductive surface and the waveguide surface relative to any adjacent site.

3. The slot antenna device of claim 1, wherein the waveguide body includes:
at least one broad portion that broadens the width of the waveguide surface relative to any adjacent site; or
at least one narrow portion that narrows the width of the waveguide surface relative to any adjacent site.

4. The slot antenna device of claim 1, wherein
the first electrical conductor includes a plurality of slots including the at least one slot, the plurality of slots being arranged along the direction that the waveguide body extends;
the waveguide body includes a plurality of ridges including the first ridge and the second ridge; and
as viewed from a direction perpendicular or substantially perpendicular to the waveguide surface, each of the plurality of slots is located between opposing ends of two adjacent ones of the plurality of ridges; and
each of the plurality of slots is open to the external space through the first electrically conductive surface.

5. The slot antenna device of claim 1, comprising:
a plurality of ridge-shaped waveguide bodies including the waveguide body, the plurality of waveguide bodies being on the second electrically conductive surface;
the first electrical conductor includes a plurality of slots including the at least one slot, the plurality of slots being arranged along a direction which intersects the direction that the waveguide body extends;
each of the plurality of waveguide bodies includes a plurality of ridges, such that ends of two adjacent ones of the plurality of ridges oppose each other;
as viewed from a direction perpendicular or substantially perpendicular to waveguide surfaces of the plurality of waveguide bodies, each of the plurality of slots is located between the ends of two adjacent ones of the plurality of ridges; and
each of the plurality of slots is open to the external space through the first electrically conductive surface.

6. The slot antenna device of claim 1, wherein
the artificial magnetic conductor includes a plurality of electrically conductive rods on the second electrically conductive surface; and
each of the plurality of electrically conductive rods includes a leading end opposed to the third electrically conductive surface and a root connected to the second electrically conductive surface.

7. The slot antenna device of claim 1, wherein
the artificial magnetic conductor includes a plurality of electrically conductive rods on the second electrically conductive surface;
each of the plurality of electrically conductive rods includes a leading end opposed to the third electrically conductive surface and a root connected to the second electrically conductive surface; and
at least one of the second electrical conductor and the waveguide body includes:
at least one dent that broadens the spacing between the third electrically conductive surface and the waveguide surface relative to any adjacent site; or
at least one bump serving that narrows the spacing between the third electrically conductive surface and the waveguide surface relative to any adjacent site.

8. The slot antenna device of claim 1, wherein
the artificial magnetic conductor includes a plurality of electrically conductive rods on the second electrically conductive surface;
each of the plurality of electrically conductive rods includes a leading end opposed to the third electrically conductive surface and a root connected to the second electrically conductive surface; and
the waveguide body includes at least one broad portion that broadens the width of the waveguide surface relative to any adjacent site; or at least one narrow portion that narrows the width of the waveguide surface relative to any adjacent site.

9. The slot antenna device of claim 1, wherein
the artificial magnetic conductor includes a plurality of electrically conductive rods on the second electrically conductive surface; and
each of the plurality of electrically conductive rods includes a leading end opposed to the third electrically conductive surface and a root connected to the second electrically conductive surface;
the first electrical conductor includes a plurality of slots including the at least one slot, the plurality of slots being arranged along the direction that the waveguide body extends;
the waveguide body includes a plurality of ridges including the first ridge and the second ridge;
as viewed from a direction perpendicular or substantially perpendicular to the waveguide surface, each of the plurality of slots is located between opposing ends of two adjacent ones of the plurality of ridges; and
each of the plurality of slots is open to the external space through the first electrically conductive surface.

10. The slot antenna device of claim 1, wherein
the artificial magnetic conductor includes a plurality of electrically conductive rods on the second electrically conductive surface; and
a length of the second ridge measured along the direction that the waveguide body extends is approximately equal to or greater than $\lambda o/16$ and approximately equal to or less than $\lambda o/4$, where $\lambda o$ is a wavelength of an electromagnetic wave in free space corresponding to a center frequency in an operating frequency band which is either transmitted or receive by the slot antenna device.

11. The slot antenna device of claim 1, wherein
the artificial magnetic conductor includes a plurality of electrically conductive rods on the second electrically conductive surface;
a length of the second ridge measured along the direction that the waveguide body extends is approximately equal to or greater than $\lambda o/16$ and approximately equal to or less than $\lambda o/4$, where $\lambda o$ is a wavelength of an electromagnetic wave in free space corresponding to a center frequency in an operating frequency band which is either transmitted or receive by the slot antenna device; and
at least one of the second electrical conductor and the waveguide body includes:
at least one dent that broadens the spacing between the third electrically conductive surface and the waveguide surface relative to any adjacent site; or
at least one bump that narrows the spacing between the third electrically conductive surface and the waveguide surface relative to any adjacent site.

12. The slot antenna device of claim 1, wherein
the artificial magnetic conductor includes a plurality of electrically conductive rods on the second electrically conductive surface; and
a length of the second ridge measured along the direction that the waveguide body extends is approximately equal to or greater than $\lambda o/16$ and approximately equal to or less than $\lambda o/4$, where $\lambda o$ is a wavelength of an electromagnetic wave in free space corresponding to a center frequency in an operating frequency band which is either transmitted or receive by the slot antenna device; and the waveguide body includes at least one broad portion that broadens the width of the waveguide surface relative to any adjacent site; or at least one narrow portion that narrows the width of the waveguide surface relative to any adjacent site.

13. The slot antenna device of claim 1, wherein
the artificial magnetic conductor includes a plurality of electrically conductive rods on the second electrically conductive surface;
a length of the second ridge measured along the direction that the waveguide body extends is approximately equal to or greater than $\lambda o/16$ and approximately equal to or less than $\lambda o/4$, where $\lambda o$ is a wavelength of an electromagnetic wave in free space corresponding to a center frequency in an operating frequency band which is either transmitted or receive by the slot antenna device;
the first electrical conductor includes a plurality of slots including the at least one slot, the plurality of slots being arranged along the direction that the waveguide body extends;
the waveguide body includes a plurality of ridges including the first ridge and the second ridge;
as viewed from a direction perpendicular or substantially perpendicular to the waveguide surface, each of the plurality of slots is located between opposing ends of two adjacent ones of the plurality of ridges; and
each of the plurality of slots is open to the external space through the first electrically conductive surface.

14. The slot antenna device of claim 1, wherein
at least one of the second electrical conductor and the waveguide body includes a plurality of dents that broaden the spacing between the third electrically conductive surface and the waveguide surface relative to any adjacent site;
the plurality of dents include a first dent, a second dent, and a third dent which are adjacent to one another and consecutively follow along the direction that the waveguide body extends; and
a distance between centers of the first dent and the second dent is different from a distance between centers of the second dent and the third dent.

15. The slot antenna device of claim 1, wherein
at least one of the second electrical conductor and the waveguide body includes a plurality of bumps that narrow the spacing between the third electrically conductive surface and the waveguide surface relative to any adjacent site;
the plurality of bumps include a first bump, a second bump, and a third bump which are adjacent to one another and consecutively follow along the direction that the waveguide body extends; and
a total distance between centers of the first bump and the second bump is different from a total distance between centers of the second bump and the third bump.

16. The slot antenna device of claim 1, wherein,
the waveguide body includes a plurality of broad portions that broaden the width of the waveguide surface relative to any adjacent site;
the plurality of broad portions include a first broad portion, a second broad portion, and a third broad portion which are adjacent to one another and consecutively follow along the direction that the waveguide body extends; and
a total distance between centers of the first broad portion and the second broad portion is different from a total distance between centers of the second broad portion and the third broad portion.

17. The slot antenna device of claim 1, wherein,
the waveguide body includes a plurality of narrow portions that narrow a width of the waveguide surface relative to any adjacent site;
the plurality of narrow portions include a first narrow portion, a second narrow portion, and a third narrow portion which are adjacent to one another and consecutively follow along the direction that the waveguide body extends; and
a total distance between centers of the first narrow portion and the second narrow portion is different from a total distance between centers of between the second narrow portion and the third narrow portion.

18. The slot antenna device of claim 1, wherein the first electrically conductive surface of the first electrical conductor has a shape defining at least one horn communicating with the at least one slot.

19. The slot antenna device of claim 1, wherein
the first electrically conductive surface of the first electrical conductor has a shape defining at least one horn communicating with the at least one slot;
the artificial magnetic conductor includes a plurality of electrically conductive rods on the second electrically conductive surface; and
each of the plurality of electrically conductive rods includes a leading end opposed to the third electrically conductive surface and a root connected to the second electrically conductive surface.

20. A radar device comprising:
the slot antenna device of claim 1; and
either one or both of a transmitter and a receiver connected to the slot antenna device; wherein
the either one or both of the transmitter and the receiver is implemented as a millimeter wave integrated circuit.

21. A radar device comprising:
the slot antenna device of claim 1; and
either one or both of a transmitter and a receiver connected to the slot antenna device; wherein
the artificial magnetic conductor includes a plurality of electrically conductive rods on the second electrically conductive surface;
each of the plurality of electrically conductive rods includes a leading end opposed to the third electrically conductive surface and a root connected to the second electrically conductive surface; and
the either one or both of the transmitter and the receiver is implemented as a millimeter wave integrated circuit.

22. A radar system comprising:
the slot antenna device of claim 1;
either one or both of a transmitter and a receiver connected to the slot antenna device;
either one or both of an A/D converter connected to the receiver and a D/A converter connected to the transmitter; and
a signal processing circuit connected to the either one or both of the A/D converter and the D/A converter; wherein
the either one or both of the transmitter and the receiver is implemented as a millimeter wave integrated circuit; and
the signal processing circuit performs at least one of direction-of-arrival estimation and estimation of distance.

23. A radar system comprising:
the slot antenna device of claim 1;
either one or both of a transmitter and a receiver connected to the slot antenna device;
either one or both of an A/D converter connected to the receiver and a D/A converter connected to the transmitter; and
a signal processing circuit connected to the either one or both of the A/D converter and the D/A converter; wherein
the artificial magnetic conductor includes a plurality of electrically conductive rods on the second electrically conductive surface;
each of the plurality of electrically conductive rods includes a leading end opposed to the third electrically conductive surface and a root connected to the second electrically conductive surface;
the either one or both of the transmitter and the receiver is implemented as a millimeter wave integrated circuit; and
the signal processing circuit performs at least one of direction-of-arrival estimation and estimation of distance.

24. A communication system comprising:
the slot antenna device of claim 1;
either one or both of a transmitter and a receiver connected to the slot antenna device;
either one or both of an A/D converter connected to the receiver and a D/A converter connected to the transmitter; and
a signal processing circuit connected to the either one or both of the A/D converter and the D/A converter; wherein,
the signal processing circuit performs at least one of encoding a digital signal and decoding a digital signal.

25. A communication system comprising:
the slot antenna device of claim 1;
either one or both of a transmitter and a receiver connected to the slot antenna device;
either one or both of an A/D converter connected to the receiver and a D/A converter connected to the transmitter; and
a signal processing circuit connected to the either one or both of the A/D converter and the D/A converter; wherein
the artificial magnetic conductor includes a plurality of electrically conductive rods on the second electrically conductive surface;
each of the plurality of electrically conductive rods includes a leading end opposed to the third electrically conductive surface and a root connected to the second electrically conductive surface;
the signal processing circuit performs at least one of encoding a digital signal and decoding a digital signal.

\* \* \* \* \*